US008112176B2

(12) United States Patent
Solomon

(10) Patent No.: US 8,112,176 B2
(45) Date of Patent: *Feb. 7, 2012

(54) SYSTEM FOR SELF-ORGANIZING MOBILE ROBOTIC COLLECTIVES

(76) Inventor: Neal Solomon, Oakland, CA (US)

( * ) Notice: Subject to any disclaimer, the term of this patent is extended or adjusted under 35 U.S.C. 154(b) by 911 days.

This patent is subject to a terminal disclaimer.

(21) Appl. No.: 12/011,982

(22) Filed: Jan. 30, 2008

(65) Prior Publication Data
US 2010/0286824 A1   Nov. 11, 2010

(51) Int. Cl.
*G06F 19/00* (2011.01)

(52) U.S. Cl. ........ 700/245; 700/247; 700/248; 700/249; 700/256; 700/258; 318/12; 318/16; 318/568.11; 318/587; 901/1; 901/3; 901/46; 701/17; 701/24; 701/25; 701/26

(58) Field of Classification Search .................. 700/245, 700/247, 248, 249, 256, 258, 259, 264; 318/12, 318/16, 568.11, 587; 901/1, 3, 46; 701/17, 701/24, 25, 26
See application file for complete search history.

(56) References Cited

U.S. PATENT DOCUMENTS

| | | | | |
|---|---|---|---|---|
| 5,020,411 A * | 6/1991 | Rowan | ........................... | 89/1.11 |
| 5,210,821 A * | 5/1993 | Yazaki et al. | ................. | 700/248 |
| 6,249,252 B1 * | 6/2001 | Dupray | ......................... | 342/450 |
| 6,408,226 B1 * | 6/2002 | Byrne et al. | .................. | 700/258 |
| 6,415,274 B1 * | 7/2002 | Goldsmith | ....................... | 706/45 |
| 6,507,771 B2 * | 1/2003 | Payton et al. | ................. | 700/245 |
| 6,687,571 B1 * | 2/2004 | Byrne et al. | ................. | 700/245 |
| 7,085,694 B2 * | 8/2006 | Xavier et al. | ..................... | 703/7 |
| 7,254,464 B1 * | 8/2007 | McLurkin et al. | ........... | 700/245 |
| 7,274,332 B1 * | 9/2007 | Dupray | ......................... | 342/450 |
| 7,298,327 B2 * | 11/2007 | Dupray et al. | ................ | 342/451 |
| 7,343,222 B2 * | 3/2008 | Solomon | ........................ | 700/245 |
| 7,525,484 B2 * | 4/2009 | Dupray et al. | ................ | 342/450 |
| 7,571,025 B2 * | 8/2009 | Bischoff | ....................... | 700/248 |
| 7,764,231 B1 * | 7/2010 | Karr et al. | ..................... | 342/457 |
| 2001/0022558 A1 * | 9/2001 | Karr et al. | ..................... | 342/450 |
| 2002/0165638 A1 * | 11/2002 | Bancroft et al. | ............. | 700/213 |
| 2004/0162638 A1 * | 8/2004 | Solomon | ....................... | 700/247 |
| 2005/0187677 A1 * | 8/2005 | Walker | ............................ | 701/16 |
| 2007/0100479 A1 * | 5/2007 | Ahmed | ............................ | 700/47 |
| 2008/0237754 A1 * | 10/2008 | Solomon | ....................... | 257/414 |
| 2008/0241264 A1 * | 10/2008 | Solomon | ....................... | 424/490 |
| 2008/0244500 A1 * | 10/2008 | Solomon | ......................... | 716/16 |
| 2008/0269948 A1 * | 10/2008 | Solomon | ....................... | 700/245 |
| 2008/0270097 A1 * | 10/2008 | Solomon | ....................... | 703/11 |

* cited by examiner

*Primary Examiner* — James Trammell
*Assistant Examiner* — McDieunel Marc

(57) ABSTRACT

A system of self-organizing mobile robotic agents (MRAs) in a multi-robotic system (MRS) is disclosed. The MRAs use simulations to organize the behaviors of groups of robots in the MRS. The MRAs use software agents to model the MRS and the environment. By developing simulations of environmental change, the system provides methods for the MRS to interact with its environment to produce collective epigenetic behaviors.

11 Claims, 100 Drawing Sheets

IMSA Operations Control of MRAs

Fig 1: System Layers

8. Functional Applications

7. Cellular Automata (CA) Simulations

6. Multi-Agent System (MAS) and Intelligent Mobile Software Agents (IMSA)

5. Omni-Nodal Evolutionary Artificial Neural Network (EANN)

4. Dynamic Distributed Object Relational Database Management System (ORDbMS)

3. Flexible Mobile Grid Computing Architecture in Dynamic Clusters

2. Distributed Mobile Robotic System (MRS) for Mobile Robotic Agents (MRAs)

1. Second-order Synthetic Hybrid Control System (HCS) for Mobile Robotic Agents (MRAs)

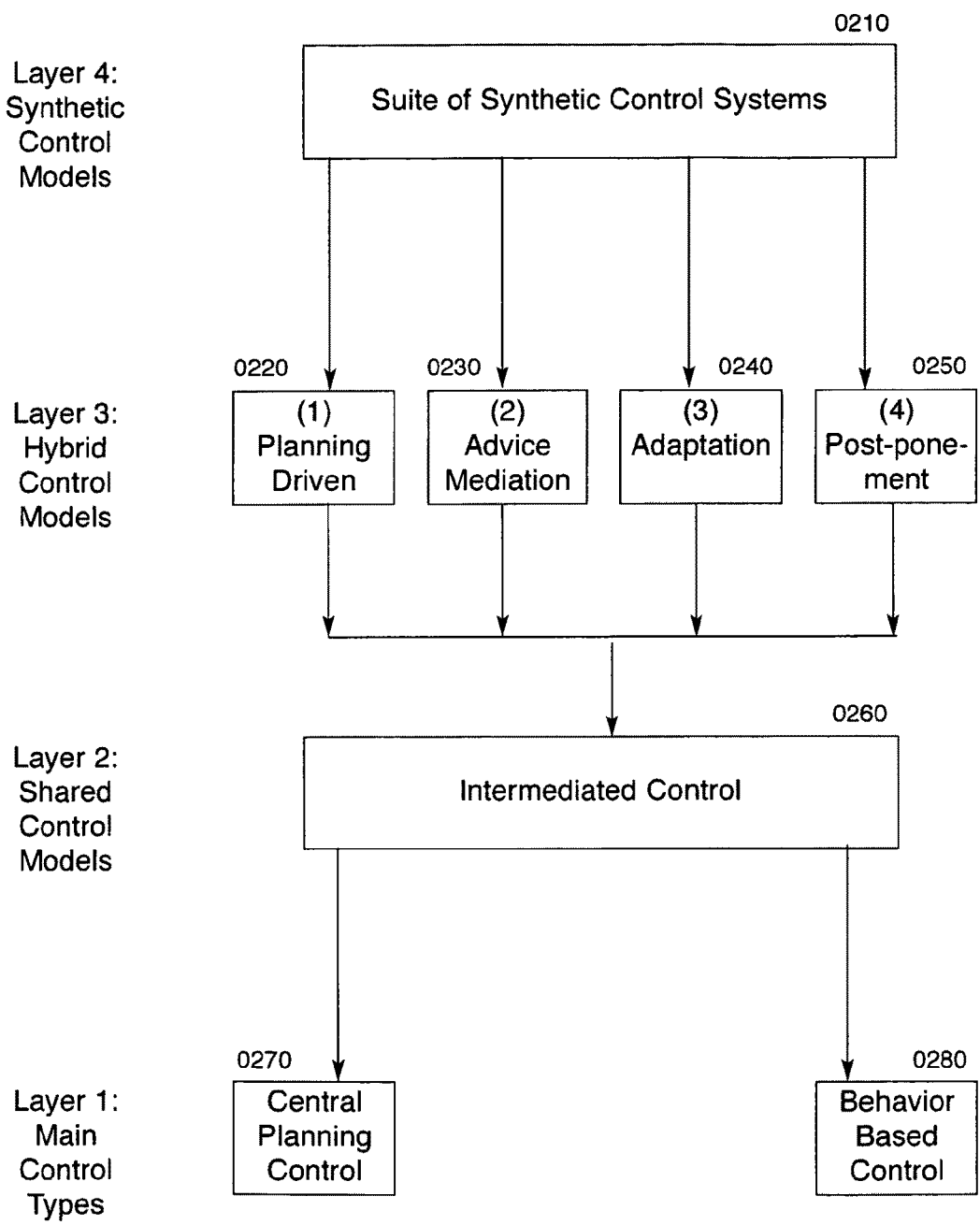
Fig 2: MRA Synthetic Hybrid Control System Architecture

Fig 3: Dynamic Database Organization

| Modular Architecture / Type | One Unit | Distributed Network | Mobility |
|---|---|---|---|
| MRAs in MRS | Hardware agent<br><br>ORDb data organization | Distributed computers (Data management within network)<br><br>Sharing ORDbs (sharing data organization functions) | Mobile robotic agents with changing spatial positions |
| IMSAs in MAS | Software agents that analyze, decide, and negotiate | Mobile groups of interacting software agents | Limited range of IMSA interactions within wireless mobile robotic agent network |
| Evolutionary Artificial Neural Networks | Computation resource management | Continuous restructuring of network grid to maximize computation power | Wireless mobile grid of flexible network rewiring as it adapts to environment |

Fig 4: Identifying MRA Locations With Sensors
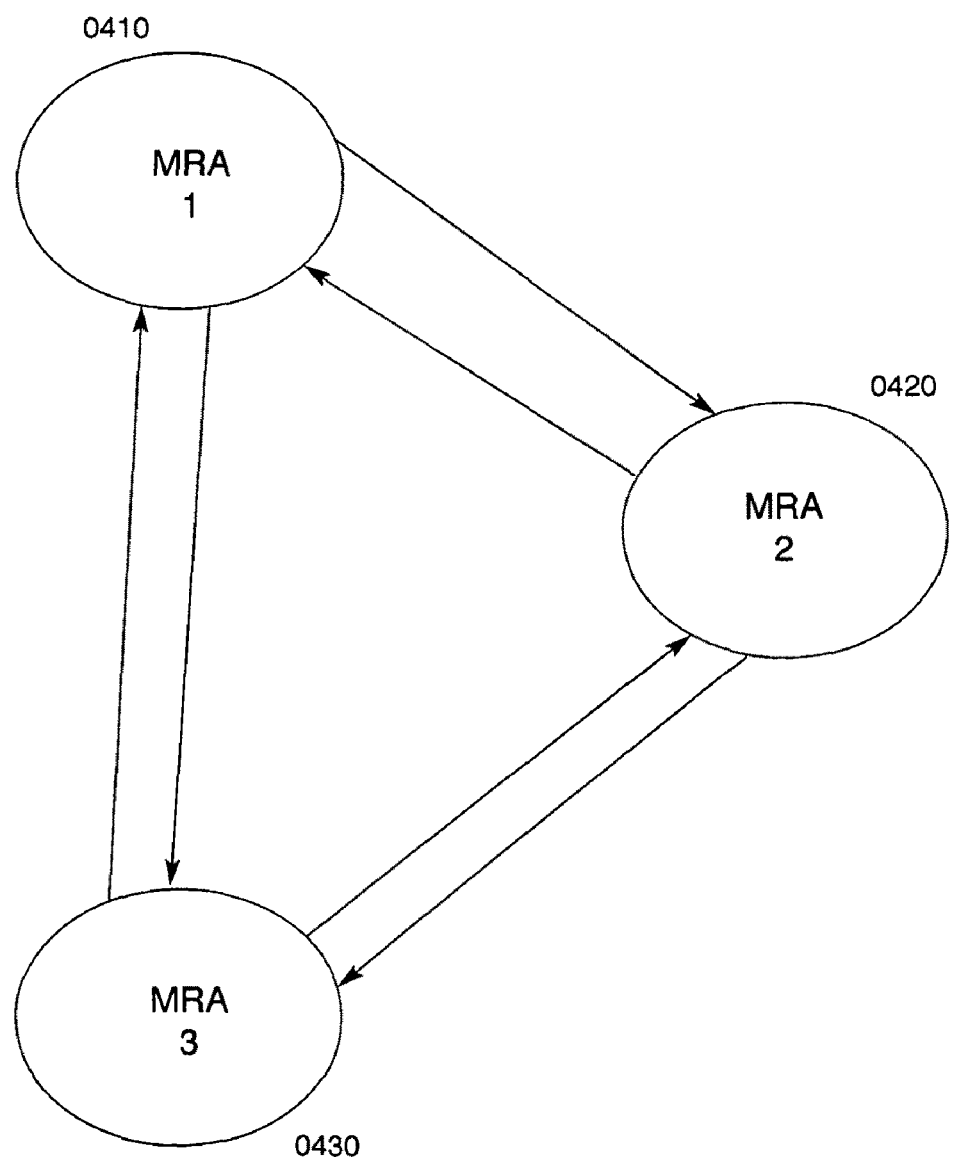

Fig 5: Assessing Environmental Situation and Coordinating Change in MRA State
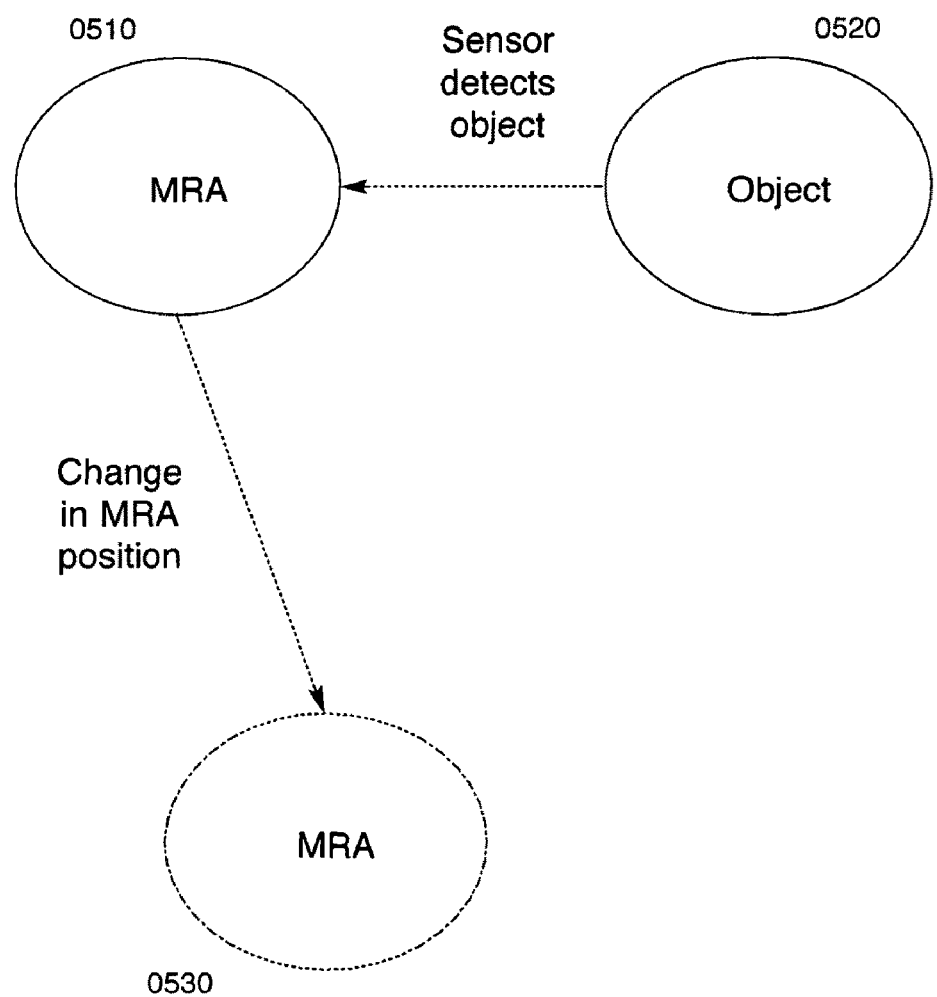

**Fig 6: Metacomputing Model for Distributed MRS:
Flexible Mobile Grid Architecture in Dynamic Clusters**
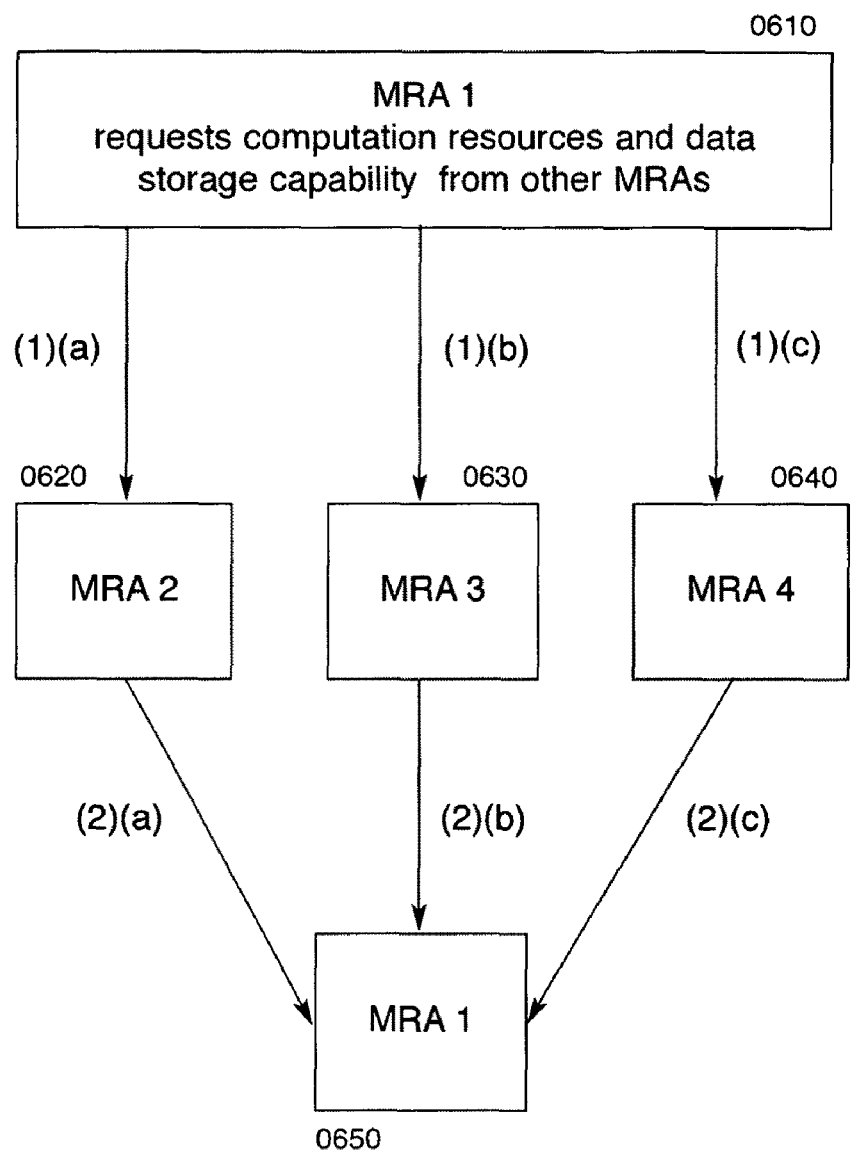

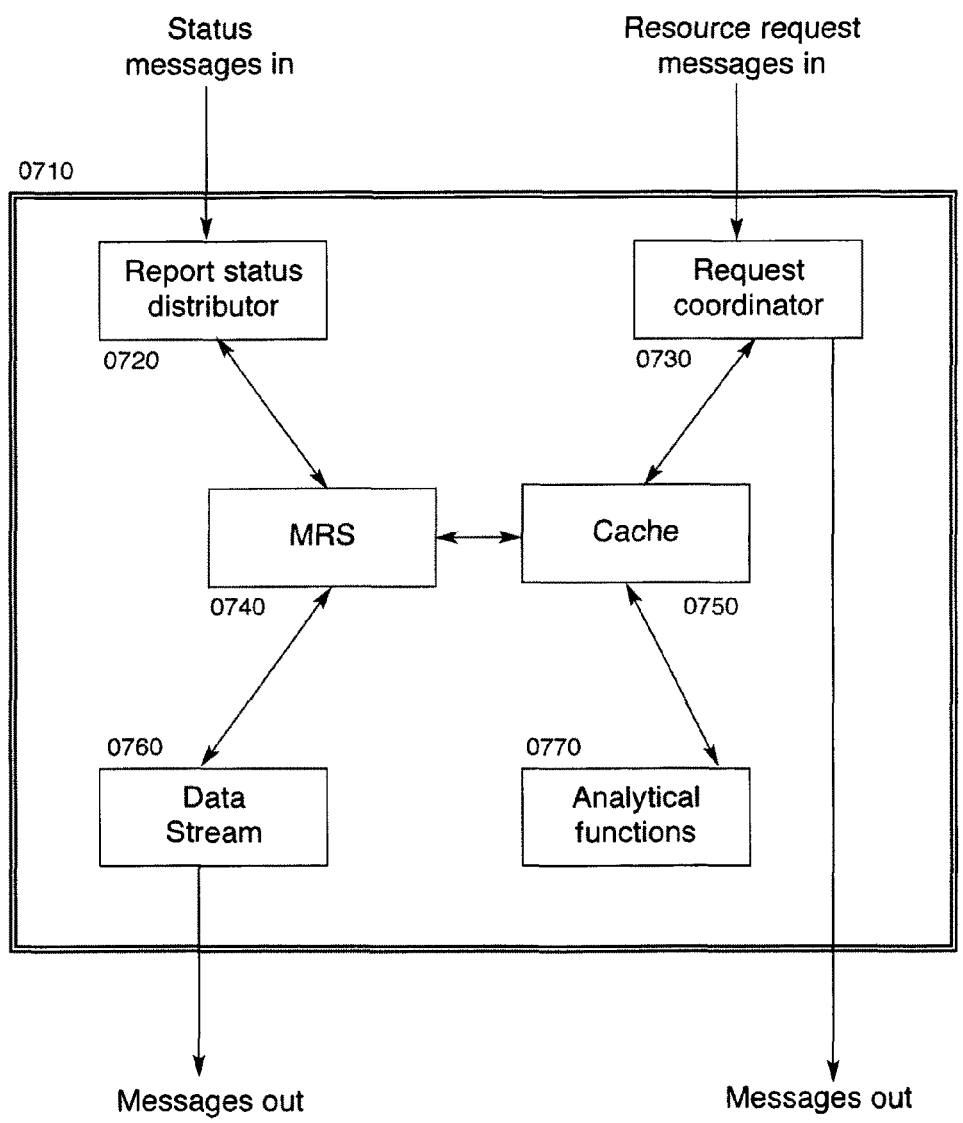
Fig 7: Sharing Computation Resources Among MRA Nodes in Wireless Mobile MRS: Efficient Routing of Database and Analytical Functions

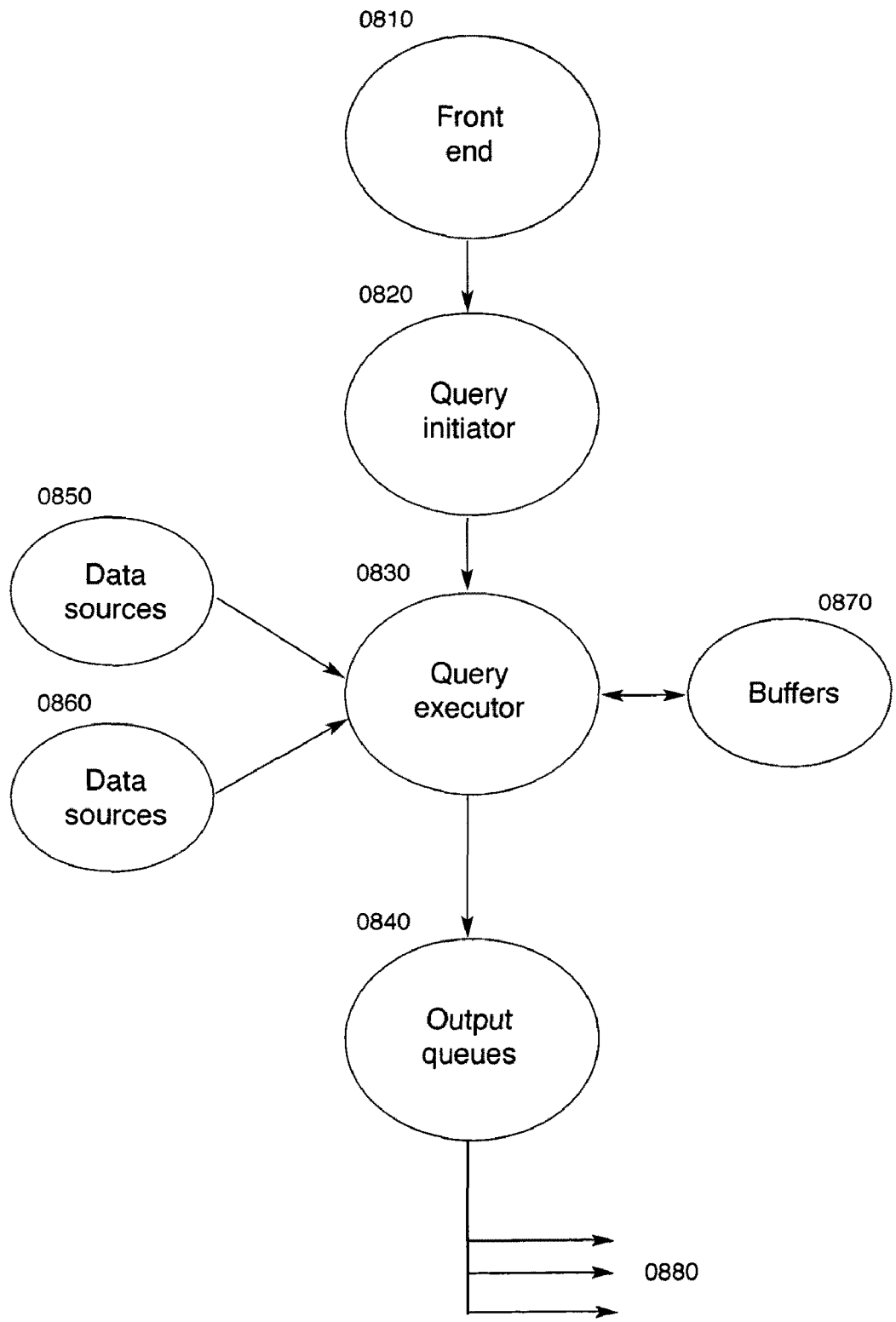
Fig 8: Database Coordination in Distributed MRS

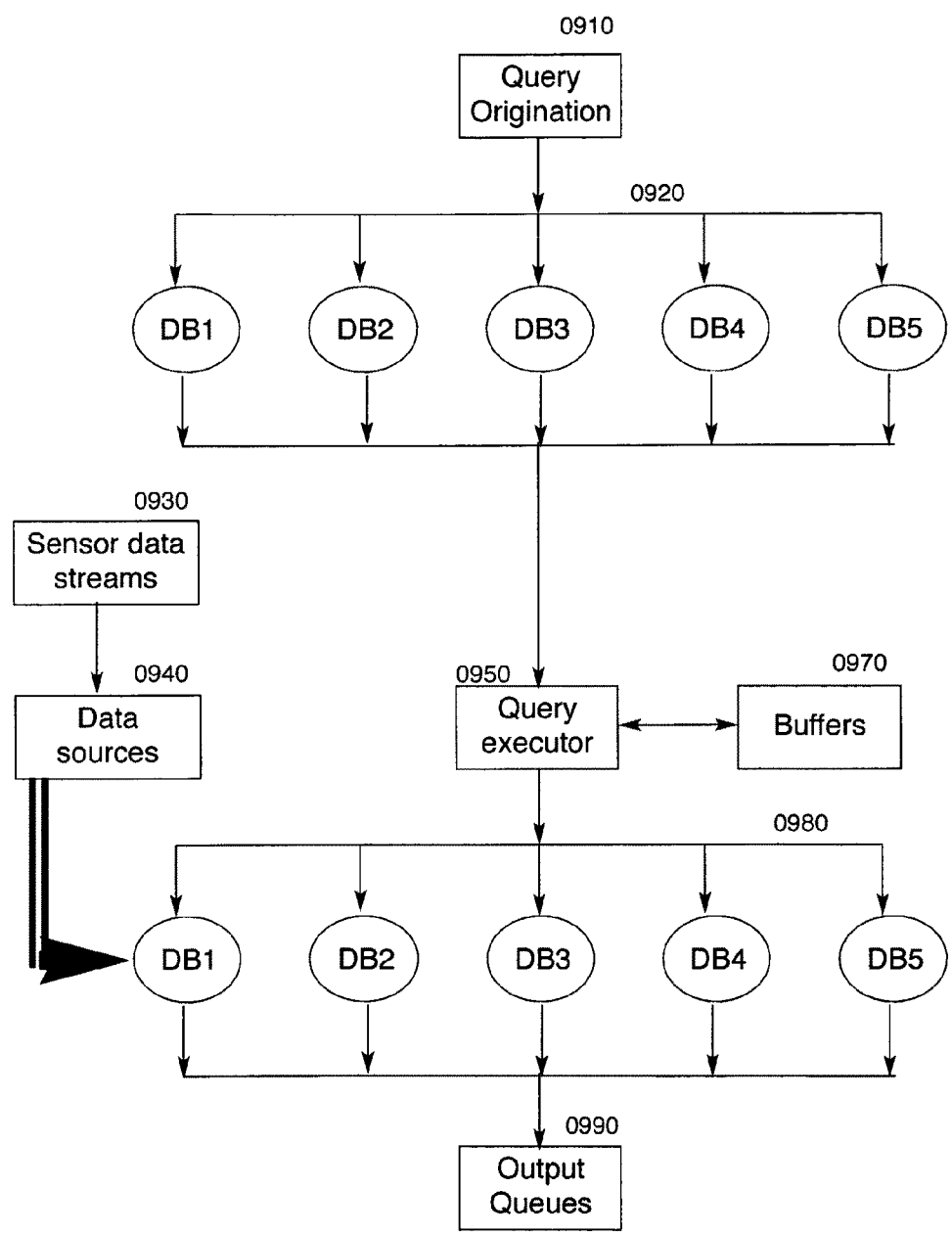
Fig 9: Dynamic Distributed Object Relational Database Data Flow Process

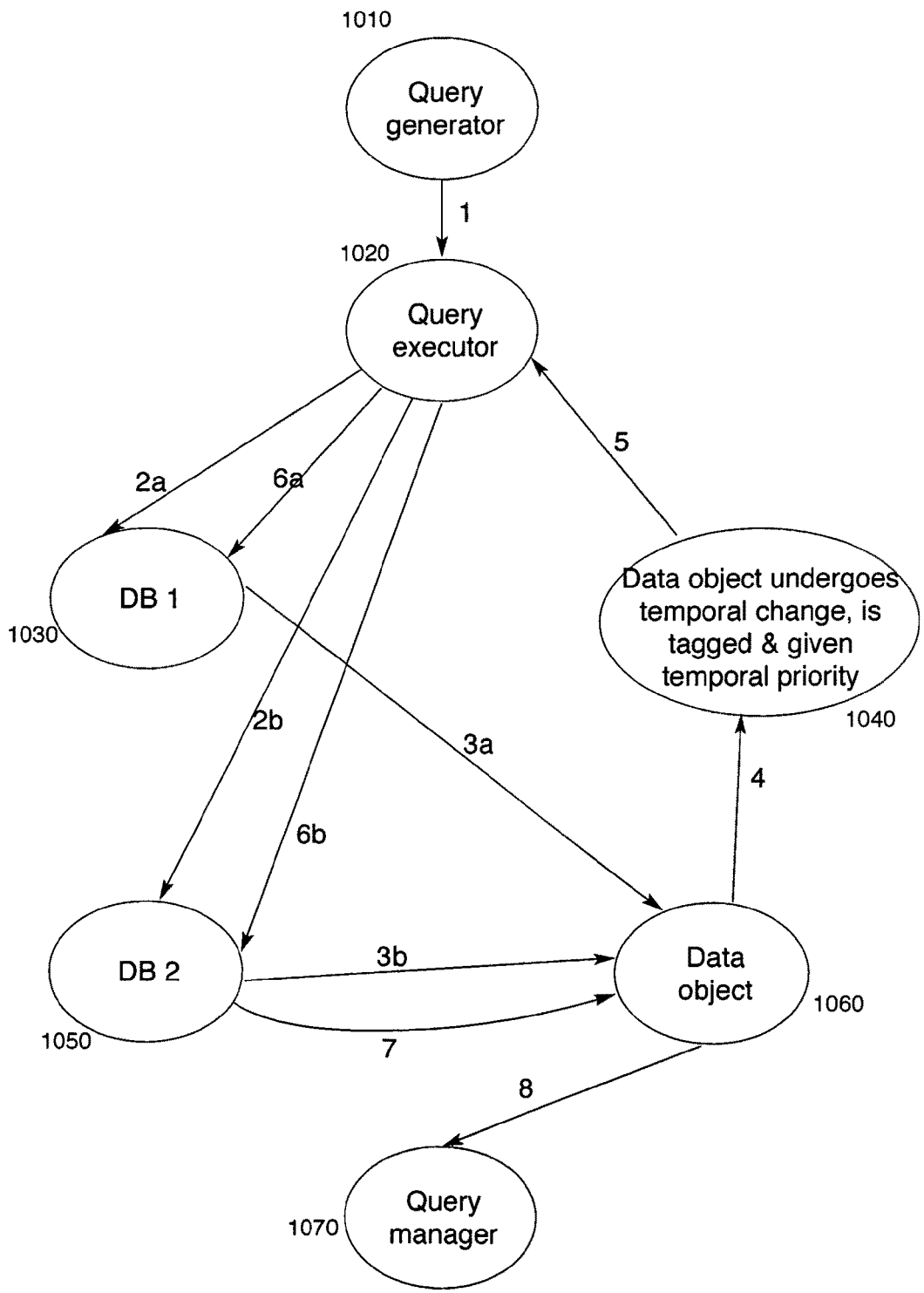
Fig 10: Temporal Objects in ORDbMS

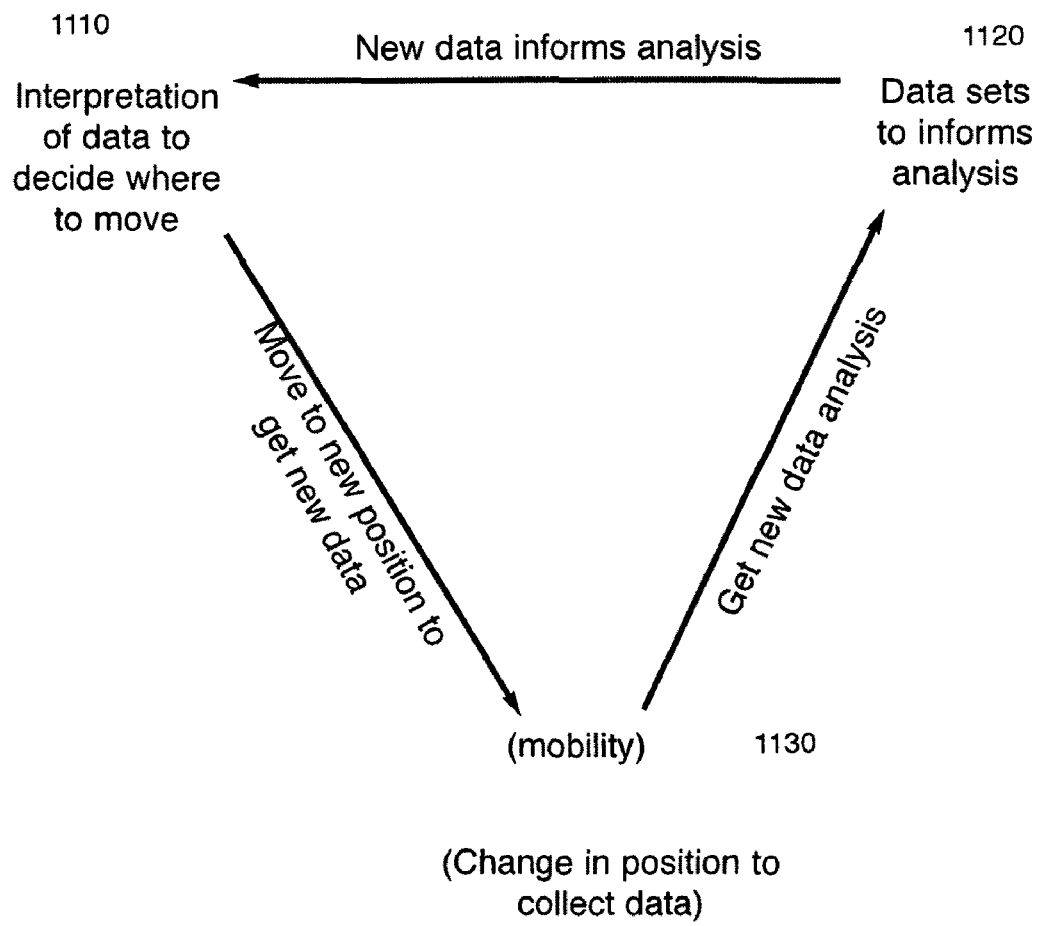
Fig 11: Mobile Grid Dynamics

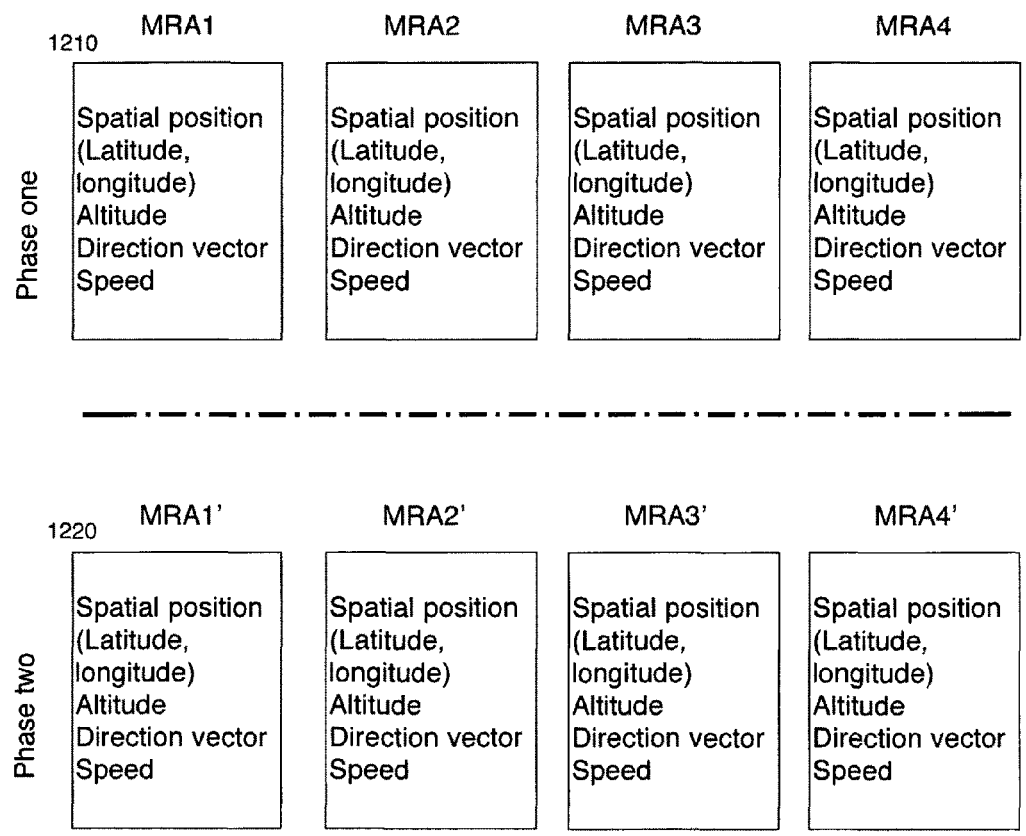
Fig 12: Autonomous Blackboards For MRAs
Data set changes from phase one to phase two

Fig 13: IMSA Operations Control of MRAs
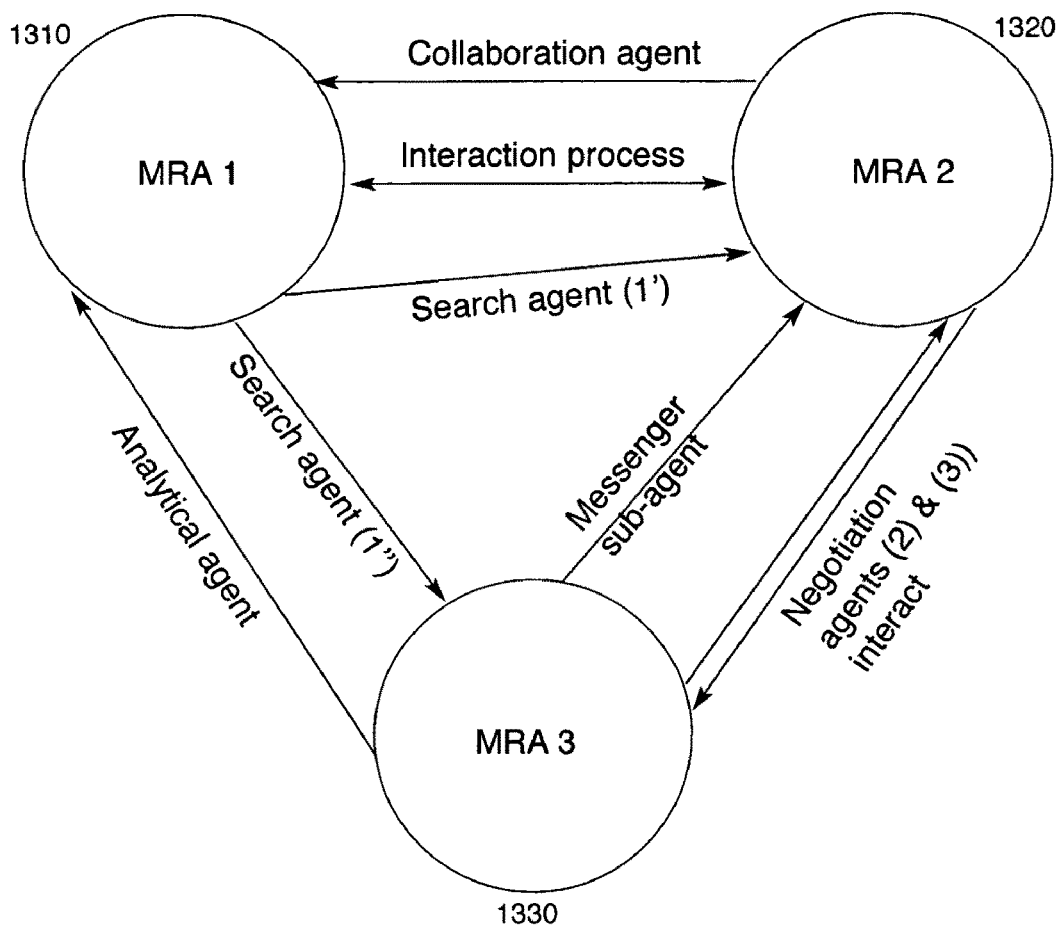

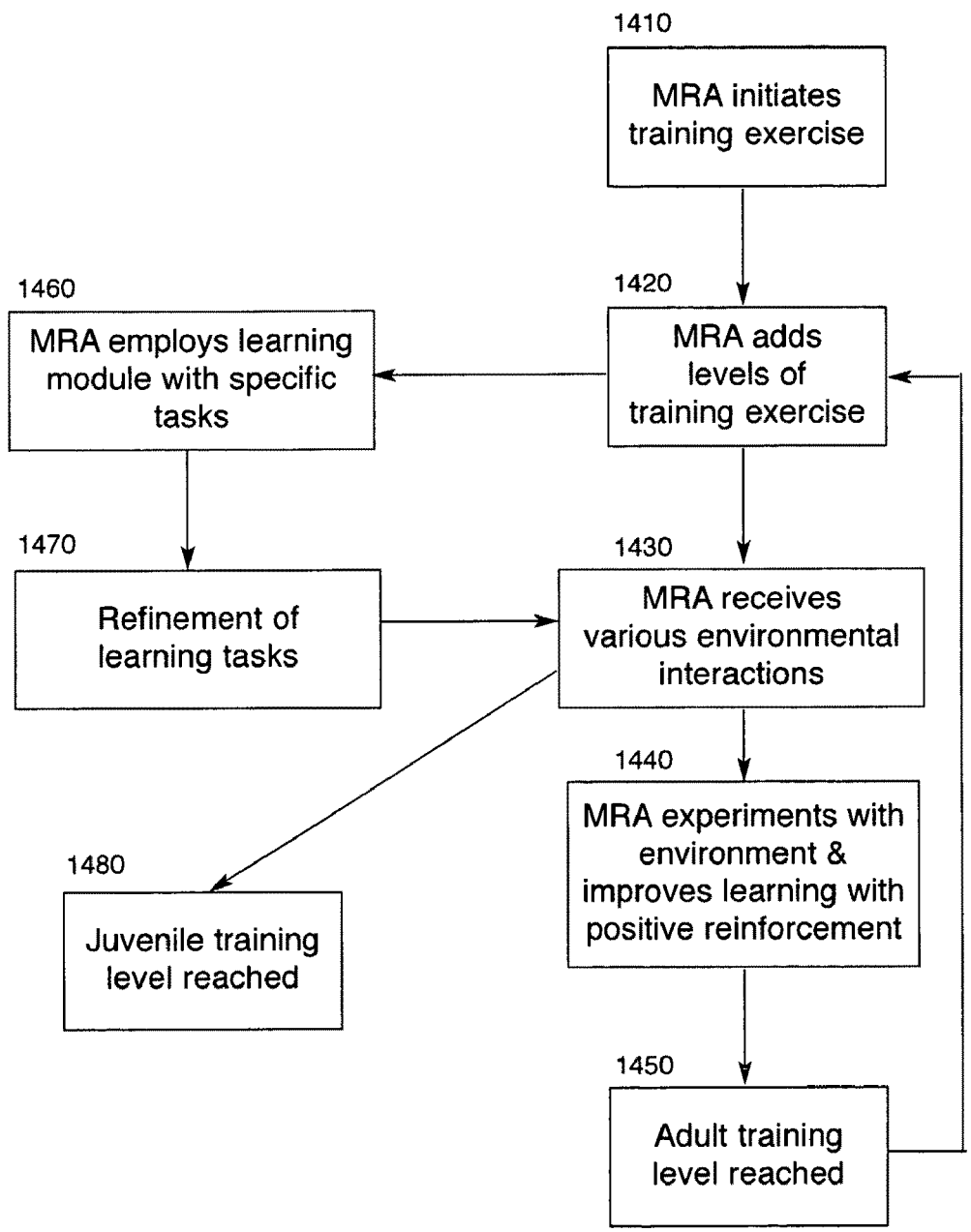
Fig 14: MRA Juvenile and Adult Training Levels

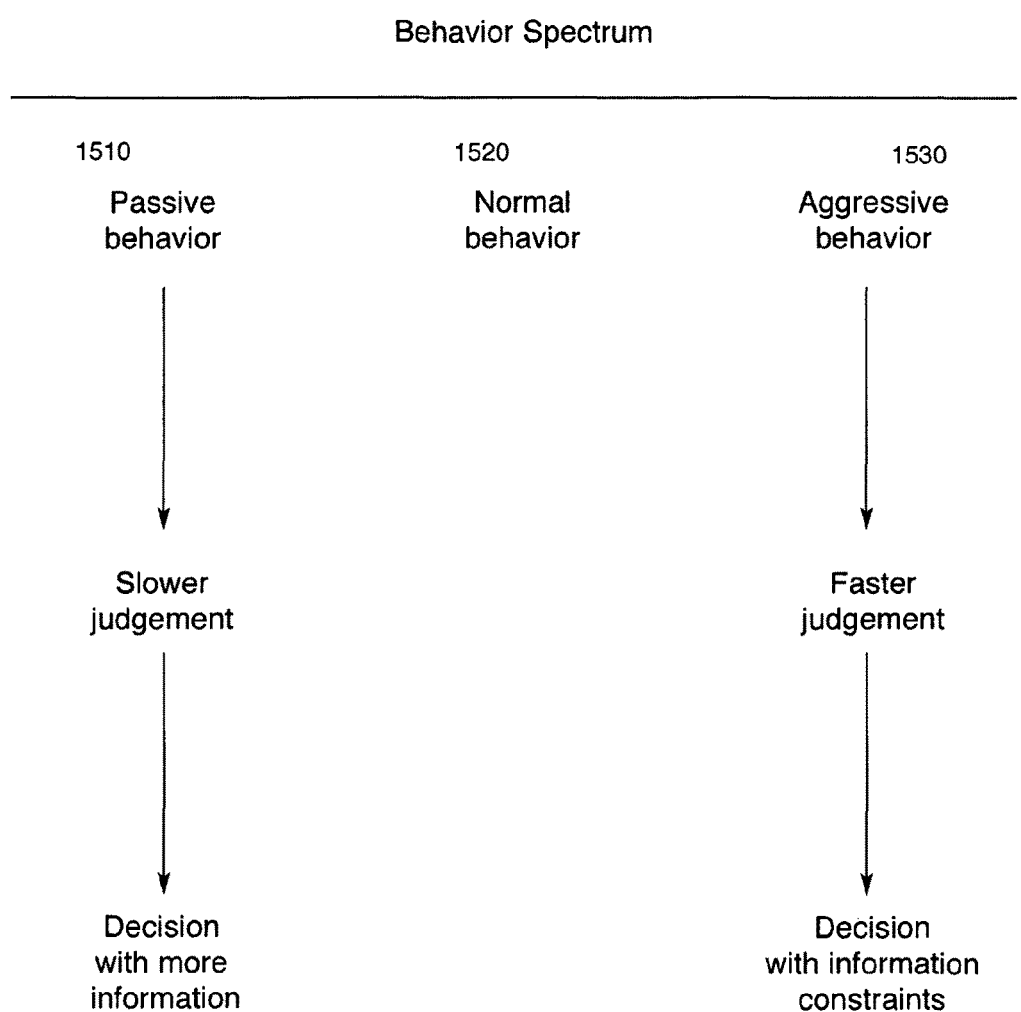
Fig 15: MRA Attitude Biases

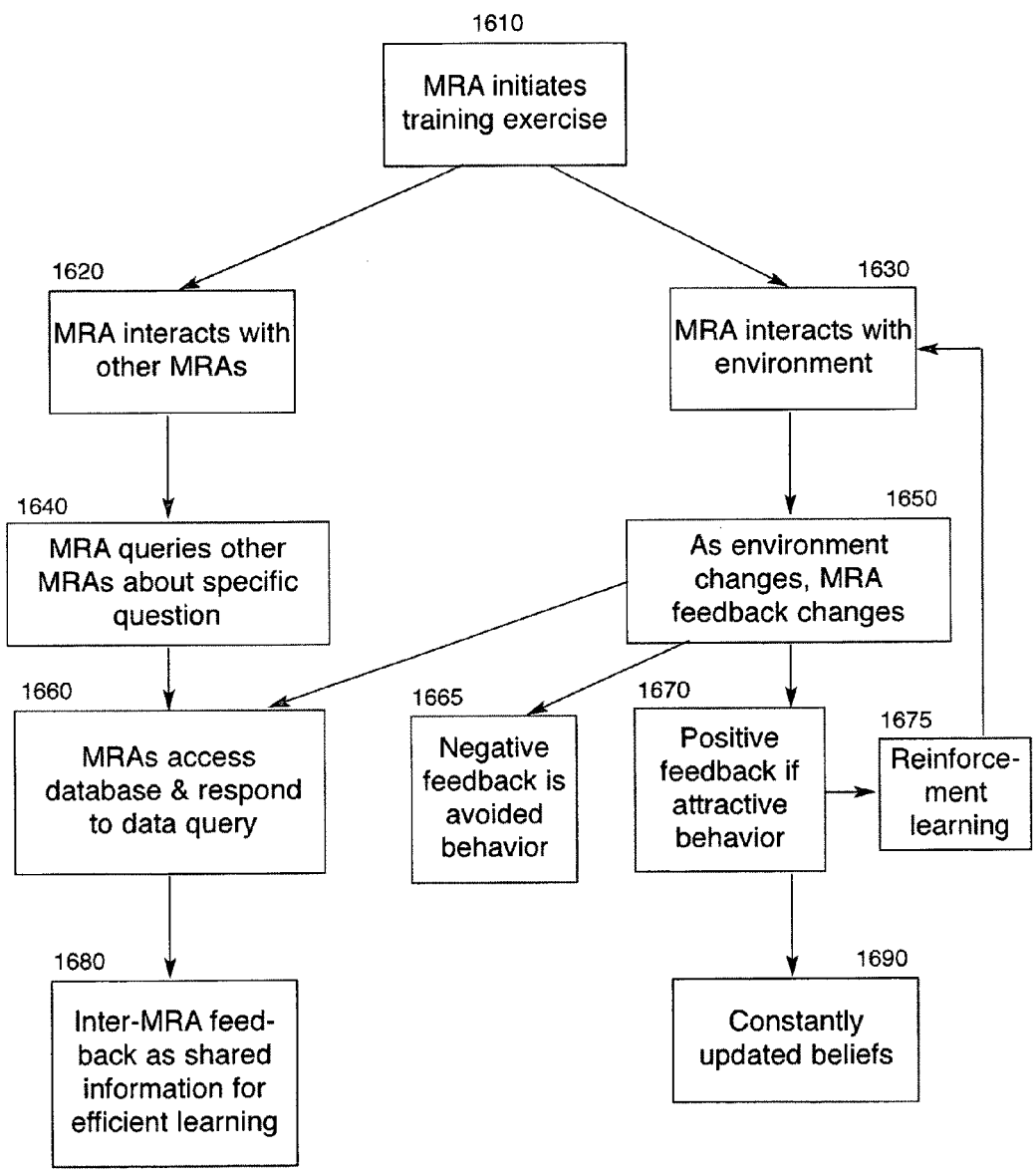
Fig 16: Learning From Environmental Interaction: Adaptation

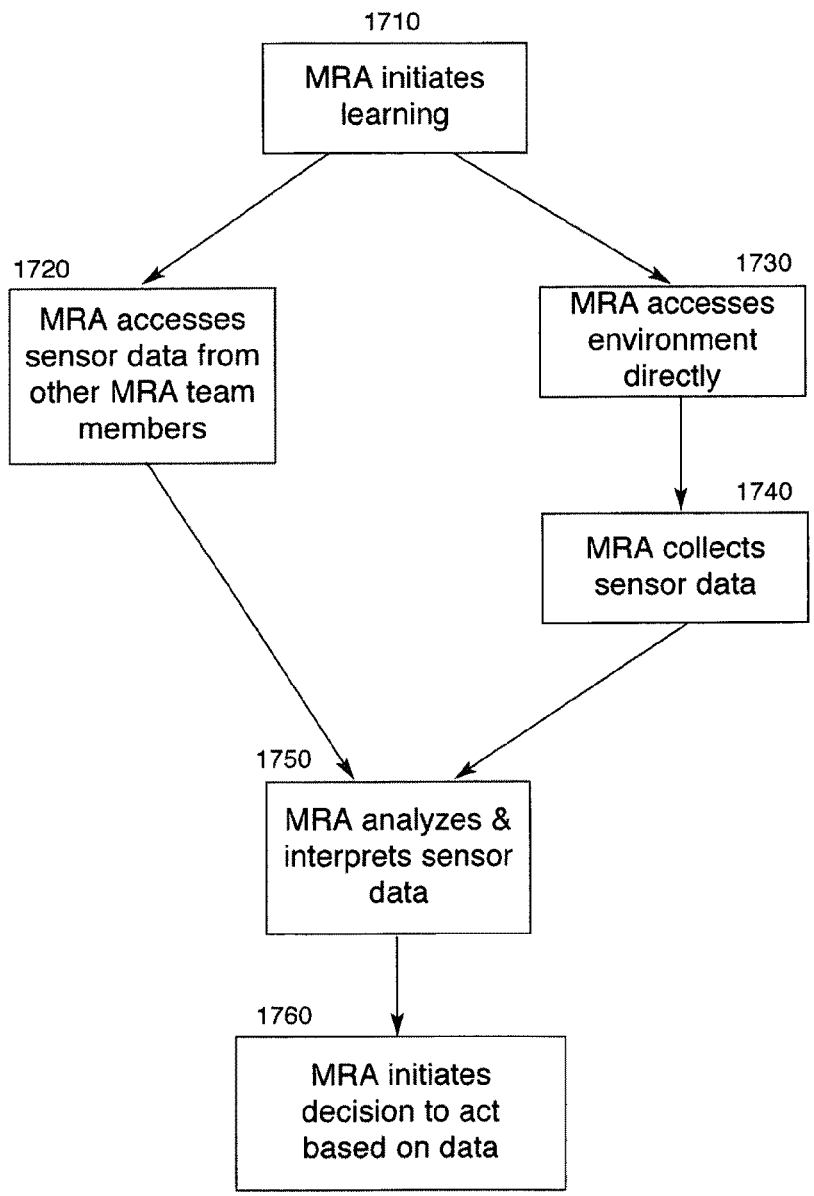
Fig 17: MRA Training Process - "Experience" of Environmental Interaction Combined With Group Sensor Data

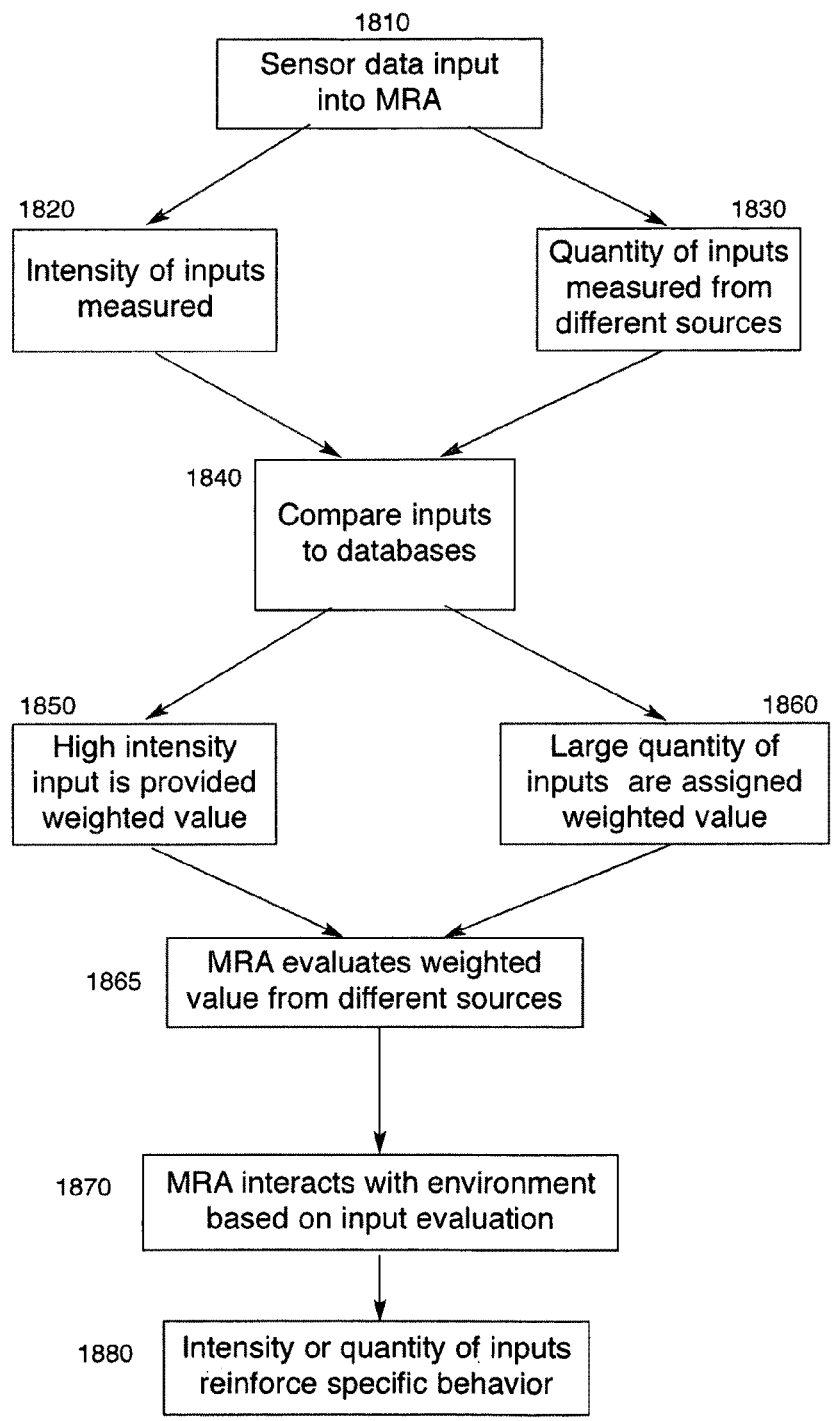
Fig 18: Reinforcement Learning:
(A) Intensity of Sensor Data and (B) Quantity of Sensor Data

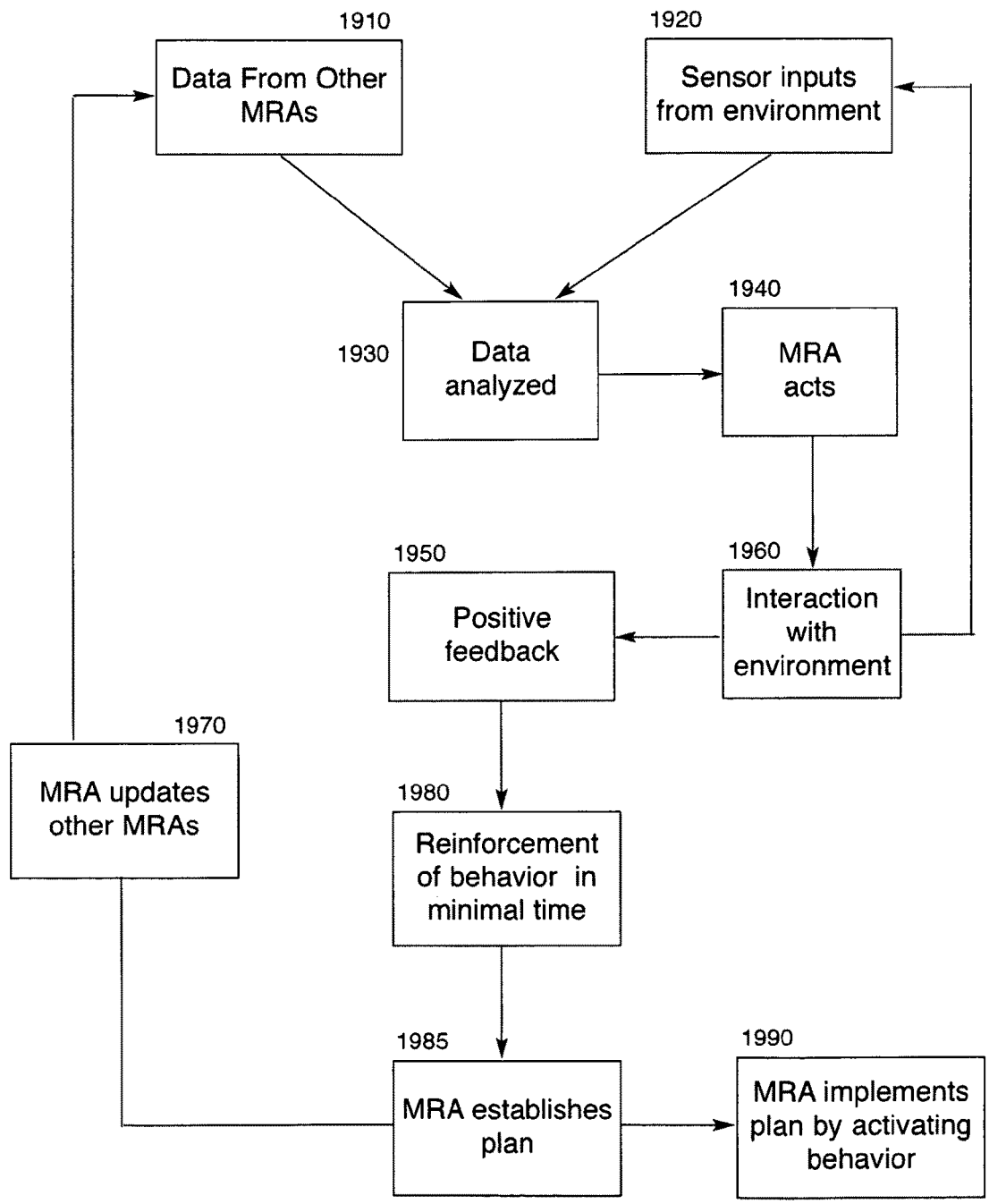
Fig 19: Hybrid Learning Model With Time Constraints

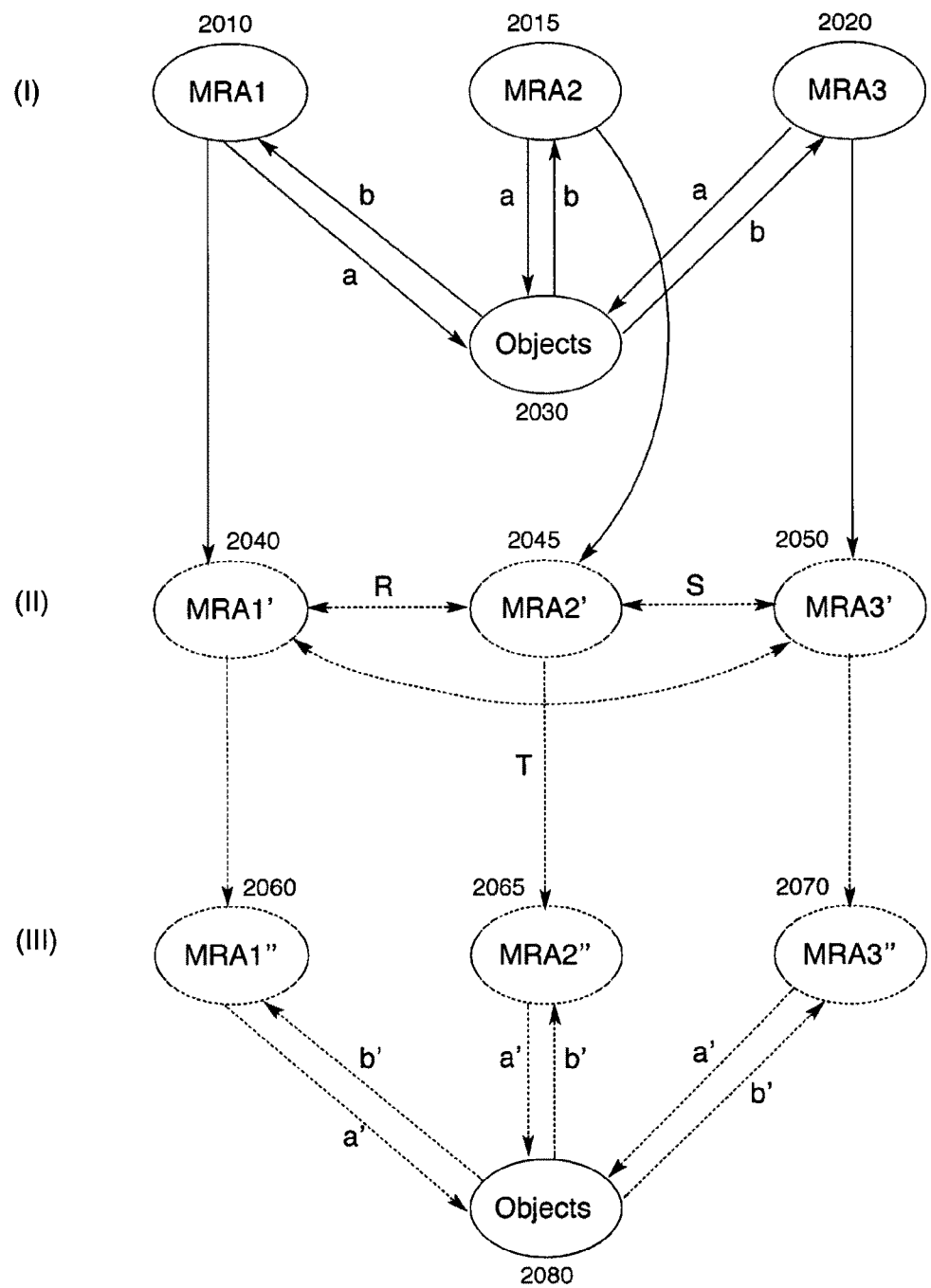
Fig 20: Social Learning: Learning From Inter-MRA Interaction

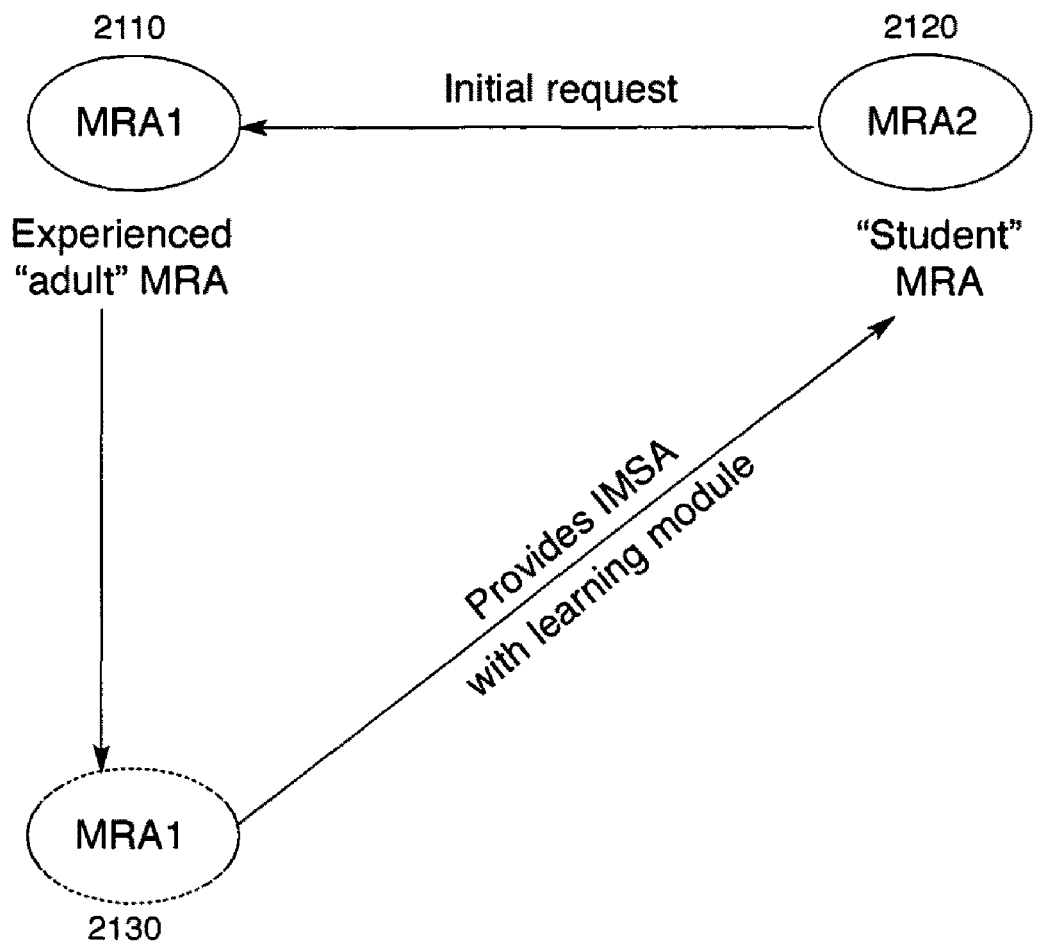
Fig 21: MRAs That Teach Other MRAs

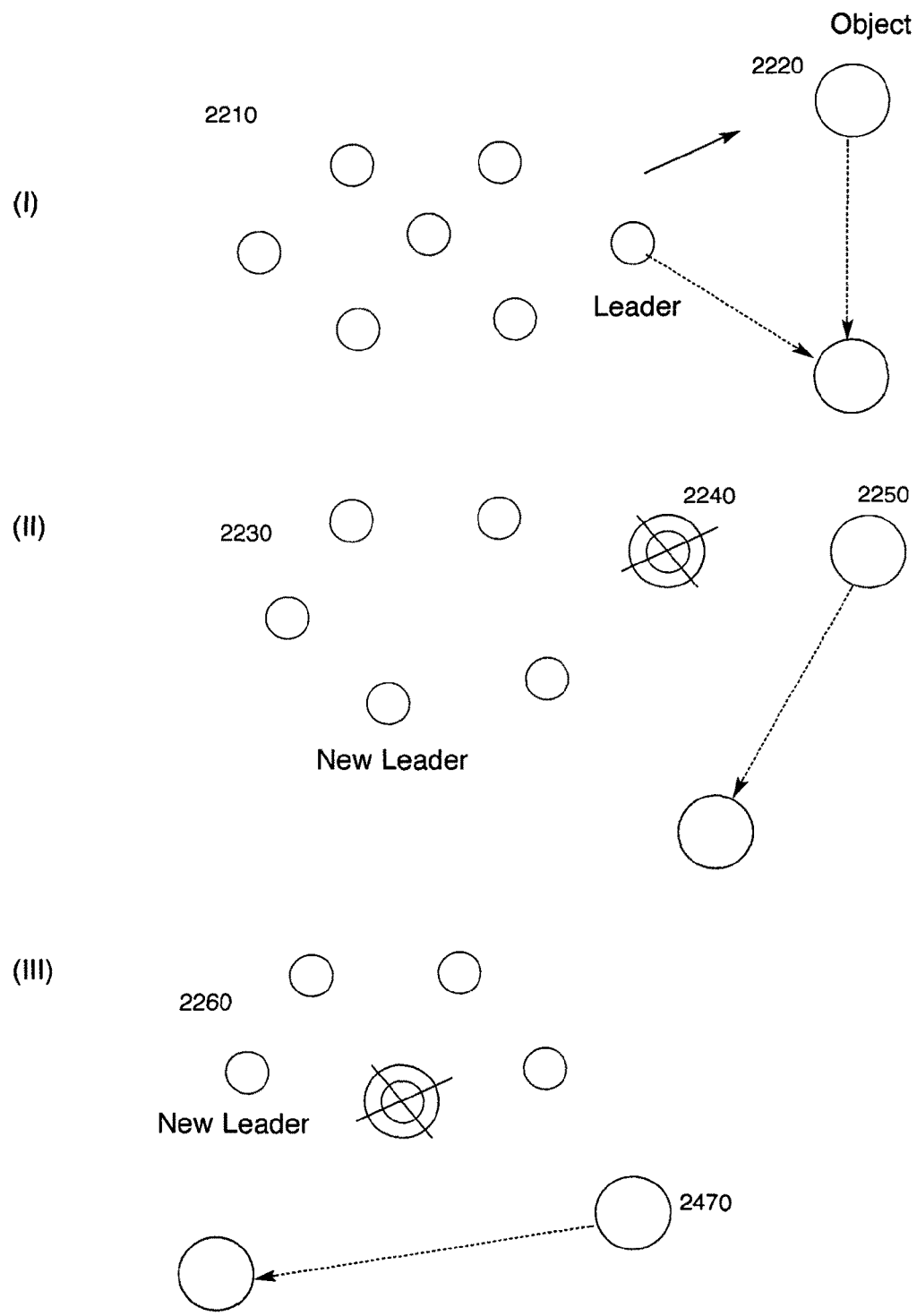
Fig 22: Asymmetric MRA Leadership and the Emergence of Temporary Hubs

**Fig 23: Specialized Learning (in Teams):
Division of Labor in Self-Organizing Groups**
(I)
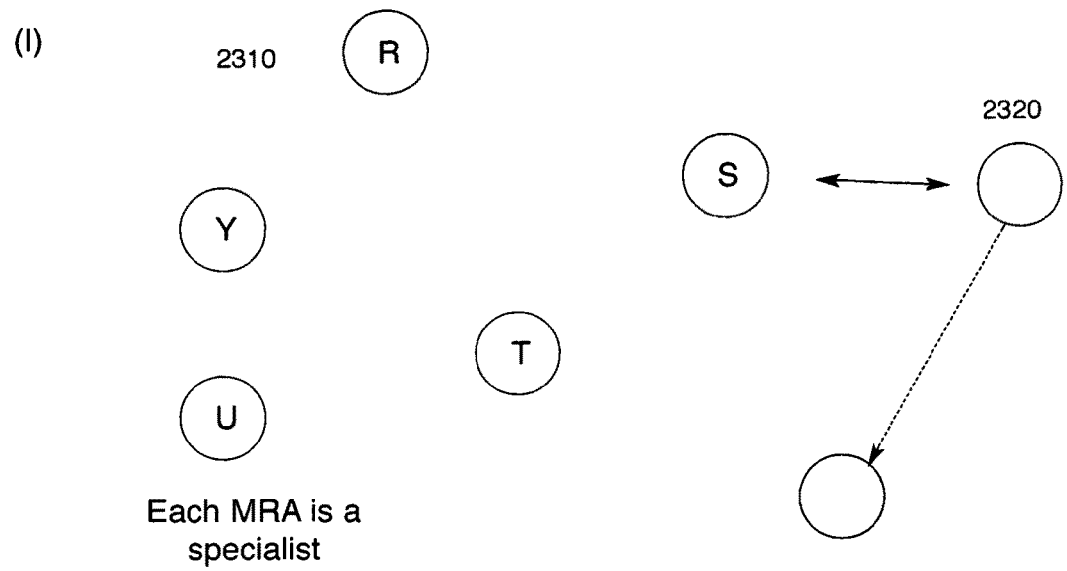
Each MRA is a specialist
(II)
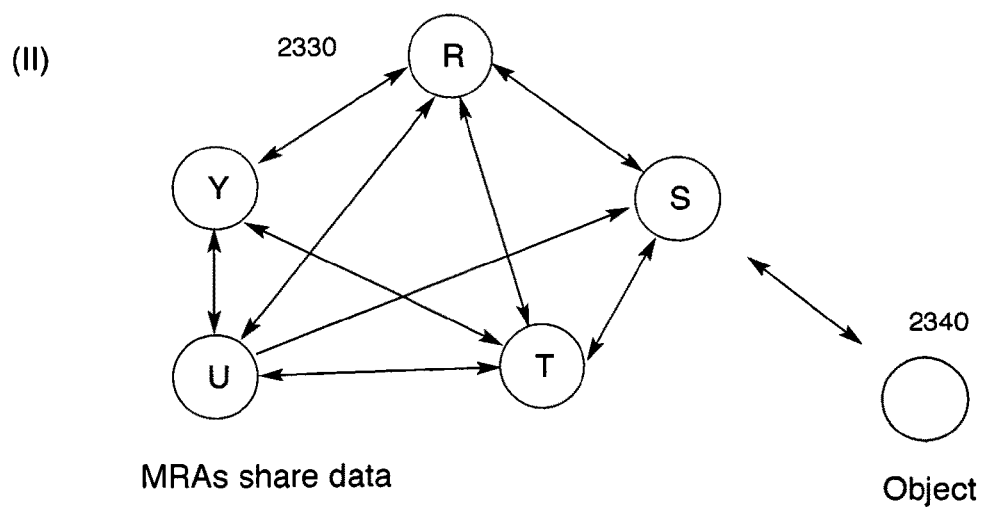
MRAs share data
Object

Fig 24: Auto Specialization: Self Organization by Task Division for Individual Specialization
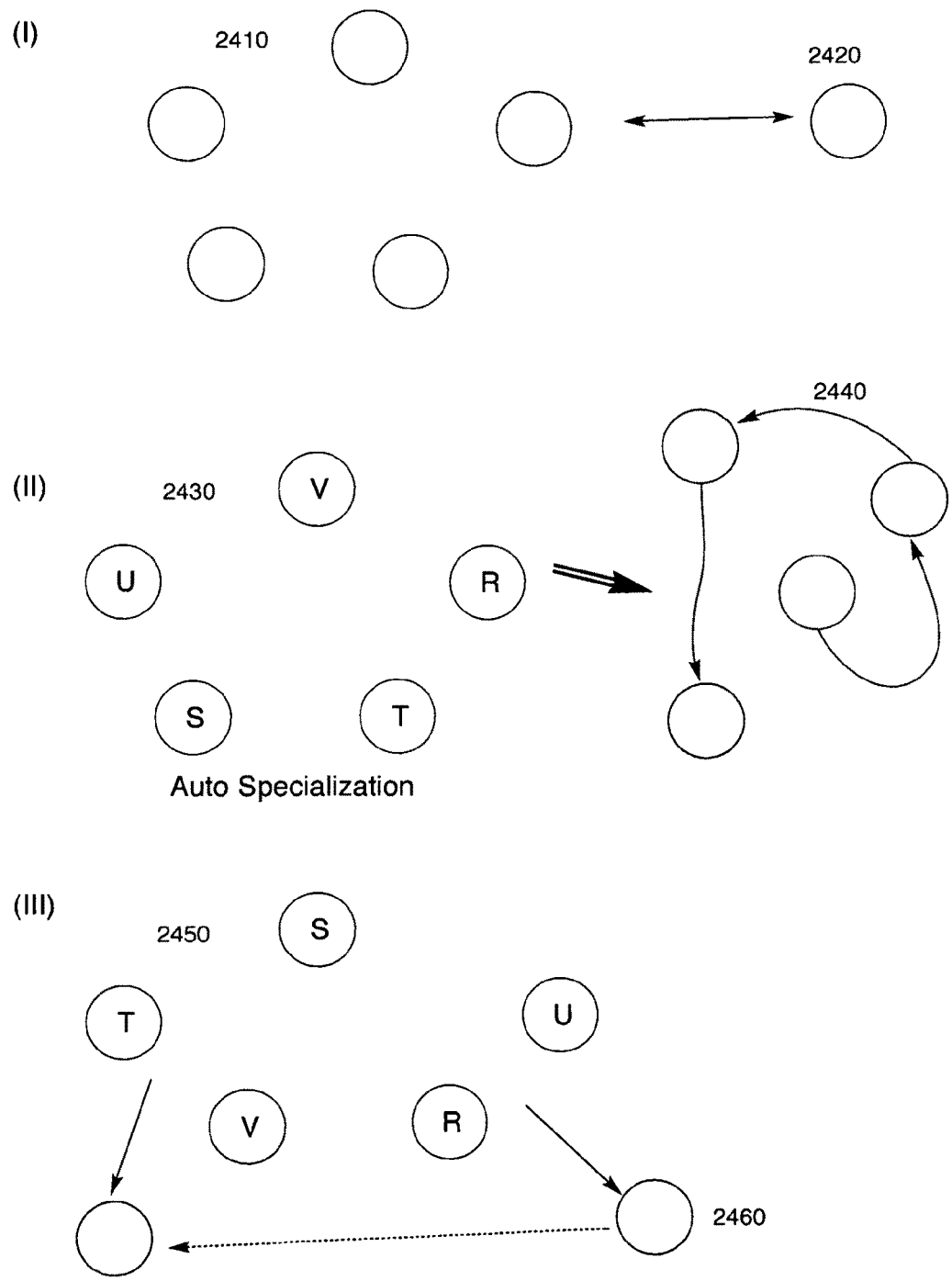

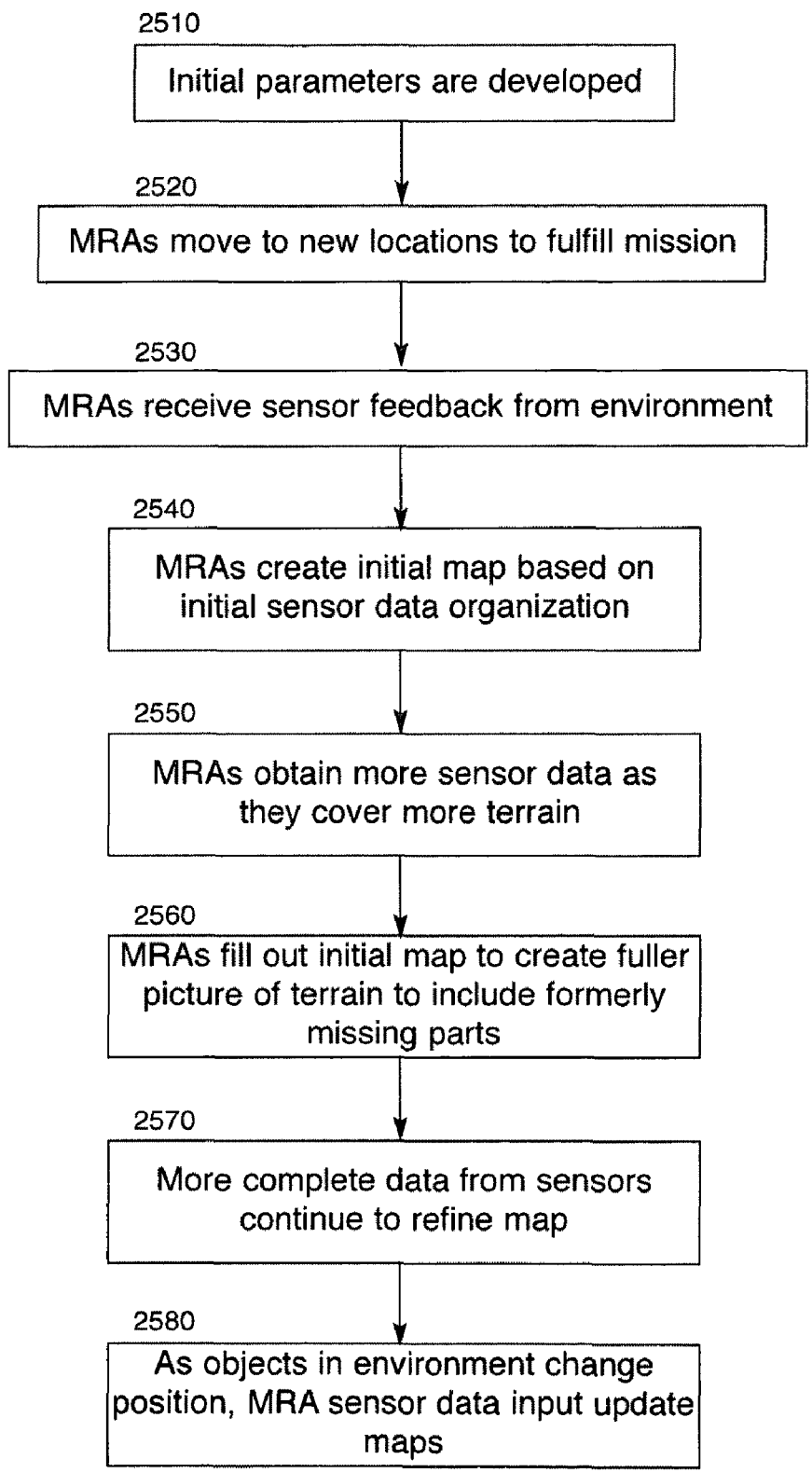

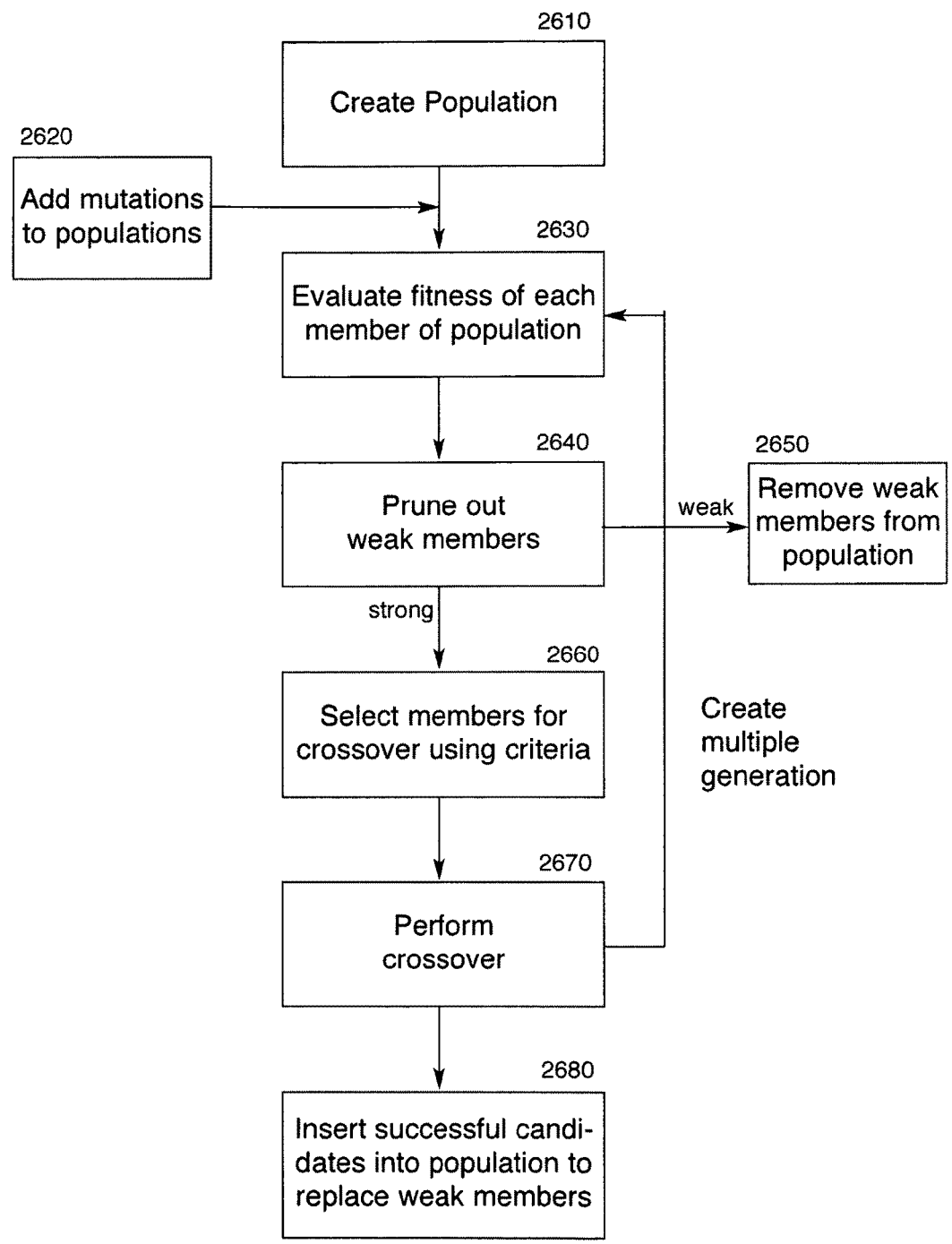
Fig 26: Flow Chart of Genetic Algorithm

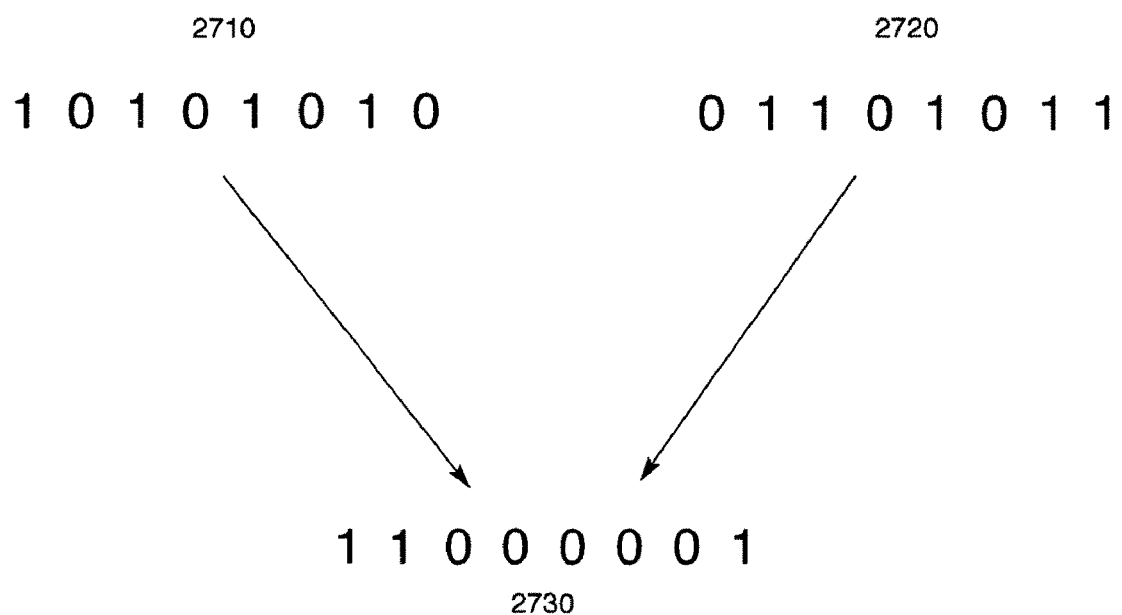
Fig 27: Binary Genetic Algorithm Model

Fig 28: Tree Architecture - Genetic Programming Model
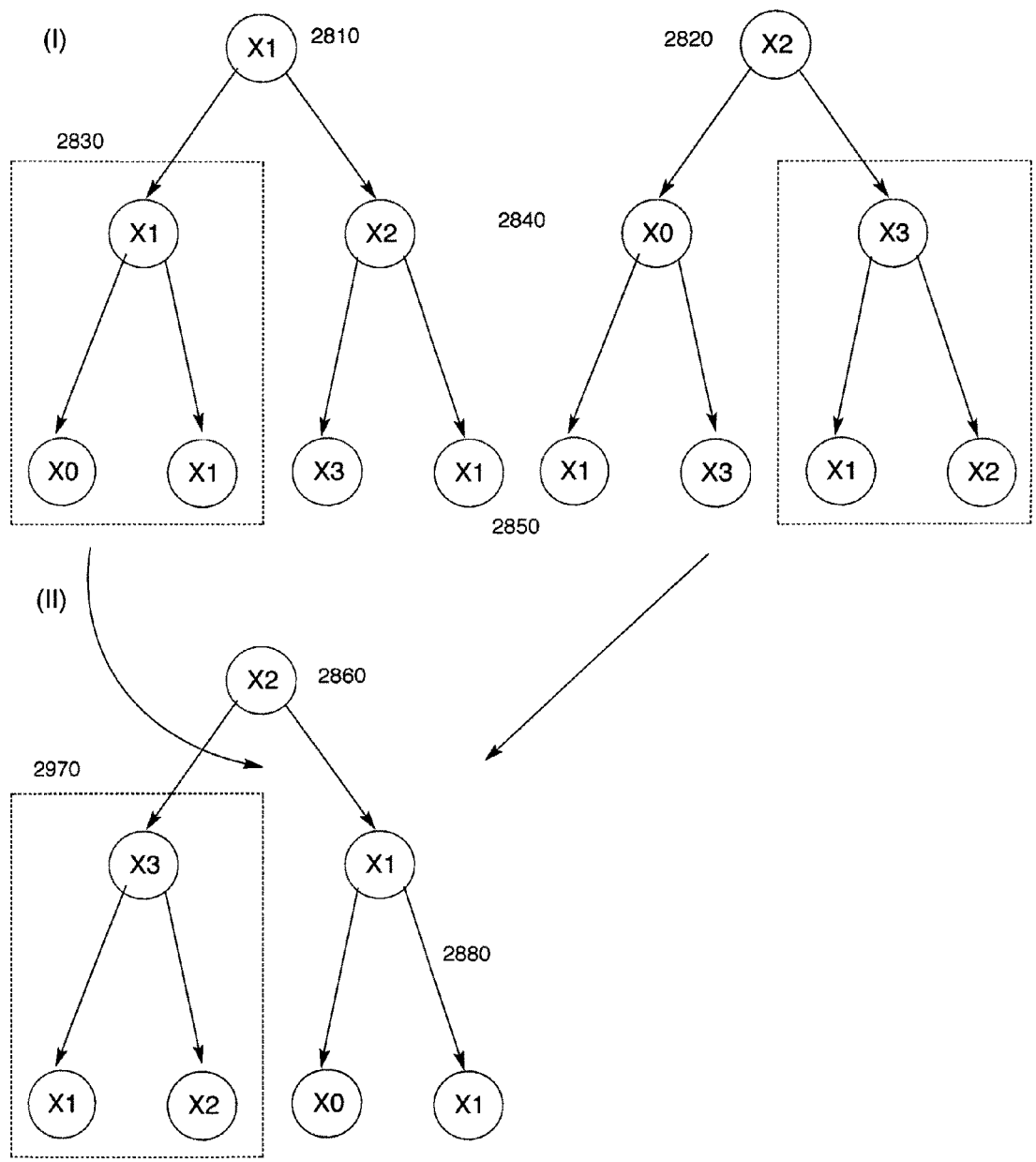

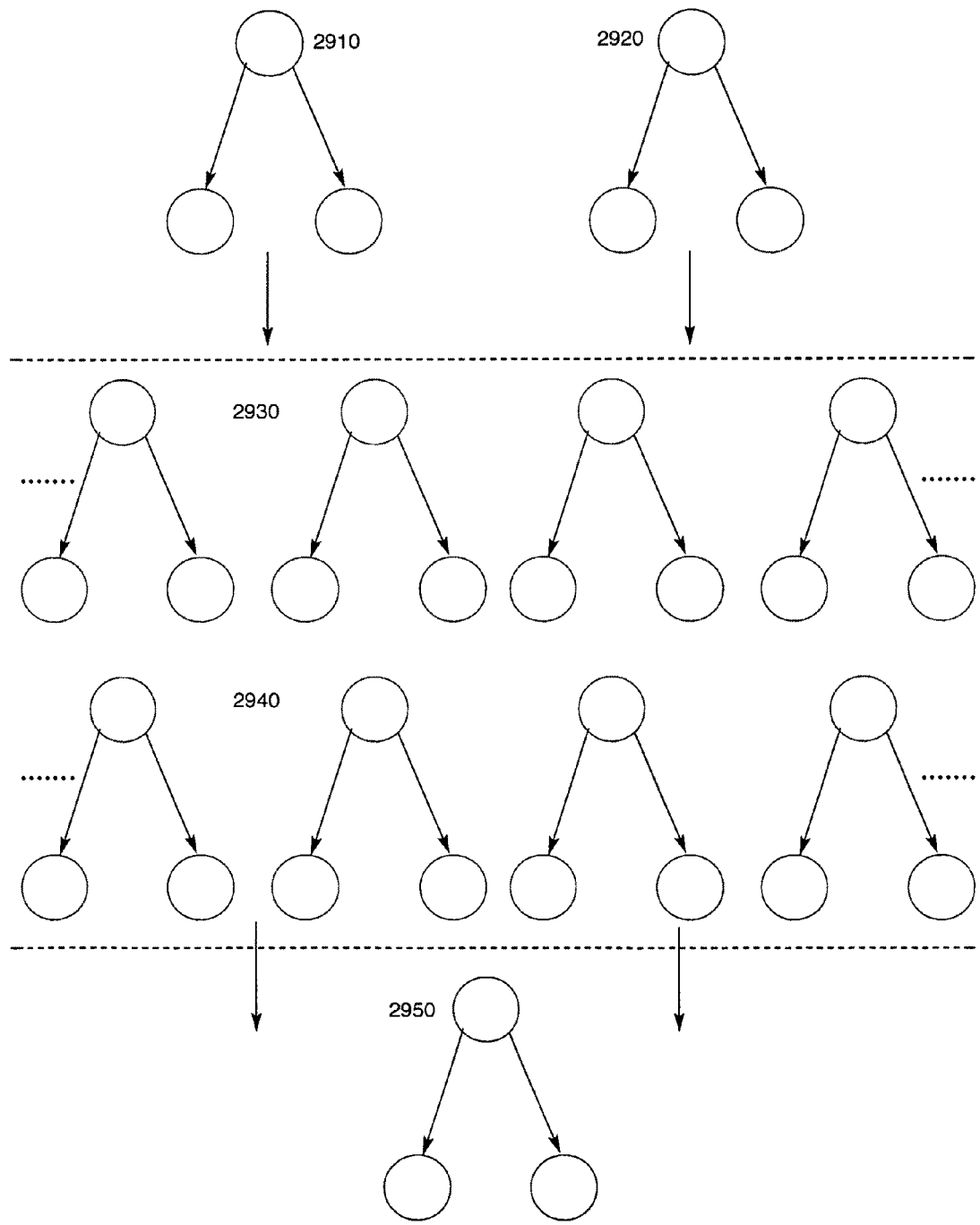
Fig 29: Parallel Subpopulations Fitness Evaluation

Fig 30: Two Layer Neural Network
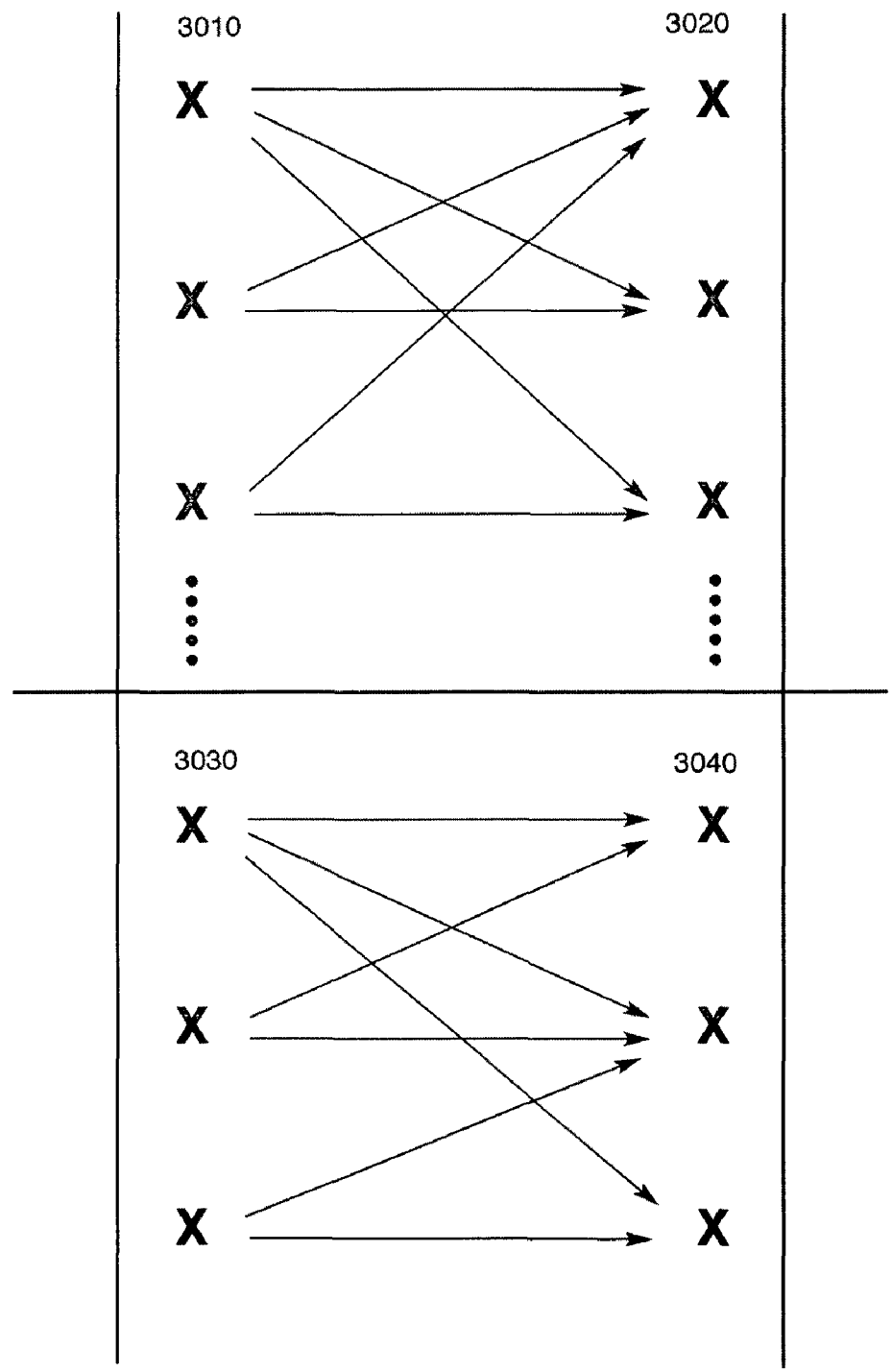

Fig 31: Artificial Neural Network Connection Weights
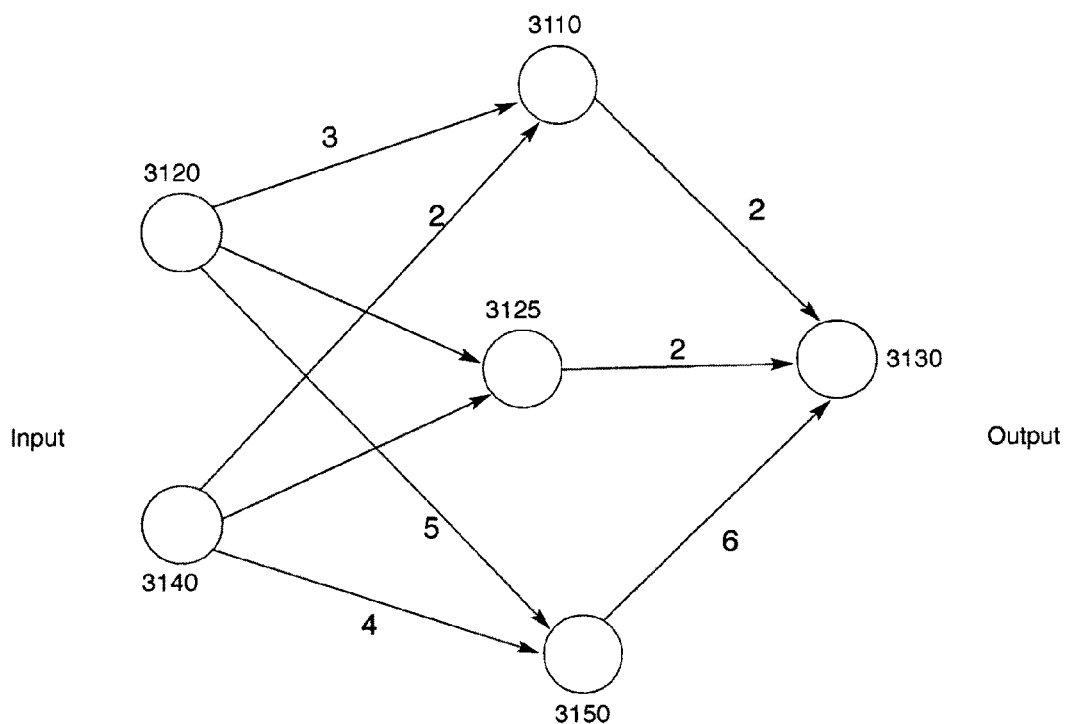

Fig 32: Genetic Programming Calculates Initial Weights
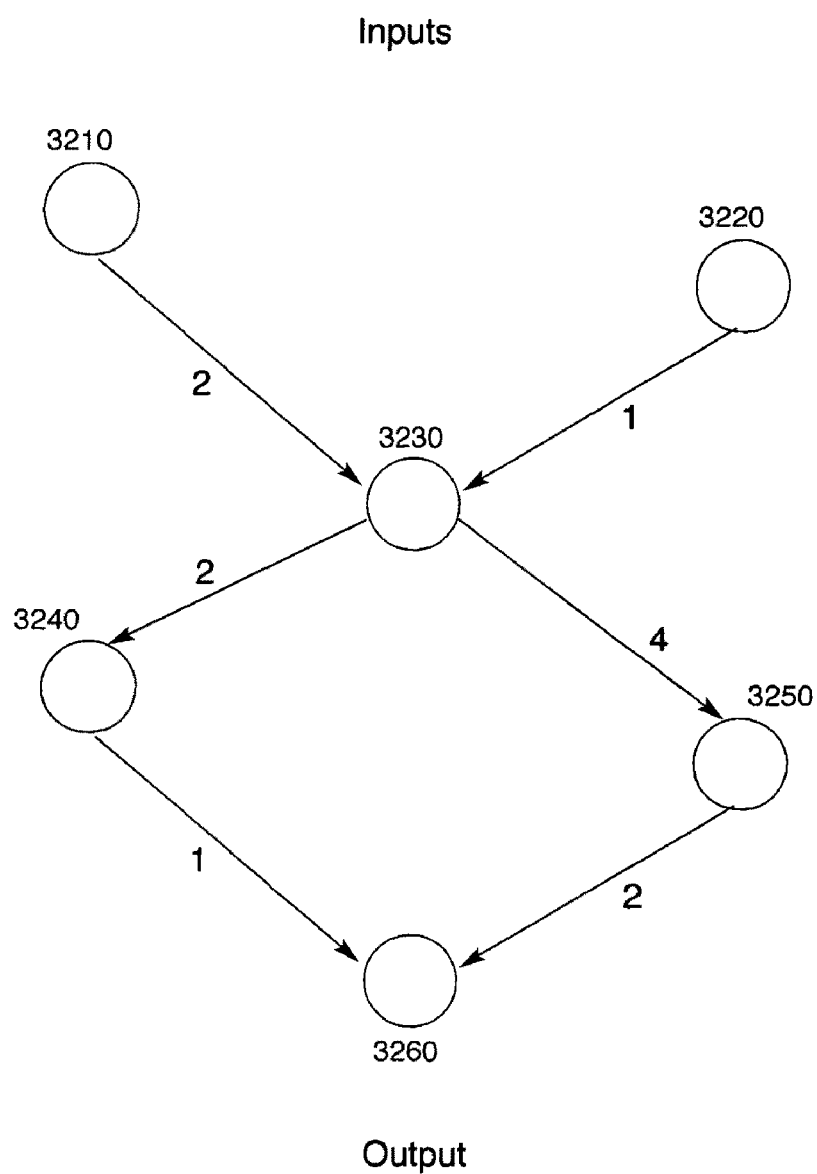

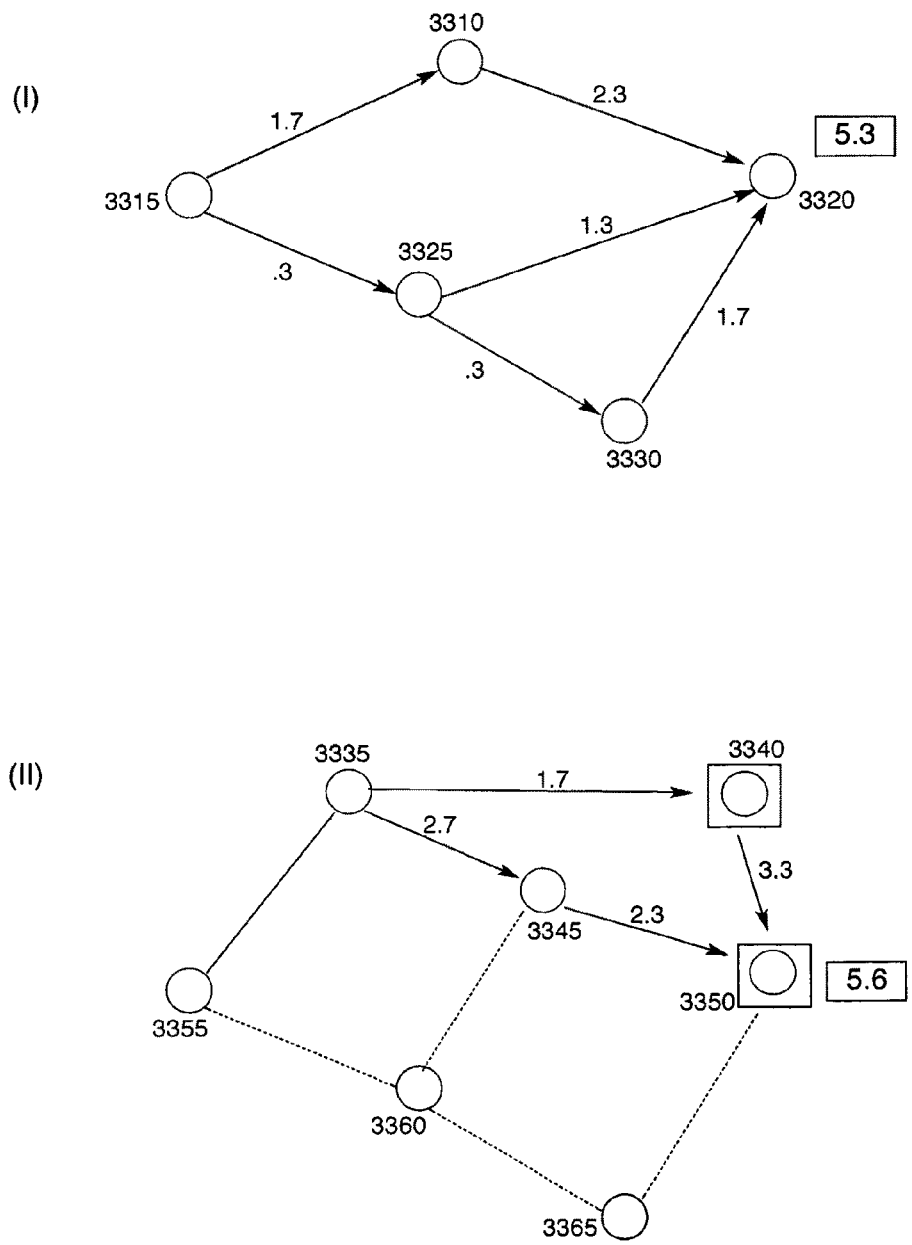
Fig 33: Genetic Programming Applied to Indeterministic ANN

Fig 34: Neuroevolution - Evolutionary A-NN Connection and Node Additions
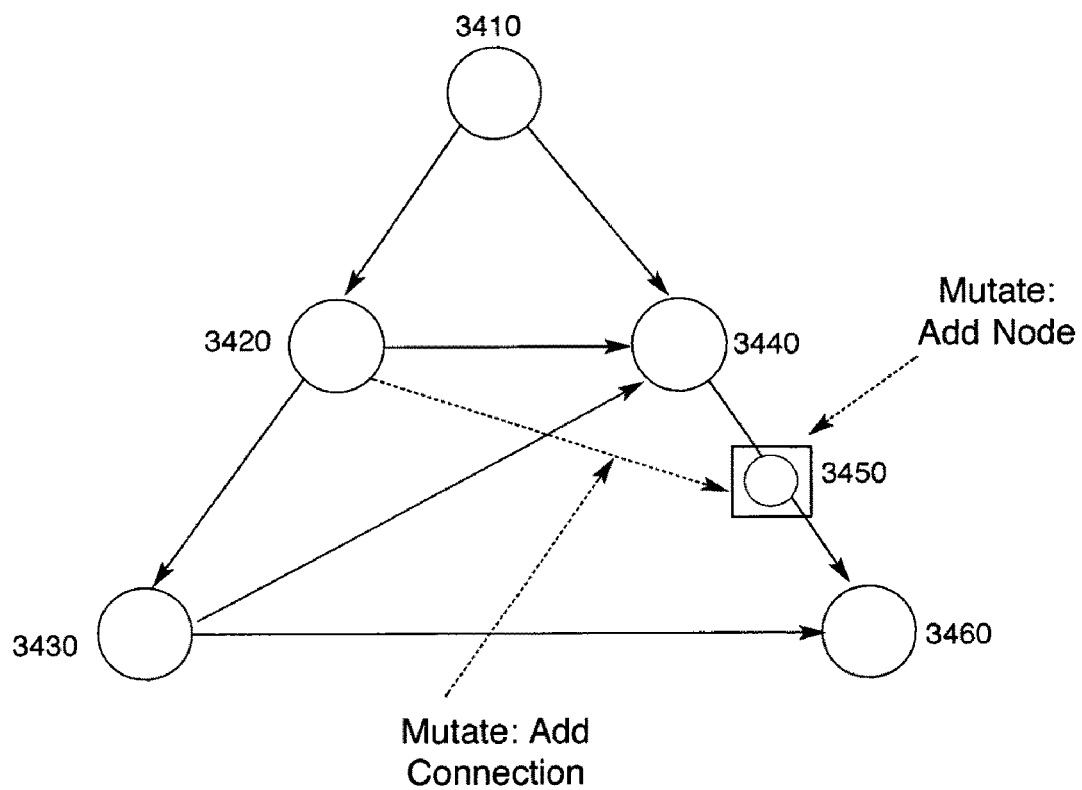

Fig 35: Evolutionary A-NN Non-deterministic Feed Forwarded
(I)
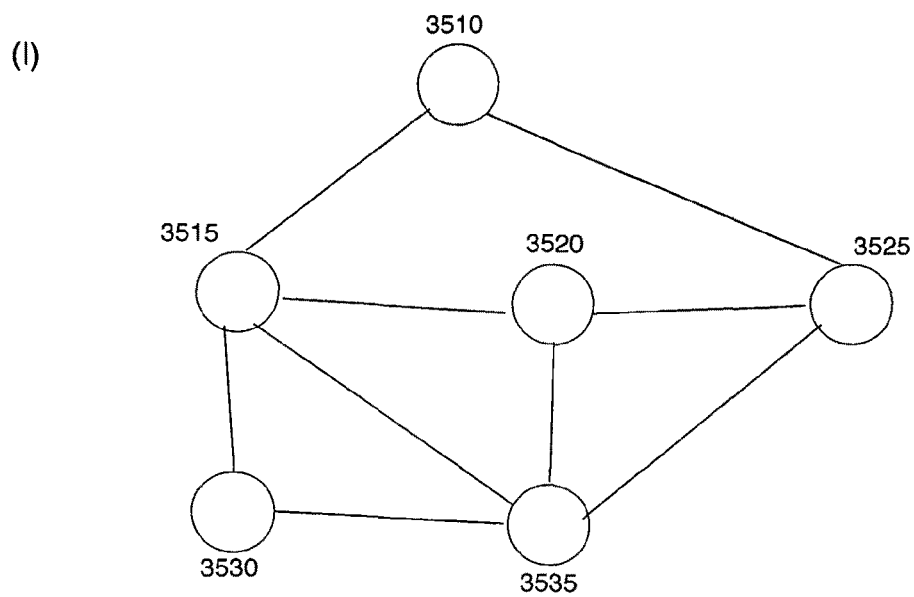
(II)
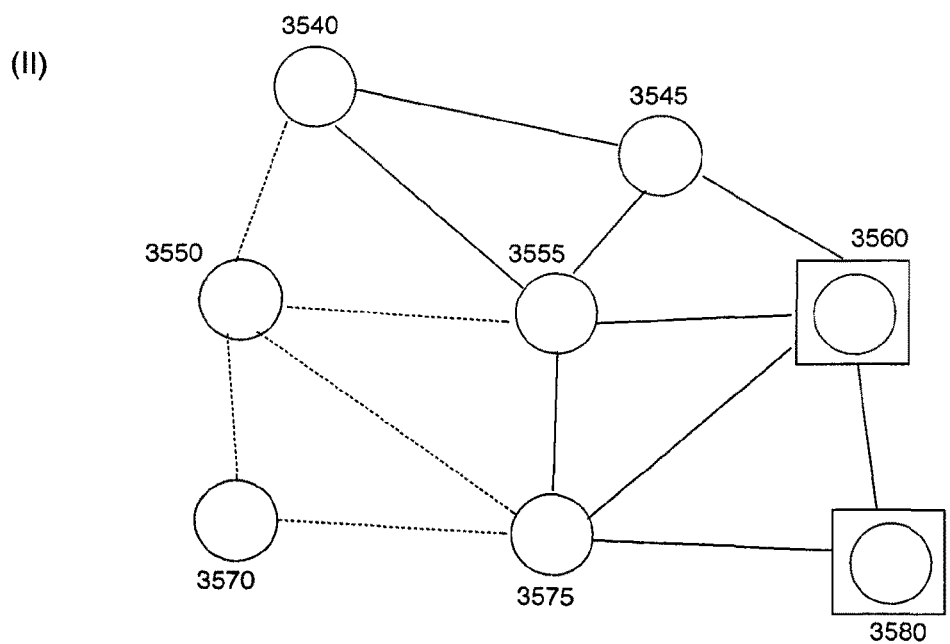

Fig 36: Evolutionary Search For Connection Weights in an ANN
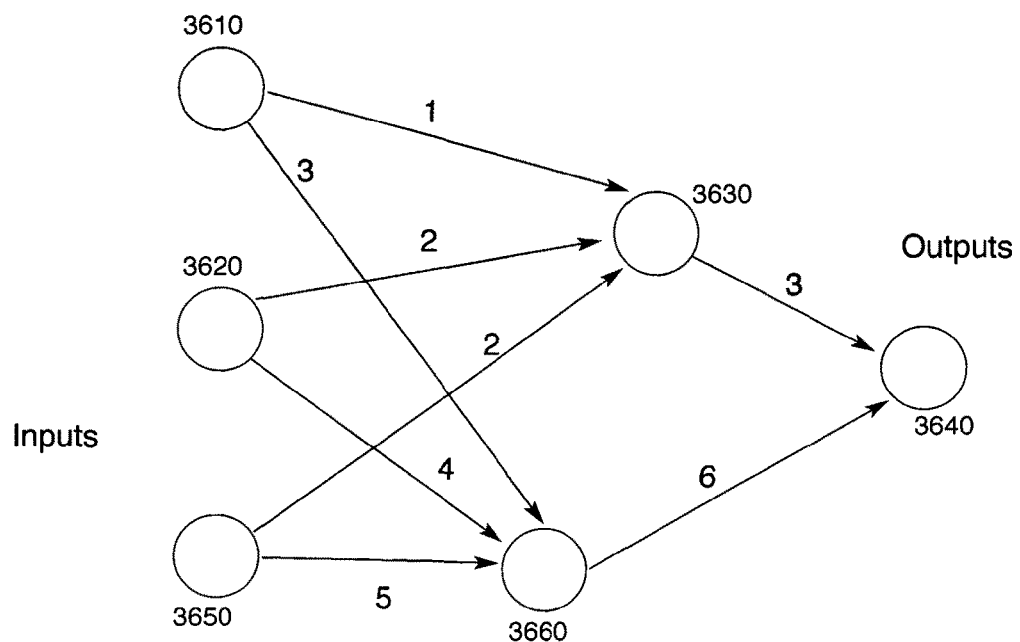
Genotype: 0010 0001 0110 1001 1010
3670
Binary representation of connection weight chromosome encoding

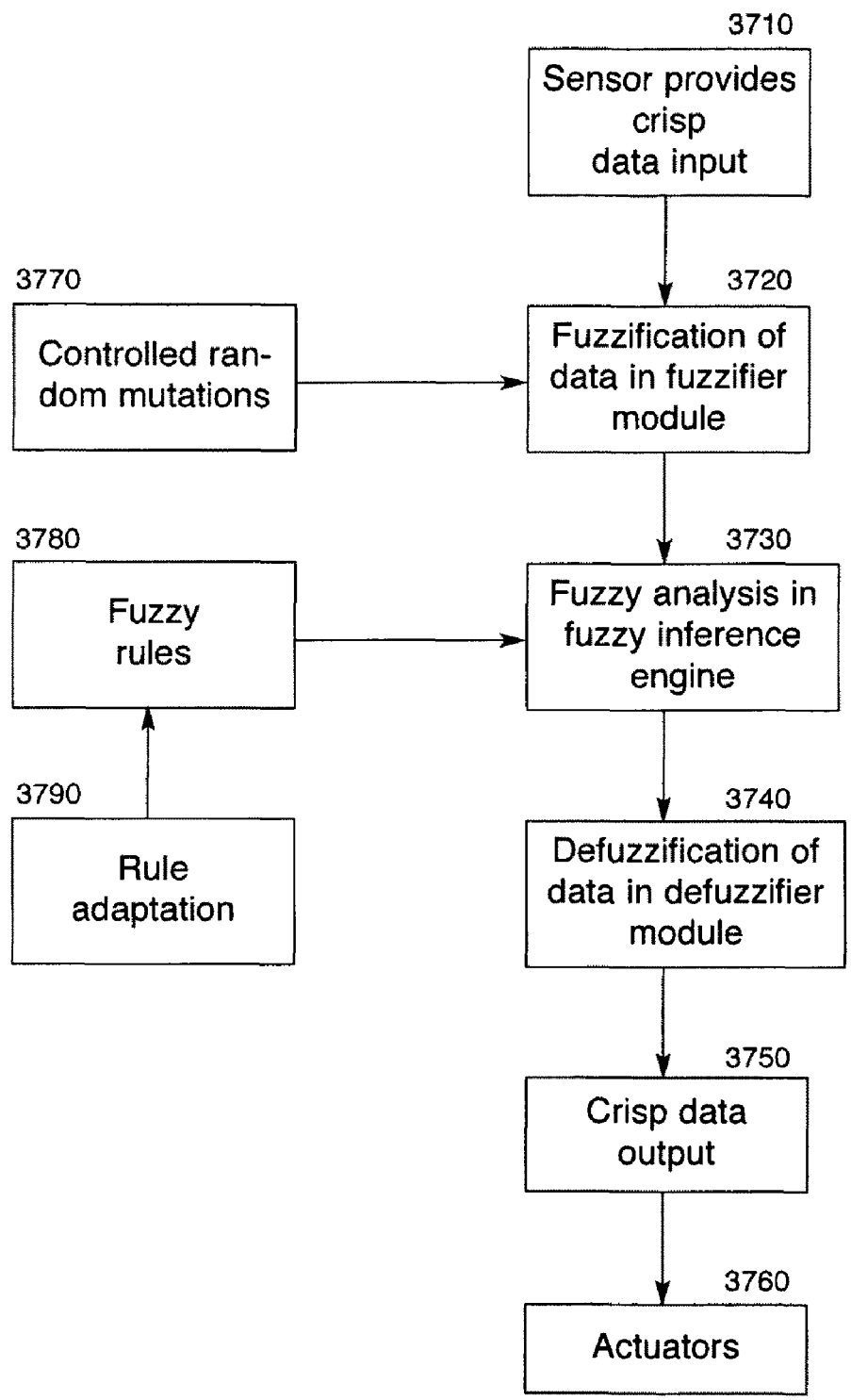
Fig 37: Fuzzy Logic Module

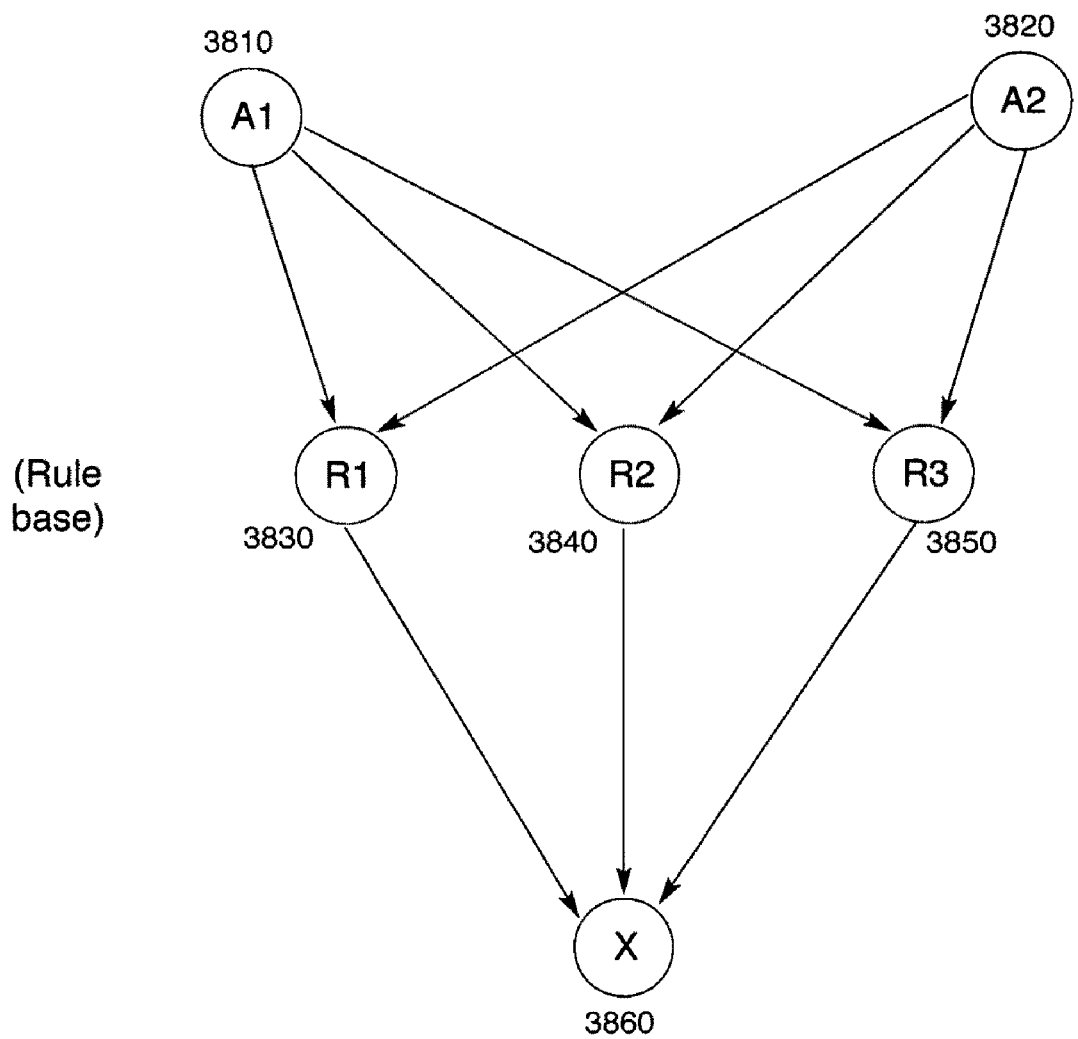
Fig 38: Neuro Fuzzy Controller with Two Input Variables & Three Rules

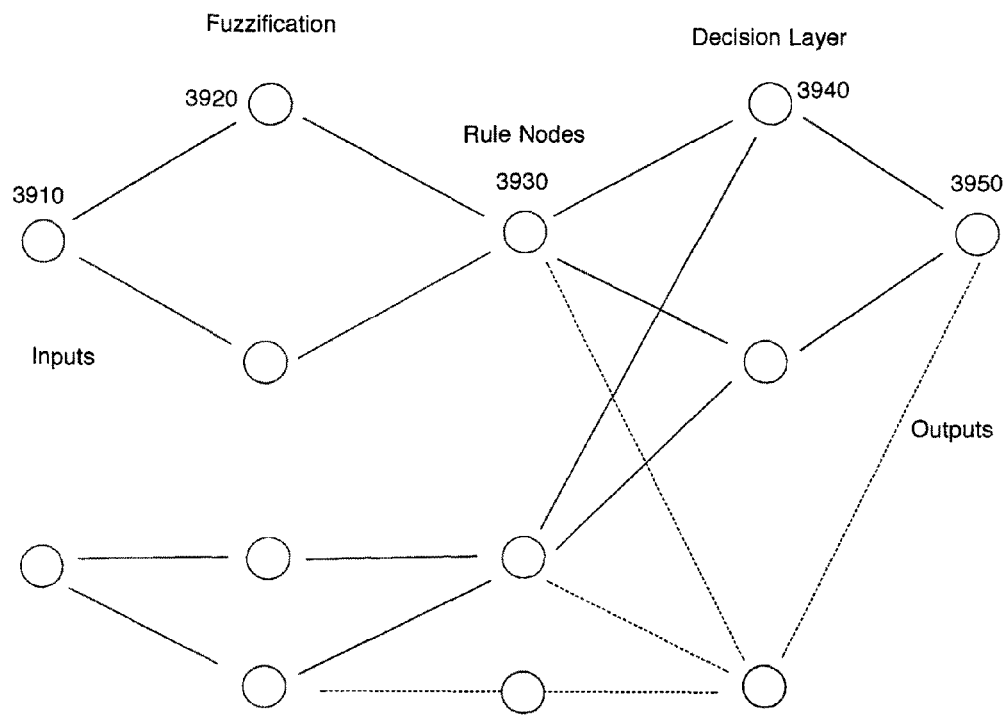
Fig 39: Five Layer Evolving Fuzzy Neural Network

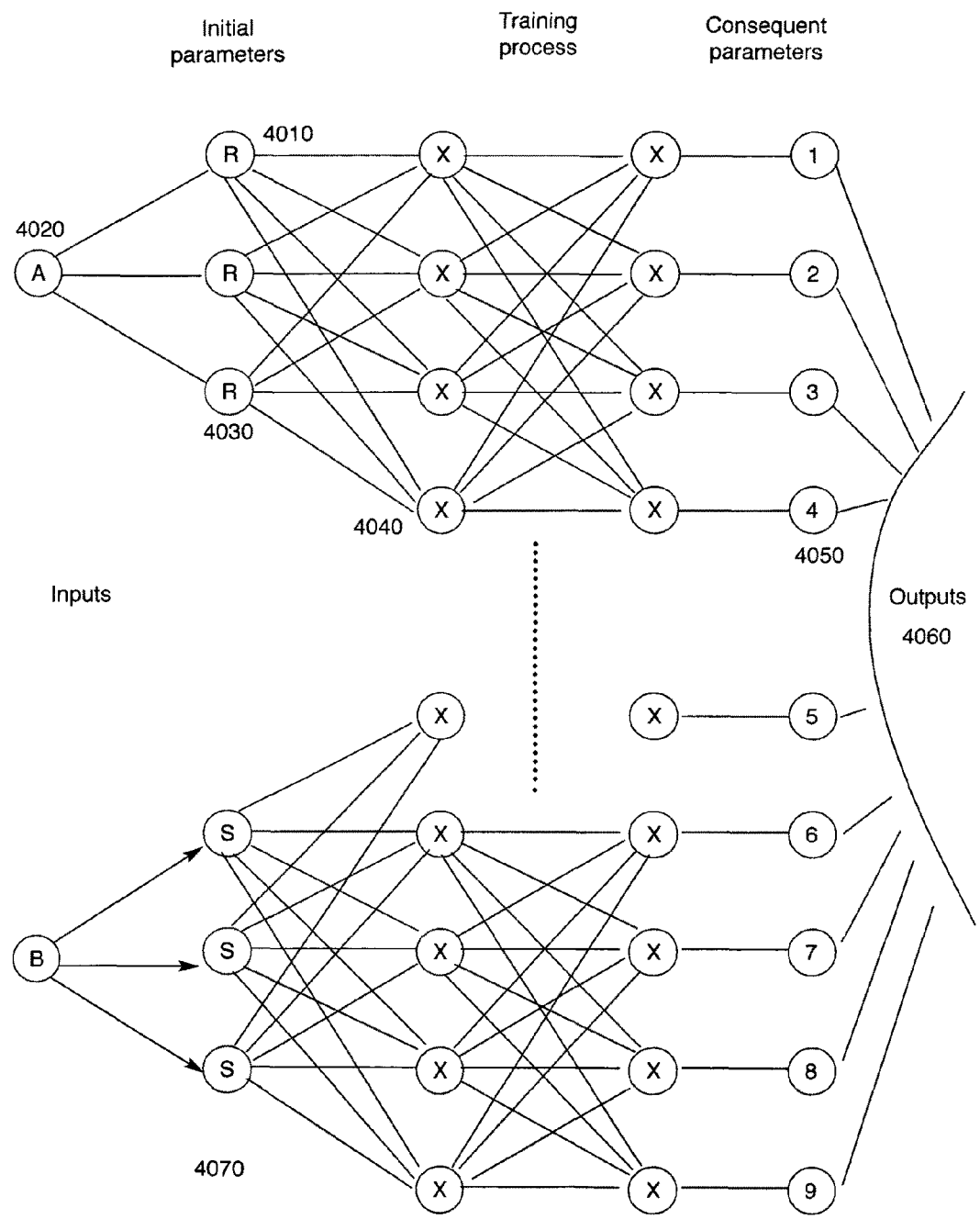
Fig 40: Adaptive Network Based Fuzzy Inference System

Fig 41: Self Organizing Neural Fuzzy Inference Network Architecture
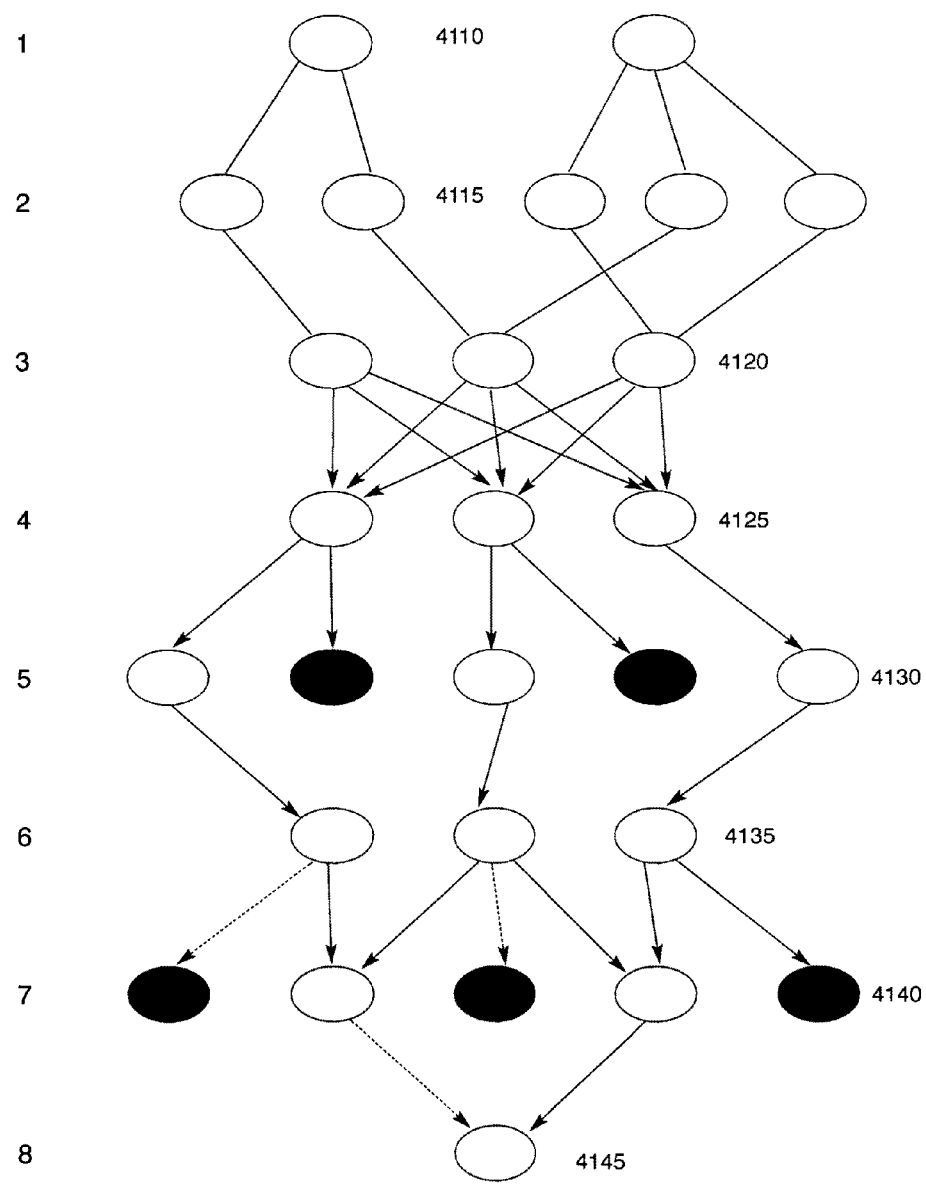

Fig 42: Dynamic Evolving Fuzzy Neural Network
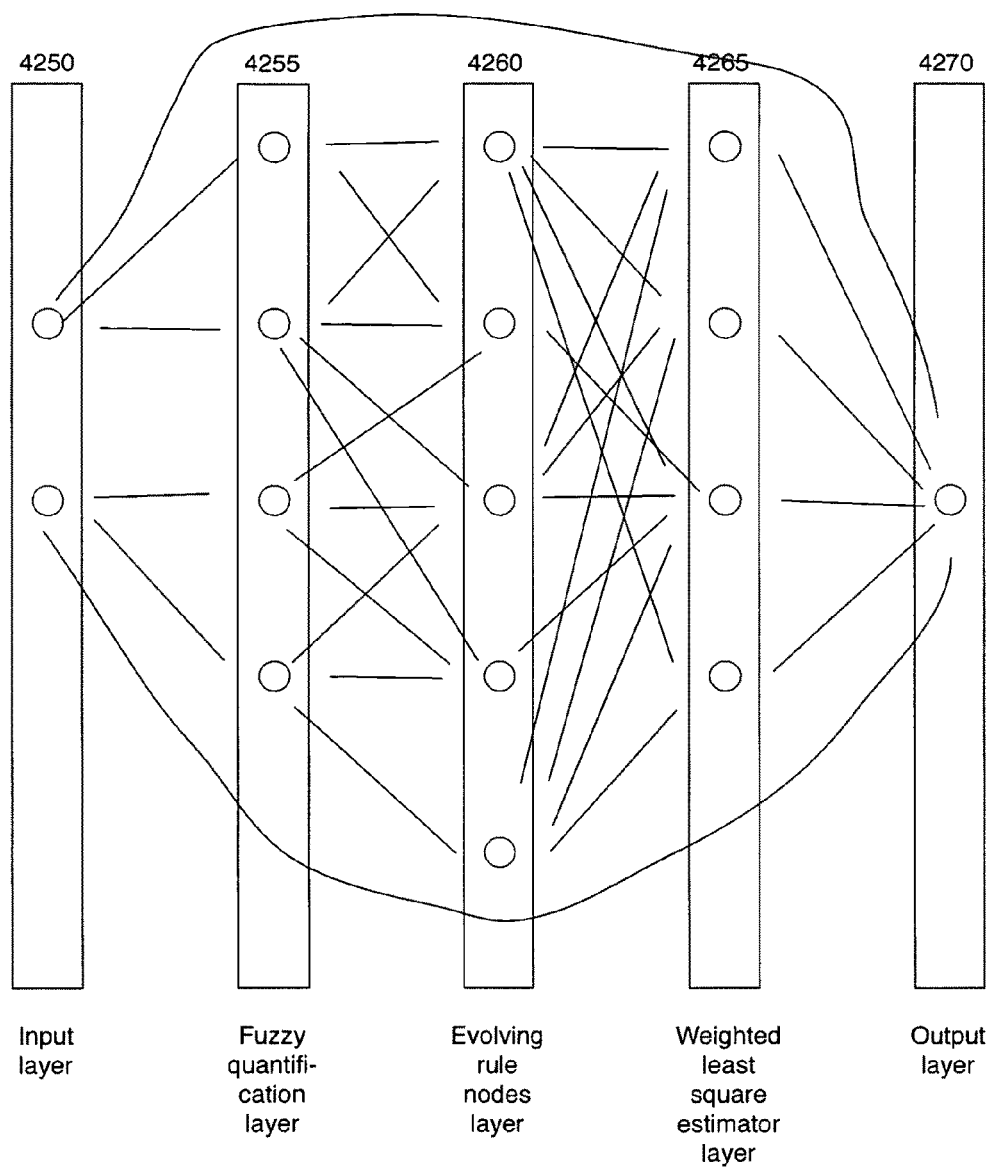
Input layer | Fuzzy quantification layer | Evolving rule nodes layer | Weighted least square estimator layer | Output layer

Fig 43: Flexible Extensible Distributed ANN - Shared ANN Computation Between MRAs
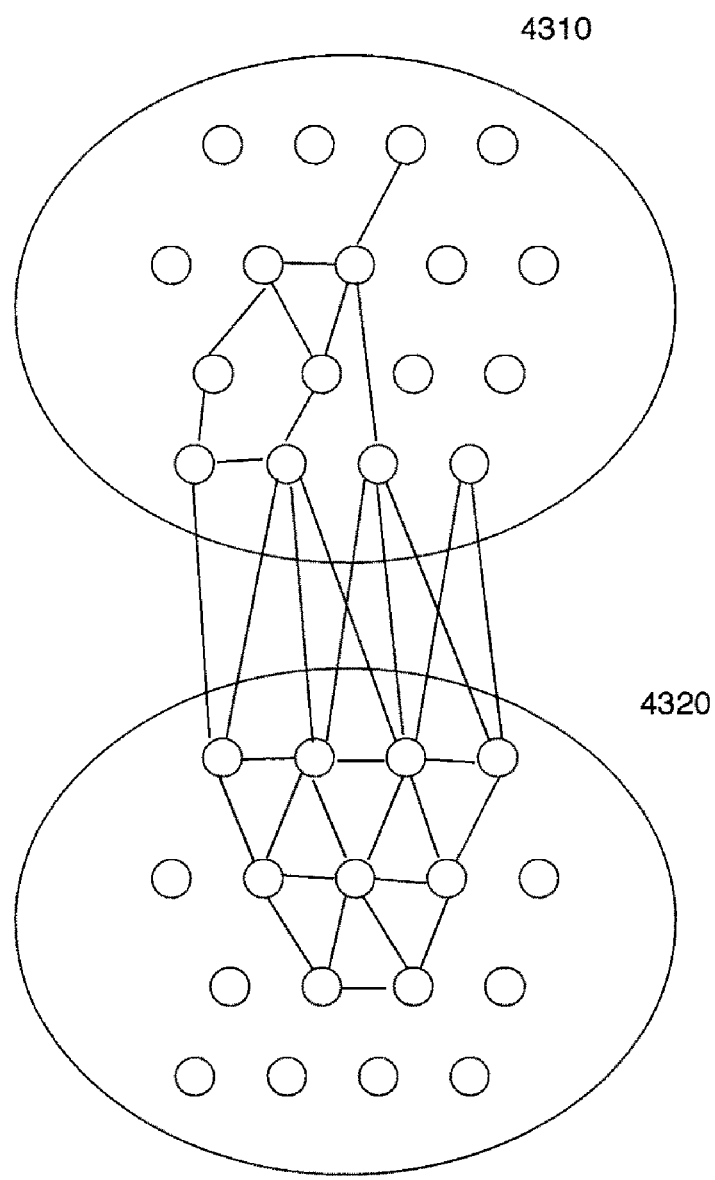

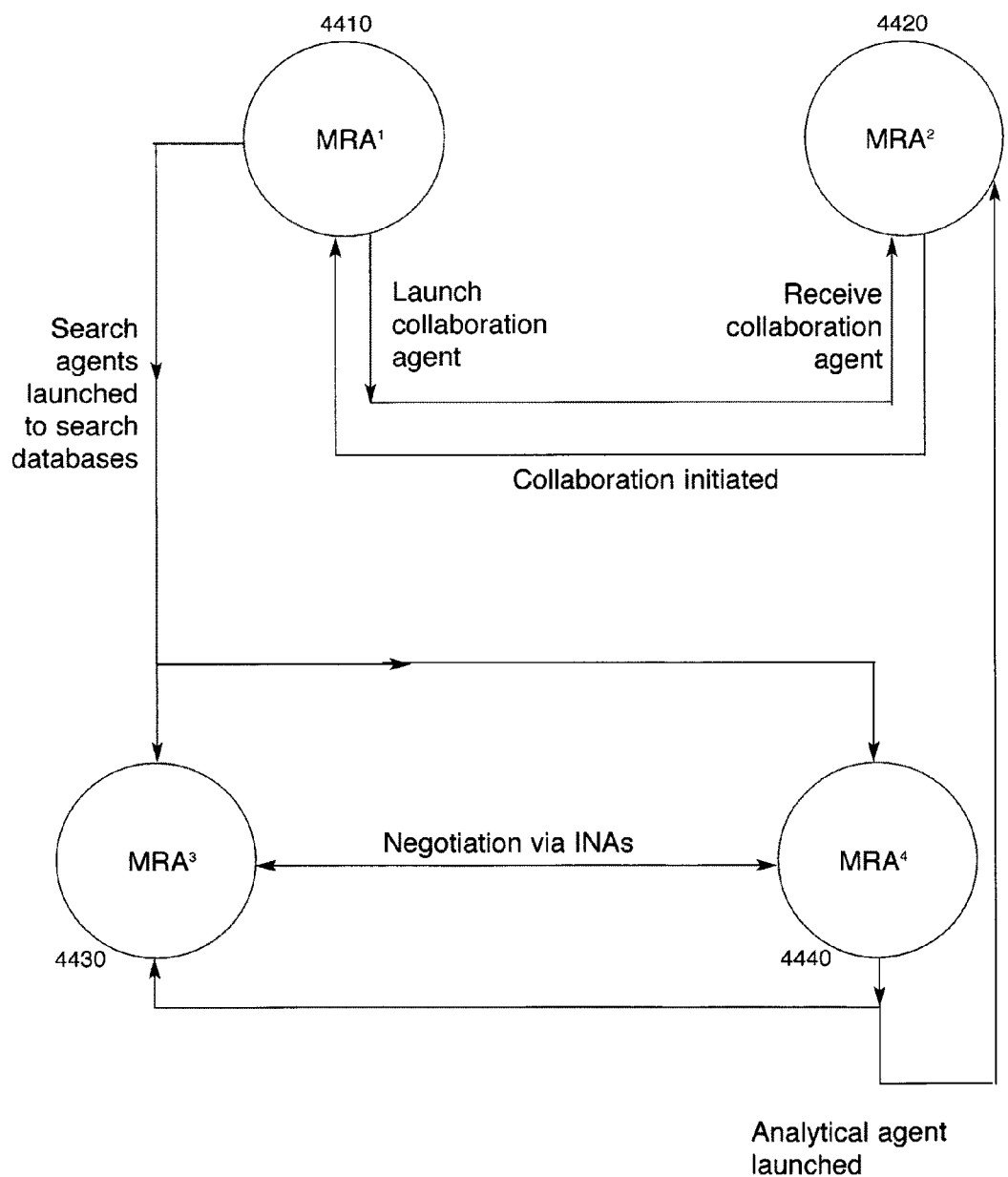
Fig 44: IMSA Dynamics in MAS: MRA Interactions via IMSAs

Fig 45: IMSA Relations Between MRAs
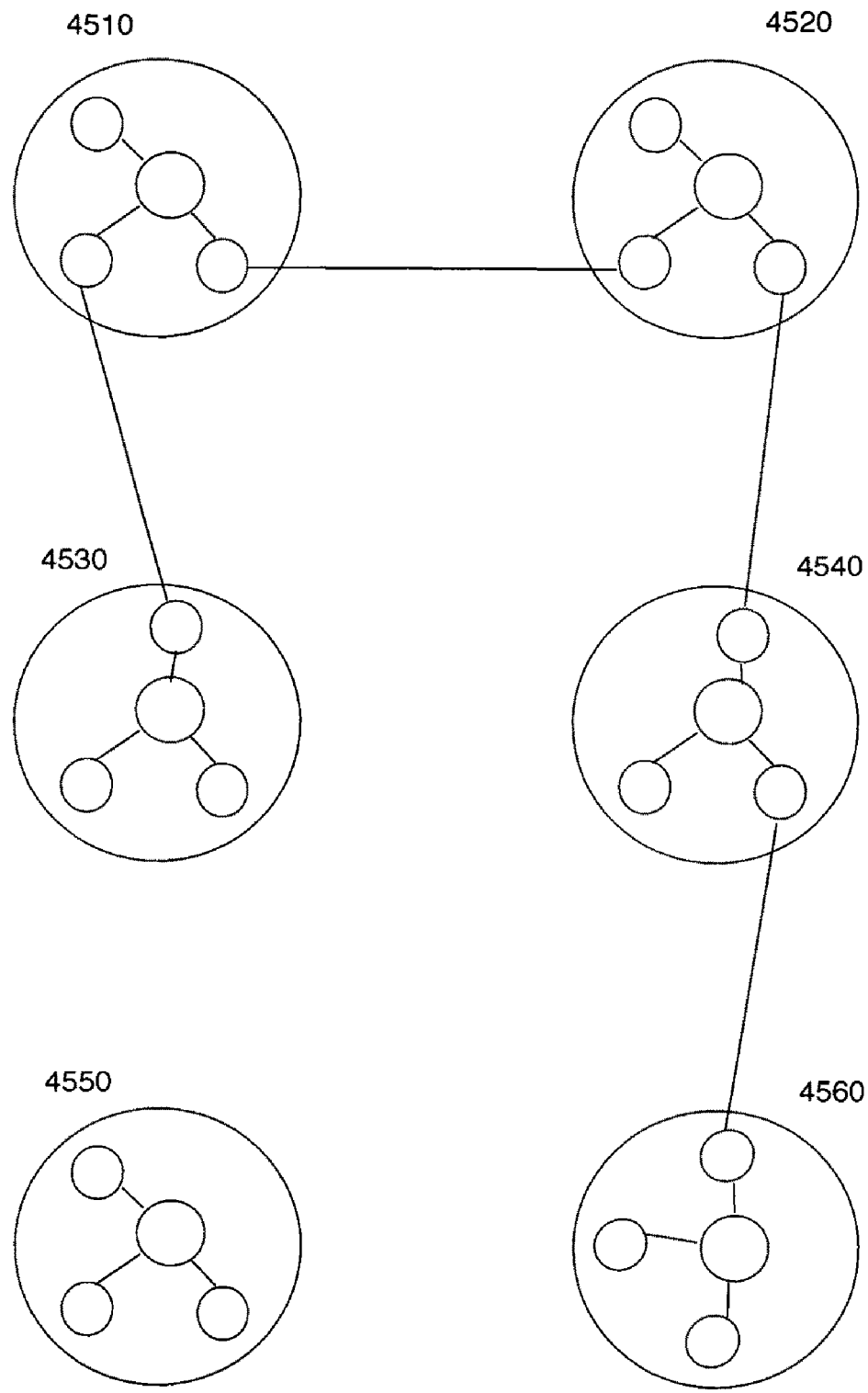

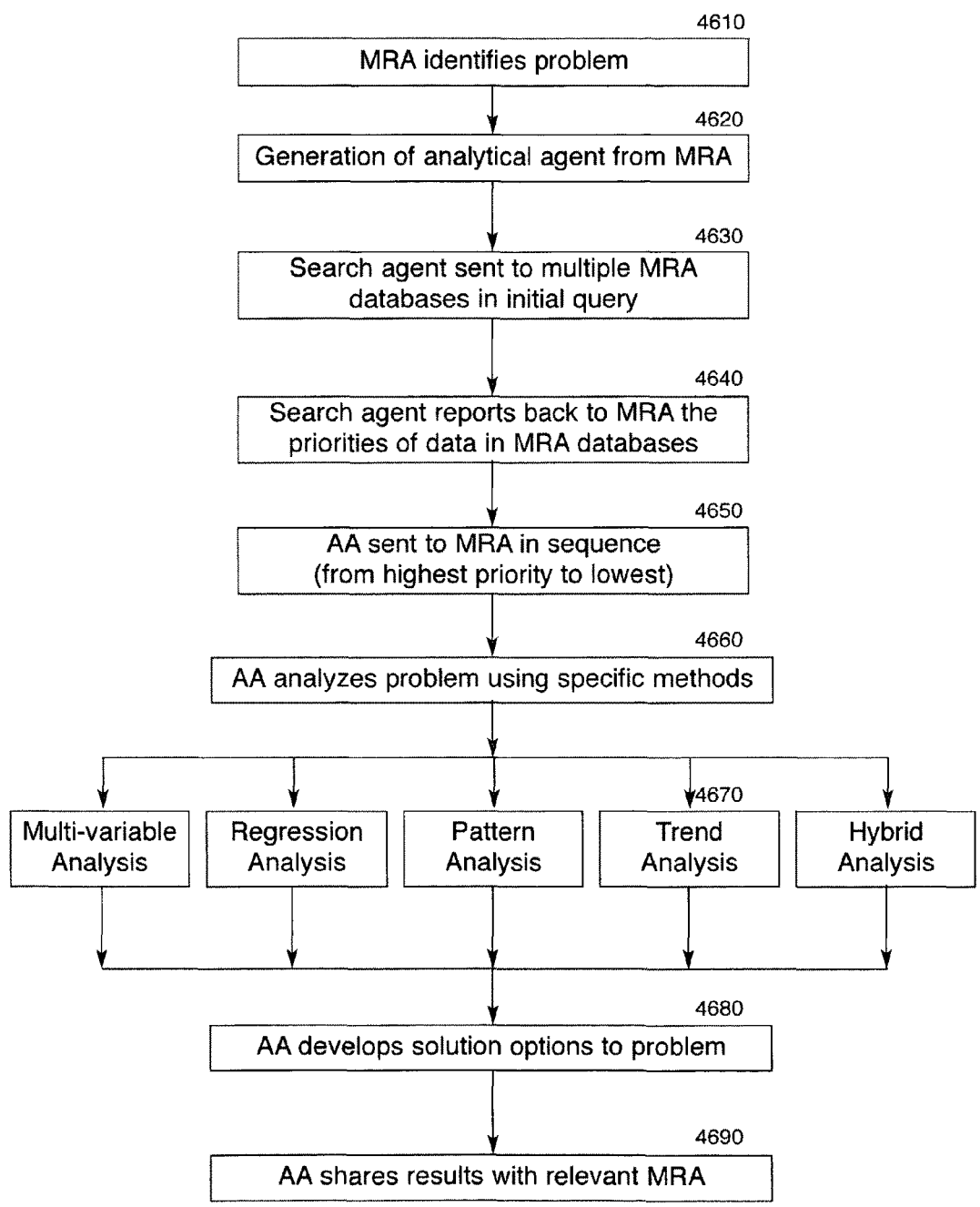
Fig 46: Analytical Agents

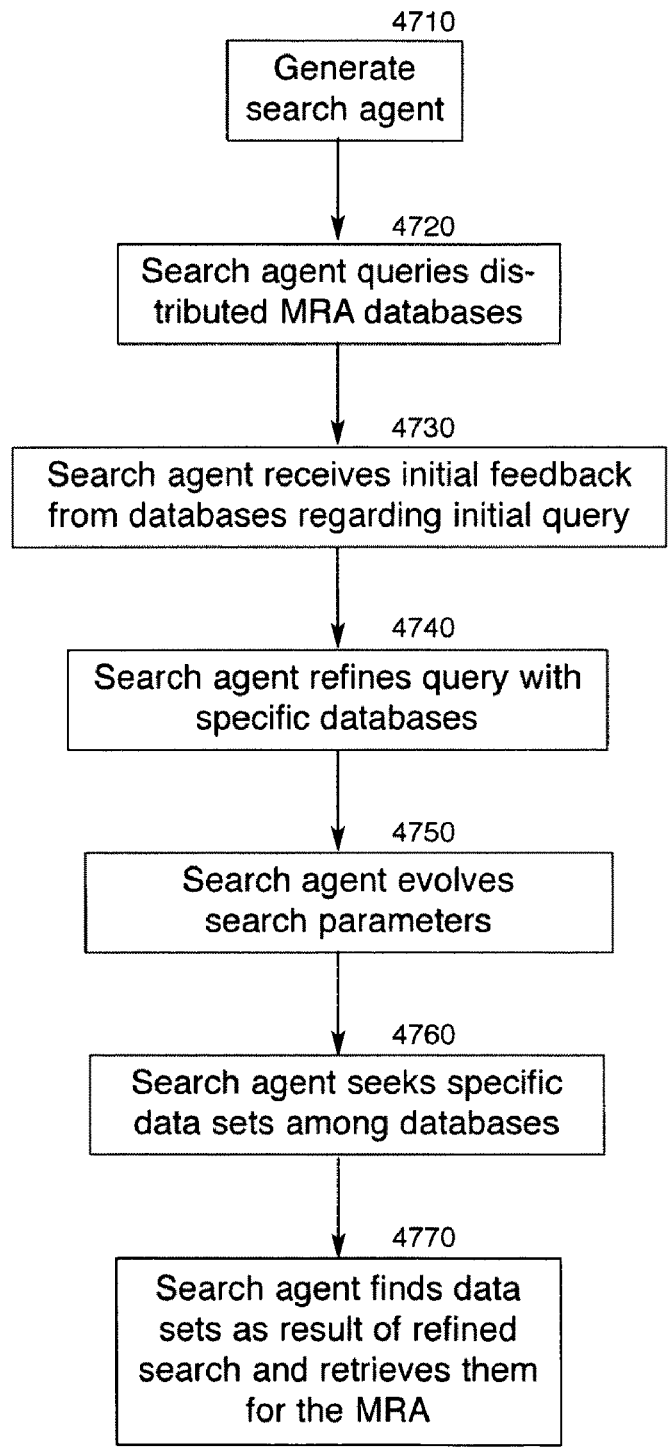
Fig 47: Search Agents

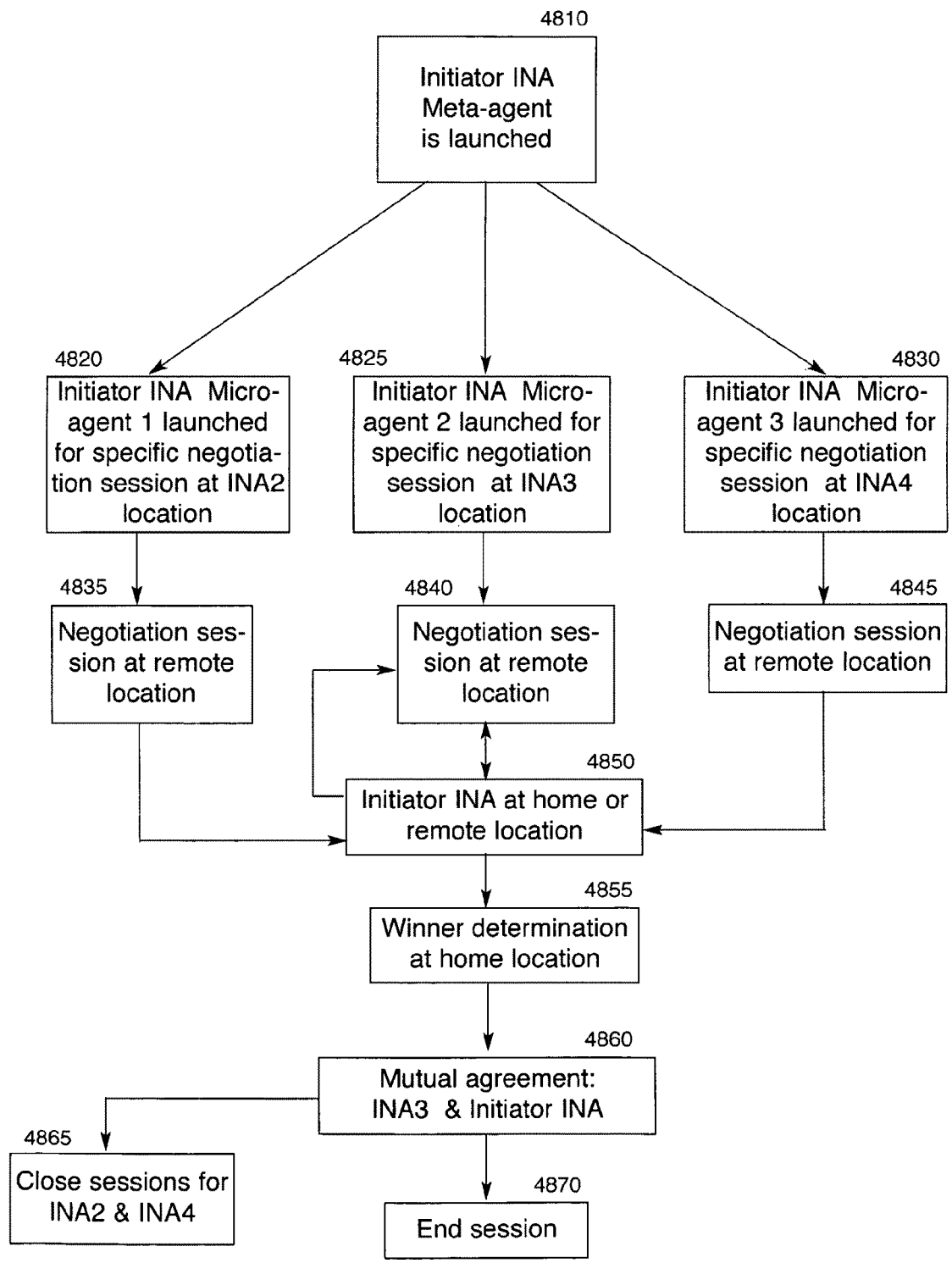
Fig. 48: Intelligent Negotiation Agents

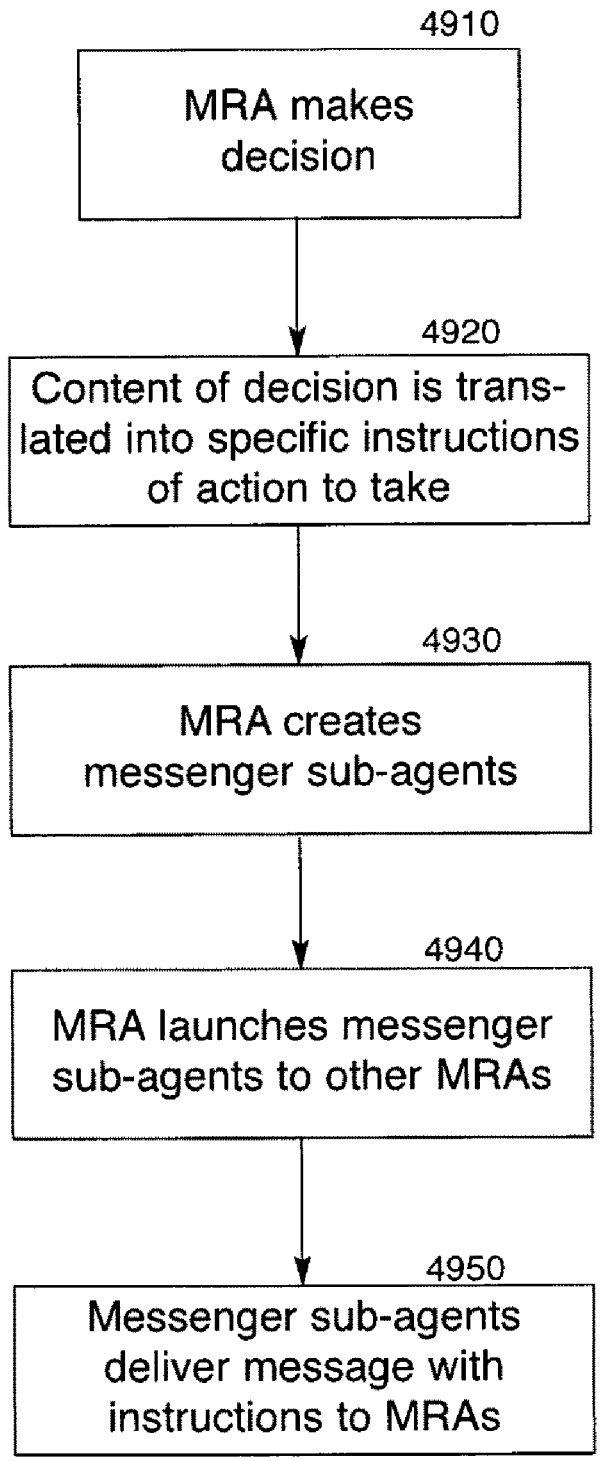
Fig 49: IMSA Intercommunication

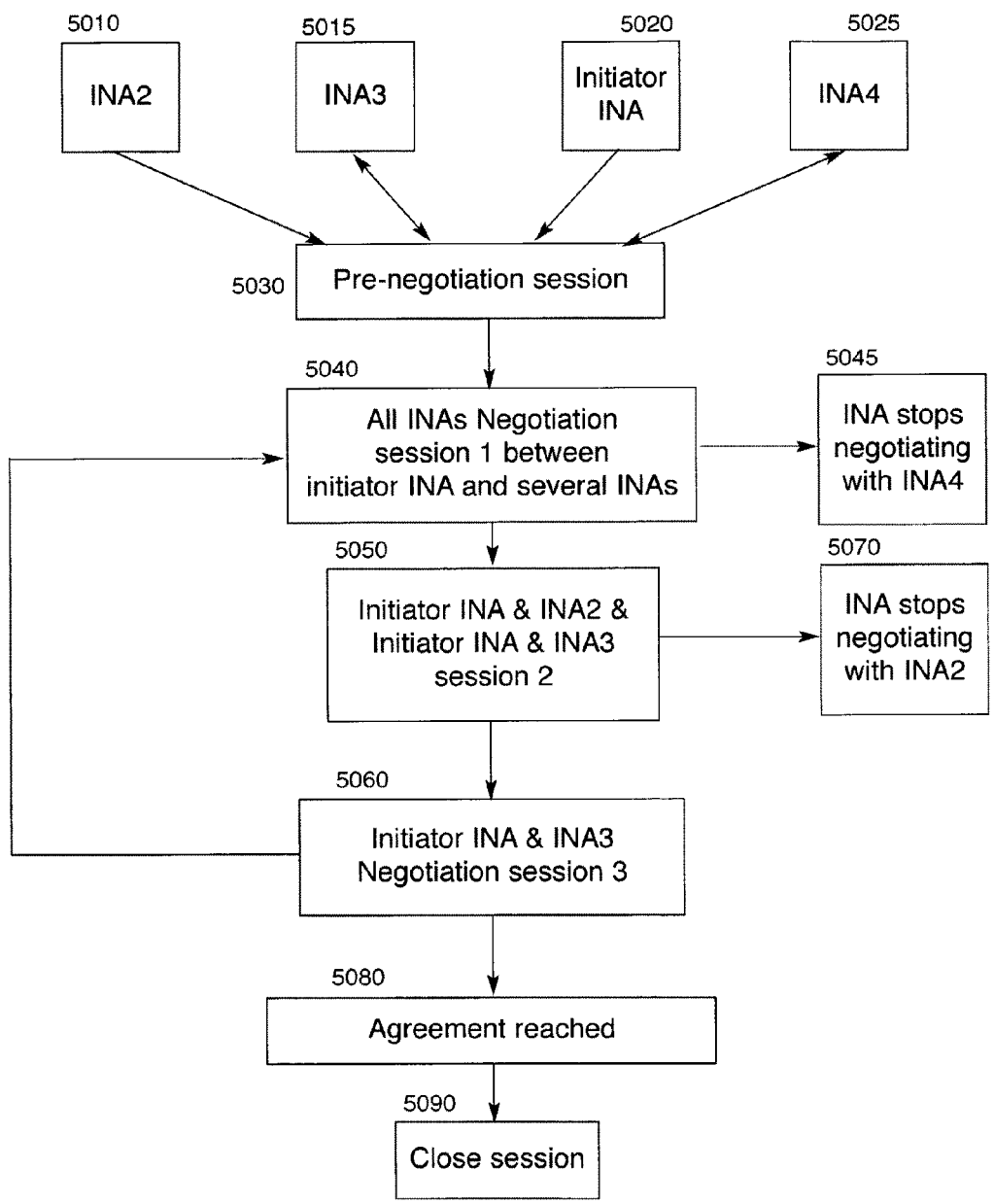
Fig 50: INA Architecture

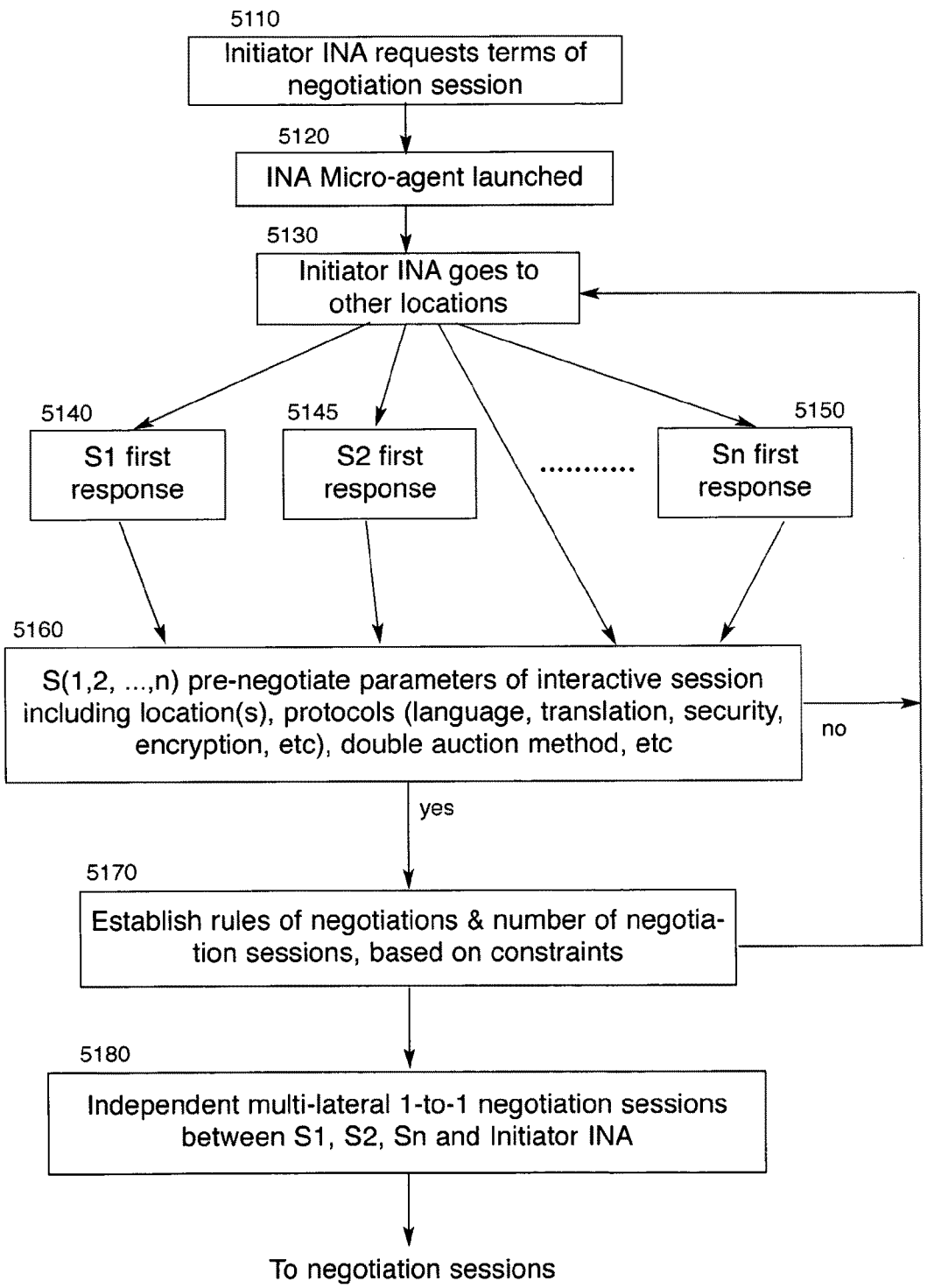
Fig. 51: Pre-Negotiation

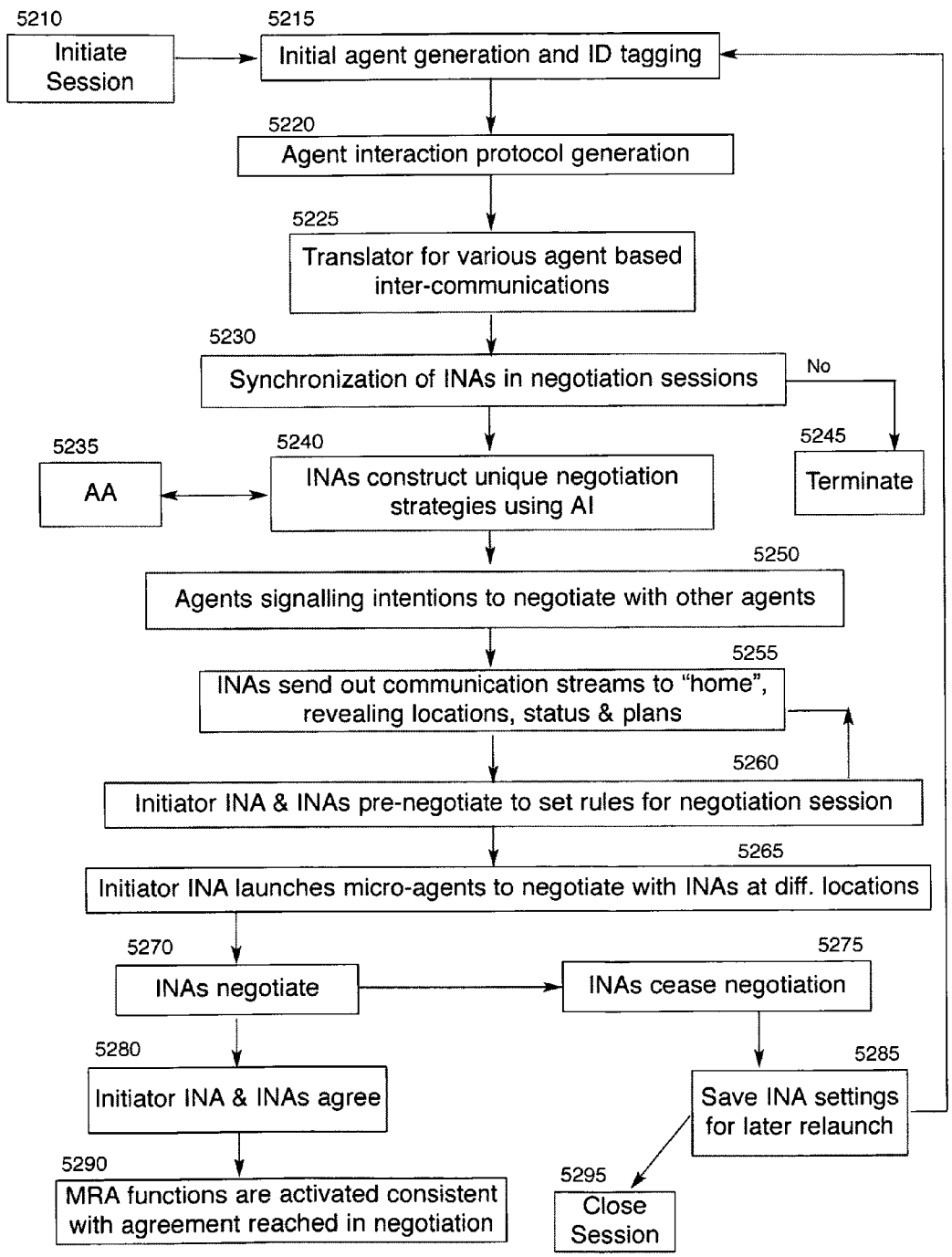

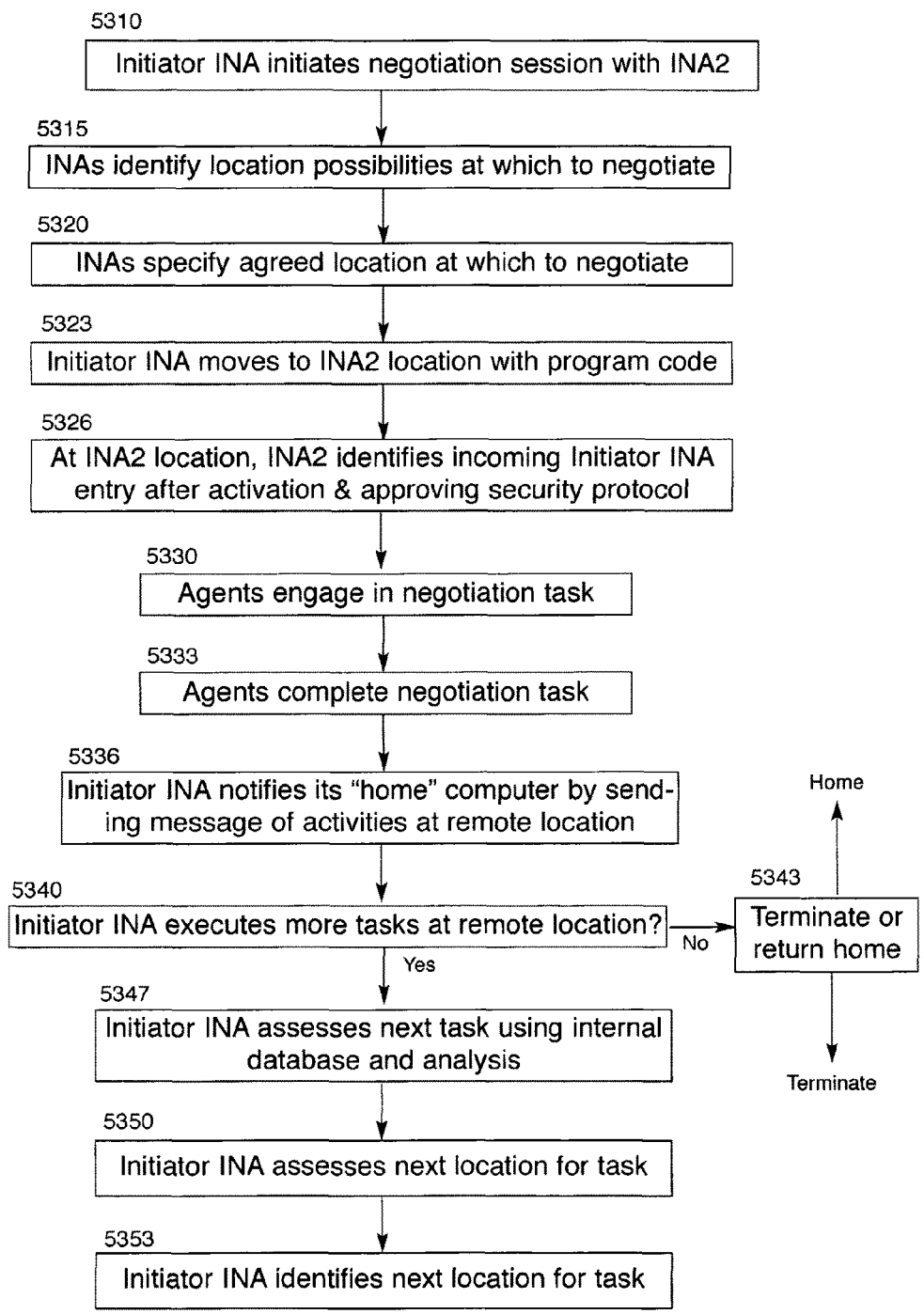
Fig. 53A: Negotiation in a Distributed System with Mobility

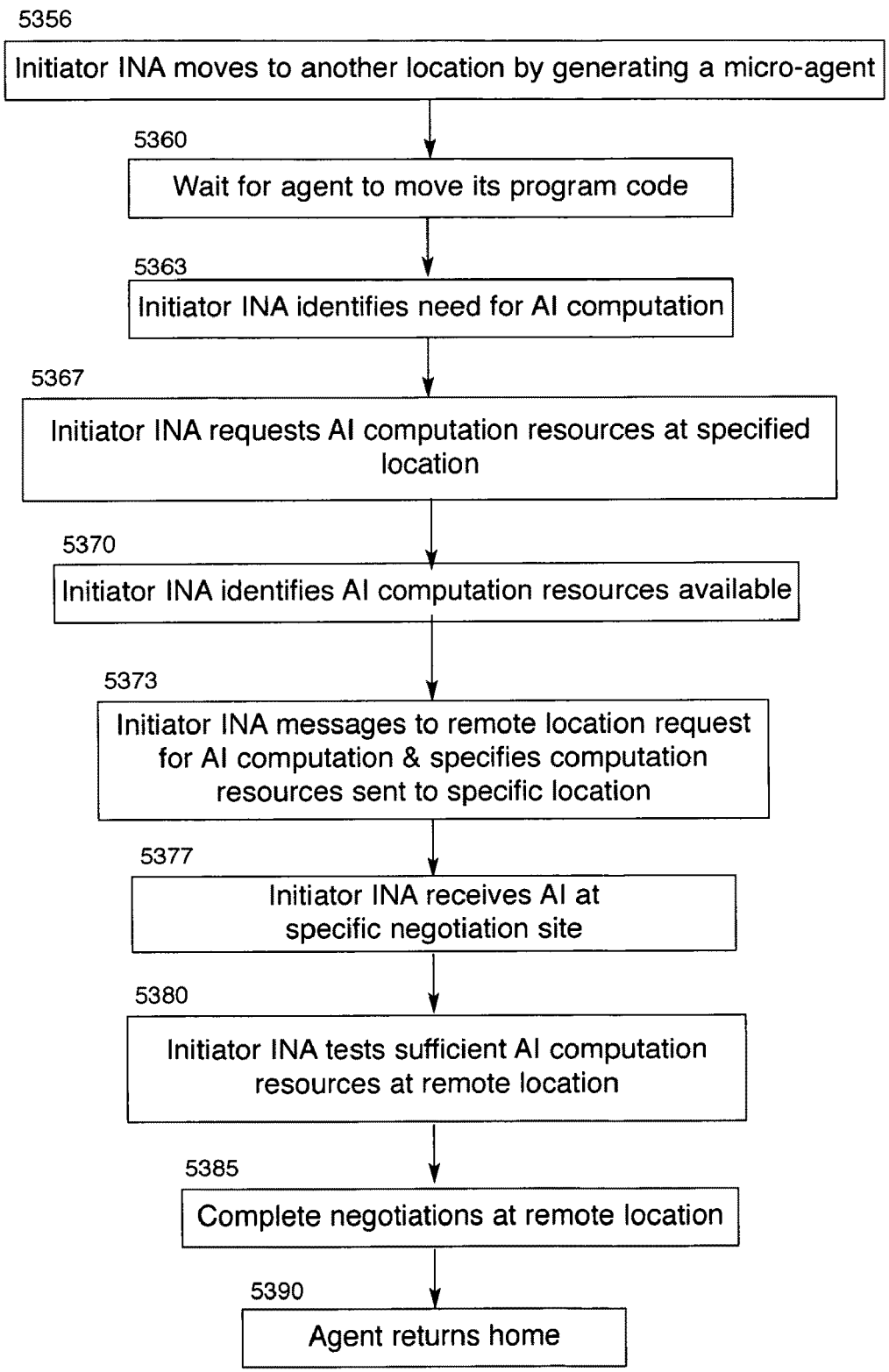
Fig. 53B: Negotiation in a Distributed System with Mobility (Continued)

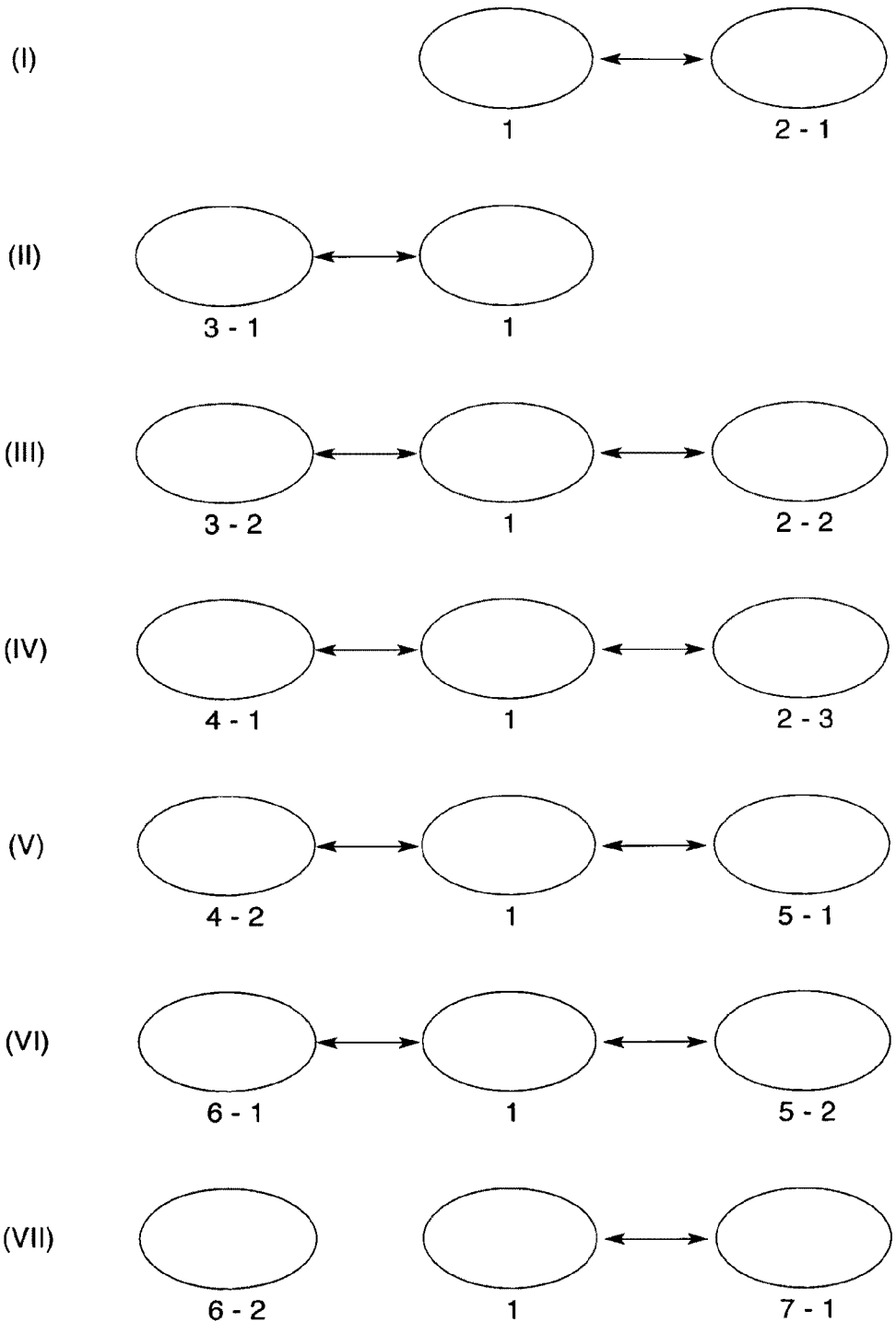
Fig 54: Simultaneous Multi-lateral Negotiation Process with Multiple Variables Fig 55: Multivariate Negotiation Factors
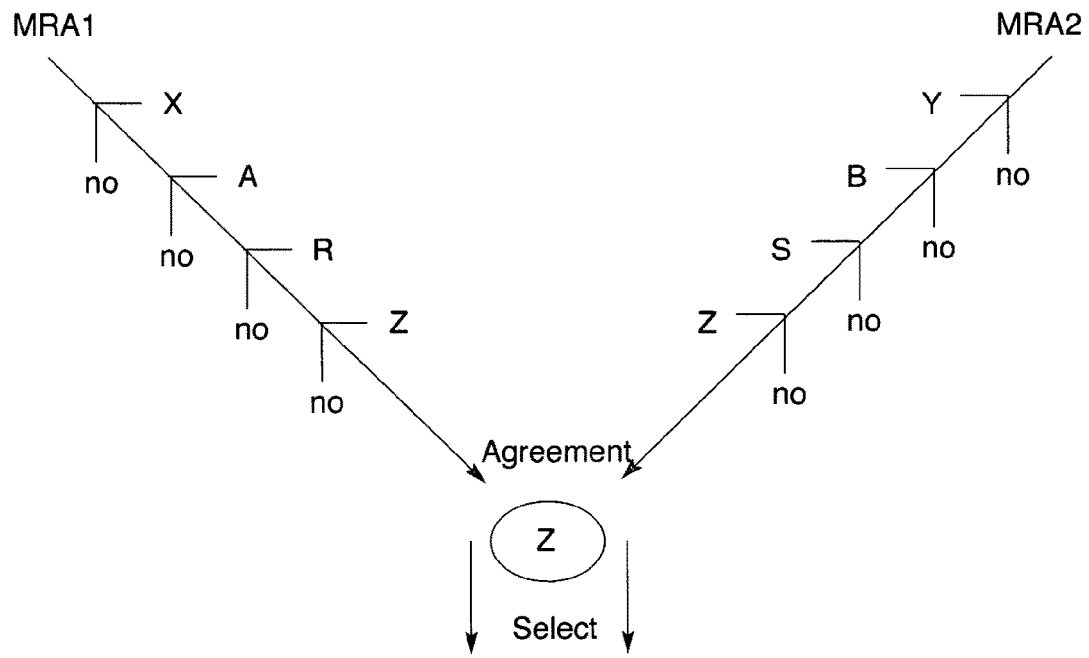
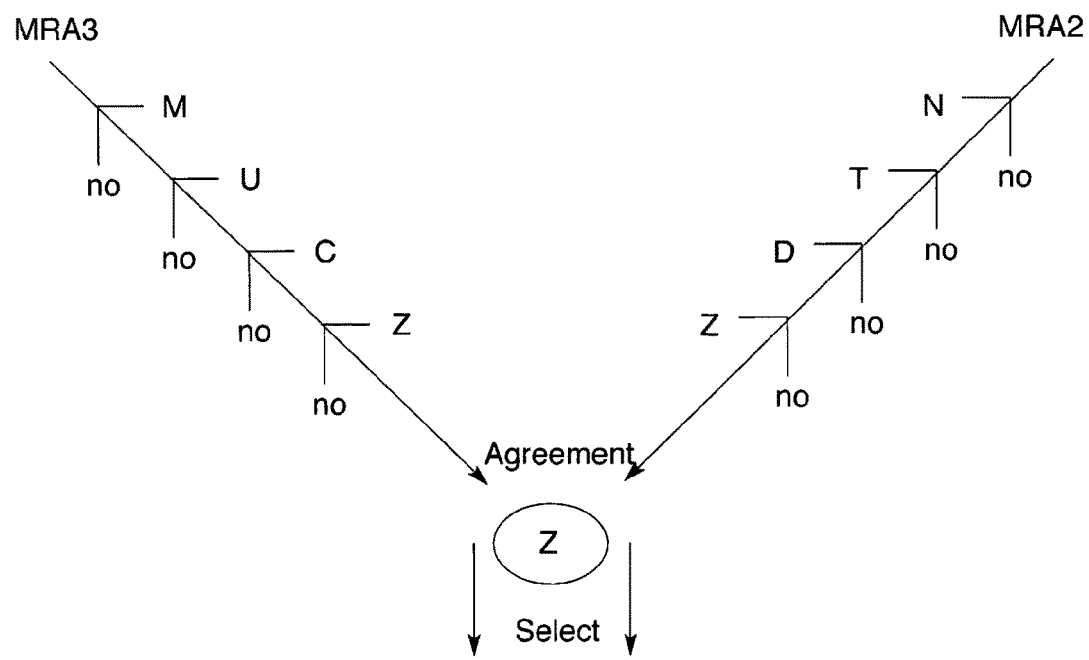

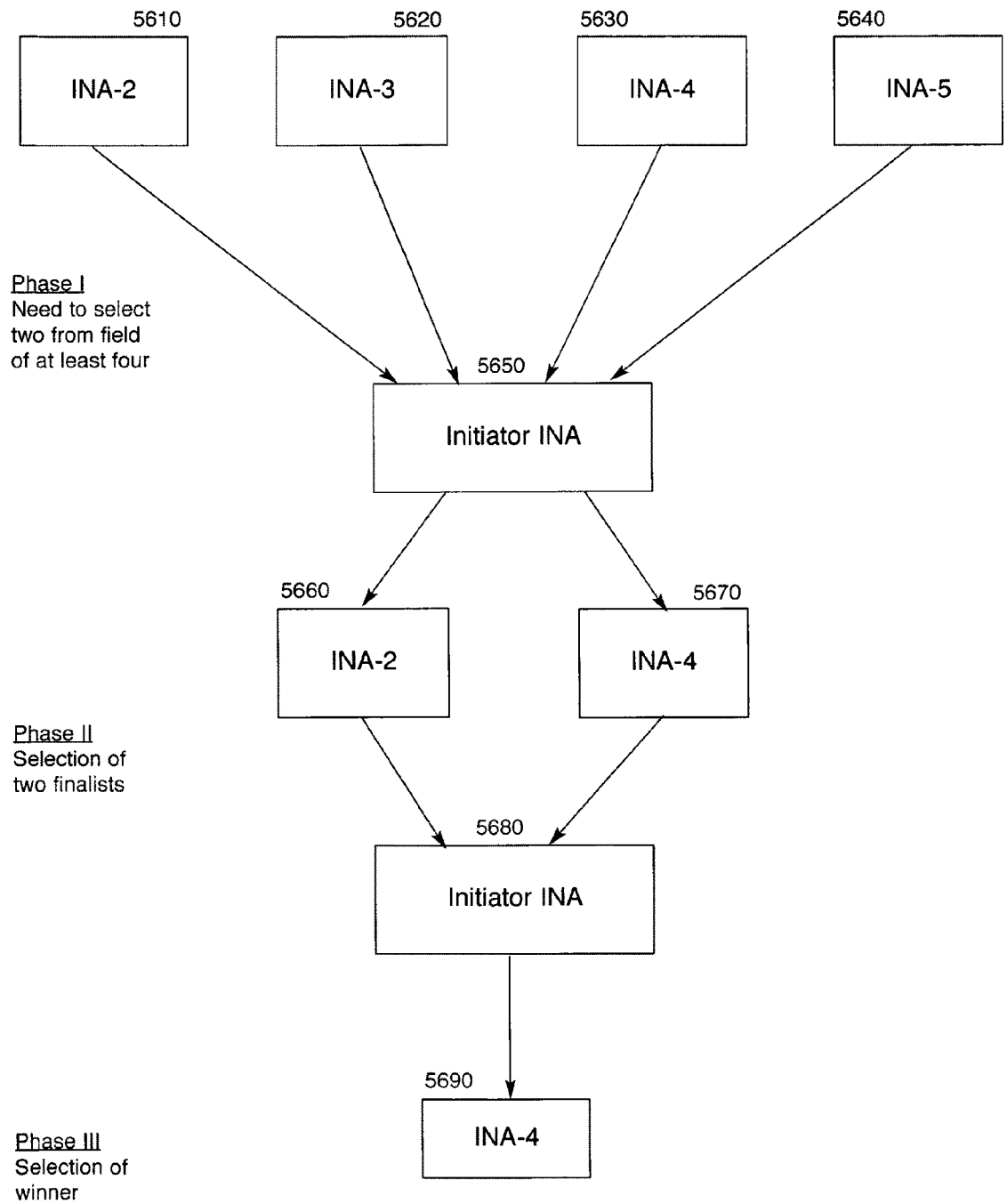
Fig. 56: Winner Determination in Competitive INA Framework

Fig 57: Argumentation Process

| Temporal Phases | 5710<br>A | 5720 | 5730<br>B |
|---|---|---|---|
| Negotiation variables | | | X |
| Prune out uncompromise variable | X | | |
| Prune out variables non-negotiable | | | X |
| Compromise key variables | X | | X |

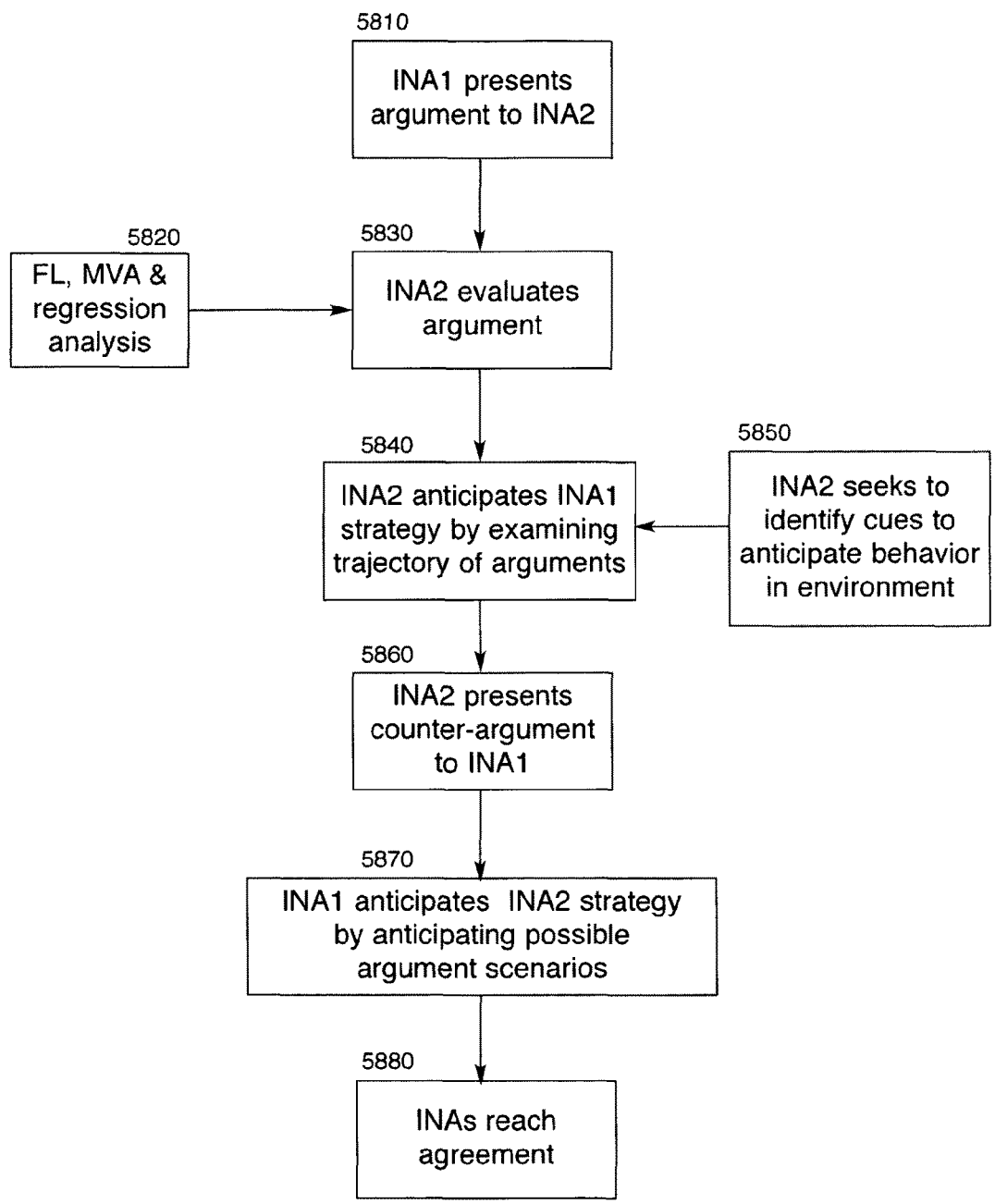
Fig 58: Anticipating Opposing INA Strategies

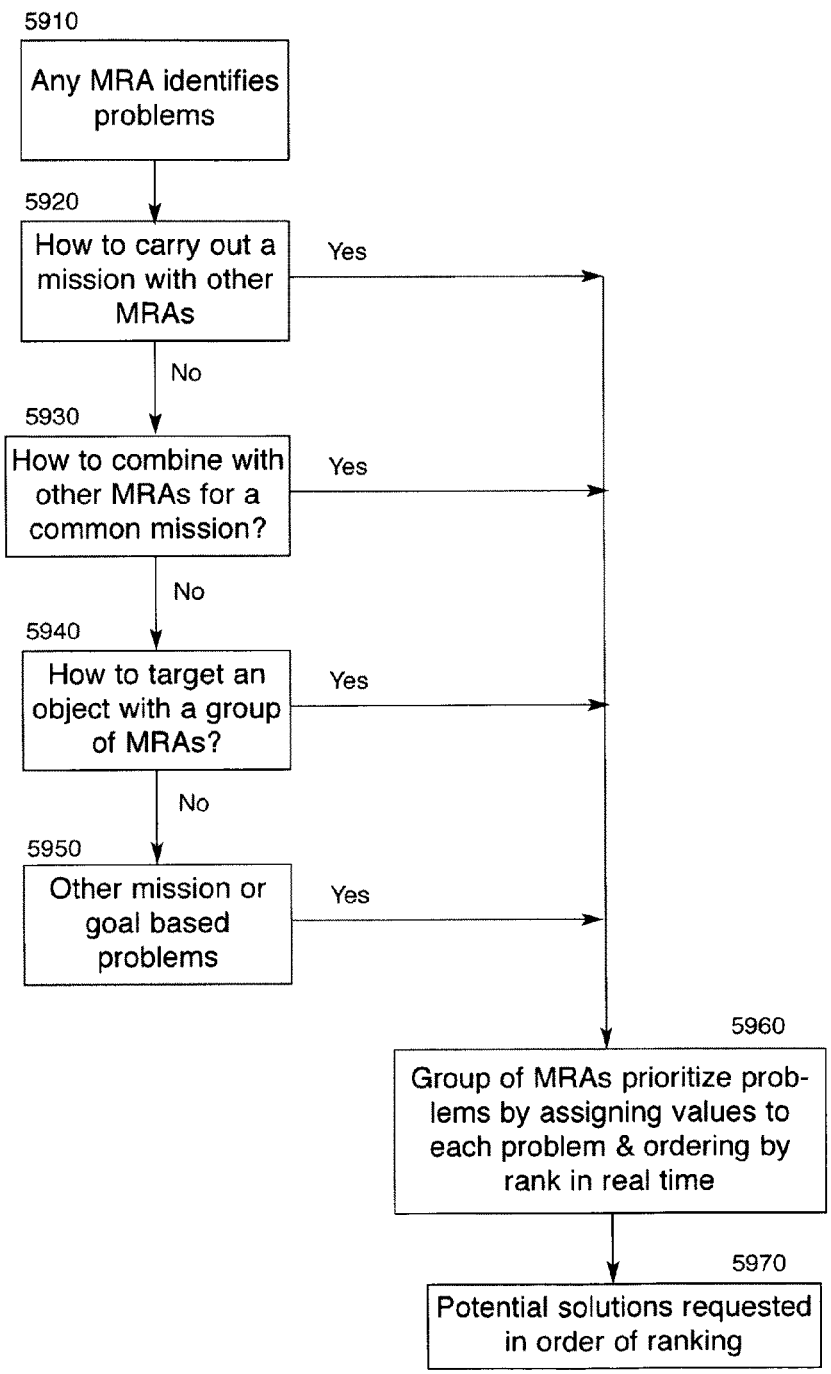
Fig 59: Identify Problems: Group Agrees To Narrow Focus

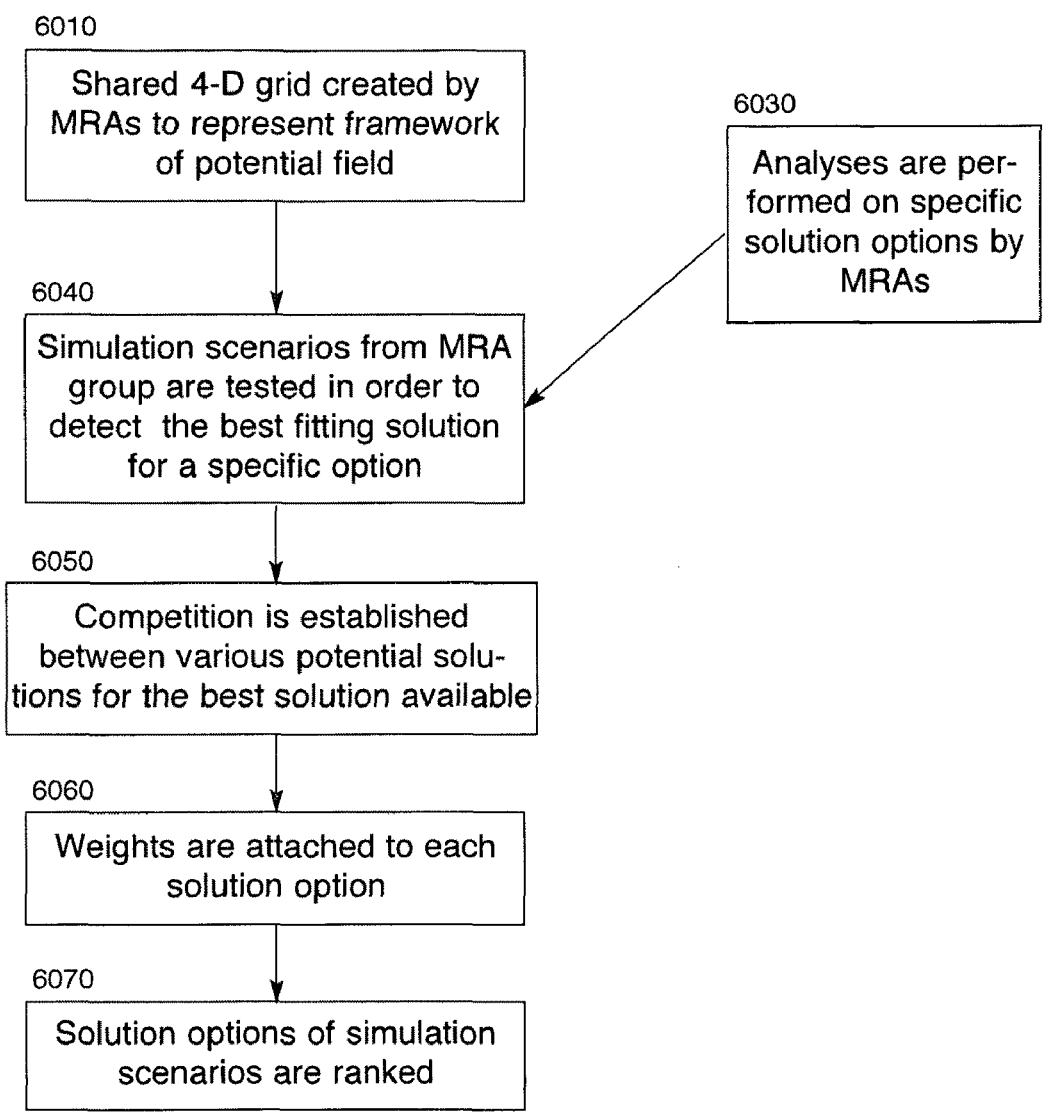
Fig 60: Develop Solution Options Between MRAs

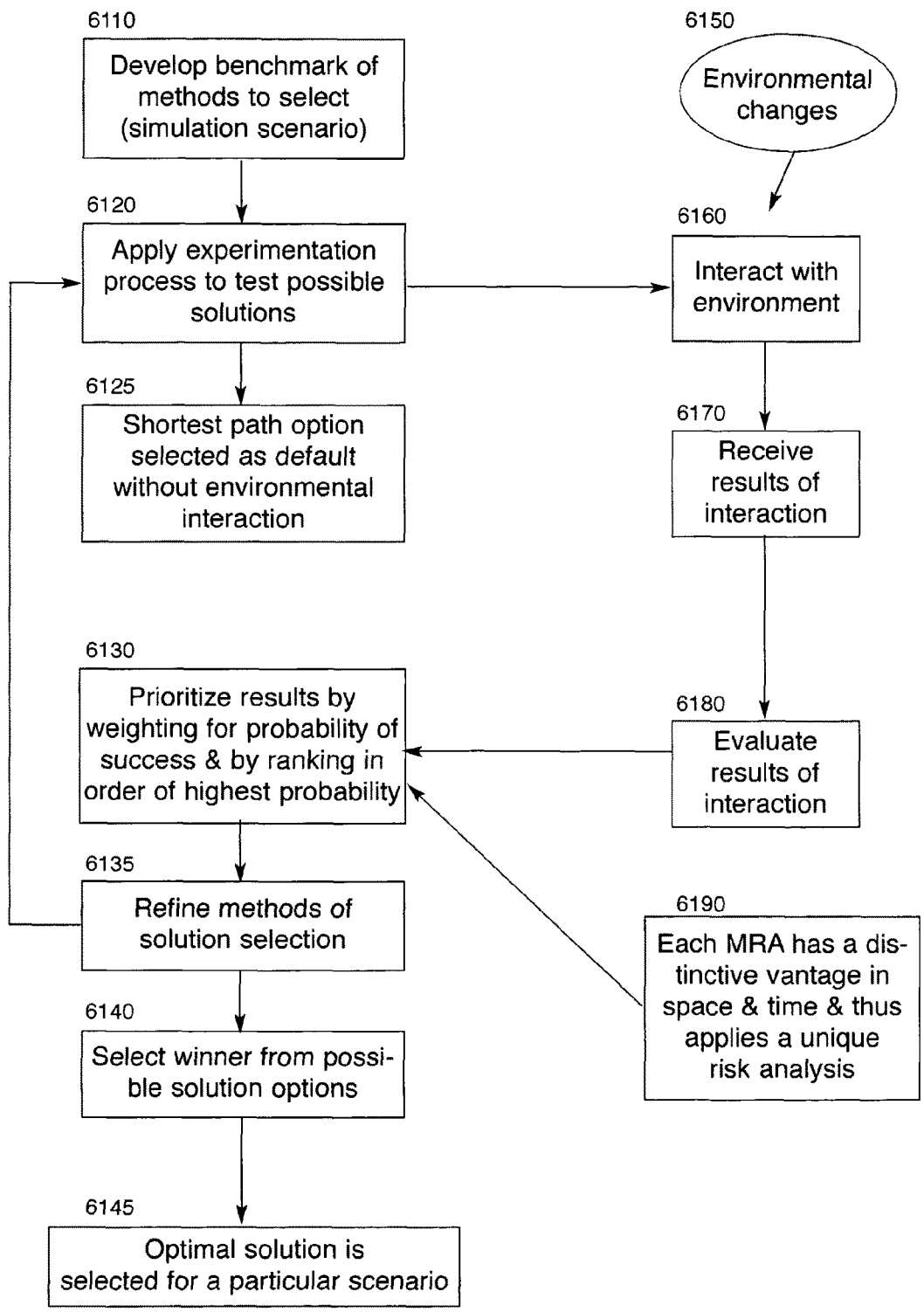
Fig 61: Solution Option Selection Method

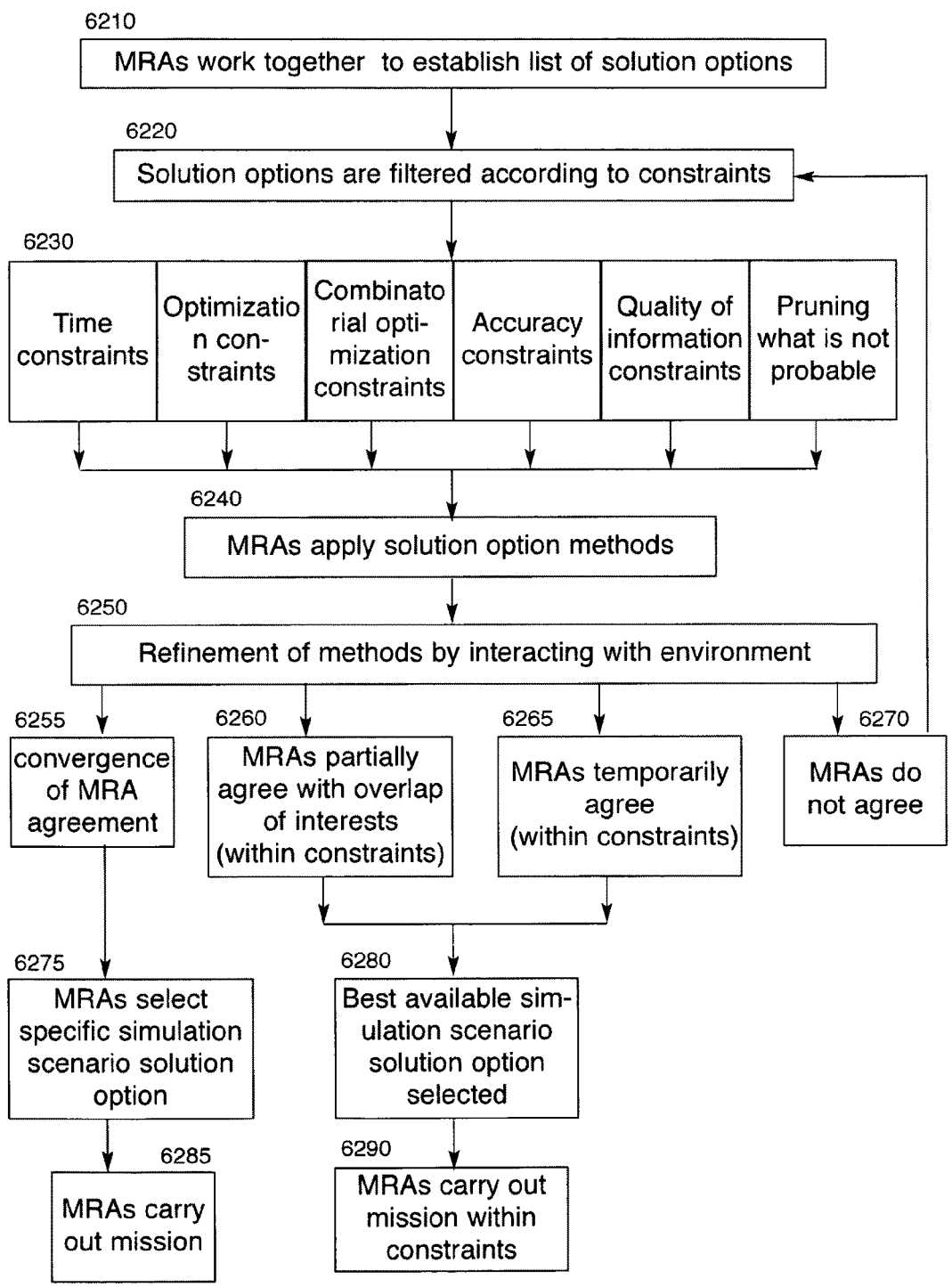
Fig 62: MRAs Select Best Available (not Optimum) Solution To Problem in Present Circumstance While Waiting For Most Recent Relevant Information

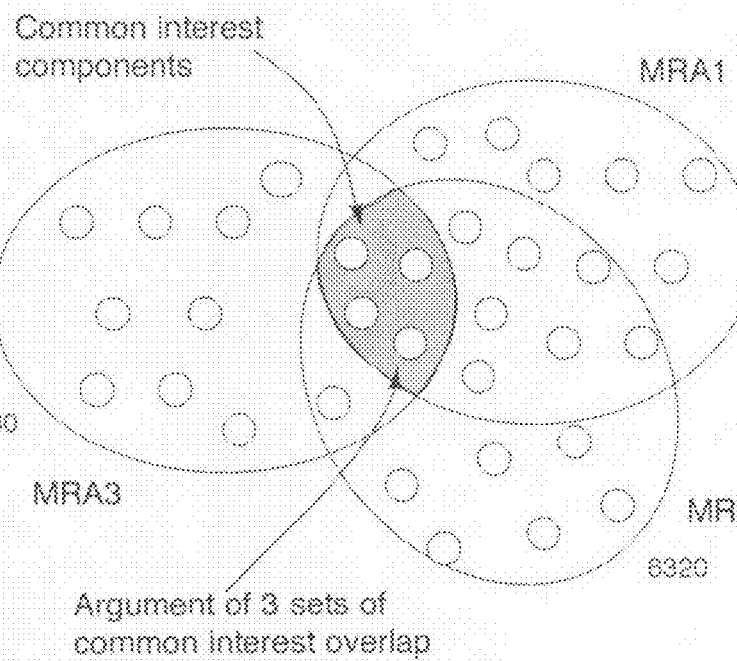
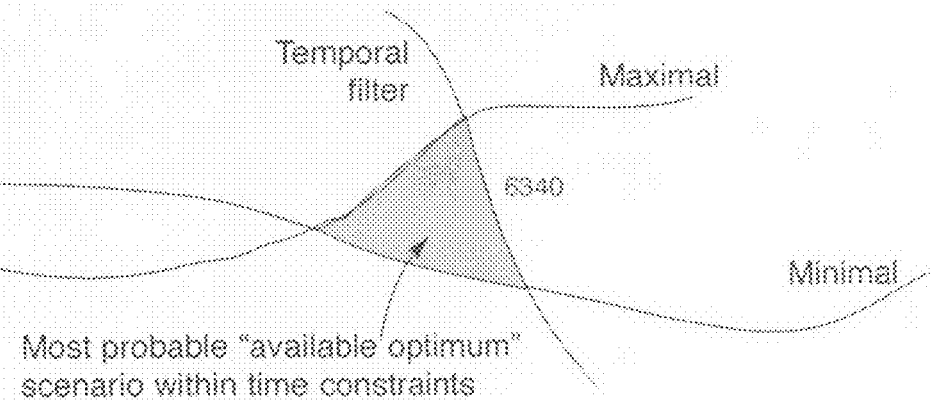
Fig 63: MRA Group Agreement

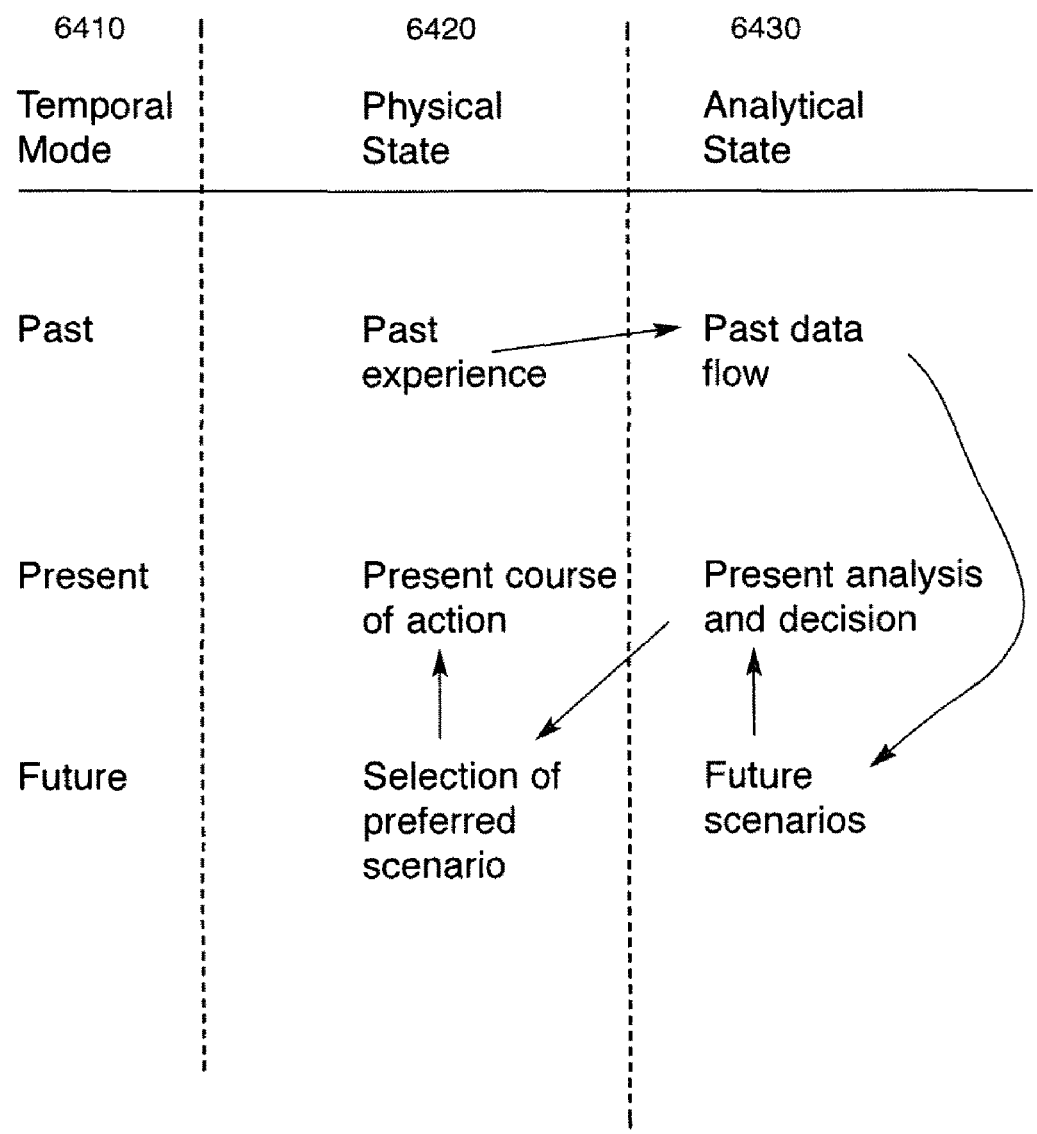
Fig 64: Temporal Aspect of Decision Process

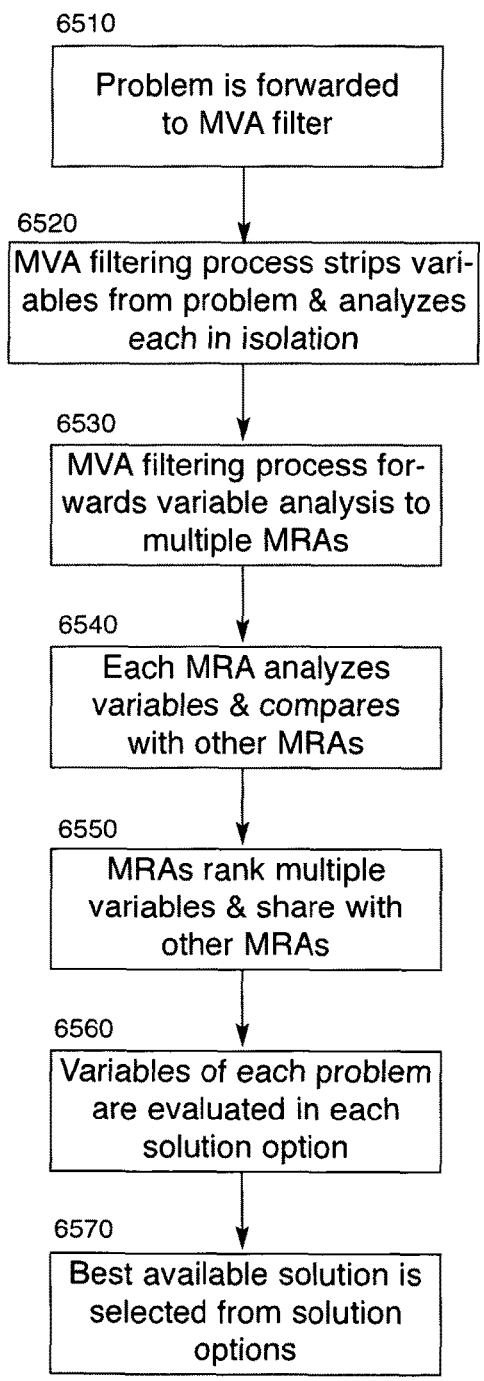
Fig 65: Applying Multivariate Analysis to Problem Solving

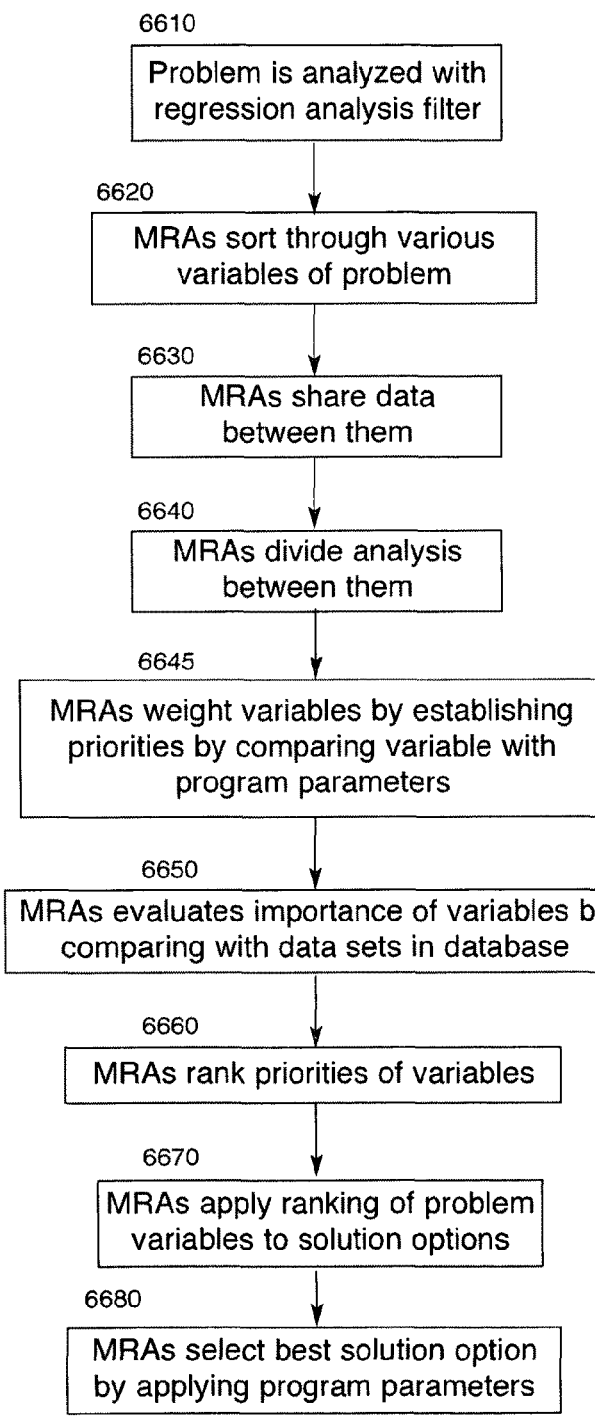
Fig 66: Applying Regression Analysis to Problem Solving of Conflicting MRAs for Winner Determination

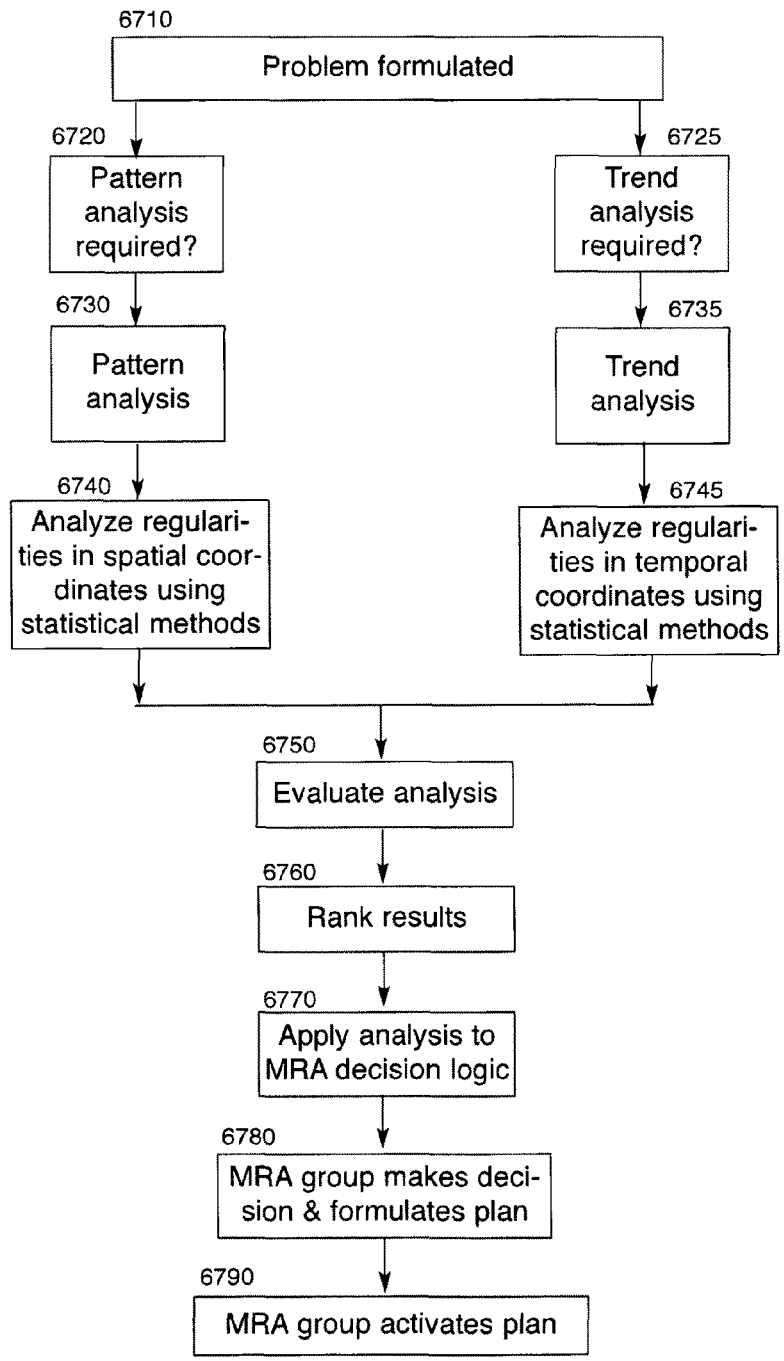
Fig 67: Applying Pattern Analysis and Trend Analysis to Problem Solving of Conflicting MRAs for Winner Determination

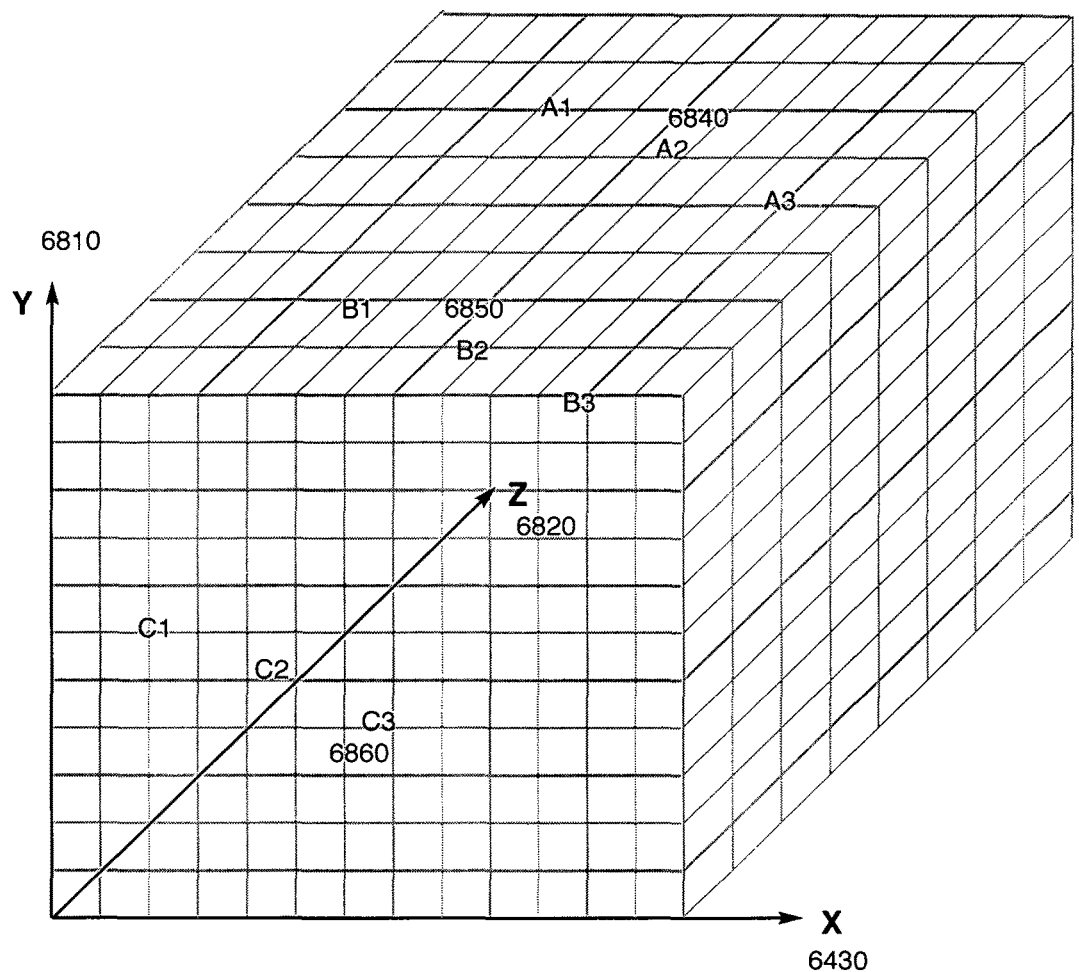
Fig 68: Modeling MRS Activity with Simulations- Situation Assessment
MRAs A, B, C move from place 1 to place 3 in a cubic space

Fig 69: Synchronizing Simulations Within MRA Cluster
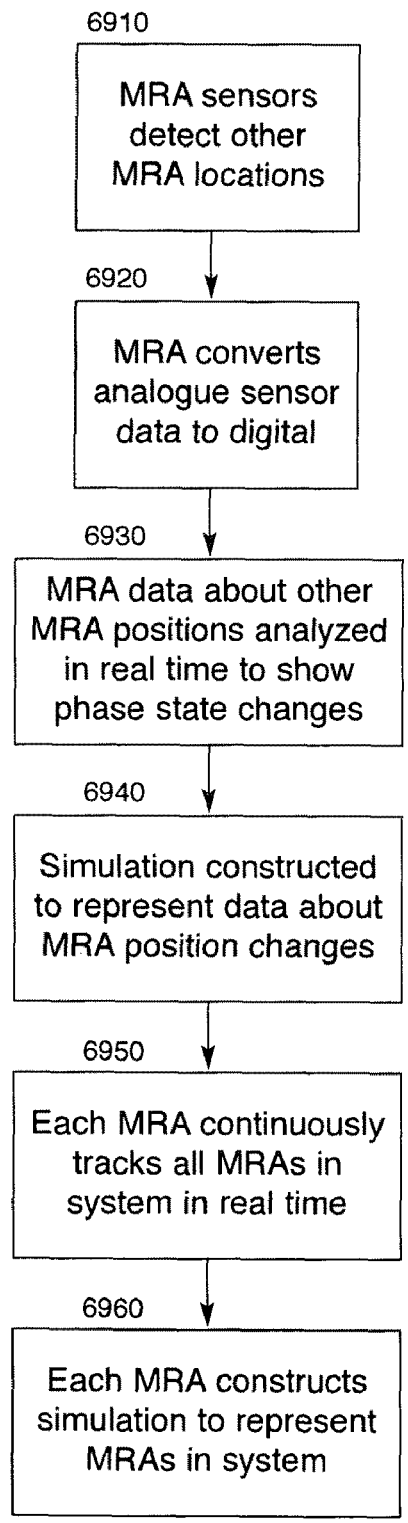

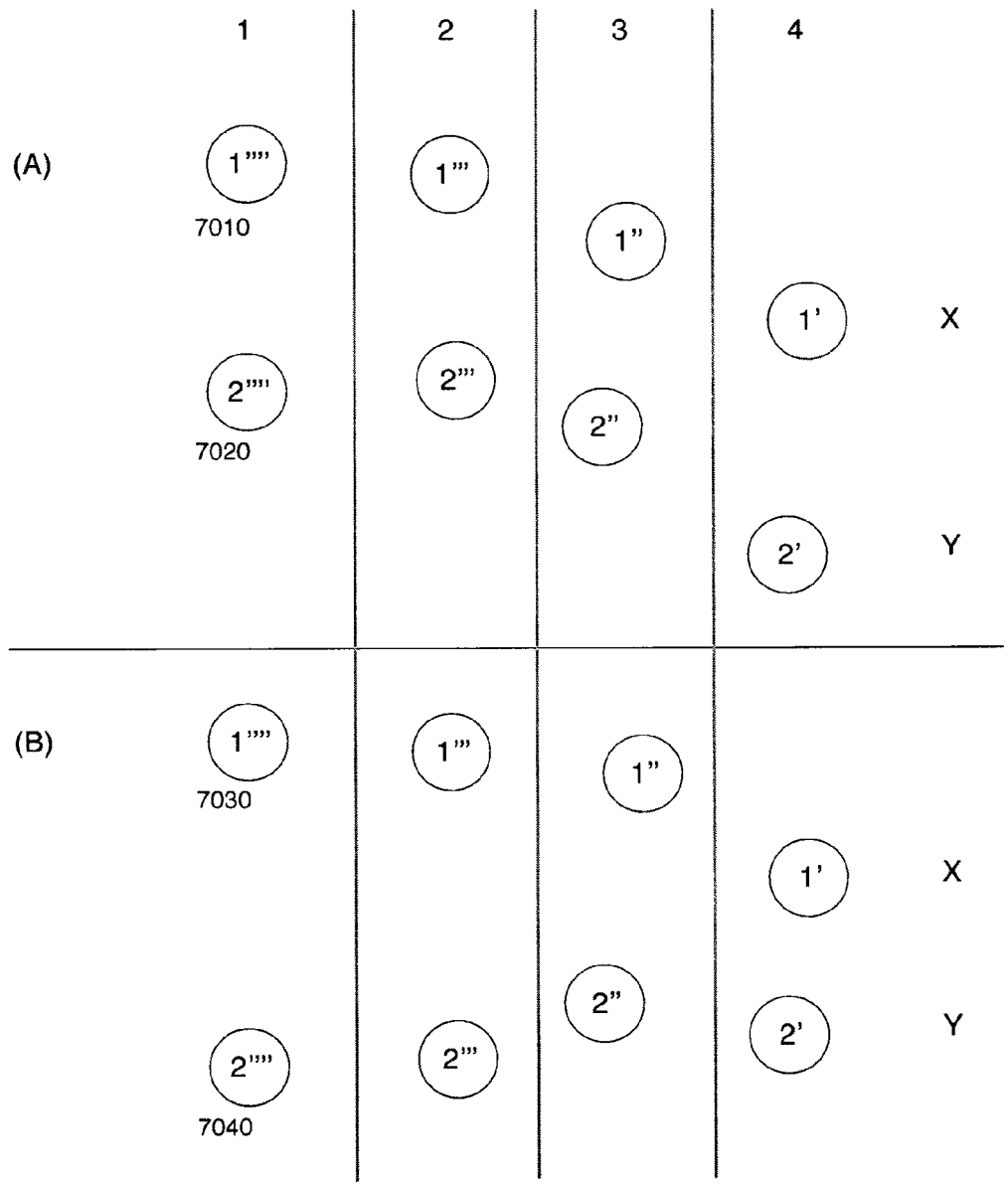
Fig 70: Contingency CA Scenario Option Simulations

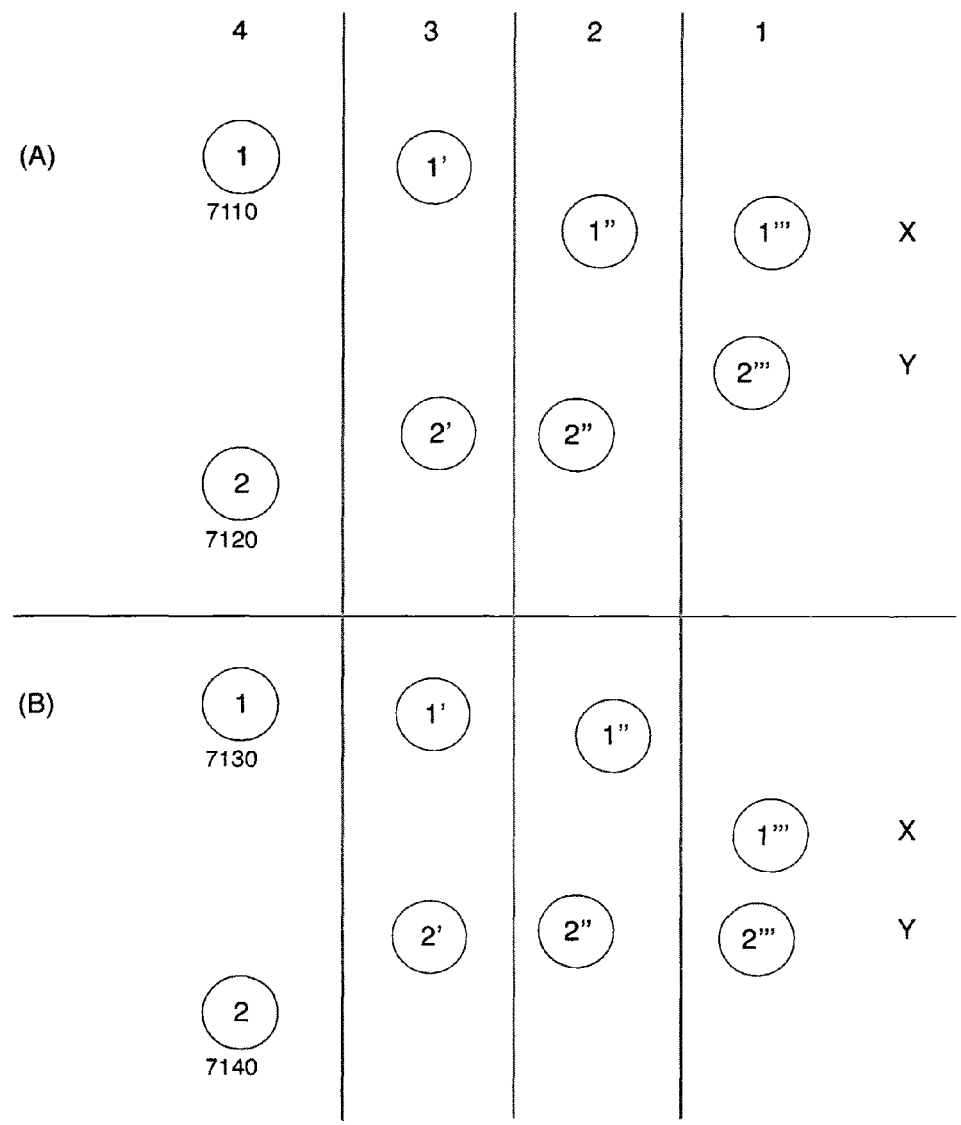
Fig 71: Reversible (Deterministic) CA-Projecting Backwards From A Goal

Fig 72: Adaptive Geometric Set Theory Applied To MRS
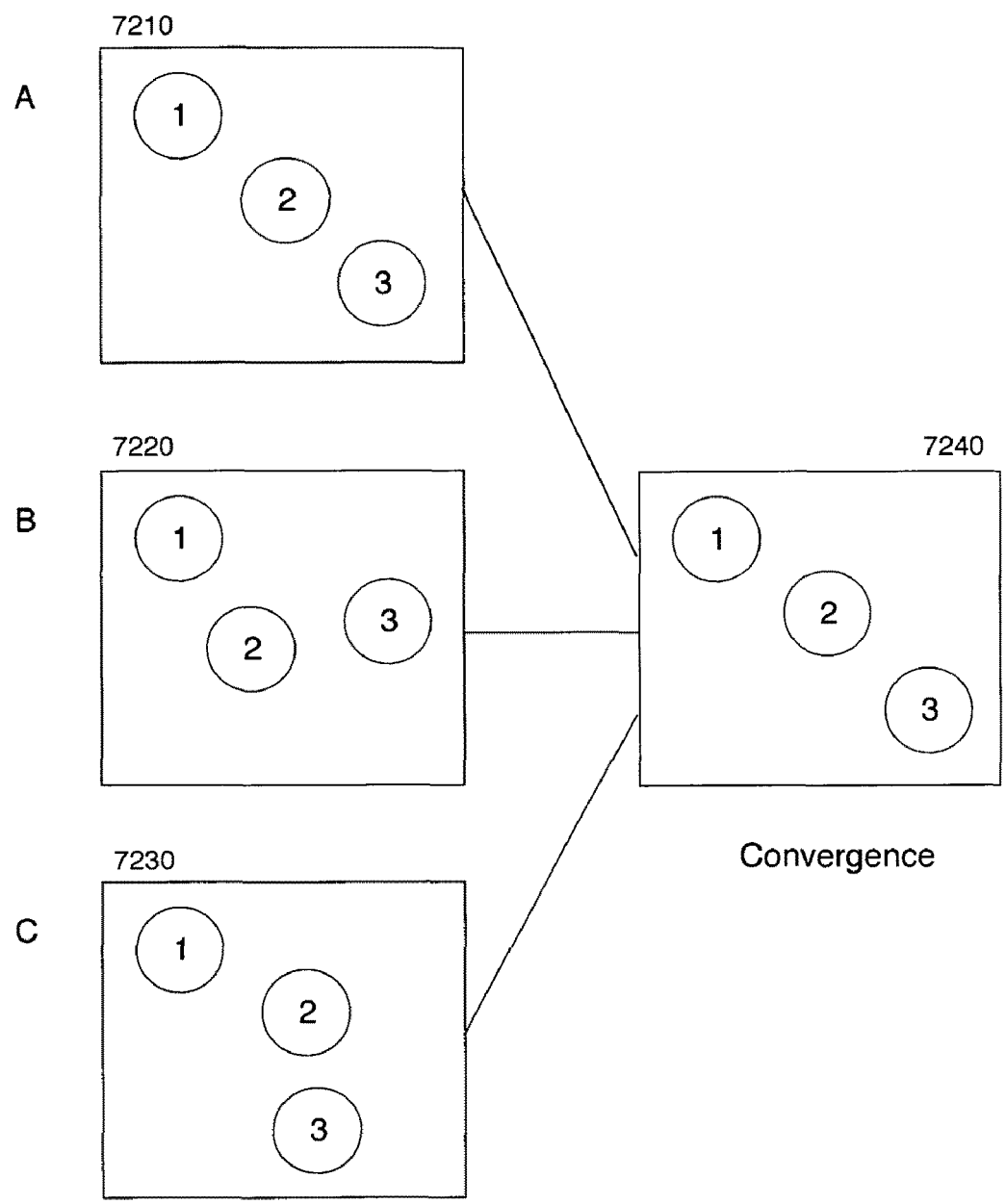

**Fig 73: Selecting Optimal Simulation-
(Temporary) Convergence of Simulation Scenarios**
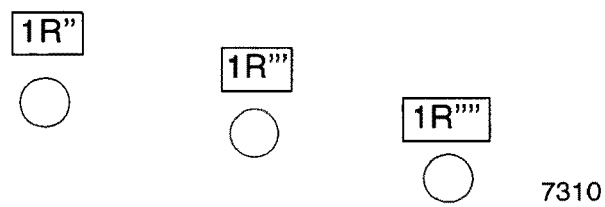
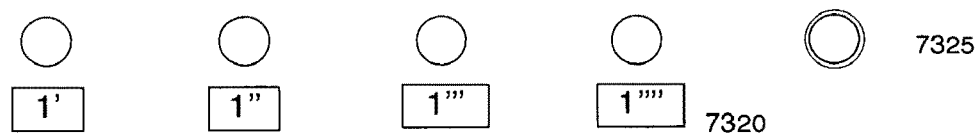
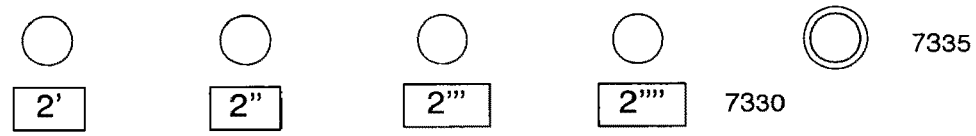
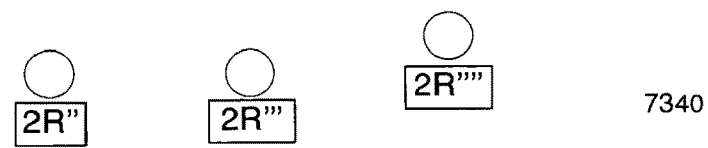

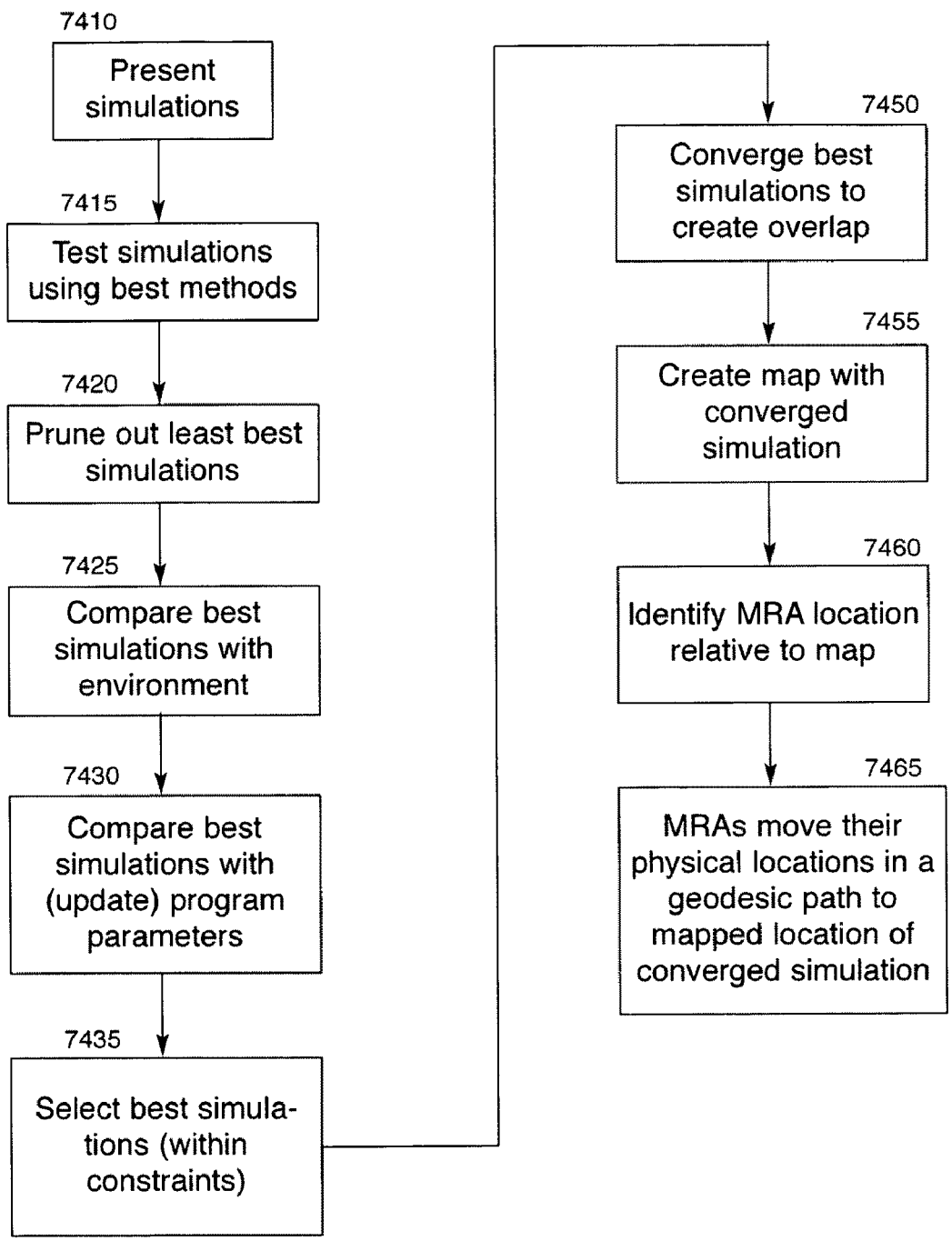
Fig 74: Initiation of Aggregation Process - Sets of MRAs Forming From Larger Collective

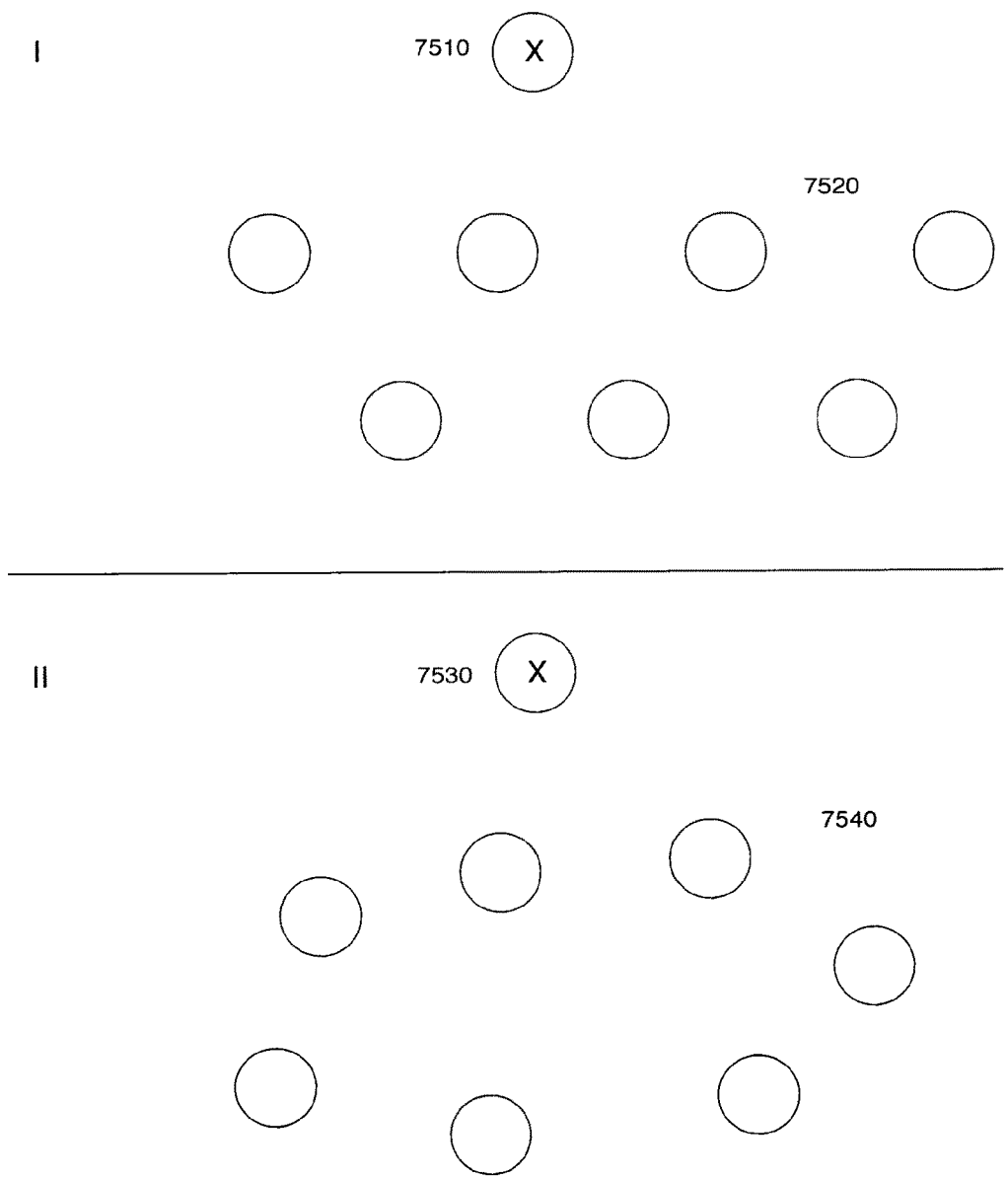
Fig 75: Initiating Homogeneous MRA Group Formation

Fig 76: Initiating Common Heterogeneous MRA Group Formation
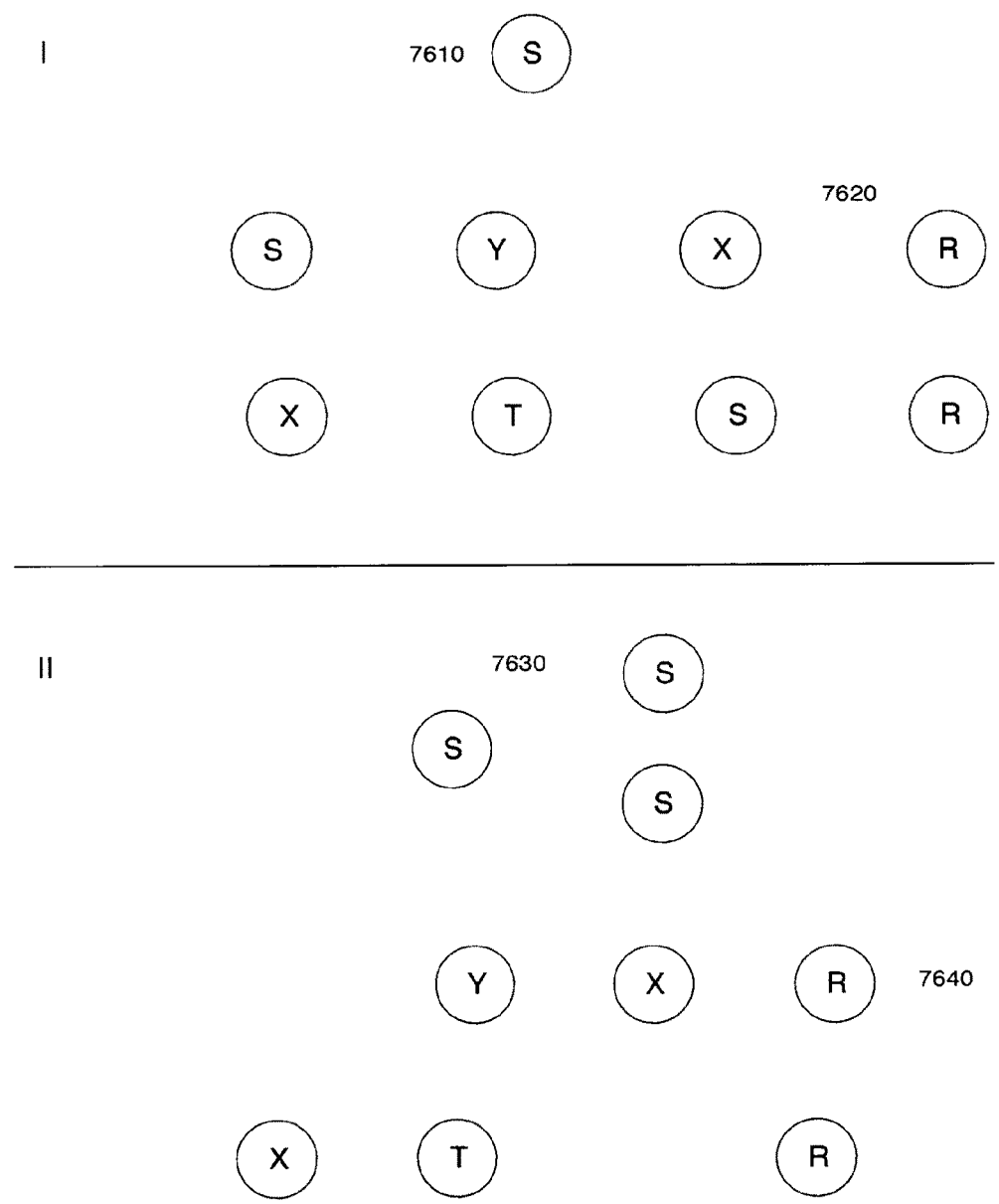

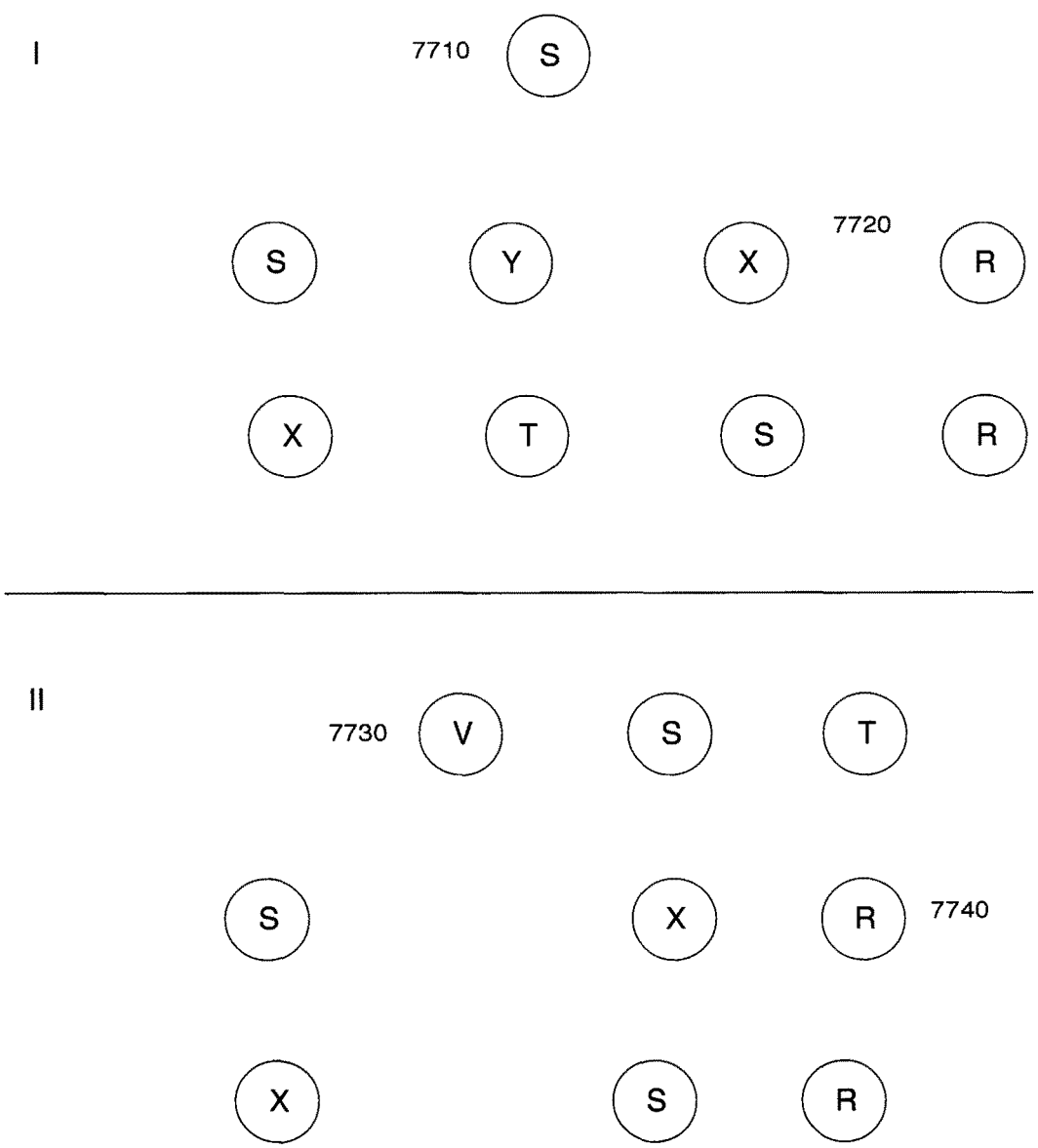
Fig 77: Initiating Complementary Heterogeneous (Specialized) MRA Group Formation

Fig 78: Demand Initiated Environmental Adaptation: Initial Phase
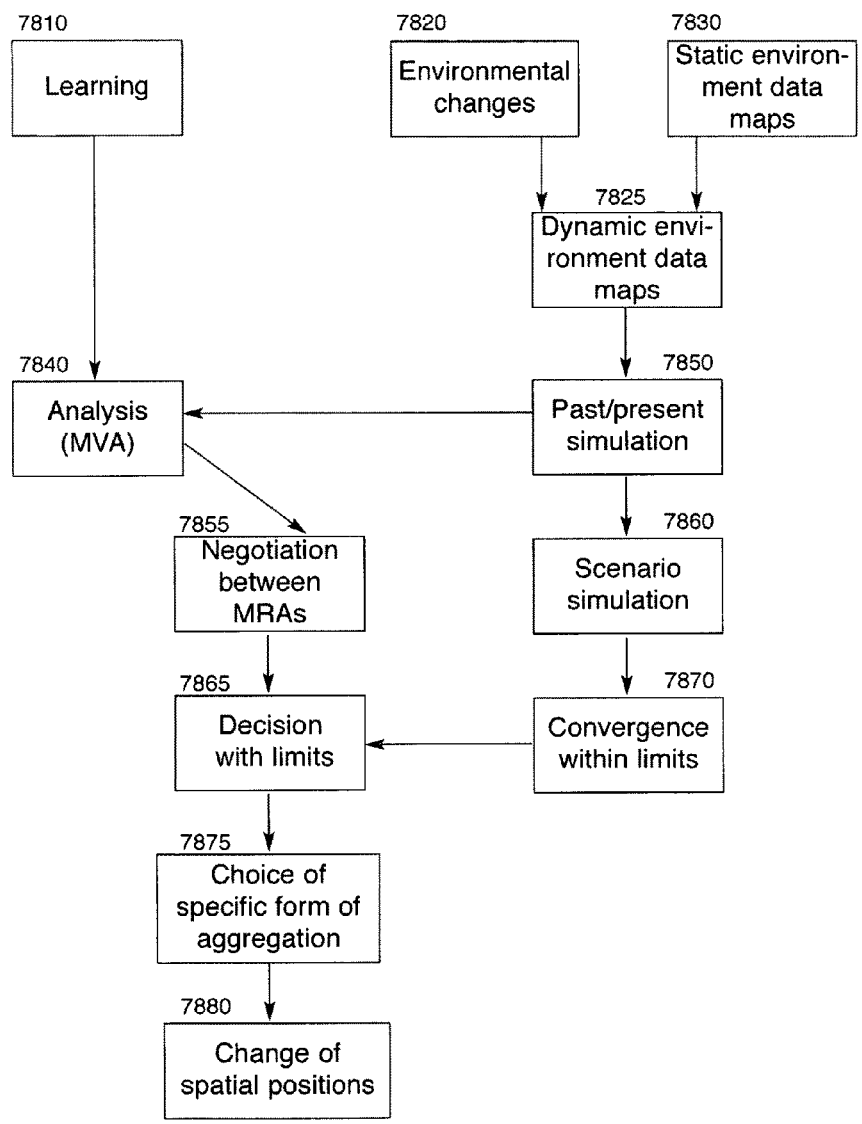

Fig 79: Continuous MRA Group Composition Reconfiguration
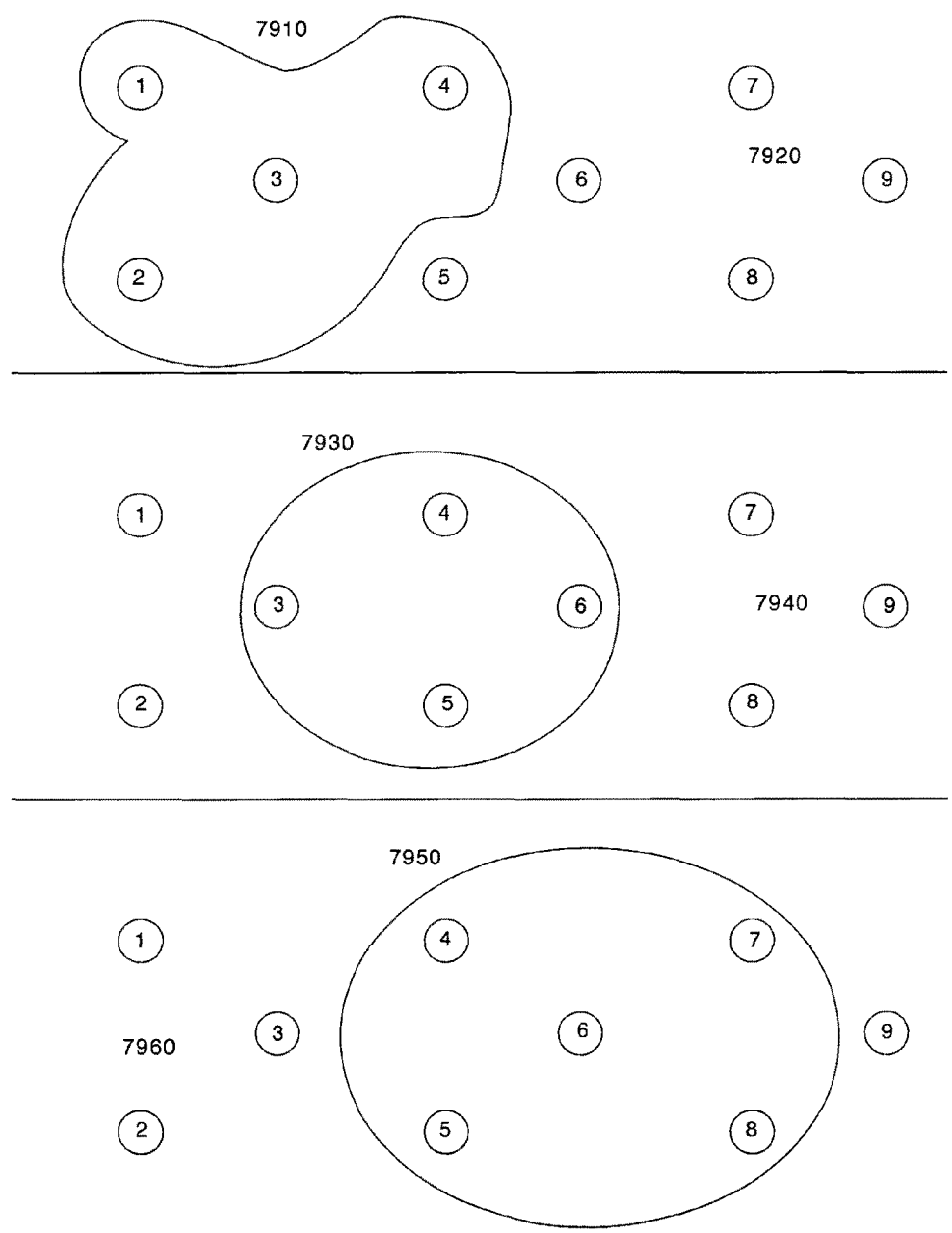

Fig 80: Continuous Reconfiguration of Sub-networks (Scalable Capacity Increases and Decreases)
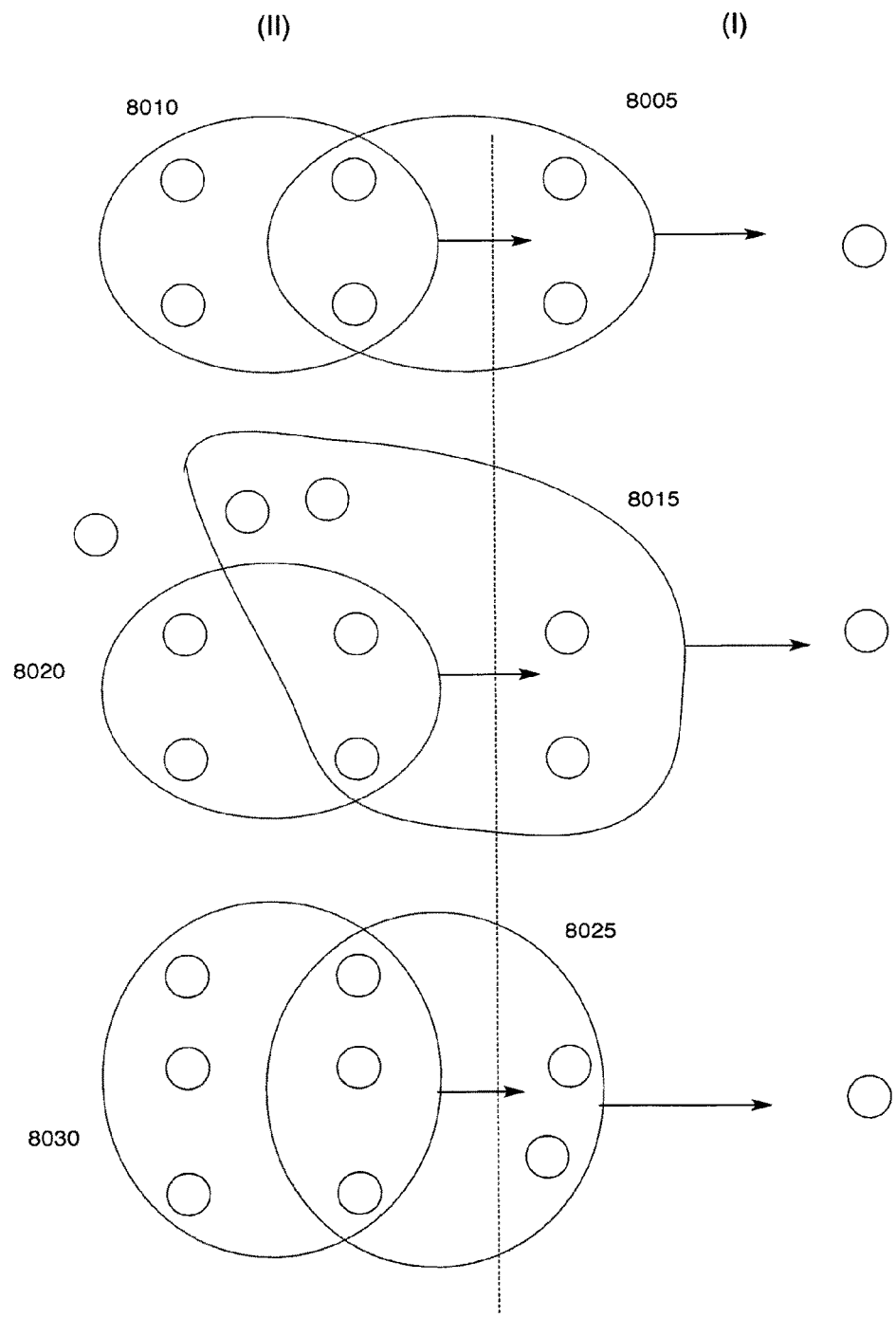

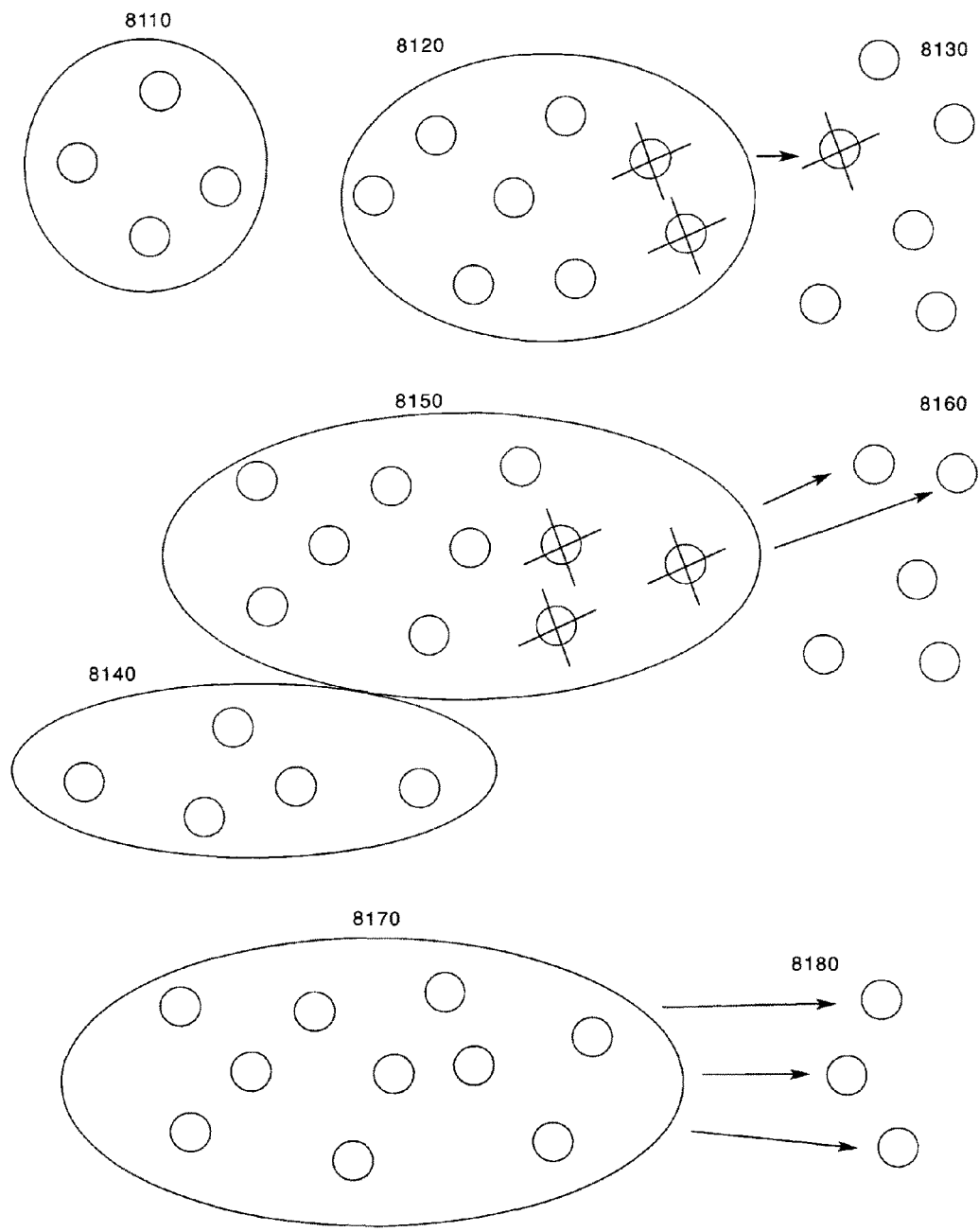
Fig 81: Dynamic Group Behavior Adaptation to Environmental Interaction

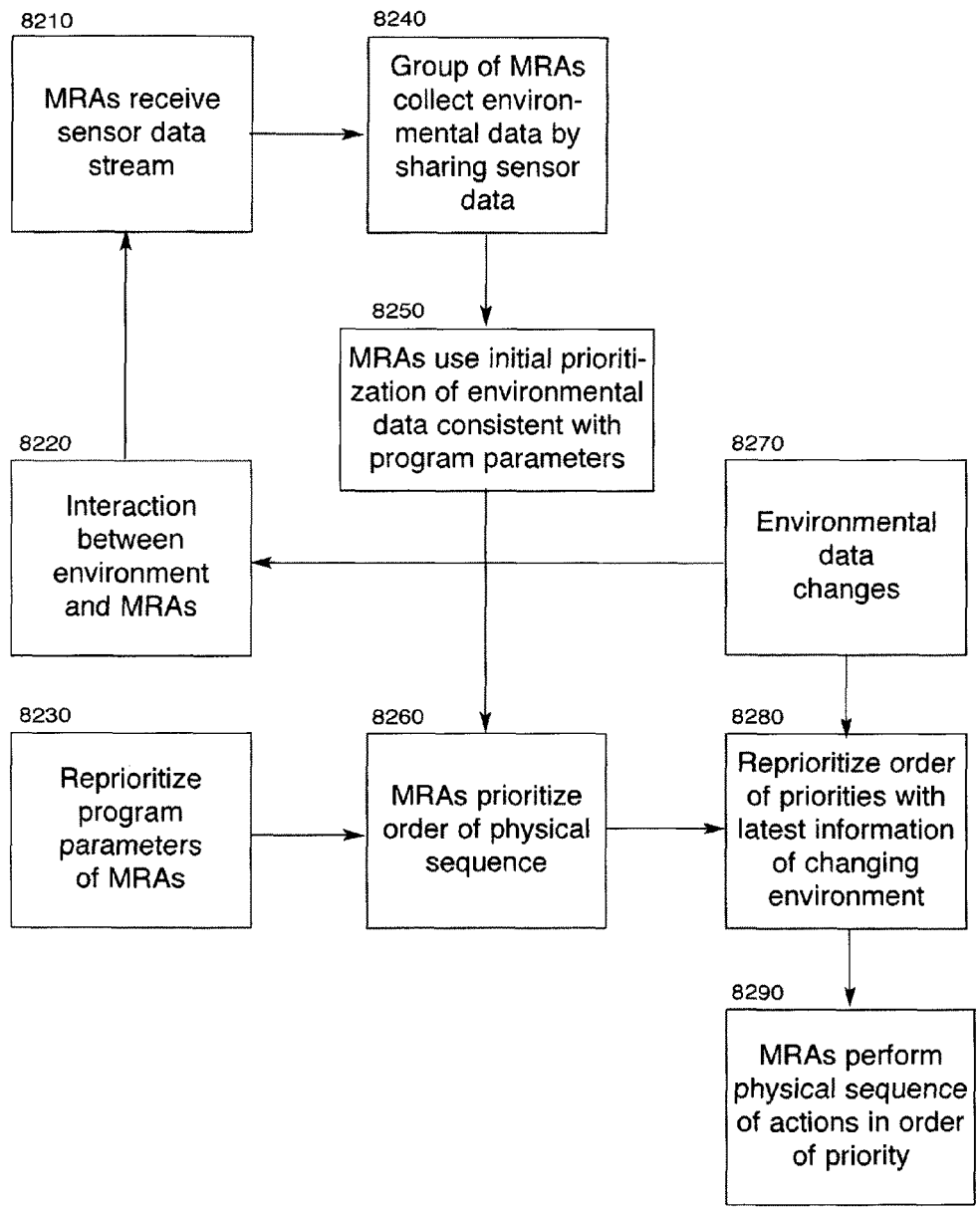

Fig 83: Sacrificing (Altruistic) MRAs in Order to Acquire Sensor Information to Increase Chances of Overall Mission Success
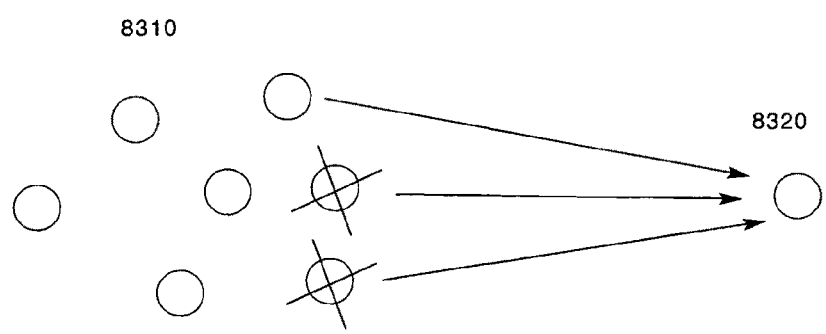

Fig 84: General Dynamic Coalition Process
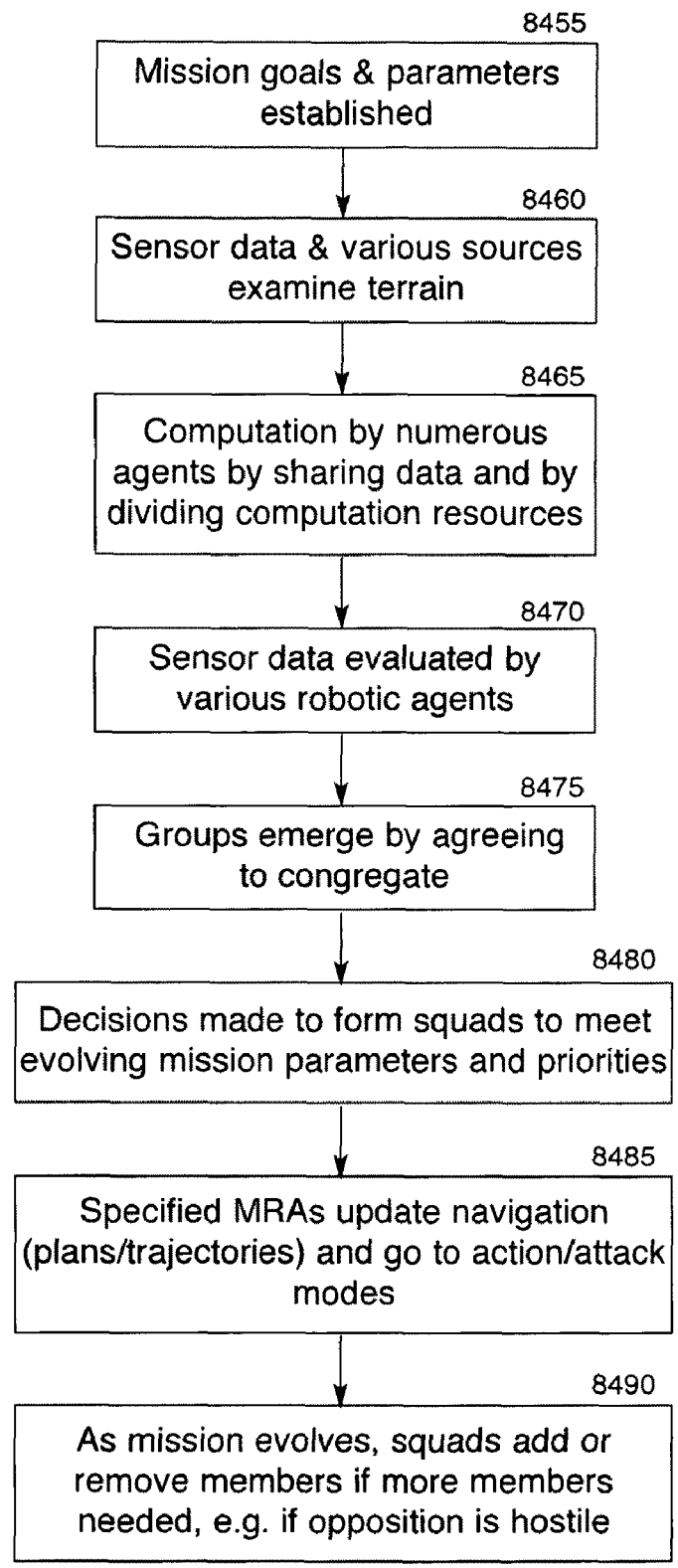

Fig 85: Group Coordination and Obstacle Avoidance
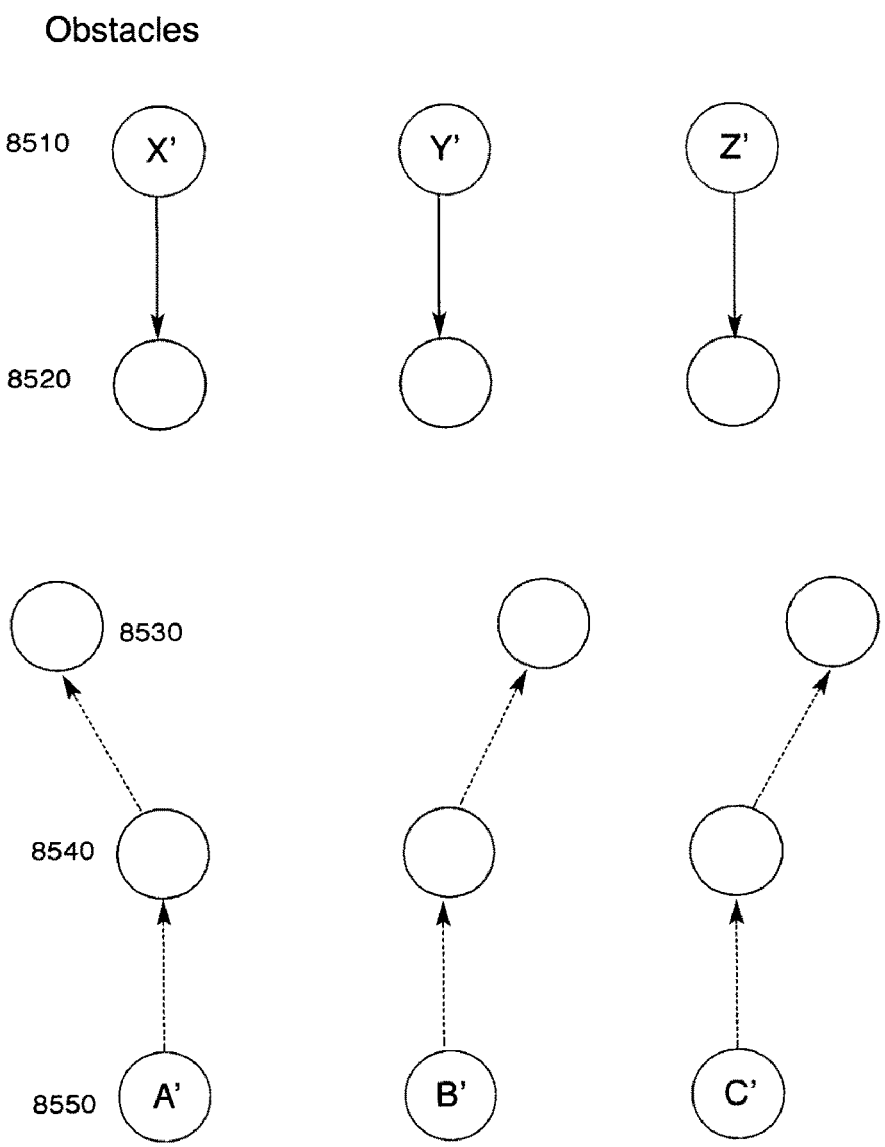

Fig 86: Specialization: Specific MRA Functionality
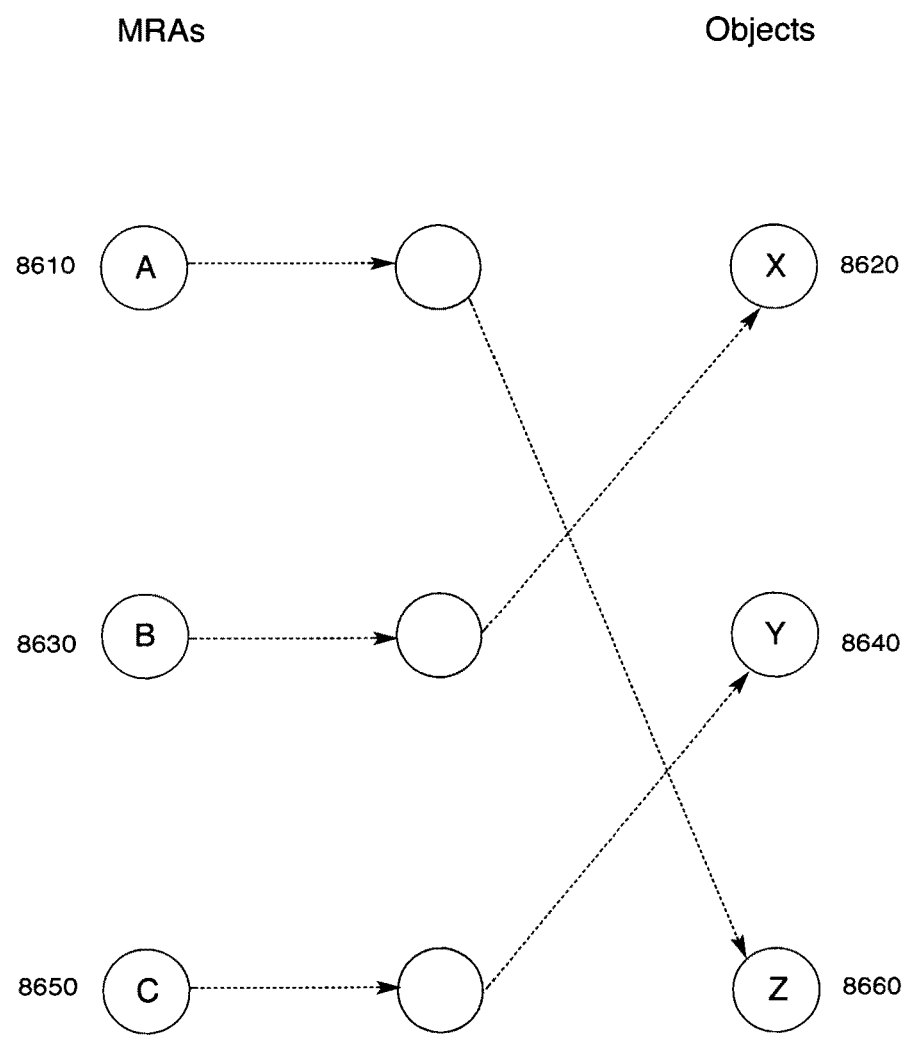

Fig 87: Specialized MRAs Working As A Team
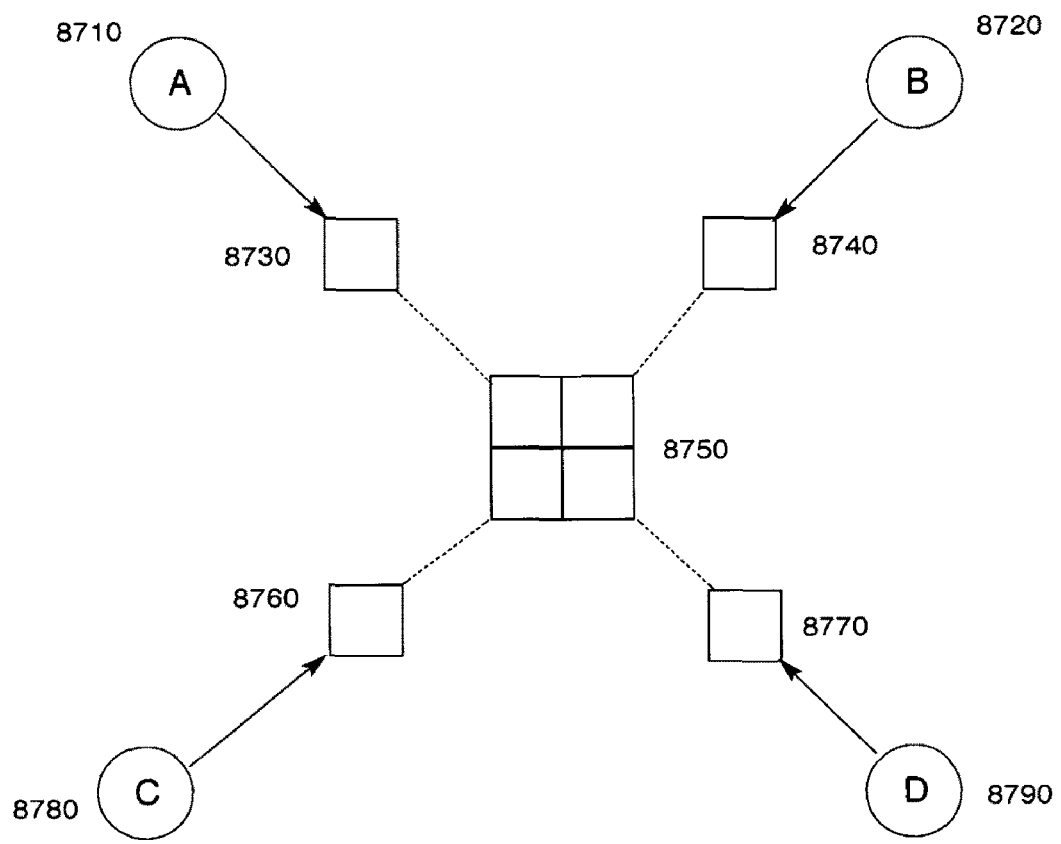

Fig 88: Multi-functional MRAs in Self Organizing Process
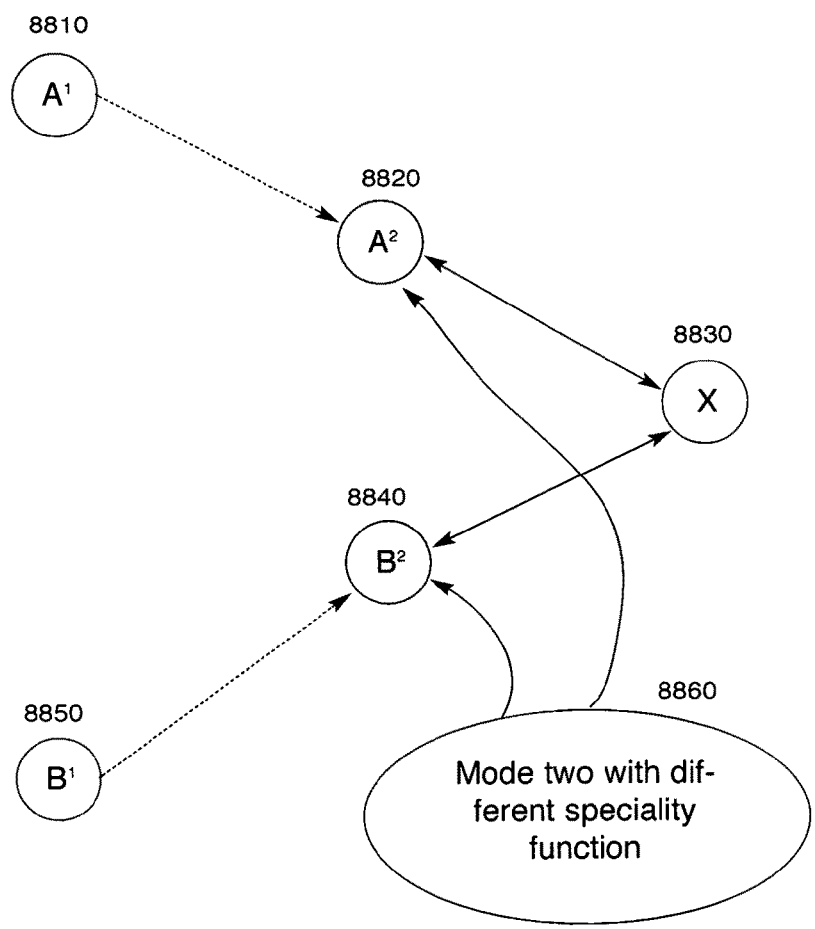

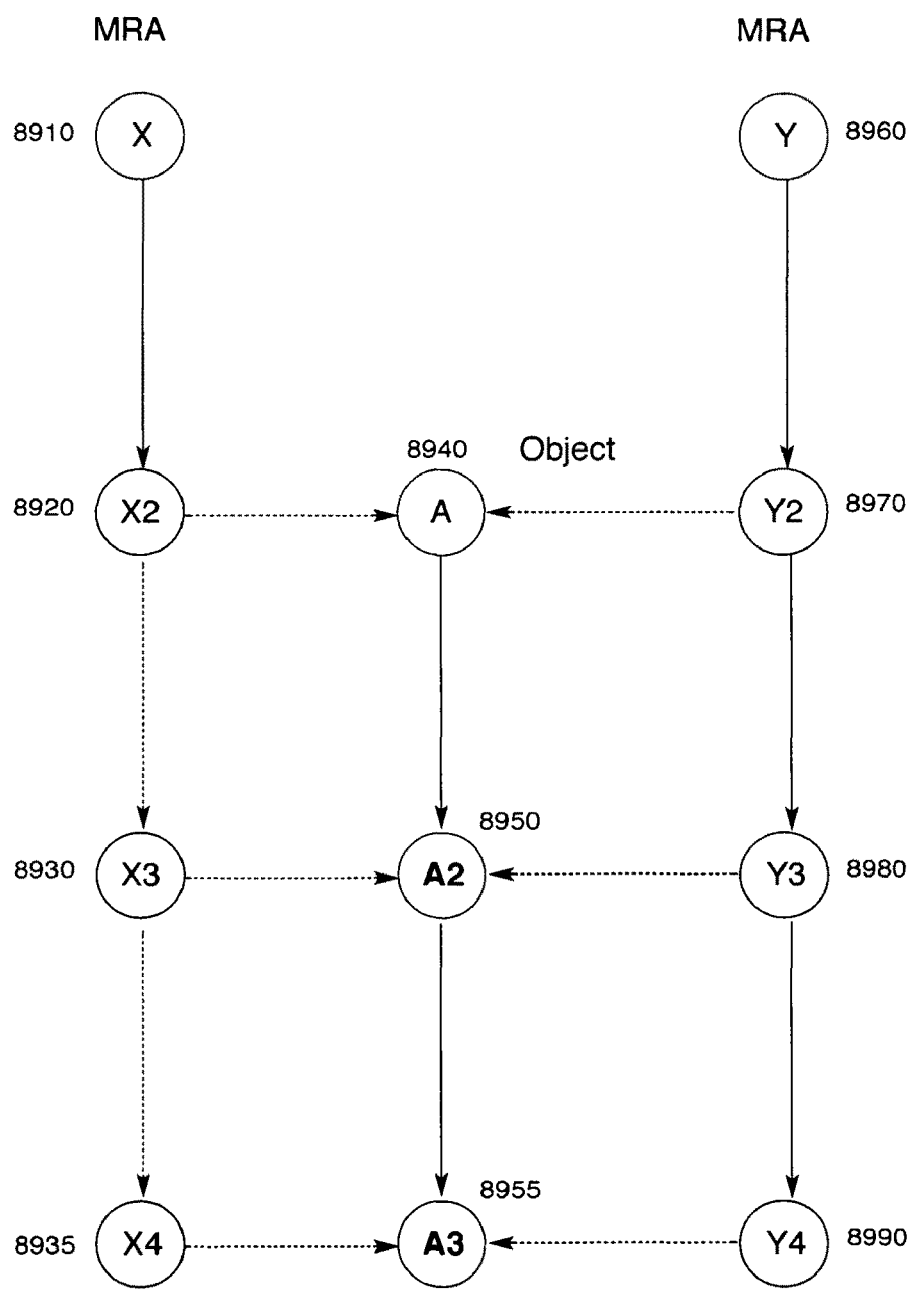
Fig 89: Surveillance & Reconnaissance - Mobile Object Sensed & Tracked By Multiple Micro-MRAs

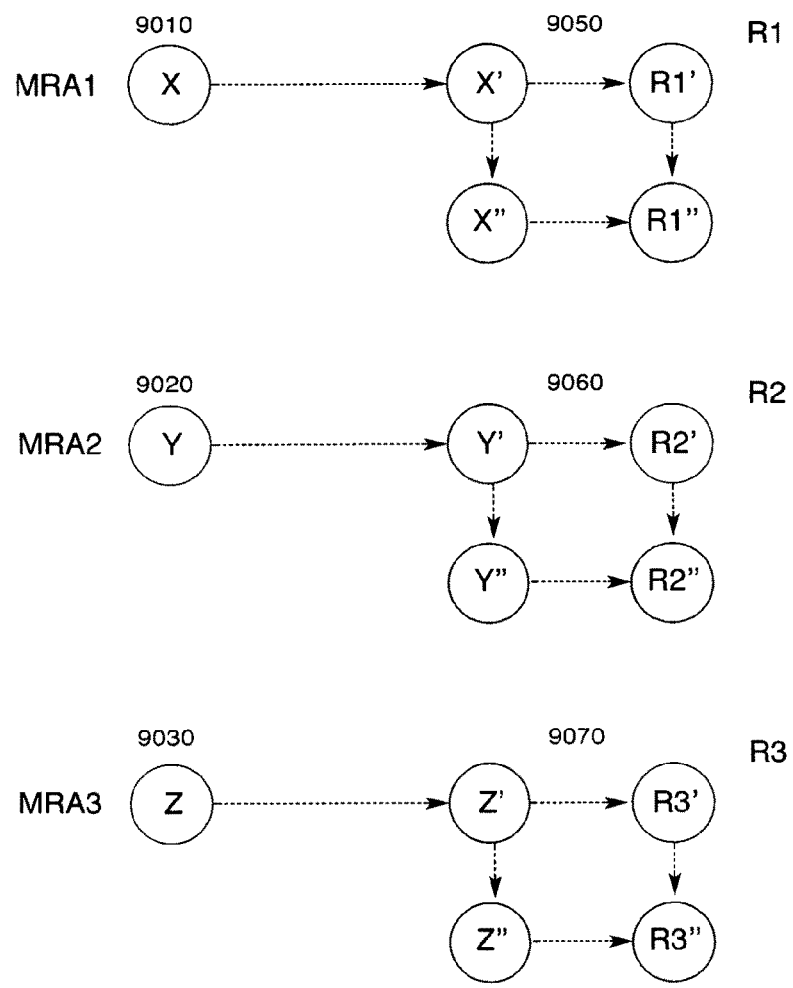
Fig 90: Remote Exploration: Initial Tracking of Multiple Objects With Multiple Micro-MRAs

Fig 91: Sentry Action - Limited Perimeters - Defending Multiple Objects With Multiple MRAs
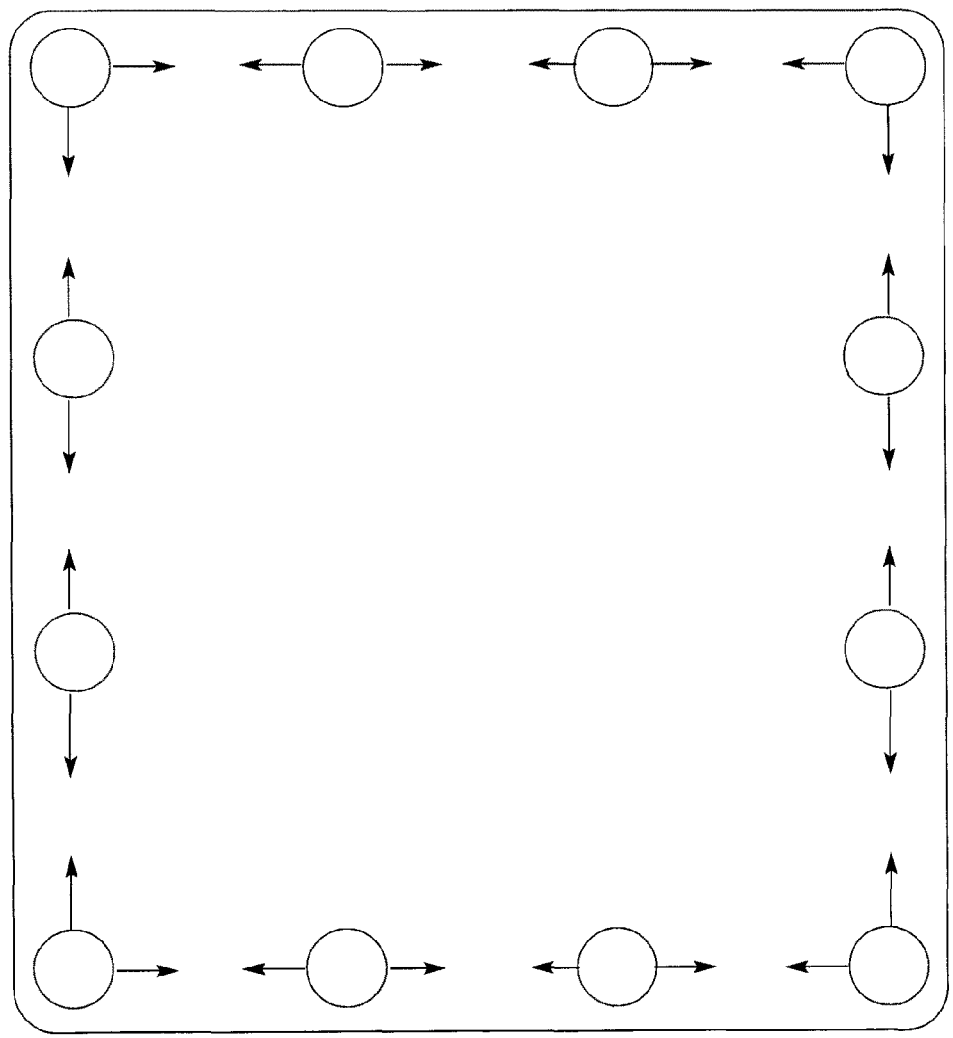

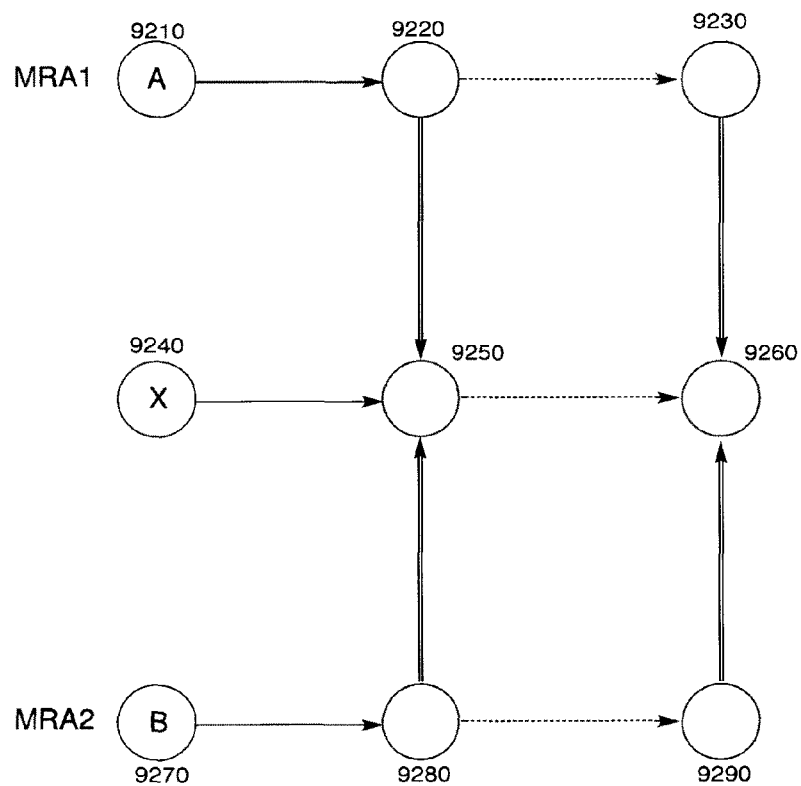
Fig 92: Cinematography - One Mobile Object (or Cluster of Mobile Objects) Sensed and Tracked with MRAs

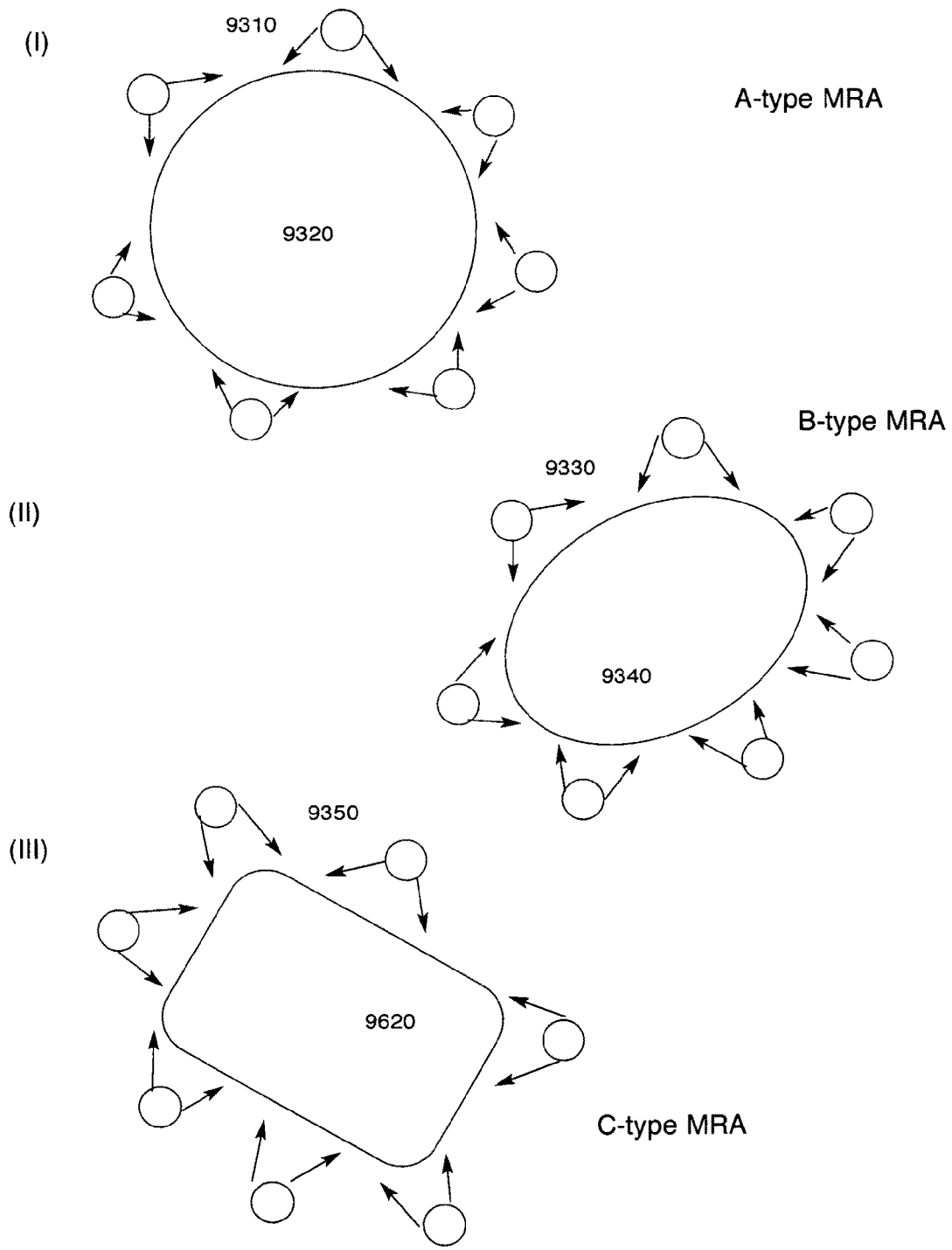
Fig 93: Toxic Site Cleanup - Static Cleanup Within Land Perimeters by Multiple MRAs

Fig 94: Oil Spill: Dynamic Cleanup Within Limited Hydro Perimeters by Multiple MRAs
(I)
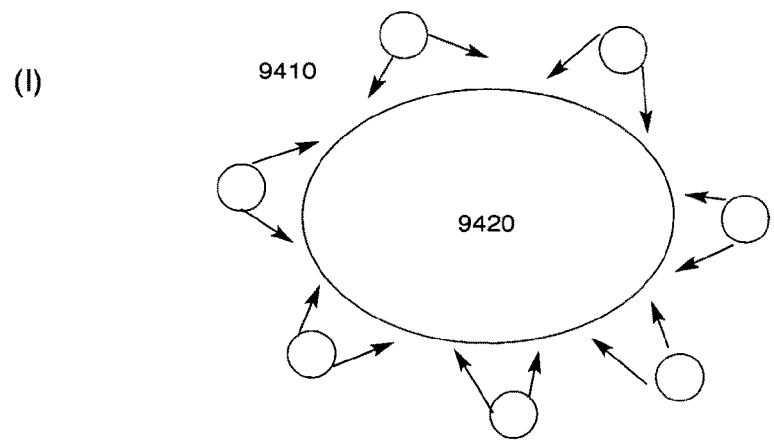
(II)
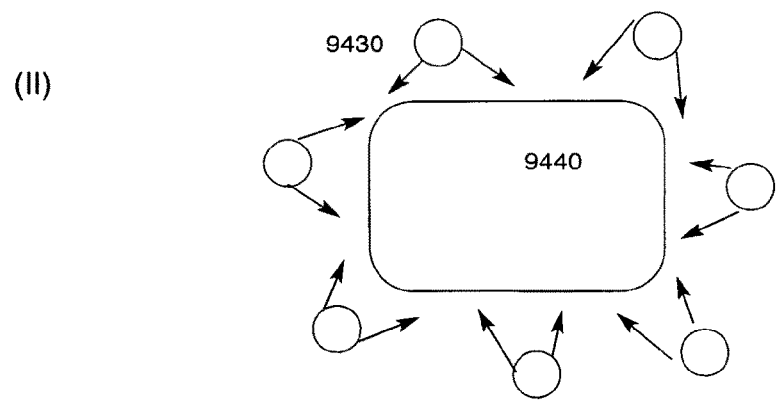
(III)
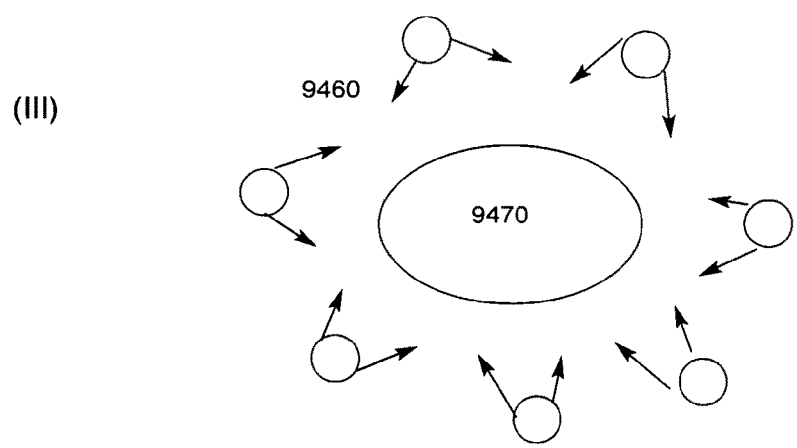

**Fig 95: Fire Fighting - Dynamic Interaction
With Complex Environment by Multiple MRAs**
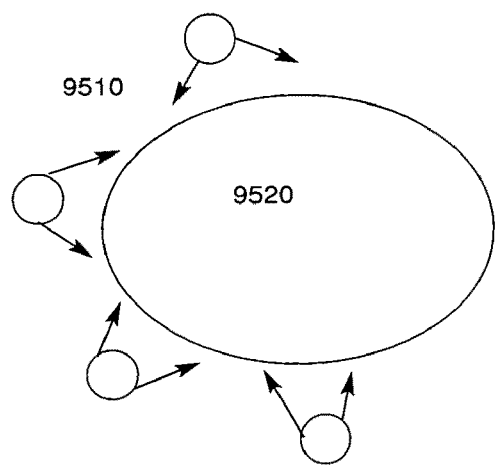
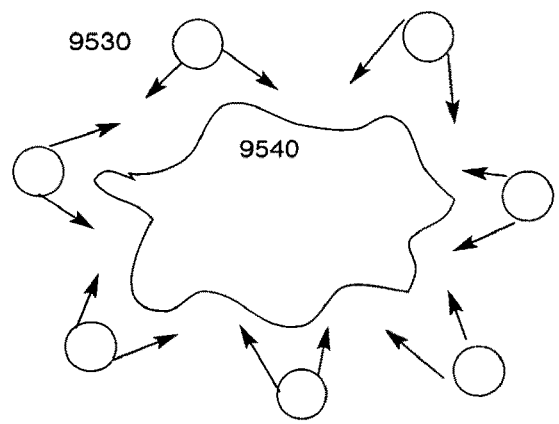
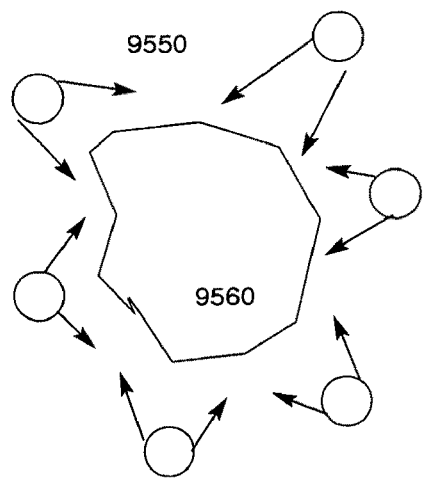

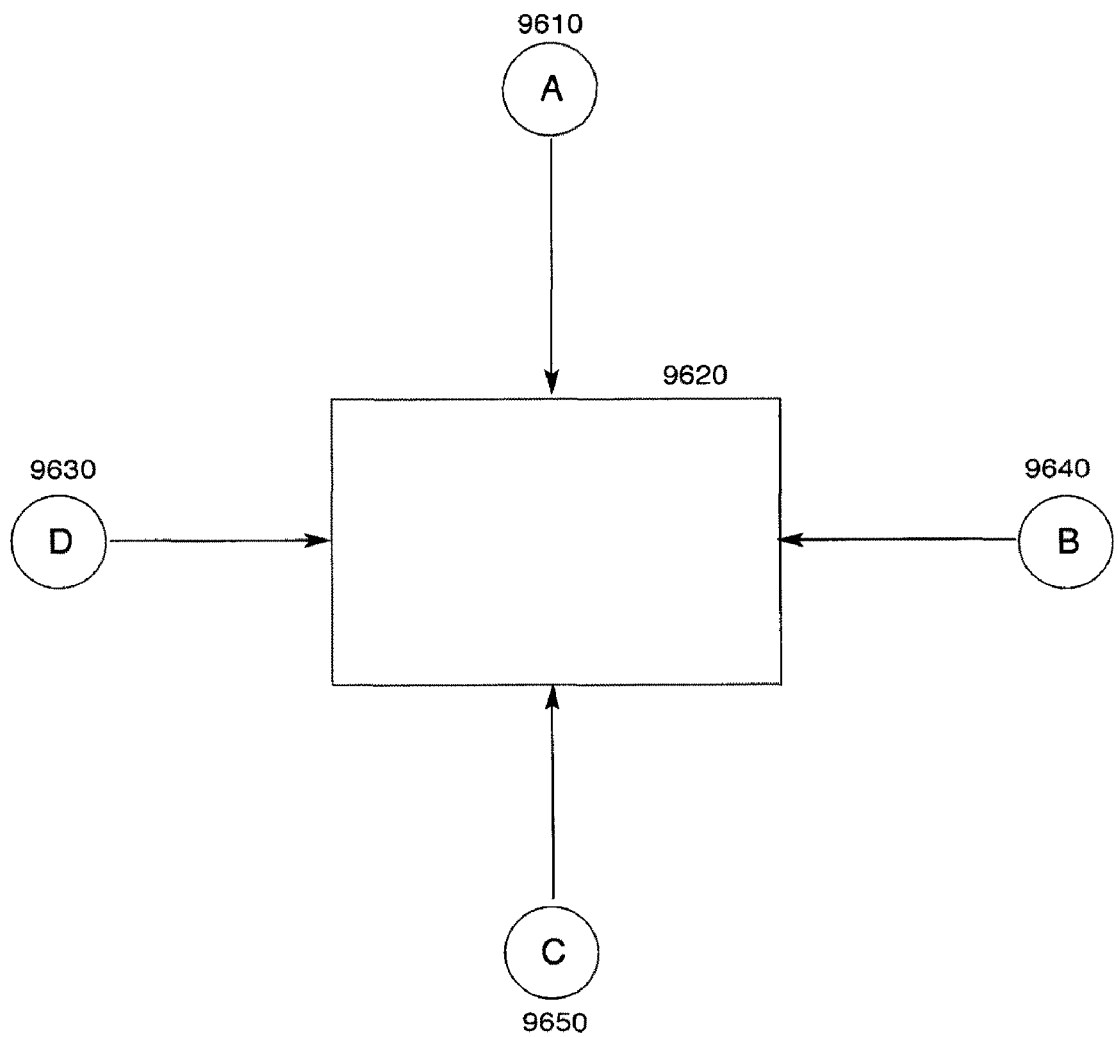
Fig 96: Manufacturing Production: Object Creation Using Multiple MRAs

Fig 97: Assembly: Combining Parts To Create Whole Object Using Multiple MRAs
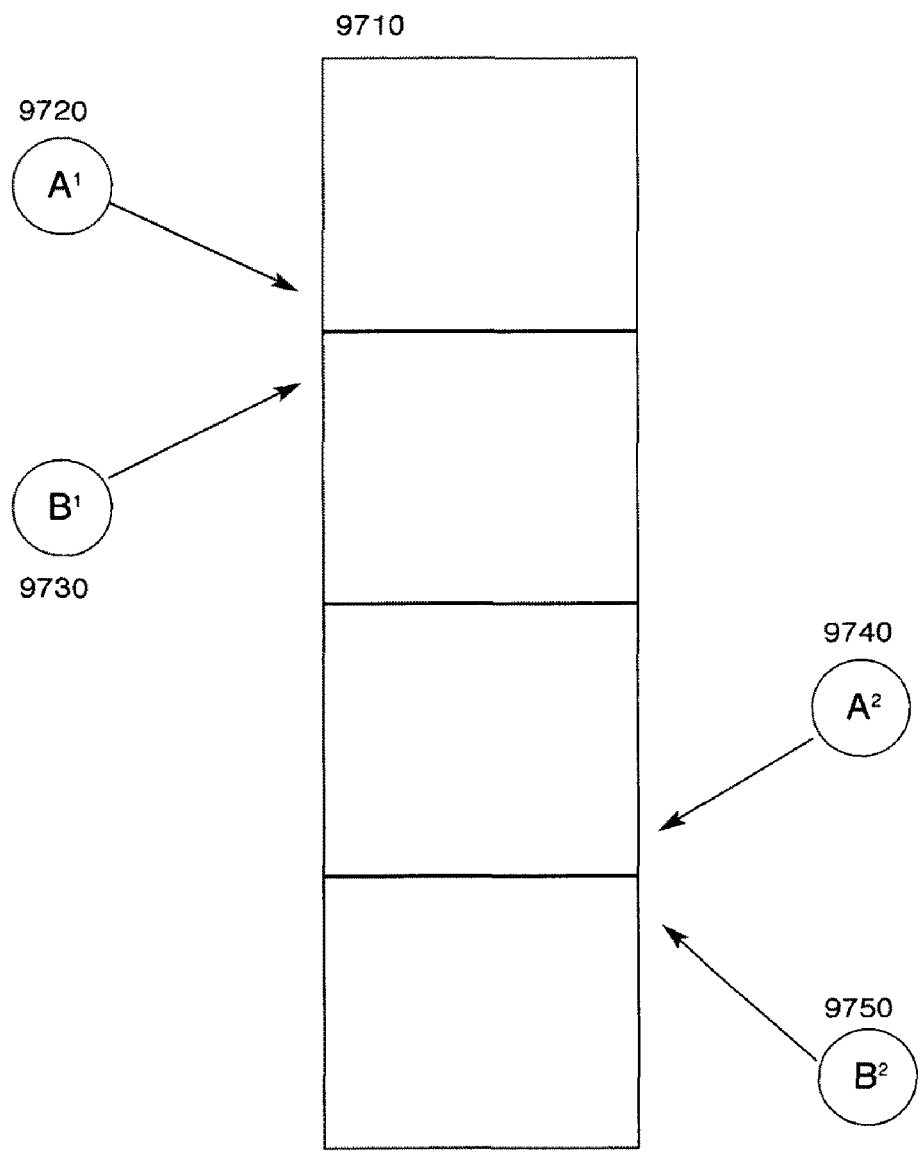

Fig 98: Building Roads: Road Creation Using Multiple MRAs
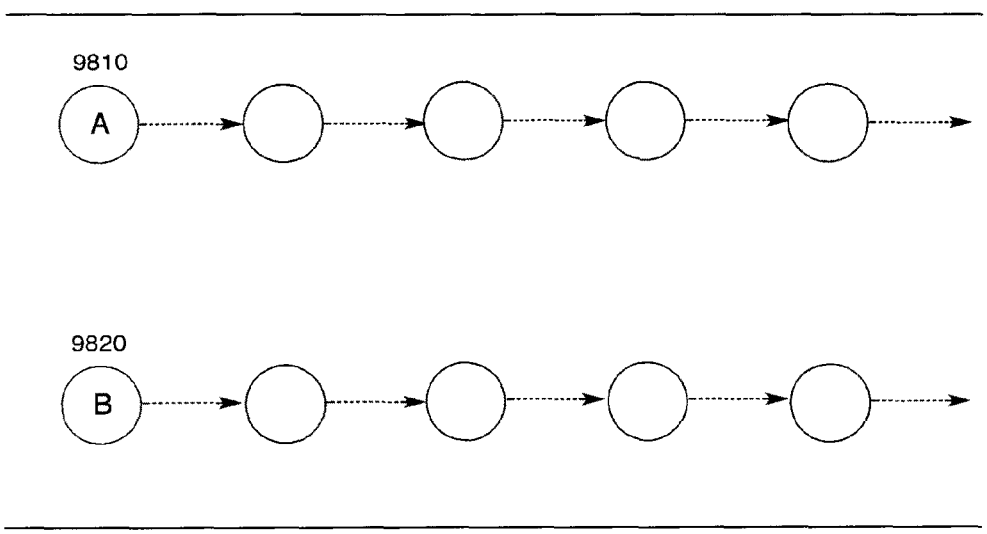

Fig 99: Surgical Micro MRAs for Trauma Intervention & Stabilization
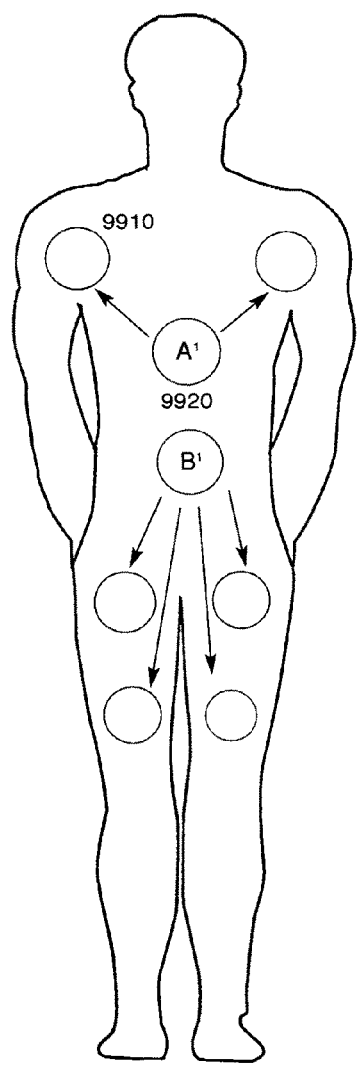

SYSTEM FOR SELF-ORGANIZING MOBILE ROBOTIC COLLECTIVES

CROSS-REFERENCES TO RELATED APPLICATIONS

The present application claims the benefit of priority under 35 U.S.C. §119 from U.S. Provisional Patent Application Ser. Nos. 60/404,945 and 60/404,946, filed on Aug. 21, 2002, and Utility patent application Ser. No. 11/147,153, the disclosures of which are hereby incorporated by reference in their entirety for all purposes.

BACKGROUND OF THE INVENTION

There are several categories of prior art patents that apply to the present invention. These patents involve mainly mobile robots and groups of mobile robots.

Matsuda (robot system and control device), U.S. Pat. No. 5,825,981; Peless et al. (method for operating a robot), U.S. patent application publication no. # 20010047231; and Nourbakhsh et al. (socially interactive autonomous robot), U.S. patent application publication number # 20020013641, mobile robots are used automatically, or with manual intervention to perform tasks such as multifunctional manufacturing, cleaning, mowing, snow blowing or interacting with humans. These pedestrian approaches to robotic control fit into the main paradigm of robotic applications.

Kawakami (mobile robot control system), U.S. Pat. No. 5,652,489; Asama et al., (mobile robot sensor system), U.S. Pat. No. 5,819,008; and Wallach et al. (autonomous multi-platform robot system), U.S. Pat. No. 6,374,155 involve multiple mobile robots. These patents involve using sensors for navigation and obstacle avoidance. In addition, one mobile robot can transmit information to another mobile robot for some effect. These inventions offer only rudimentary connections between robots and lack advanced system functions.

Most of the research history involving the technologies of the present system—including (1) intelligent agents and self-organizing systems, (2) AI and D-AI in coordinated systems, (3) negotiation and problem solving and (4) cooperating agents and aggregation—are represented in the academic literature, described below.

The development of complexity theory is fairly recent. Theorists from economics and biology advanced the view in the 1980s that systems are self-organizing and adaptive of their environments. In particular, biologists have studied ant and insect social organization and have observed the complex adaptive behaviors of these societies.

Researchers at the Sante Fe Institute (SFI) have developed complexity theory by looking at the fields of biology, economics, mathematics, epistemology and computer science. One of the aims of the SFI is to develop a complex self-organizing computer model representing artificial autonomous agents that emulate the biological functions of complex insect social behavior.

SFI theorists have developed the swarm intelligence model of artificial computer societies primarily for simulating economic systems. The swarm intelligence model, by emulating biological system operation, uses ideas of emergent behavior to describe the complex social interactions of relatively simple insects according to straightforward decentralized rules governing group activity.

The challenge for computer scientists lies in how to develop a system of self-organized autonomous robotic agents. The development of societies of behavior-based robotics that fuse elements of system control with elements of decentralized local control is one of the most difficult challenges in computer science and robotics. A key part of this problem lies in how to configure AI systems for problem solving in a MRS for collective behavior. In short, how can we design an intelligent MRS for optimal adaptation to dynamic environments?

The computer science fields of robotics and AI have evolved in the past decade in such a way that a convergence of technologies allows an explosion in research in collective robotics and in intelligent systems in order to achieve the goals of developing an intelligent MRS for group behavior. For example, rapid advances in computation resources, communications and networking allow the combination of integrated technologies necessary for a development of a sophisticated MRS. In addition, in the area of AI research, several trends have emerged, including GA, GP, A-NN and distributed AI, that allow computer systems to not only learn but achieve some degree of autonomy.

In the early 90s, Brooks developed a decentralized modular approach to robotics at MIT's Media Lab. Revolutionary at the time because it spurned conventional wisdom of highly computation-intensive deliberative robotic control approaches, his modular approach used less than three percent of traditional computer approaches. This leap in efficiency was achieved by separating the subsystems for automatic reactive control (he called it subsumption) rather than deliberative top-down robot system control. The mobility, navigation and pick-up functions of the robot could be separated for increased efficiency.

By exploiting this research stream, Arkin (1998) developed a behavior-based model of robotics. In this model, Arkin describes behavior-based robotic architectures as well as experiments in the field with sophisticated hybrid robotic architectures. An example of this hybrid approach is NASA's Atlantis system (1991) that synthesizes deliberative planning with group behavior. The aim of these models is to develop autonomous robots that are adaptive to their environment. The development of robotic teams with social behavior is one of the most difficult challenges, according to Arkin's pioneer study.

Bonabeau et al. (1999), an SFI fellow, develops a research stream that connects the study of ant and insect behavior in complex biological social systems with the development of complex artificial robotic societies. In their vision of swarm intelligence, they use key notions of system self-organization, reactive behavior and environmental adaptation to point to a model for artificial robotic systems that might emulate biological systems.

In 2001, Kennedy and Eberhart focused on the social and theoretical aspects of swarm intelligence. Their examination of group behavior develops a computer model of adaptive self-organized systems, similar to economic "particle" simulations by the SFI, by emulating the social behavior of biological systems. In order to develop an artificial swarm system, the authors look to complex pattern emergence, which has a lineage from Von Neumann to Burks to Wolfram. In this research stream, cellular automata are used to simulate a complex but stable self-organizing system. Though the authors refer to research experiments with robot societies, their focus remains on computer and theoretical models of complex social behavior involving autonomous entities.

Another important research stream involves the application of AI to networks. The emergence of the Internet has presented novel ways to conduct commerce automatically with autonomous software agents in a MAS. Originally developed by Smith, the contract-net protocol established an early model for distributed problem solving. As the Internet evolved rapidly, new computational systems emerged to emulate commercial systems. Solomon has developed demand-initiated self-organizing commercial systems for both inter-mediated and dis-intermediated transactions that employ novel multivariate and multilateral negotiation models.

One niche of the automated commerce system lies in the aggregation of autonomous agents. Precisely how to combine pools of autonomous agents for wholesale discounts presents an opportunity to remove a layer of distribution from commercial systems. This research stream is important because it provides clues as to how to develop coalitions of robotic agents for common purposes.

MRS models have been developed. The Nerd Herd is an example of an MRS using rule-based social behaviors for subsumption based foraging popularized by Brooks. Second, the Alliance architecture developed a modular approach to robot team behavior that includes inter-robot communication. Such communication allows for emergent cooperation. An additional version of Alliance (L-Alliance) accommodates the learning aspect of robotic agents in order to achieve a form of adaptation.

Arkin developed a "multiagent schema-based robotic architecture" in which team cooperation was modeled using a behavior-based approach without explicit inter-robot communication.

Dias and Stentz provide a market-based model for multi-robotic coordination in which individual robots in a distributed environment negotiate with each other in order to agree upon a course of action. Such a model applies the contract-net protocol used with software agents in a distributed network to the robotics context for operation of groups of autonomous robots in dynamic environments.

Finally, Solomon developed a hybrid MRS model with military and industrial applications in which a hierarchical leader-follower approach is implemented in a hybrid central-control and behavior-based control architecture.

Most MRSs possess several common traits, including mobility, intelligence, communications, group behavior and specific functionality.

One critical aspect of robotic group behavior lies less in the value of intelligence that in the importance of methods of aggregation. It is a key challenge of robotic systems of determine ways for robotic agents to synchronize, cooperate and collaborate and, in sum, to work together as a team. The emergence of dynamic coalitions of robotic groups is one of the most interesting and important areas of robotic research.

The effort to achieve the development of complex MRSs that may emulate, and even transcend, emergent natural self-organizing processes, has become primarily a computation challenge that involves the need to create sophisticated AI architectures. AI systems have themselves emulated biological systems, with the advent, from Holland and Koza to the present, of genetic algorithms, genetic programming and evolutionary computation methods in order to solve complex problems. A related research stream involves A-NN, which has utilized GA in order to establish weight values of neural nodes. One main aim of the neural networks is to develop self-configuring and self-organizing learning systems for complex problem solving. This is useful in real time collective robotics situations in which rapid adaptation to a changing environment is necessary.

The development of hybrid AI technologies that synthesize various methods for specified problem solving would provide a robust and successful option in the computer scientist's arsenal of weapons that may be useful for the development of sophisticated MRS architectures.

BRIEF SUMMARY OF THE INVENTION

The present inventions involve multi robotic systems, multi agent systems, collective robotics, artificial group behaviors, aggregation of robotic agents, coalition formation, dynamic coalitions, self-organization of robotic agents, emergent behavior of intelligent agents, cooperation of intelligent agents, multi agent learning, problem solving between conflicting intelligent agents, artificial intelligence, artificial neural networks and multi robotic operating systems.

Multi-robotic systems are complex networks that facilitate the interaction between autonomous robotic agents according to specific rules of behavior in order to perform a specific function or combination of functions. The present invention describes a system for multiple mobile robotic behavior by applying the logic of advanced computer science, in particular artificial intelligence (AI), with advanced robotic electronics and mechanics. The focus here is on artificial robotic collectives. So far very little research has been developed on the group behavior aspects of robotic societies as they plan, and then achieve, a coordinated goal.

There are several layers of any such collective robotic system, including (1) the computation, electrical and mechanical hardware of each autonomous robot unit, (2) a hardware network layer that links the individual robots together with wireless communications, (3) a metacomputing layer (that performs complex memory, database and computation analysis functions) in a node to node distributed computing model, (4) an omni-nodal artificial neural network (A-NN) layer for distributed AI, (5) an evolutionary A-NN layer—driven by genetic algorithms and genetic programming—for adaptive group learning in order to develop real-time cellular automata (CA) based simulations to seek optimal system solutions, (6) an OS layer and (7) a layer for specific functional applications.

The present invention describes a sophisticated MRS that is dynamic, interactive and evolving, adaptive to its environment and capable of exhibiting emergent behavior. The system is designed as a hybrid of behavior-based and central planning control processes in a distributed network environment. By decentralizing numerous functions in a distributed architecture model, groups of autonomous robotic agents can learn together, make group decisions together (cooperatively and competitively), negotiate and solve problems together, congregate together in various sub-sets and re-configure in non-overlapping sub-groups. Using these unique approaches, autonomous robotic agents can form and reform into various configurations of groups in a self-organized way interacting with each other and with the environment in order to achieve pre-programmed, or evolved, goal parameters.

Artificial intelligence (AI) is used in a number of MRS processes, including individual robot learning and decision making using genetic algorithms (GAs), genetic programming (GP) and other evolutionary computation (EC) approaches as well as group robotic agents that uses A-NN and hybrid evolutionary A-NN approaches (including GA, GP, FL, etc.) that provide tools for adaptive collective learning and decision making. The use of both individual agent and group learning tools are important because though the collective resources are far greater, when the system defaults to behavior-based biases, for instance, in situations with diminished computation resources, it is necessary for the individual robotic agents to have the tools to maintain autonomy. By building on the lower layers of behaviors of reactive approaches, a more complex MRS can evolve beyond ant society emulation.

In practical terms, MRS operation in unknown environments presents numerous challenges and problems to solve. In the absence of a centralized "mission control" station to solve all the problems a robotic system may encounter, there must be a number of fall back system modes in order for the mission to be successful, which leads to a hierarchy of system structures. These system modes are dependent on computation resources, communications resources, levels of robotic agent autonomy, levels of learning and levels of group behavior.

In earlier multirobotic systems, a relatively simple architecture would consist of a leader robot with various followers in a hierarchy. The leader possesses increased autonomy and orders the followers (super-drones). In this model, pre-selected squadrons are formed, the control for which can be manually intervened by human interaction processes such as a video feed for mission objective alteration. Reprogrammable orders and priorities can be uploaded at any time.

In one embodiment, supplementary external computation resources can be kept outside of the MRS and fed in as needed by satellite. Alternatively, though computation is performed externally to the MRS, analytical results can be used to control the system. In addition, reporting on agent behavior can be provided to an off-site blackboard so as to unify control at a central command center.

As the system and its agents gain autonomy, increased capacities are brought in, such as computation power, communication bandwidth and AI capabilities. Still, only reactive behavior-based autonomous robotic agent interaction approaches would yield a relatively simple system that appears to generate group behavior but merely mimics collective actions because of the outcome of interactions between autonomous agents. The system in this mode is merely semi-autonomous, which reflects its resource limits.

As the MRS system is linked together in a distributed network of autonomous robotic agents that employ powerful computation resources and AI processes, the system can automatically "think" like a group and constantly reconfigure to the best available situation while interacting with and adapting to its environment.

It is therefore valuable that the system, though using a hybrid architecture, employ a number of distinct embodiments that accommodate changes and that automatically default to the most complex task achievable.

Hybrid MRS Architecture with Distributed Resource Management and Command Structure A pure behavior-based reactive MRS architecture has advantages of local control and emergent behavior but disadvantages of the inability to control large groups in complex adaptive environments. On the other hand, a central deliberative MRS control architecture has the ability to develop large self-organizing interactive systems and sub-systems but has the limits of being cumbersome and dependent on substantial computation resources. What is needed in order to build and operate a complex and high performance MRS is a hybrid architecture. In effect, the MRS architecture is a complex, continuously reconfiguring, operating system that links together robotic agents with computation, communications and software subsystems. Such a system must be modular (so that upgrades in a subsystem can be seamlessly performed), scalable (so that nodes can be added or removed) and reconfigurable. The system uses mobile software program code that provides inputs and outputs to robot machine agents. The "Harness" dynamic reconfigurable metacomputing model is a pioneer for this mobile self-organizing MRS hybrid approach because it continuously seeks to re-route the system to the optimal computation and communication pathways.

On a lower level, each robotic machine unit has sensors, actuators, microprocessors, communication receivers and transmitters, power supply, a specific functionality and (system and applications) software. However, when they are linked together, the opportunity exists for the MRS specific mobile robotic unit sensors to be organized into a network for collective data acquisition. The group's collective computation resources can analyze the sensor data. In addition, the group of mobile robotic agents can use complex AI induced learning processes to make group decisions, even in the face of noisy, error-prone and conflicting data streams. By maximizing the efficiency of the available group MRS resources, intelligent group behavior can emerge.

The aggregation of MRAs into subgroups can occur, further reconfiguring in complex ways in dynamic and changing environments. By learning and working as a group, specific autonomous agents are altruistic and may be sacrificed for the greater whole if it is necessary in a specific critical operation. Further, specific sub-groups may conflict and split the herd in order to achieve different objectives. The convergence of technologies that allows teams of autonomous MRAs to work together—computation resources and reconfiguration, communications bandwidth capacity and complex system software—make possible a revolution that emulates how groups of humans think and behave.

In order to make this technology convergence operability possible, it is necessary to develop a distinctive hybrid MRS architecture for a distributed self-organizing system. Such a hybrid system accommodates lower-level bottom-up reactive modular behavior-based approaches as well as the use of sophisticated hybrid AI resources (D-AI, A-NN, GA, GP, etc.) that work in a distributed system for group learning processes applied to complex decision processes, optimal simulation and collective robotics actions in dynamic environments. Such a hybrid model allows for adaptation in uncertain environments while also being able to carry out initial, and evolving, program objectives.

If one compares how animals work in groups we see a resemblance to our system. Though specific animals have sensory data, memory, navigation, data analysis, decision-making and action sub-system abilities, as a group collectives of animals can achieve marked performance improvements because they have more data and analytical capacities and the integration of successful actions that increase the probabilities of winning at foraging for food or defending against attacks. Why, then, cannot an MRS be developed that emulates, and even transcends, the performance of the animal (and insect) group model?

Historically, one of the main problems in building such an intelligent MRS of autonomous self-organizing MRAs has been computer resource constraints. There is the limit, not only of computer capacity, but also time, constraints. A huge amount of data must be processed in a short time while the MRS is operational; in essence, the system must compute on the fly as it gathers and understands data and decides what to do and then how to act as a group. There are practical solutions to these resource constraint problems. First, the application of Grid computing models provides an appropriate distributed model for maximizing computation capacity by sharing resources among MRAs in real-time. This model can be scalable so that new MRAs can be added as needed even if others are subtracted as the mission requires. In fact, each agent can be re-tooled and upgraded in each reuse of the modular system.

Second, multiple communications topologies can be used to re-route data streams to the most efficient use within the distributed system, including using advanced caching techniques for optimal collective effect. Finally, AI software can be employed for learning, negotiation, decision and simulation of complex collective behaviors. The system then determines, while it is mobile, what to do and then acts as a team to cooperatively achieve the objective. By overcoming the resource constraints with collective action, an intelligent MRS emerges.

The present system is therefore far more advanced than previous MAS approaches that seek to emulate the behavior of groups of simple insects because our system is endowed, not only with autonomous agent intelligence, but with collective group intelligence that transcends simple group behaviors. It is clear, then, that in order to develop such an advanced MRS, hybrid or meta-architectures must be employed that combine both local and global aspects.

Towards a Hybrid MRS AI Model: Distributed Problem Solving, Integrated Group Learning, Decision Processes and Dynamic Optimization Simulations with Cellular Automata AI has emerged in the past generation as a valuable tool for solving complex problems. Genetic algorithms, developed by Holland and others, are a problem solving method to evolve, through reproduction, crossover and mutation techniques, algorithms. Genetic programming and other evolutionary computation approaches seek to solve different domains of problems. These complex strategies seek to emulate natural evolution processes so as to find the fittest, most efficient or optimal solutions.

The development of artificial neural networks (A-NN) was initially intended to emulate brain function. Referred to as connectionism, A-NN uses GA and FL (soft computing) techniques to map out, train and reconfigure a network of nodes for solving problems. By using an adaptive network architecture topology, the A-NN system can optimize adaptation to its environment. By training the network over distributed groups of agent nodes, the A-NN can learn. Evolutionary A-NN (E-A-NN), or neurevolution, is useful for reinforcement learning. A-NN's work by using genetic algorithms to adapt input features, learning rules and connection weights. One of the most effective applications for A-NN is nonlinear statistical models such as pattern recognition. A-NN's learn by altering synaptic weights; synaptic weight variables change by using fuzzy logic techniques to assess probabilities and thresholds. Bayesian networks use hypotheses as intermediaries between data and predictions to make probability-based estimates of solutions. Hopfield networks are used to remember an earlier network configuration and to revert to an old network when noisy data limits continuing network development.

The present invention uses a hybrid approach to AI that combines GA and GP with A-NN and D-AI architectures. The combination of evolutionary computation approaches with distributed neurocomputing models produces a system that constantly rewires itself as the system is reconfigured. This approach is necessary because finite computation resources need to be maximized even while the distributed mobile MRS changes. Not only is this scheme scalable but increased computation capacity can be provided on demand if needed by specific under used MRAs. Such a hybrid AI architecture is best suited for learning by groups in a distributed network as well as for optimal adaptation to dynamic environments.

Hybrid AI approaches can be useful when solving complex problems. Two main problem solving models involve either cooperative (altruistic) or conflict (self-interested) oriented agent behavior. One main computational challenge that involves MRS is the distributed problem solving that requires negotiation among conflicting autonomous agents.

Conflicting MRAs use AI approaches to negotiate a settlement so as to solve complex multilateral disagreements. One way for groups to solve problems in a conflicted MRS is by finding proper matches for shared common interests, thereby focusing on the limited remaining variables and disagreements. This pruning process can settle an issue either by pre-determined (or changing) rules or by a vote between involved agents. In this way teams of MRAs can compete for effective solutions. Another method to find solutions in conflicted MAS situations is to set up a competition for the strongest strategies according to agreed upon rules. Finally, an agent can persuade other agents to its position.

All of these models involve inter-agent collaboration for complex group problem solving. The resolution of competing rival MRAs conflicts result in agreement about an optimal solution. Through conflict and competition, not only is common ground sought, but a winning algorithm solution is determined for complex problems. This problem solving negotiation approach is useful for organizing heterogeneous MRAs for common objectives.

How are negotiations between MRAs in a MRS processed? Autonomous robotic agents use complex decision processes that ultimately affect group behavior. Decisions can be made by either individual agents or by groups of agents. Rules are used to prioritize specific possible choices over others. Upon achievement of a specific threshold, a decision process yields a resulting choice of possible options. Once a threshold is achieved, a plan of action can be implemented.

Since it is important to configure group decision processes for MRS problem-solving, a range of decision choice constraints present the lower and upper bounds of potential optimal solutions. Further, these parameters are constantly shifting in dynamic environments. Hence, methods need to be devised to find the shortest path to perform specific tasks. One way to do this is to perform specific tasks. One way to do this is to use statistical weighting to prioritize problems and solution possibilities. In the context of complex changing environments, an MRS must simultaneously work on solving numerous constantly changing problems. The Markov decision process makes decisions by prioritizing possible choice as measured by evolving values criteria.

MRS action starts with a plan. By mapping the parameters of group action plans, we can model the optimal configuration or allocate the most efficient resources. Decision logic processes lead to identifying trade offs (parameters) between possible solutions that lead to an optimal problem solving choice. MRAs use computation optimization techniques to select optimal solutions to complex problems in uncertain environments. By mapping various scenarios, using AI and decision processes in a distributed network, MRAs select the best plan to achieve objectives.

MRSs use advanced hybrid AI methods in order to achieve optimal grouping patterns of behavior. Unlike purely computational MASs, a MRS have physical dimension and motion in space. These physical and geometric realities about the practical operations of MRSs involve the need to organize spatial interactions and movements. It is useful to model these MRA movements before actually performing specific maneuvers primarily through the use of simulations.

Cellular automata (CA) models provide an important tool to simulate the changing movements of MRAs in an MRS. By using AI approaches, each robot is represented as a cell in a larger system. Cells can interact with neighbor cells in the neighborhood of a CA system, with two dimensional, three dimensional or four dimensional models representing the change in cellular states.

The results of combinatorial optimization approaches to seek the best solutions to solve problems can be represented by CA simulations and, thereby, tested, before actually implementing these decision choices. By modeling group behavior in real time, the MRS solves problems and can seek improved solutions that can capture subtle contingencies in complex operational situations. MAS swarms are tested in particle simulations using CA models, but MRSs have not applied these important CA driven simulations for real geometric behaviors. Therefore, the present invention uses simulations in a dynamic, rather than merely static, way, for real time testing. In the simulation, virtual robots are provided the valuable advantage of trial and error of potentialities of activity so as to learn from complex contingencies, in order to optimize the chances for mission success.

Swarms, Flocks, MRS Aggregation and the Formation and Reconfiguration of Dynamic Coalitions Nature provides analogies for computer scientists in the contexts of AI and group robotics. In the case of AI, GAs and GPs seek to emulate natural selection by breeding the best fit problem-solving programs using principles of sexual reproduction, pruning and random mutation. In the case of robotic group behavior, scientists have sought to emulate insect (ant and bee) social behaviors in order to understand how compolex patterns emerge from simple individuals. How can MRSs be developed that have the self-organizing properties of insects? The two main behaviors that have intrigued observers are foraging (food location search and procurement) and swarming behaviors.

Scientists have discovered that ants use pheromones (chemicals that have an odor to attract others) to develop complex foraging behaviors. By laying down pheromones, which, though temporary, can be increasingly intense if compounded, ants provide a natural reinforcement mechanism (stigmation) with positive feedback. This positive reinforcement learning mechanism suggests a self-organizing system.

There are other ways for insects to communicate with each other. Some ants and bees have developed ways of communicating with their nearest neighbors about food sources, for instance, to get help with or altruistically share information with the group. This nearest neighbor communication approach, which is primarily sense based, is key to the formation of flocking, herding and schooling behaviors in animals and fish.

In the case of bees or ants, there may be specialists that perform specific functions in the hive or nest in order for the whole organization to function more smoothly. This division of labor has evolved for millions of years as an efficient social system.

Insects may communicate with each other indirectly. The process of stigmation operates with an insect affecting, or changing, the environment, which then catalyzes other insect behavior. The use of pheromones illustrates this process because the ants lay down an attracting chemical that may be acted upon by others in a limited time.

Animal and insect group behaviors emerge at the local level. Though insects are not intelligent in some ways, their complex group behaviors suggest that they have evolved social intelligence. By working in groups, they have defended against predators and survived in hostile environments. But here are limits to this kind of swarm intelligence.

Though they have an initiator, most swarm or flocking behaviors do not have a single persistent leader. Instead, such social behaviors focus on local and reactive interactions.

Flocking is a case in point. Each bird in a flock has limited information about flockmates. Instead, they have neighbors they provide local information on direction and speed. The big challenge is to avoid collision with neighbors even as they signal trajectory and velocity data through their behavior. Consequently, both attractive and repulsive forces are involving in flocking behaviors.

There are, then, simple flocking rules that are useful to MRS designers because they illustrate local reactive behaviors: (A) Fly at a steady state speed of neighbors, (B) Tend to the center of the flock and (C) Avoid collisions with neighbors. This is similar to driving on highways because we have limited information (visibility) restricted primarily to our nearest neighbors, with which we seek to avoid collision but also maintain a consistent pace. Flocking, like herding, school and swarm behaviors, have evolved to allow groups of insects, birds, fish or animals to move in a hostile environment while avoiding peripheral members from being picked off by predators. In nation, then, avoidance of obstacles, neighbors and predators has become integrated into the rules of survival that social group behaviors maintain.

How does a swarm form? An event will stimulate an individual insect to attract neighbors to the swarm activity. Though any individual can be a leader that initiates action, the recruitment of other individuals through attracting the cooperation of similarly interested neighbors is key to the process because these individuals then respond by attracting more neighbors, and so on. Thus, any individual can initiate a swarm or flock; this initiation is a sort of initial request to procure resources for a specific (defensive or offensive) function or activity. Rather than a centralized mission control issuing orders to the troops, specific decentralized individuals can trigger group activity in a sort of local reactive chain reaction process that has the effect of overwhelming an enemy. In some cases, specialists alone, such as soldier ants, may swarm for an attack process.

Insect and animal social behaviors are important to understanding complex social processes involving simple individuals. Attempts have been made to emulate biological system swarm intelligence for development of artificial systems of robots. For instance, Arkin's (1998) use of Brooks' simple modular reactive robot for group behavior shows an attempt to model complex behaviors from simple robots.

Beyond Flocking: MRS Aggregation and the Formation and Reconfiguration of Dynamic Coalitions The present invention goes beyond these interesting biological emulations. Because our system is layered, with simpler default modes of operation, we will use simple swarm behaviors in an MRS that employ reactive local interactions. But the main objective is development of complex aggregated MRS systems that are capable of intelligent social behavior as well as the operation of dynamic coalitions. Whereas the simpler group behaviors have severely limited computation and communication resources in a homogeneous system, the present invention does not. Simple swarm behaviors have anonymous homogeneous simple members (in uniform roles) with primitive local communication, minimal computation capacity and the limits of reactive behaviors using a narrow set of rules for learning and action. The limits of this biologically inspired system can be improved by development of an advanced MRS that exhibits social intelligence. Our system has autonomous individual MRAs with highly advanced computation, AI and communications capabilities, complex learning and simulation functions, specialization features and team behaviors in a heterogeneous system. In short, the present invention emulates human social behavior by using artificially thinking mobile robotic agents for a range of functions.

The problem of how to aggregate objects is an important one in computer science. Methods of aggregation involve collecting together disjoint sets for an organized assembly. Combinatorial optimization is the mathematical field concerned with seeking solutions to aggregation problems. Aggregation is useful for mass pooling of customers with common interests for wholesale discounts. Similarly, combinatorial auctions are a useful commercial structure to enable parties to acquire bundles of items for optimum benefit.

For the purposes of the present invention, aggregation is important as a process for organizing groups of MRAs within an MRS. We are not only interested in how groups of intelligent robotic agents form, but also the process by which groups break into subgroups and reform. Intelligent aggregation of MRAs involves automatic selection, formation, combination, reformation and dissipation of groups. Each new set of intelligent agents represents a new configuration. Emergent behavior of the MRS leads to a complex self-organizing system that never settles on an equilibrium because it is constantly changing. Finally, unlike other pure computational contexts for aggregation, the application in an MRS involves the geometry of space and extension and the physics and mechanics of motion.

The autonomy of intelligent agents leads to the opportunity for individual specialization. Whether in biological or economic systems, specialization affords the optimization of teams because it establishes an efficiency enhancing division of labor. Groups of MRA specialists can work together in an artificial system for increased benefit to the objectives of the whole group. The existence of specialization also makes possible the interactions of sets of agents.

Aggregation is a process of grouping entities together. One useful way to model groups is with game theory. As applied to an MRS, game theoretic models have a geometric dimension. Game theoretic approaches to modeling an MRS is useful particularly because they can be multi-phasal and interactive. Not only are MRA interactions nicely modeled but complex interactions between sub-groups can be more optimally represented as well as interactions with the environment. Game theory can model cooperating agent behavior as well as conflicting or heterogeneous behaviors. An example of a heuristic for MRS game theoretic modeling parallels chess playing maneuvers, with openings, gambits and traps providing MRA models for the inter-operation of artificial societies. Robotic agents work together to develop winning game strategies for achieving goals or solving problems.

One of the aims of the present invention is to develop methods for MRAs to constantly develop shifting groups. We are interested in discovering how intelligent autonomous robotic agents form and reform into dynamic coalitions of collectives. Understanding precisely how sub-groups of MRAs organize, self-configure, reconstitute, adapt to their environment and regroup is the key to understanding complex emergent group behavior in intelligent self-organizing systems.

With severe resource constraints, mobile agents will tend to behave according to simple rules inspired from biological systems, with local and reactive control. But endowed with sufficient computation and communications resources, an intelligent MRS will be able to perform more effectively. One of the areas of improvement in the operation of groups of MRSs lies in establishing methods and processes for dynamic coalition behavior.

Multiple squads containing specialized MRAs can work together by sharing sensor data, data analysis, computation, communications and decision processes. Such multiple squads can form alliances and temporary coalitions for specific missions with numerous applications to industry. When group resources are restricted, specific squads can operate autonomously with limited information and still perform its objectives. Further, higher priority squads can get more resources at crucial times. Squads can reconstitute by taking resources from the larger group for continuous dynamic coalition reformation so as to more optimally adapt to changing environments. The existence of multiple micro-coalitions can be better suited to satisfying multiple goals simultaneously and thus increase the chances of a mission success.

Squads of MRAs break off from larger groups in an MRS. The squads can share the larger computation, communication and sensor resources and decision processes of the larger group. In effect, the squads operate as teams of nodes in a neural net that constantly reconfigures on the fly. Since some of the sensors in some of the squads are exogenous to each team, the squads have access to data streams beyond any limited team. Sub-teams are synchronized into the distributed network using hybrid AI approaches. Nevertheless, each squad, and its reconfiguring teammates, can work independently with local behaviors. In addition, differences between agents in a squad, for example, specialists or different "personalities," can create complexity in squad behavior within the practical constraints of their programming, as they interrelate in different configurations. Squads self-select into various coalition configurations, but during complex missions, new squads can pick up stragglers from previous damaged squads. Similarly, squads can merge in instances where combined strength is needed to solve a problem. Robotic agent nodes can be added or subtracted as the system continuously reconfigures to achieve optimum success.

Different methods are employed in order to realize group MRA self-organization processes. In one important sense, game-theoretic and cellular automata simulations are useful in order for collectives in an MRS to map out and achieve complex plans for problem solving. By employing these processes within AI driven computation, intelligent MRAs work together to optimize complex processes in order to achieve mission success. The opportunity to simulate these processes of constant re-grouping for dynamic coalitions of MRAs allows a new generation of applications of MRS social behaviors to be possible. In this way, among others, the present system far surpasses prior approaches to emulating biological social behaviors. Our system allows intelligent MRAs to constantly shift in dynamic coalitions that are best suited for environmental interaction. It is precisely the continuously changing environment that requires development of a complex system that makes possible continuous reorganization.

Innovations and Advantages of the Present System

The present system has a number of innovations and advantages over earlier inventions. These innovations involve (1) multi-robotic system architecture, (2) computation resource structure, dynamics and allocation, (3) AI dynamics, (4) group negotiation, learning and decision structures and processes, (5) intelligent social behavior involving mobile robots and (6) dynamic coalitions of MRAs.

The present invention utilizes a novel hybrid MRS architecture that dynamically adjusts from manual operation of groups of MRAs to wholly automated socially intelligent MRAs in order to accommodate severe resource restrictions as well as extremely complex behaviors. By defaulting to the most complex appropriate resource level, the system optimally adjusts to environmental conditions. For instance, very small MRAs may be resource constrained and would thereby employ simpler local reactive behavioral rules. The architecture of the present system is also both modular and scalable so that growth or shrinkage will not affect performance.

The present system uses a distributed wireless grid supercomputing model. This approach allows the sharing of computation resources, including memory, database storage and data analysis capacity, thereby far extending previous constraints. In addition, this distributed model is optimal for equal node parallel processing within a collective. Computation processing speeds of dozens of teraops could be maintained in this system, thereby providing ample resources for complex group behaviors. The present system also uses advanced routing procedures to maximize the most efficient geodesic heuristics.

The present system employs a novel use of a MAS within a MRS in order to communicate, negotiate, control and organize group behaviors. Intelligent mobile software agents (IMSAs) are the analytical representatives that perform critical internal functions in the robotic system. In addition, intelligent negotiation agents (INAs) represent a core and innovative aspect of the present system as a vehicle for MRAs to interact and solve problems.

The present invention uses a dynamic reconfigurable evolutionary A-NN that provides optimal adaptation to the changing environments of an intelligent MRS. The A-NN uses hybrid AI techniques, including combinations of GA, GP, FL and EC. As nodes are added or subtracted to the network, the A-NN is automatically rewired for maximum efficiency. The system uses feedback loops to learn. The A-NN is useful to train the system in group learning processes. These applications to a mobile and dynamic MRS are novel. The use of connectionism (neural nets) in a MAS and a MRS is a huge leap from earlier systems.

In order for the present system to learn, it employs FL processes that use probabilities to make group decisions by selecting the best available option among a range of contestant options. The system utilizes combinatorial optimization approaches to select the best solution to solve problems. Particularly in conflicting situations between agents, there is a need to negotiate a settlement by developing a method of winner determination. The system employs novel approaches to asymmetric problem-solving by using multi-lateral negotiation methods.

The present invention uses game theoretic approaches and cellular automata schemas in order to simulate tactical system opportunities for an MRS in novel ways. By using real-time CA and GT simulations, an MRS can automatically select an optimal problem-solving path and, hence, model complex interaction dynamics among MRAs and between MRAs and the environment. Given limited information in challenging environments with resource constraints, the use of simulation modeling for action planning and contingency scenario testing is necessary to achieve highly intelligent MRS behavior.

The present system is novel because it is heterogeneous. The MRS employs specialty robots for diverse functions. Some MRAs may have multiple functions, alternative functions or work in teams with complementary functions. This approach increases efficiency of task execution because it promotes an automated division of labor in an MRS.

Despite their specialty functions, any agent can initiate group behaviors. The attraction of MRAs to collectives can be demand-initiated in a novel implementation of group behavior in an MRS. This approach enhances system performance. In one implementation, stronger data inputs may constitute invitations to act beyond a specific threshold and thereby initiate MRA grouping behaviors. The present system uses novel group attraction initiation methods.

The present system synthesizes local control with deliberative planning. This hybrid architecture is novel and is possible only with the unique convergence of advanced computation technologies disclosed herein.

The present system uses novel approaches to dynamic coalition formation. Using these approaches, the MRS constantly reconfigures its structure and dynamics in order to adapt to environmental changes. This more effective adaptation provides increased speed, precision, efficiency and effectiveness in mission critical situations.

By applying distributed artificial intelligence approaches, the present system develops a way for groups of robotic agents to make decisions in cooperative and in conflicting situations in real time. This is a novel and important advance over earlier systems.

The present system implements novel MRS approaches involving tactical cooperating teams of MRAs. This sophisticated use of the system transcends earlier notions of artificial group intelligence.

Why are groups of robots important? Traditionally, robot groups allow an increased speed to do a task. Like in nature, groups are increasingly reliable since some may fail but the group still finishes the task. In addition, using robot groups to perform tasks can be more flexible than only individual robots. The present system offers higher performance benchmarks for these traditional advantages.

Since the present system uses multiple hybrid architectures, at the system and AI levels, there are nontrivial advantages over earlier systems.

The present system most efficiently implements complex group behavior in an artificial robotic system. For example, unlike earlier artificial systems that seek to emulate insect behaviors, the present invention seeks to emulate, and transcend, complex human group judgment to develop a true social intelligence. Consequently, the present invention goes beyond robotic systems that focus primarily on local control of the nearest neighbor and reactive behaviors.

The use of coordinated, cooperative and reconfiguring squads in dynamic coalitions in the present system provides numerous novel and useful advantages.

Finally, the present system is useful for a broad range of important applications, from manufacturing to toxic clean-up and from remote exploration to traffic coordination. The sheer breadth of collective robotic applications, to industry and beyond, using the present system suggests a range of uses that could provide revolutionary implications.

Applications of the Present Invention

There are numerous applications of the present system. Robots can have specific functions for specialized purposes. One robot can clean, while another can dry. But specialized robots can have particularly high utility as they function in teams. While specific purpose robots are useful, multiple function robots are increasingly productive. Multiple function robots can switch roles or change forms as needed to complete complex tasks. The more tasks a robot can do because of its multiple specialties, the more plasticity and flexibility it has.

Multi-functional teams of robots can perform more tasks than specific specialty robots. The more tasks that robots can do, the more plasticity of tasks a team of robots can perform because of the efficiency benefits of the maximized division of labor.

The following is an extensive (but not exhaustive) list of applications of groups of robots that the present invention advances.

Manufacturing

The present system enhances factory production, assembly and distribution processes. Methods for groups of robots to work together may greatly accelerate production techniques. For instance, by using groups of multi-functional autonomous robots, a host products can be produced faster, more efficiently and cheaper than with earlier methods.

Regarding the factory assembly process, the novel use of groups of autonomous mobile robots may reshape the very idea of an assembly line because new interactive processes, reflecting an efficient modular workspace, will reconfigure approaches to activities in which parts are combined to a whole. The application of self-organized groups of multi-functional robotic systems to manufacturing assembly can promote just-in-time production processes and lean inventory to save time and increase efficiency.

The distribution function of factories, such as loading and unloading, can be improved with teams of autonomous robots working together. Such a system can replace routine labor practices.

Construction and Repair of Structures and Roads

Self-organizing teams of autonomous robots can build and repair roads and structures. From laying track or pipe to electrical, plumbing, framing and roofing, an MRS can be useful in performing laborious time-intensive routine structure building construction functions. Similarly, MRAs can be useful in the repair of buildings and streets. These novel MRA processes can save time and reduce costs of building construction as well as road work and repair. In one practical application, pot holes can be automatically detected and repaired by teams of MRAs.

Medical Applications: Medi-bots

There are two categories of application of the present invention to the medical field. First, groups of medical robots (medi-bots) can be used in critical field situations to stabilize a patient. Autonomous medi-bots work together to (a) diagnose a patient's trauma, (b) resuscitate, via electronic pulse or CPR, a patient whose cardiac or pulmonary functions have ceased, (c) cauterize wounds to stop (or minimize) bleeding, (d) apply an IV for intravenous solution transmission in order to replace vital fluids and (e) call for more medical resources by providing a precise physical location position. Multiple medi-bots can much more efficiently rescue and stabilize patients, thereby saving lives.

Second, groups of medi-bot can assist doctors in clinical situations by performing functions typically attributed to nurses and assistants. Such medi-bots can monitor patient functions during procedures as well as actively support the surgeon or dentist so as to save time. These medi-bots can also supply expertise in critical operating room environments. In critical emergency room situations, where time and precision can make a difference, medi-bots can save lives.

Reconnaissance and Surveillance

A big category of use of the present system lies in reconnaissance and surveillance. Multiple autonomous robots working as a team are optimal for reconnaissance and surveillance activities. These MRAs can transmit real-time vision and sound to off-site locations, typically via satellites or terrestrial communications systems.

In one mode, the MRAs can be very small micro robots (more fully referenced below) that provide stealth advantages for reconnaissance and surveillance purposes.

In other embodiments, MRAs can be disguised as natural phenomena, such as animals, birds, insects, etc. for evasive and stealthy advantages. By emulating natural animal behaviors, mission effectiveness can be maximized.

Finally, by using groups of MRAs, a more complete, more dynamic and more accurate view of the terrain being viewed can be maintained than with any other existing technology.

If captured, an MRA in this system can erase its programming and be rendered a useless pile of sensors, while the remaining network nodes automatically reconfigure for effective performance.

Search and Rescue

Including reconnaissance MRAs and medi-bots, teams of robotic agents can conduct search and rescue operations in difficult terrain that may be inhospitable to humans, such as in extreme weather.

Toxic Clean-ups

Groups of MRAs can be used to perform complex clean-up operations that may be hazardous to humans. These clean-up categories include: (a) toxic waste dumps, (b) nuclear reactor cleaning, (c) oil spill events and (d) sewer cleaning.

MRAs can use self-organizing maps of a local terrain to devise plans to most efficiently and safely provide toxic clean-up operations, thereby saving lives and protecting the environment.

Fire-Fighting

Using similar configurations and methods as used in toxic clean-up applications of MRAs, an MRS can be used to fight fires. Ground MRAs can dig trenches and plot trajectories for the expanding fire territory, while aerial MRAs can drop fire retardant at tactical locations for optimal effect. As with toxic clean-ups, MRAs use self-organizing mapping processes to assess the scope and dynamics of the full-motion fire situation. Fire-fighting MRAs can save lives and protect property. This application can be useful for forest fires, urban fires or industrial structure fires that require complex problem solving and decisive action. Medi-bots can be used in conjunction with these fire fighting applications for maximum benefits.

Mining

MRA teams can be very useful for mining minerals in remote locations. Robots can identify the most promising locations to dig and then help with laborious digging and sifting tasks. Groups of MRAs can work faster and more efficiently than current automation processes, in part because they are mobile, autonomous and self-organizing.

Agriculture

Farming has enjoyed increased automation processes for generations so as to maximize production. Groups of MRAs can continue this automation evolution, particularly in the planting and harvesting contexts in which greater care is required for specific crops such as fruit and vegetables. In general, MRAs replace the routine functions of migrant pickers.

Ship Hazards

Like toxic clean-ups, ships have a number of complex and dangerous problems to solve. Because ships function as self-enclosed physical domains, MRAs can operate effectively on specific problems. Groups of MRAs can provide effective automated solutions to hazardous functions, thereby reducing risks and saving time and money.

Clearing Minefields

One main activity for MRAs involves demining. Groups of autonomous robots can work together to either dis-assemble or explode mines that are discovered in a self-organized search process. In addition, disarming bombs can be a useful function for groups of MRAs.

Traffic Coordination

Groups of automated vehicles can use the present system for effective operation. MRS vehicle categories may include cars, trucks, trains, aircraft and ships. In particular, cargo may be moved on various groups of autonomous vehicles for greater efficiency, timeliness and cost-benefit. Such traffic coordination systems may develop complex routing algorithms that emulate, and transcend, bird flocking or ant foraging behaviors.

Elevator and Dam System Regulation

Systems of elevators can be better guided and coordinated by using autonomous group logic. Similarly, dams can be regulated more efficiently by using group logic processes of an MRS.

Weather Prediction

The present system is useful to organize groups of weather balloons or aircraft to gather and disseminate data. The MRS is ideally suited to complex adaptive environments such as detecting dangerous weather conditions such as tornados or hurricanes. Groups of self-organizing MRAs can more rapidly predict dramatic weather system changes.

In an active mode, MRAs can not only predict poor weather but can influence its outcome. In a drought situation, MRAs can seed clouds to increase the likelihood of inducing rain. In an extreme case, MRAs can prevent tornadoes by influencing their movement very early in their development and changing the immediate environmental conditions. Only self-organizing groups of automated mobile robotic agents with specific functions—such as warming cool air in limited areas so as to retard or minimize a turbulent cyclic force—could execute this precisely or rapidly.

Satellites

Groups of satellites can work together to perform distinctive functions such as optimally tracking moving objects by using the present system.

The present system can also be used to have groups of self-organized autonomous MRAs repair or readjust a satellite remotely.

Underwater Applications

As with other remote domains, the present system can be used in underwater applications. Specifically, the underwater context can be used with other applications, including surveillance, reconnaissance, search and rescuer and demining.

Remote and Space Exploration

The use of the present system for space and remote exploration is logical. By using teams of self-organizing MRAs, complex exploration activities can be routinely performed. This technology can be applied to underwater, extreme cold or deep space missions which are optimized for the flexibility and efficiency of the group behavior of mobile robotic vehicles. These vehicles can have multiple functions for the collection and analysis of local environmental data. In some situations, these MRAs can conduct covert operations during which they may need evasive programming capabilities.

Sentry Protective Services

Groups of MRAs can be used as an automated system of sentries for security protection purposes. Sentries can be used not only for surveillance but also for defensive uses in order to protect structures or personnel. Such MRA sentries detect and respond to invasive action by unauthorized personnel by tracking and evading the intruders and calling for assistance. In a more aggressive mode, automated sentries can respond to invasive behaviors by disarming and subduing unauthorized activities until the authorities can arrive.

Cinematography

The present system can be used by groups of MRAs that operate video or film cameras in order to capture dynamic movie scenes. Because the MRAs can be constantly moving and can be both self-organizing and synchronized, an MRA can facilitate a new generation of film-making techniques, particularly for the popular action sequences. While moving in synchronized or random ways, MRAs are well suited to capture moving scenes in distinctive cinemagraphic ways only possible in an MRS.

Commercial Laundry or Restaurant

Routine restaurant food preparation and delivery and commercial laundry functions can be done by teams of MRAs. Working as a group of short order cooks, MRAs can produce more variety of recipes in a shorter time than professional chefs or waitresses. Similarly, a commercial laundry service can be optimized by using groups of MRAs to organize, clean and package clothes. One hour discount cleaning is now possible by using an MRS.

Micro-Robotics

One of the most exciting developments in robotics is the advent of small (fly-sized) robots. But the smaller the robot the greater utility is derived from working in groups. Once in groups, micro-robots can become very useful much as ants or bees are successful in groups. A number of group robotic applications involve the use of micro-robots. Given resource constraints of micro-robots, the group gains massive resource benefits while operating in a network using the present invention that make possible dramatic performance gains over merely a collection of unlinked autonomous robotic agents. These MRS micro-robotic networks could also be construed as very small scale integrated systems (VSSIS).

Generally, the smaller the micro-robotic agent, the simpler the system. Hence, some straightforward applications include surveillance and reconnaissance in which sensor data is transmitted for central use while the system is camouflaged as a natural phenomena (such as a real fly or spider).

Teams of self-organizing micro-robots utilizing local reactive operational behaviors can use traditional computer based group behavior that emulates biological system behaviors such as foraging or flocking. But the present system strives to go beyond these restrictive behaviors.

In one embodiment, disaggregated collectives of micro MRAs can form together into a larger composite robot exhibiting unified behavior. This is important so as to allow larger robots to disassemble into constituent (specialized) parts if necessary in order to evade a predator or disguise a maneuver.

In another embodiment, micro MRAs using the present system could inspect and assemble micro-electronic systems or could inspect biological entities for abnormalities.

As microprocessors progress to ever smaller sizes and greater capabilities, the practical uses and possibilities for micro-robotics, particularly in self-organizing groups, increases dramatically.

Nanotechnology

A close relative of micro-robotics is nanotechnology. The use by nanorobots and nanoprobes of the present system is logical. The same argument and restrictions of microrobotics apply to molecular sized nanorobotics. Like microrobots, nanorobots can assemble into larger composites that themselves work together as autonomous groups.

Uses of nanorobots include surveillance and reconnaissance. But more fanciful uses include biological applications that include cleaning arteries by injecting a group of nano-MRAs into a patient's blood stream. The nanorobots will go to the affected area, perform the operation internally and regroup for extraction. Nanorobots could also be used to identify and repair microelectronic abnormalities.

Expert Systems

Groups of anthropological MRA "androids" can work together to form complex expert systems. Operating as consultants with autonomous opinions, robot expert groups can behave like specialist teammates to collect and analyze data, perform forecasting, develop alternative scenarios, make predictions and give advice in the form of reports. Such groups of expert consulting opinions can involve numerous substantive industry categories and topics, including optimal telecom and energy routing algorithms and economic, business industry and scientific analyses. The personalities, experience and learning processes of the android MRAs evolve. Taken together, such expert systems constitute a think tank. Ultimately, such a group of autonomous self-organizing robotic agents can form and reform coalitions of specialist experts similar to a sophisticated consulting firm. By applying evolutionary learning and combining various opinions, such complex systems can be creative and capable of original thinking approaches that far surpass chess playing supercomputers.

MRAs

MRAs can take numerous forms. Since there are numerous applications of the present system in divergent industrial and technical contexts, it is appropriate to identify the structure and function of the variety of MRAs that can perform various jobs.

MRA vehicles can include various forms of aircraft, such as airplane, glider, helicopter, balloon, blimp, satellite or spacecraft. MRAs can operate in water as ships, boats, submarines or hovercraft. On land, MRAs can be automobiles, trucks, farm equipment, mining equipment, factory equipment, etc. There may be entirely new forms of MRAs as well, such as remote exploration devices, anthropological androids, micro-robots intended to emulate insect appearances, nano-robots and so on. The range of sizes and forms of MRA are very broad.

What unites the MRAs in the present system are common processes that make possible self-organizing group behavior of autonomous intelligent mobile robots. Nevertheless, the various specialized applications that are made possible by using the present system allow a broad range of important uses that endeavor to enhance the human condition by performing the riskiest, most remote, most complex, most routine and most important tasks imaginable.

Reference to the remaining portions of the specification, including the drawings and claims, will realize other features and advantages of the present invention. Further features and advantages of the present invention, as well as the structure and operation of various embodiments of the present invention, are described in detail below with respect to accompanying drawings, like reference numbers indicate identical or functionally similar elements.

List of Acronyms:
MAS: Multi-agent system
MRS: Multi-robotic system
MRA: Mobile robotic agent
INA: Intelligent negotiation agent
IMSA: Intelligent mobile software agent
AI: Artificial intelligence
D-AI: Distributed artificial intelligence
A-NN: Artificial neural network
E-A-NN: Evolutionary artificial neural network
FL: Fuzzy logic
GA: Genetic algorithm
GP: Genetic programming
EC: Evolutionary computation
OS: Operating system
CA: Cellular automata
GT: Game theory

BRIEF DESCRIPTION OF THE DRAWINGS

FIG. 1 is a list of system layers;
FIG. 2. is a schematic diagram of a synthetic hybrid control system for an MRA;
FIG. 3 is a table of a dynamic database organization;
FIG. 4 is an illustration of three MRAs identifying MRA locations with sensors;
FIG. 5 is a diagram of an MRA assessing its environmental situation and coordinating change in state;
FIG. 6 illustrates a diagram of a metacomputing model for distributed MRS in which flexible mobile grid architecture is organized into dynamic clusters;
FIG. 7 is an illustration showing the sharing of computation resources among MRA nodes in a wireless mobile MRS, including the efficient routing of database and analytical functions;
FIG. 8 is a diagram showing database coordination in a distributed MRS;
FIG. 9 is a diagram showing a dynamic distributed object relational database data flow process;
FIG. 10 is a diagram showing temporal objects in an object relational database management system;
FIG. 11 is a diagram showing mobile grid dynamics;
FIG. 12 is a diagram showing autonomous blackboards for MRAs;
FIG. 13 illustrates a diagram showing intelligent mobile software agents operations control in MRAs;
FIG. 14 is a flow chart showing MRA juvenile and adult training levels;
FIG. 15 is a diagram showing MRA attitude biases;
FIG. 16 is a flow diagram showing the learning and adaptation from environmental interaction;
FIG. 17 is a flow diagram showing the MRA training process;
FIG. 18 is a flow diagram showing reinforcement learning;
FIG. 19 is a flow diagram showing hybrid learning with time constraints;
FIG. 20 is an illustration of social learning in which MRAs learn from other MRAs;
FIG. 21 is an illustration showing MRAs that teach other MRAs;
FIG. 22 is an illustration showing asymmetric MRA leadership and the emergence of temporary hubs;
FIG. 23 is an illustration showing specialized learning in self-organizing teams;
FIG. 24 is an illustration showing automated specialization in which self-organization by task division occurs for individual specialization;
FIG. 25 is a flow diagram showing a self-organizing map;
FIG. 26 is a flow diagram showing a genetic algorithm;
FIG. 27 is an illustration showing a binary genetic algorithm;
FIG. 28 is an illustration showing a genetic programming tree architecture;
FIG. 29 is an illustration showing parallel subpopulations fitness evaluation;
FIG. 30 is an illustration showing a two layer neural network;
FIG. 31 illustrates an artificial neural network connection weights;
FIG. 32 illustrates genetic programming in the calculation of initial weights;
FIG. 33 illustrates genetic programming applied to indeterministic artificial neural networks;
FIG. 34 is an illustration showing an evolutionary artificial network connection and node additions;

FIG. 35 illustrates evolutionary indeterministic artificial neural network feed forward progress;

FIG. 36 illustrates an evolutionary search for connection weights in an ANN;

FIG. 37 is a flow diagram showing a fuzzy logic module;

FIG. 38 is an illustration of a neuro fuzzy controller with two input variables and three rules;

FIG. 39 illustrates a five layer evolving fuzzy neural network;

FIG. 40 illustrates an adaptive network based fuzzy inference system;

FIG. 41 illustrates a self-organizing neural fuzzy inference network architecture;

FIG. 42 illustrates a dynamic evolving fuzzy neural network;

FIG. 43 illustrates a flexible extensible distributed ANN in which ANN computation is shared between MRAs;

FIG. 44 is an illustration showing intelligent mobile software agents (IMSA) dynamics in a multi-agent system with an emphasis on MRA interactions;

FIG. 45 is an illustration showing IMSA relations between MRAs;

FIG. 46 is a flow diagram showing the operation of analytical agents;

FIG. 47 is a flow diagram showing the operation of search agents;

FIG. 48 is a flow diagram showing the initial operation of intelligent negotiation agents (INAs);

FIG. 49 is a flow diagram showing IMSA intercommunications;

FIG. 50 is a flow diagram showing INA architecture;

FIG. 51 is a flow diagram showing the pre-negotiation process;

FIG. 52 is a flow diagram showing INA logistics;

FIGS. 53A and 53B are a flow diagram showing negotiation in a distributed system with mobility;

FIG. 54 is an illustration showing the simultaneous multilateral negotiation process with multiple variables;

FIG. 55 is an illustration showing multivariate negotiation factors;

FIG. 56 is a flow diagram showing winner determination in a competitive INA framework;

FIG. 57 is a table showing the argumentation process;

FIG. 58 is a flow diagram showing anticipation of opposing INA strategies;

FIG. 59 is a flow diagram showing problem identification in which a group of MRAs agree to narrow focus;

FIG. 60 is a flow diagram showing solution option development between MRAs;

FIG. 61 is a flow diagram showing a solution option selection method;

FIG. 62 is a flow diagram showing how the MRAs select the best available solution to a problem in the present circumstance while waiting for more recent relevant information;

FIG. 63 illustrates MRA group agreement;

FIG. 64 is a table that shows the temporal aspect of the decision process;

FIG. 65 is a flow diagram showing the application of multivariate analysis to problem solving;

FIG. 66 is a flow diagram showing the application of regression analysis to problem solving of conflicting MRAs for winner determination;

FIG. 67 is a flow diagram showing the application of pattern analysis and trend analysis to problem solving of conflicting MRAs for winner determination;

FIG. 68 illustrates the modeling of MRS activity with simulations in which situation assessment is performed;

FIG. 69 is a flow diagram showing the synchronization of simulations within an MRA cluster;

FIG. 70 illustrates the contingency cellular automata (CA) scenario option simulations;

FIG. 71 illustrates reversible CA projecting backwards from a goal;

FIG. 72 illustrates adaptive geometric set theory applied to an MRS;

FIG. 73 illustrates the optimal simulation selection in which simulation scenarios are (temporarily) converged;

FIG. 74 is a flow diagram showing the initiation of the aggregation process in which sets of MRAs form from the larger collective;

FIG. 75 illustrates the initiation of homogeneous MRA group formation;

FIG. 76 illustrates the initiation of common heterogeneous MRA group formation;

FIG. 77 illustrates the initiation of complementary heterogeneous (specialized) MRA group formation;

FIG. 78 is a flow diagram illustrating the initial phase of demand-initiated environmental adaptation;

FIG. 79 illustrates continuous MRA group composition reconfiguration;

FIG. 80 illustrates the continuous reconfiguration of subnetworks;

FIG. 81 illustrates dynamic group behavior adaptation to environmental interaction;

FIG. 82 is a flow diagram illustrating the parallel dynamic traveling salesman problem (TSP) with cooperating autonomous agents;

FIG. 83 illustrates the altruistic sacrifice of MRAs (gambit tactic) in order to acquire sensor information to increase chances of overall mission success;

FIG. 84 is a flow diagram illustrating the general dynamic coalition process;

FIG. 85 illustrates group MRA coordination and obstacle avoidance;

FIG. 86 illustrates specific MRA functionality via specialization;

FIG. 87 illustrates specialized MRAs working as a team;

FIG. 88 illustrates multi-functional self-organizing MRAs;

FIG. 89 illustrates surveillance and reconnaissance of a mobile object sensed and tracked by multiple micro-MRAs;

FIG. 90 illustrates remote exploration with initial tracking of multiple objects with multiple micro-MRAs;

FIG. 91 illustrates sentry behavior within limited perimeters;

FIG. 92 illustrates cinematography applications with MRAs in which objects are sensed and tracked;

FIG. 93 illustrates land based toxic site clean up with multiple MRAs;

FIG. 94 illustrates dynamic cleanup of an oil spill within limited hydro perimeters by multiple MRAs;

FIG. 95 illustrates fire fighting with multiple MRAs as a dynamic interaction between the MRS and a complex environment;

FIG. 96 illustrates manufacturing production in which an object is created by using multiple MRAs;

FIG. 97 illustrates the assembly of objects in which parts are combined to create a whole object using multiple MRAs;

FIG. 98 illustrates road generation using MRAs, and;

FIG. 99 illustrates surgical micro MRAs used for trauma intervention and stabilization.

DETAILED DESCRIPTION OF THE INVENTION

The present disclosures illustrate in detail the main ideas of the present system. Since the present invention has numerous embodiments, it is not intended to restrict the invention to a single embodiment.

The system and methods incorporated in the present invention are implemented by using software program code applied to networks of computers. Specifically, the present invention represents a multirobotic system (MRS) that includes at least two mobile robotic agents (MRAs). These MRAs have various useful purposes in the context of industrial and practical applications. The MRAs use complex software program code, including mobile software agents, to execute specific instructions involving robotic and computation operations. The software capabilities activate specific robotic functions within MRAs involving movement and decision-making.

The present invention focuses on how groups of autonomous MRAs operate in a distributed MRS. As such, the invention, or cluster of methods, solves problems in the area of computation for groups of mobile robots in a distributed network. The system shows novel ways for groups of MRAs to work together to achieve specific goals such as mapping the environment, coordinating missions, aggregating into dynamic coalitions and engaging in complex self-organizing activities. The system employs hybrid models for collective robotic control that combines not only synthetic control methods that combine central and behavior-based approaches but also hybrid artificial intelligence methods. Distributed artificial intelligence approaches are used in several contexts of the present system, including learning, negotiation, simulation and decision-making of MRAs and intelligent mobile software agents (IMSAs).

The main approach for decision making of MRA collectives is decentralized. In order to achieve self-organizing aggregation for specific missions in changing environments, the MRS engages in learning and decision processes that employ extensive use of IMSAs. IMSAs interact with each other to handle routine matters between MRAs, including communication, analysis and negotiation. Intelligent negotiation agents (INAs) provide a medium for multilateral interaction of MRAs for group decisions. Simulations are used extensively to model and select optimal pathways for MRA group action and for the evaluation of scenarios for action.

This detailed description of the figures is divided into several parts that explain: (1) the main structure and operation of the MRS, (2) resource management of a distributed MRS, (3) MRA learning, (4) AI and ANN, (5) IMSAs, (6) INAs, (7) problem solving, (8) cellular automata (CA) simulations, (9) aggregation and self-organizing dynamic coalitions and (10) specific applications including (a) remote sensing, (b) hazard management and (c) building processes.

General System Architecture and Dynamics

FIG. 1 illustrates the layers of the multi-robotic system architecture. The first level shows a synthetic hybrid control system for MRAs including central planning control and behavior-based control aspects, which are further described in FIG. 2. MRAs are independent autonomous agents that use AI to interact with their environment using the hybrid control model.

The second layer is the level of the mobile robotic system in a distributed network which connects together individual MRAs using communications. The Grid computing architecture is used to link the MRAs together at layer three in order to share computation and database resources between the individual MRAs for maximum network efficiency. In this way, the MRA network develops dynamic clusters for optimal computation and storage capability. Particularly in time constrained dynamic environments, the mobile Grid network model is critical in order to accomplish complex tasks.

At level four, the dynamic distributed database system is used. This extension of the Grid computing hardware architecture uses object relational databases and temporal data objects to organize data between databases in the MRAs.

Artificial intelligence is used in layer five as a dynamic interactive artificial neural network that evolves. By applying AI to evolving networks of MRAs as they interact in a dynamic environment, complex learning and adaptation processes develop.

Intelligent mobile software agents (IMSAs) operate within the multi-agent system (MAS), comprising the sixth layer. The IMSAs are complex agents that perform a number of important functions within each MRA, such as analysis and decision-making, and between MRAs, such as data search, negotiation and collaboration.

The MRAs produce complex simulations to represent their relative positions and movements as well as to map out the possible scenarios for future action. These simulations are represented as mobile cellular automata in level seven.

Finally, the specific functional application of each implementation of the system comprises level eight. The main application categories of remote sensing, hazard management and manufacturing processes each use specific functional representations that are closest to the environment with specific hardware types.

FIG. 2 shows a multi-layer architecture of an MRA synthetic hybrid control system. The first level shows specific central (0270) and behavior-based (0280) control processes, in which the former uses abstract logic and the latter is reactive to the environment. In layer two, the two main processes are intermediated (0260) in synthetic control approaches.

Layer three illustrates several main hybrid control systems that combine both central planning and behavior-based control models: (1) planning driven (0220), (2) advice mediation (0230), (3) adaptation (0240) and (4) postponement (0250). The planning-driven approach to combining the main control methods determines the behavioral component; it is primarily a top-down model. The advice mediation approach models the central planning function as advice giving, but allows the reactive model to decide; it is primarily a down-up model. The adaptation model uses the central planning control module to continuously alter reaction in changing conditions. Finally, the postponement model uses a least commitment approach to wait to the last moment to collect information from the reactive control module until it decides to act.

Finally, at layer four, the suite of synthetic control systems (0210) is constructed of various combinations of these main hybrid control models. For instance, a robotic unit may use a suite of hybrid control systems in order to optimize specific situations.

The evolution of these hybrid control models, as represented in the layered structure of figure two, is suited to complex social behaviors of a distributed MRS used in dynamic environments.

The structure of the dynamic database organization is referenced in FIG. 3 as a table. A single MRA unit includes a hardware component with an object-relational database. Within this MRA, software agents perform tasks such as analysis, negotiation and decision-making. On a more advanced level, a single MRA has complex computation resources to manage, including AI and ANN.

Taken as a whole system of MRAs in a distributed network, the MRAs manage data within a network and share database organizational functions. Similarly, in the distributed network, the software agents become mobile and interact with other software agents at various MRA locations. Finally, on this network level linking MRAs, computation resources are constantly restructured so as to maximize computer power for complex time constrained applications.

On the level of mobility, MRAs change spatial positions in variable time sequences in order to perform specific tasks. The software agents are also mobile within a limited wireless range between mobile MRAs. The network of MRAs constantly rewires its computation resources by using AI and ANN in order to adapt to its environment and to optimally perform the collective mission.

Thus FIG. 3 shows that while a single autonomous unit is important, when combined with other similar units in a network and provided with mobility, and when also combined with both software agent system integration and AI and ANN capabilities, the system produces a complex adaptive collective capable of autonomous mobile interaction.

FIGS. 4 and 5 show simple MRA operations such as using sensors to locate other MRAs or changing position by avoiding obstacles. FIG. 4 shows a simple communication between three MRAs using sensors. Each MRA uses its sensors to detect the positions of the other MRAs. In this way, each MRA can identify each others' positions. In another embodiment, the position of each MRA may be transmitted to other MRAs in the network by way of wireless communications. In still another embodiment, positions of MRAs can be transmitted to other MRAs by satellite, radar or other external GPS tracking system. In these ways, the positions of MRAs can be tracked by other MRAs in the network. The reason that individual MRA position tracking of other MRAs is important is that in a noisy environment, there are multiple methods for MRAs to track other MRAs. In the total absence of communication, an individual MRA may default to a behavior-based reactive mode of interacting with other MRAs and with the environment.

An individual MRA can detect an object (0520) in the environment with its sensors and change position from 0520 to 0530 as illustrated in FIG. 5.

The individual autonomous MRAs are part of a distributed network in much the same way that inert computers are linked together into grid computing networks for supercomputing. This mobile grid computer network comprised of individual MRAs uses wireless communications in order to share computation resources. FIG. 6 shows a metacomputing model for a distributed mobile robotic system (MRS). The figure describes a flexible mobile grid architecture of dynamic clusters of mobile MRAs. At 0610, MRA 1 requests (at (1)(a), (1)(b) and (1)(c)) computation resources and data storage capacity from other MRAs. MRAs 2, 3 and 4 (at 0620, 0630 and 0640, respectively) then respond to the request (at (2)(a), (2)(b) and (2)(c), respectively) of MRA 1 (at 0650).

FIG. 7 illustrates the sharing of computation resources among MRA nodes in a wireless mobile MRS, with an emphasis on the routing of database and analytical functions. The distributed network of MRAs can work together as one dynamic unit. Messages are input to the report status distributor (0720) and the request coordinator (0730) The report status distributor feeds messages to the MRS (0740) which interacts with the cache (0750) and the data stream (0760). The cache also interacts with the analytical (0770) functions of the system. Messages are output from the data stream and from the request coordinator. The mobile wireless grid computing architecture uses the most recent version of the message passing interface (MPI) for distributed computer networks. The use of grid architecture in a mobile wireless distributed network allows for a maximum of flexibility and scalability in providing massive resources in adaptive environments.

MRAs possess not only computation capability, which allow up to teraops (one trillion operations per second) or yodaops of system processing power, but also database storage capacity as well. Each MRA possesses a database. However, taken as a whole, the MRS network comprises a distributed database system with complex coordination capabilities. The databases work together to store data objects such as a table, a calculation, a multimedia segment or other complex combinations of coherent mobile code. Such working together involves sharing database storage among a number of machines in order to ensure maximum efficiency under severe time constraints. FIG. 8 shows database coordination in a distributed MRS. The front end (0810) inputs queries at the query initiator (0820) which inputs to the query executor (0830), which has buffers (0870) with other MRAs. The multiple data sources (0850 and 0860) supply information to the query executor. The query executor outputs its queries to output queues (0840) at various other MRAs (0880). This process is further illustrated in FIG. 9.

In FIG. 9, the dynamic distributed object relational database data flow process is described. The query origination (0910) moves to the various databases (0920), DB1 through DB5, internal to MRA 1 through MRA 5. The query executor (0950) which is buffered (at 0970), searches the same databases (0980), which have sensor data stream inputs (0930) as data sources (0940). Once accessed, the databases output their data at the output queues (0990). This distributed model shows a parallel network approach to database organization. In one embodiment, the system uses active storage databases in which the computer processing capacity is internal to the database, which is itself continuously mining objects for analytical functionality.

One of the particular types of objects that the object-relational database management system organizes involves temporal objects. Because the MRS is typically time constrained in order to perform its primary missions, temporal objects become a prominent part of the distributed database system. Temporal objects reveal their temporal priority in order to be listed in a higher or lower relative priority in the database for storage retrieval purposes. Objects are "tagged" with temporal priorities such as "now", "imminent", "very soon", "in the future", "possibly useful in the future", "past", "near past", "immediate past", "urgent priority", etc. By storing, and reprioritizing, objects according to temporal priority, the system can operate much more efficiently. FIG. 10 shows how temporal objects operate in a ORDbMS.

The query generator (1010) requests the query executor (1020) to access databases at DB1 (1030) and DB2 (1050) in sequential order. These databases access the data object (1060), which is tagged as it undergoes temporal change and is given temporal priority (1040) and is then provided back to the query executor (1020). Once again the databases are accessed with temporal information about the data object. The data object is then directed to the query manager (1070) for feedback to the system. By prioritizing data according to temporal priority, the system can route data efficiently and effectively anticipate functions. Temporal data is useful in the present system in the context of evolving learning, evolving ANN, evolving game theoretic negotiation applications, evolving environmental conditions and general systemic adaptation processes.

FIG. 11 shows the mobile grid dynamics. Data sets at a specific location inform the system analysis at 1120. The data sets are analyzed and interpreted at 1110 in order to determine where the system should move. The system moves to the new position at 1130. Yet this change of position provides new data sets, which are, in turn, provided to the system for analysis in order to determine where the system should move. This dynamic process optimizes the functionality of the system.

It is necessary for MRAs to obtain and transmit information from other MRAs about specific data such as physical position, analysis, negotiation and decision-making. Concise data sets are transmitted between MRAs in real time about the location and analytical state of the MRAs. These abbreviated data sets are consolidated in each MRA by autonomous blackboards, which act as "radar readouts" informing MRAs about the state of the network.

In FIG. 12 autonomous MRA blackboards are described. In this example, limited information is referenced involving spatial position, vector and speed so that each MRA can get a snapshot of the present situation of every other MRA in the system. In the figure, MRAs 1 through 4 readout specific data sets in a spreadsheet format at 1210 during phase one. New data sets are presented to the same MRAs in phase two to signify a change in state of the network. In one embodiment, an external blackboard keeps track of the data as a form of back up. In the event of a centralized blackboard on board a specific MRA, such as a satellite, the leader would maintain the consolidated information function. If such a consolidated approach were used in a further embodiment of the system, the leader may shift, thereby providing fluidity for centralized leadership of the system.

FIG. 13 describes the operation of intelligent mobile software agents (IMSAs) among MRAs. Though discussed below at FIGS. 44 to 58, IMSAs (and INAs) are the main software based methods for MRAs to communicate, interact and collaborate with each other. MRA 1 (1310) receives a collaboration agent sent by MRA 2 (1320), as it launches a search agent to both MRA 2 and 3 (1330). An interaction process is engaged between MRA 1 and MRA 2. Meanwhile, an analytical agent is launched by MRA 3 to MRA 1, while a messenger sub-agent is launched from MRA 3 to MRA 2. Finally, the figure shows negotiation agents (INAs) interacting between MRA 2 and MRA 3. These software based interactions represent a key method for MRAs to communicate and work with each other as a network.

FIGS. 14 through 19 deal with MRA training and learning, while FIGS. 20 through 25 deal with social learning.

FIG. 14 is a flow chart depicting the evolution of training level states. After an MRA initiates a training exercise (1410), it increases levels of training (1420). It may employ a learning module with specific learning tasks (1460) and refinement of learning tasks (1470) or it may interact with various environmental inputs (1430) in order to learn. At a specific point, a juvenile training level is achieved (1480). However, with continued experiments with the environment, it improves learning with positive reinforcement (1440) and an adult training level is reached (1450), which is constantly reinforced with a feedback loop.

MRA attitude biases are shown in FIG. 15. On a behavior spectrum between passive (1510) and aggressive (1530) behaviors lies a moderate "normal" behavior (1520). With passive behavior, the MRA acts with slower judgment but generally with more information, while with aggressive behavior, the MRA acts with faster judgment but within information constraints because of the time limits of quicker action.

Environmental interaction is critical for learning and adaptation. FIG. 16 shows a flow chart in which MRAs interact with both other MRAs and with the environment. After an MRA initiates a training exercise (1610), it either interacts with other MRAs (1620) or with its environment (1630). When it interacts with other MRAs, an MRA queries other MRAs about a specific question (1640), while the MRAs then access databases and respond to the data query (1660). Inter-MRA feedback is then shared between MRAs for efficient learning (1680), akin to a tutorial. On the other hand, when an MRA interacts with the environment, as the environment changes, the MRA feedback changes (1650). In this case, negative feedback is avoided (1665) while positive feedback is attractive behavior (1670) which leads to reinforcement learning (1675) and a feedback loop with the environment. As the environment changes, new data about these changes is supplied to MRA databases in order for them to access these environmental changes. When provided with positive feedback, the MRA constantly updates its beliefs about the environment (1690).

The MRA training process includes a combination of environmental interaction with group sensor data as illustrated in FIG. 17. The MRA initiates learning (1710) and accesses either the sensor data from other MRA team members (1720) or the environment (1730). By accessing the environment direction, the MRA collects raw sensor data (1740). Whether obtained from other MRAs or directly from the environment, the MRA analyzes and interprets the sensor data (1750) and initiates a decision to act based on the data (1760). In this way, training processes may be implemented based on the data obtained, contingent on the method of originating the data (whether from the environment directly or from other MRAs). Whereas FIG. 17 shows the two main ways of obtaining data, FIG. 18 shows the two main qualities of information, viz., intensity and quantity of data, which provide MRA learning reinforcement.

In FIG. 18, sensor data is input into an MRA (1810) while the intensity of inputs is measured (1820) or the quantity of inputs is measured from different sources (1830). In either event, the inputs are compared to databases (1840) while each is provided a weighted value, with high intensity input weighting (1850) and quantity input weighting (1860), respectively. The MRA evaluates the weighted value from different sources (1865) and interacts with the environment based on input evaluation (1870). For instance, if a number of MRAs provide a large quantity of inputs that a mission objective is achieved, then these inputs are weighted highly in order to provide reinforcement of a specific behavior (1880); contrarily, if a very high weighting is assigned to an individual MRA data set because of the intensity of the data, then this behavior is reinforced.

The combination of the aforementioned learning approaches present a hybrid learning model with time constraints illustrated in the flow chart of FIG. 19. Data from other MRAs (1910) and direct environmental inputs (1920) are analyzed (1930) before the MRA acts (1940). The MRA then proceeds to interact with the environment (1960) and receive positive feedback (1950). This environmental feedback presents behavior reinforcement in a minimal time (1980) and the MRA establishes a plan of action (1985), which is implemented by activating specific behavior (1990). Meanwhile, the MRA updates other MRAs (1970) which provides a partial feedback loop for MRAs to supply information for future sensor data.

In FIG. 20 social learning is described as MRA interaction. MRA 1 (2010), MRA 2 (2015) and MRA 3 (2020) interact with objects (2030) in the environment in an initial phase. In the second phase, the MRAs interact with each other by sharing information about the object-interaction. This descriptive phenomenology about the objects is used in the third phase by further interactions between the MRAs and the objects.

FIG. 21 illustrates an MRA that teaches another MRA. MRA 2 (2120), a "student" with limited training, requests assistance from an experienced MRA 1 (2110). While MRA 1 is in motion, and thus moves to a new position (2130), the "adult" MRA 1 provides the student with a learning module via a software agent.

Given the distributed environment of the present MRS network and the learning schema presented, it is possible to have asymmetric MRA leaders. That is, if this is not a centralized system, it is still possible to have mission leaders, but they are not necessarily centralized or even consistent. Like in a flock of geese, any member of the flock may be a leader, though temporarily. Consequently, asymmetric MRA leadership provides the emergence of temporary hubs of MRAs that cluster together to interact with the environment.

FIG. 22 illustrates this process. In the first phase, a leader of a cluster of MRAs (2210) interacts with a moving object (2220). But the leader is knocked out of action (2240) in the second phase, while a new leader emerges for the group (2230) as the new leader seeks the moving object (2250) and it is also removed from action. Finally, in phase three, yet another new leader emerges for the group (2260) while the mobile object (2470) continues to elude the group. At each new phase, a new hub is created with a new leader of the MRA cluster. In each case, the goal is to seek out the elusive mobile object.

A division of labor can occur in specialized teams for increasingly efficient performance as shown in FIG. 23. Each MRA is designated with a letter to signify its role as a specialist, while the whole group interacts with a mobile object (2320). In phase two, the MRAs reorganize into new positions in order to optimize the sharing of data and resources and to organize an interaction between the various specialists and the object (2340). FIG. 24 further illustrates the self-organization process by task division for automatic individual specialization. In the first phase, the group of MRAs (2410) interact with the object (2420). The MRAs automatically activate a specific specialization mode (2430) to attack the increasingly elusive object (2440) as shown in the second phase. However, at phase three, the MRAs automatically reorganize to a new specialization mode (2450) to catch the object (2460).

One key application of the (social) learning and environmental interaction processes is to construct a self-organizing map of an uncertain environment. This map can then be used as a benchmark for further collective action. FIG. 25 is a flow chart that shows the process of a self-organizing map for a group of MRAs. After initial parameters are developed (2510), MRAs move to new locations to fulfill a mission (2520), where they receive sensor feedback from the environment (2530). The MRAs create an initial map based on initial sensor data organization (2540) and obtain more sensor data (2550) as they cover more terrain to include in more refined mapping phases. In this way, the MRAs fill out the initial map to create a fuller picture of terrain to include formerly missing parts (2560). The MRAs can perform this filling in procedure by using caching techniques that add the most recent information to a map outline. More complete data from sensors continue to refine the map (2570) as the MRAs continue to generate more and better data from continued mobility and data gathering. As objects in the environment change position, the MRA sensor data inputs that represent these changes continue to update the maps (2580).

Using artificial intelligence and artificial neural networks optimizes the learning process. FIGS. 26 through 29 show the main AI procedures of genetic algorithms and genetic programming. These techniques are then applied, in FIGS. 30 through 43, to artificial neural networks. These discussions are important because AI and ANN are also applied to IMSAs, to the negotiation process and to simulations, which will be addressed later in the figures.

In his quest for software that would solve complex optimization problems, Holland sought a solution from nature. By emulating biological processes of breeding, mutation and survival of the fittest, he sought to develop a new kind of software logic that would automatically improve in order to solve problems. His revolution in software design emerged as genetic algorithms that are binary representations of genes that undergo evolutionary processes similar to biological entities. FIG. 26 describes a flow chart of a genetic algorithm. After a population is created (2610) (and mutations added to the population (2620)), each member of the population is evaluated for fitness (2630). The weak members are pruned out (2640) and removed (2650) while the strongest members are selected for crossover (2660), such as breeding, which is then performed (2670). A feedback loop is generated in order to generate multiple generations of a population or a range of sub-populations. The successful candidates are put into the population to replace the weak members (2680). In this way, the population of possible algorithms evolves to an optimal solution. FIG. 27 shows an example of a binary genetic algorithm crossover in which 2710 is bred with 2720 to achieve 2730. In this example, a combination of "zero" and "one" yields a one, while two zeros or two ones combined in a specific position produces a zero.

Holland's student, Koza, developed genetic programming based not on binary algorithms but on the evolution of trees diagrams. FIG. 28 shows a genetic programming model with a crossover from the first phase of a tree on the left with a tree on the right. In this example, the triangular grouping on the upper left (in the box) (2830) is combined (2880) with the tree of the upper right (including the triangular grouping in box (2970)), though the two groupings are "switched" right to left in the examples. This tree structure modeling approach more closely resembles the actual genetic representation of evolutionary processes.

The process of producing multiple generations of algorithms may take an enormous amount of time because there may be many thousands of generations before a solution to a problem emerges. In order to abbreviate this process, the evaluation part of the process may be performed in a parallel way. By breaking down the fitness evaluation function, the process is expedited. FIG. 29 uses the tree structure model to illustrate parallel subpopulation fitness evaluation in which two main triangular structures (2910 and 2920) break into a large number of smaller sub-populations (2930 and 2940) in order to assess the fitness of the best set of pairings. A final pairing is then selected (2950). Rather than running through a single sequence of the fitness assessment procedure, the parallel approach is much more time sensitive. This time sensitivity is more conducive to adaptive systems in which real-time interaction is critical.

Genetic algorithms, genetic programming and evolutionary computation techniques are applied to artificial neural networks in order to (1) calculate the initial weight and the connection weights of the signal between neurons, (2) train and optimize the connection weights, (3) generate the architecture and topology of a NN and (4) analyze the pattern, structure and phase state of a NN. GA, GP and EC are also applicable to a range of complex computation problems, including (1) distributed problem solving, (2) group learning, (3) group cellular automata simulations, (4) routing of computation resources in the distributed system, (5) scheduling in a dynamic distributed system, (6) creating a self-organizing map, (7) solving optimization problems, (8) performing game theoretic simulations, (9) performing parallel data mining and (10) selecting a winner from among complex aggregation choices.

FIGS. 30 through 43 deal with artificial neural networks. ANNs and evolutionary ANNs have numerous applications to the present system, particularly (1) organizing and optimizing distributed networks, (2) performing dynamic data mining, (3) organizing indeterministic learning, (4) ordering and adapting simulations, (5) modeling and optimizing dynamic game theoretic interactions (6) structuring adaptive self-organization and (7) general problem solving. The field of neural networks has evolved in the last generation from a purely theoretical endeavor of logicians, mathematicians and neurobiologists to include applications that are useful for practical systems. The present system is an example of an application of complex neural networks to learning, simulation and adaptive processes. The neural networks are computational representations within the program code of MRA hardware that provide useful tools for calculations of specific solutions to problems.

ANNs are parallel computational systems including interconnected nodes. Sometimes called connectionism because of an emphasis on the connections between the nodes, ANNs have inputs and outputs in the connection weights between nodes. An ANN node represents an artificial neuron that is modeled after biological neurons in a brain. A perceptron is the structure that represents the sum of a neuron's inputs and outputs.

FIG. 30 shows a two layer neural network in which inputs are entered on the left side and outputs are registered on the right side of the figure. A feedback connection can be added that directs the connections back to the left side of the nodes. In FIG. 31, a multi-layer ANN is represented, with 3120 and 3140 representing the first layer, 3110, 3125 and 3150 representing the second, hidden, layer, and 3130 representing the output layer. In this example, the ANN structure is a multilayer perceptron (MLP). The connection weights are illustrated in numerical terms in this figure, with the bottom part having higher numbers than the upper part. There are a number of types of neural networks that may be useful for various functions of a distributed mobile multirobotic system, including the MLP illustrated here, the Hopfield Network, the Hebbian Network, the Boltzmann Network, the Bayesian Network, the evolutionary ANN (neuroevolution) and the recurrent Net. These types of ANNs can be classified as having feed-forward recall or feedback recall, being deterministic or indeterministic and, finally, possessing supervised learning or unsupervised learning.

In FIG. 32, genetic programming is used to calculate initial connection weights. The GP randomly generates a population, computes the fitness of its members, generates a new population by performing a crossover of the first generation and adding random mutations and, finally, seeks to identify the fitness of specific members of this most recent population by comparing the best fit members with the criteria to satisfy the problem of identifying the initial weight of the connection. FIG. 33 shows how genetic programming is applied to an indeterministic ANN.

In phase one, the multi-layer ANN has inputs that register higher relative numbers at the top (connections between 3315 and 3310, between 3310 and 3320 and between 3325 and 3320) of the network than at the bottom (connections between 3315 and 3325, between 3325 and 3330 and between 3325 and 3320) of the network. As the network grows, shown in phase two, it emphasizes growth at the top, where there is significantly higher activity, and adds nodes at 3340 and 3350, while lower positioned nodes at 3355, 3360 and 3365 become inactive. FIG. 34 shows the automatic generation of a new node (3450) and a new connection (between 3420 and 3450) through a mutating process. This process of mutation and growth through node (and connection) addition(s) provides an evolutionary model of ANN change called neuroevolution. GP calculates both the addition of the node, the addition of the connection and the connection weights. In addition, GP can simultaneously calculate the node/connection additions, connection weight changes and the architecture of the evolving ANN particularly in a distributed network using parallel computation techniques. FIG. 35 illustrates an evolutionary ANN indeterministic feed forward progression from the first phase to the second phase. In the second phase, new nodes (3560 and 3580) and their connections are added, while less active nodes (3550 and 3570) and their connections are made inactive. In this way, ANNs constantly "rewire" the network towards more productive nodes.

FIG. 36 shows a 3-2-1 multilayer network in which connection weights are calculated by genetic algorithms. The algorithms are represented as binary units in order to calculate the connection weights. The network is trained by finetuning the connection weights through a process of optimization that the successive generations of genetic algorithms perform.

Fuzzy logic is a method to provide new approaches to computing that includes terms like "maybe," "possibly" and other partial and soft descriptions. Also called soft computing, FL represents a departure from traditional hard computing with mutually exclusive logic. FL uses statistical methods to compute solutions to complex real world problems. FL is applied to ANN to produce complex adaptive networks. FIG. 37 describes a FL module. A sensor provides crisp data input (3710) to a fuzzifier module (3720), which is fed random mutations (3770) and proceeds with the fuzzification process. At this point, a fuzzy analysis proceeds in a fuzzy inference engine (3730) that operates according to fuzzy rules (3780) which are themselves adapted (3790). After the fuzzy analysis process, the defuzzification of data occurs in the defuzzifier module (3740) where crisp data is output (3750) and presented to actuators (3760) for functional performance. This process is similar to a the process a signal undergoes in conversion from an analogue waveform to a digital mode by way of an analogue-digital (A to D) converter, or, contrarily, from a digital to an analogue signal by way of a digital-to-analogue converter (DAC).

FIG. 38 shows a neuro fuzzy controller with two input variables and three rules. The input variables A1 (3810) and A2 (3820) provide connections to the rule base R1 (3830), R2 (3840) and R3 (3850), which then provide an output at X (3860). FIG. 39 shows a five layer evolving fuzzy neural network, with the input layer (3910), the fuzzification layer (3920), the rule node layer (3930), the decision layer (3940) and the output layer (3950). A more complex ANN architecture is described in FIG. 40. In this figure, an adaptive network based fuzzy inference system is shown in which inputs are presented to the initial presentation layer, which is shown here in a parallel configuration, with R and S nodes. A training process occurs in the multilayer network (4040) that contains hidden layers. The outputs of this training process are fed to the consequent parameters (4050) that then lead to outputs.

A multilayer neural fuzzy inference network is illustrated in FIG. 41. The first layer (4110) generates the offspring (4115), which produce neural nodes at level three (4120) that are evaluated for fitness at level four (4125). The nodes breed a new generation with inactive nodes (4130) at level five. The surviving nodes (4135) again breed a new population of nodes that result in two active members (4140) in layer seven.

The successful mating of these nodes yields an output node (4145) at level eight. By breeding successive generations of successful populations, and by training these successful populations, the network is self-organizing and adaptive to its environment.

FIG. 42 shows a dynamic evolving fuzzy neural network. With five layers, including an input layer (4250), a fuzzy quantification layer (4255), an evolving rule nodes layer (4260), a weighted least square estimator layer (4265) and an output layer (4270). This model shows a complex synthesis of simpler ANN representations.

One of the advantages of applying evolutionary computation to ANN is that such advanced computing can be performed more efficiently by using parallel approaches to break down a problem into smaller parts so that a larger number of computer processors may solve the problem simultaneously. In this way, multiple MRAs may work on a problem together in order to accomplish the task in real time. One application of this approach is in the fitness evaluation part of the genetic algorithm population production process. The problem of identifying the successful candidates in a population can be performed, and expedited, by using parallel processing.

In another example of using parallel processing to accelerate computation problem solving, consider the problem of adding a neural node. By using parallel computation processes, not only can the neural node be added, but the connections to it can be added simultaneously; in addition, the architecture of the network can be configured and reconfigured in real time, as new training models are considered and tested. The application of parallel algorithms to evolutionary computation, and, in turn, the application of EC (both GA and GP) to ANN provide increasingly efficient approaches for use in a distributed mobile MRS. MRAs share ANN computation in a flexible way as illustrated in FIG. 43. Not only are the ANN not limited to the computation of a single MRA, but MRAs (4310 and 4320) may share ANN computation resources between them. This distributed manifestation of parallel computation shows a flexible and extensible model in which the sharing of resources results in increasingly efficient capabilities.

The application of EC and ANN to a distributed mobile MRS involves several important areas, including learning, training, adaptation and prediction. In order for MRAs to interact with an uncertain, and changing, environment, it must learn, predict and adapt. While EC is useful to train ANNs, it is the general learning capabilities that are regarded as an outcome of this training process that ANNs ultimately provide to MRAs and to the MRS that is critical to the effective real time adaptation needed by the system. Many of the problems that a mobile MRS encounters involve evolving solutions, adaptive behavior patterns, complex predictive scenario modeling and self-organized processes. These problems are solvable by applying EC and ANN models.

An example of the application of EC and ANN to an MRS is the modeling of game theoretic interactions. A particular strategy may be evolved for a particular player based on a basic rule pattern selection organized by a multilayered feed forward perceptron. Each layer performs a calculation of the weights of inputs, connections and biases. A random number of nodes is selected in the multilayer network, with a random number of offspring replicated from each parent and randomly mutated. A number of rules of game moves are identified and consistently applied. Each network generation is evaluated for accurate effectiveness of achieving a successful game move. The network is trained and retrained with full information. In this way, the learning process is refined so that each player is able to optimally move according to the rules.

This straightforward application of EC and ANN to a game theoretic modeling problem is relevant for a distributed mobile MRS because the present system uses simulations to model action. The simulations, which are discussed below in FIGS. 68-73, can be either present-time-based or may be based on future scenarios. Since in the case of the MRS, multiple MRAs provide sensor data inputs into the system and multiple MRAs provide computation resources, the complexity of the game theoretic interaction increases with the size of the network. Only EC and ANN, along with parallel computation of a mobile grid computing system, is able to calculate the increasingly complex problem solving algorithms necessary to organize such a model. The main systemic unit that is able to organize such a complex architecture is the intelligent mobile software agent (IMSA) operating within a multi agent system (MAS). IMSAs, introduced in FIG. 13, are discussed in FIGS. 44 through 49.

IMSA dynamics within the MAS are discussed in FIG. 44 in the context of MRA interactions. MRA 1 (4410) launches a collaboration agent that is received by MRA 2 (4420) and collaboration between the two MRAs is initiated. A search agent is launched from MRA 1 to search databases in MRA 3 (4430) and MRA 4 (4440). A negotiation between MRA 3 and MRA 4 occurs by using intelligent negotiation agents (INAs). INAs are further discussed in FIGS. 48 and 50 through 58 below. Finally, analytical agents are launched by MRA 4 to MRA 2 and MRA 3 in order to analyze a specific problem. FIG. 45 shows IMSA relations between MRAs. MRAs are able to communicate with each other about complex tasks simultaneously by using IMSA specialist agent roles. There are number of specific types of IMSAs, including analytical agents, search agents, collaboration agents and negotiation agents. FIGS. 46 to 48 briefly describe analytical, search and negotiation agents.

In FIG. 46, analytical agents are described. After an MRA identifies a problem (4610), it generates an analytical agent (4620). However, the process of initiating the AA begins with the generation of a search agent, which is sent to multiple MRAs' databases with an initial query (4630). The search agent reports back to the initiating MRA with the priorities of data in MRA databases (4640). The AA is then sent to the MRA in the order of priority sequence (4650) revealed by the search. The AA analyzes the problem using specific methods (4660) detailed at 4670 including MVA, regression analysis, pattern analysis, trend analysis and hybrid analyses. The AA develops solution options to the problem (4680) and shares the results with relevant MRAs (4690).

Search agents are described in FIG. 47. An MRA generates a search agent (4710) to query distributed MRA databases (4720). The search agent receives initial feedback from databases regarding initial query (4730), refines the query with specific databases (4740), evolves search parameters (4750) and seeks specific data sets among databases (4760). The search agent finds data sets as a result of the refined search (4770) and retrieves them for the MRA.

The general negotiation process is described with reference to intelligent negotiation agents (INAs) in a distributed network in FIG. 48. The initiator INA meta-agent (4810) begins the process by launching initiator INA micro-agents to several other MRAs. INA micro-agent 1 is launched to a negotiation session at INA 2's location (4820), INA micro-agent 2 is launched to a negotiation session at INA 3's location (4825) and INA micro-agent 3 is launched to a negotiation session at INA 4's location (4830). Each respective negotiation session occurs at each INA' s location within its MRA (2, 3 and 4, respectively). The initiator INA interacts with INAs at the various remote MRA locations (or at its home location) (4850), while a winner is determined at its home location (4855). Mutual agreement is reached, in this case between INA 3 and the initiator INA (4860), while sessions are closed between the INA 2 and INA 4 negotiations (4865) and the overall negotiation process is closed (4870).

FIG. 49 describes an IMSA intercommunication with messenger sub-agents. Once an MRA makes a decision (4910), the content of the decision is translated into specific instructions of action (4920) and the MRA creates messenger sub-agents (4930). The MRA launches the messenger sub-agents to other MRAs (4940), which then deliver the message with the instructions to the MRAs (4950).

Because INAs are used in a critical way in a distributed mobile multi-robotic system, they are further developed in FIGS. 50 through 58, including a description of the INA architecture, pre-negotiation process, INA logistics, negotiation process in a distributed network, multi-lateral negotiation process, multivariate negotiation factors, winner determination process, argumentation process and opposing INA strategies.

INAs work by negotiating between at least two MRAs. INAs use. argumentation methods to negotiate by presenting arguments with variable weights. INAs also negotiate about the best simulation to use in a specific situation. In general, INAs use multi-lateral and multivariate negotiation in order to come to agreement between noncooperating MRAs. In the case of competitive MRAs that negotiate for a compromise, problems are solved using group problem-solving and analytical techniques. Solutions to complex MRA group problems include the optimal or a temporary choice between solution options. Group problem solving is discussed in FIGS. 59 to 67. In all cases, AI is used in order to facilitate the negotiation and problem solving processes.

In FIG. 50, the main INA architecture is described. Four INAs, including an initiator INA (5020) and INA 2 (5010), INA 3 (5015) and INA 4 (5025) enter into a pre-negotiation session (5030), which is discussed more fully in FIG. 51 below. After pre-negotiation, all INAs negotiate in a first session between the initiator NA and the several INAs (5040), but stops negotiating with INA 4 (5045). While the initiator INA continues to negotiate with INA 2 and INA 3 in session two (5050), it eventually stops the negotiation process with NA 2 (5070). However, the initiator INA continues to negotiate with INA 3 in session 3 (5060) where it reaches agreement (5080) and closes the session (5090).

Referring to FIG. 51, the pre-negotiation process is described. After an initiator NA requests negotiation terms (5110), an INA micro-agent is launched (5120) and the initiator INA moves to other locations in order to communicate with other INAs (5130). Several INAs, designated as S1 (5140), S2 (5145) and Sn (5150) enter into a pre-negotiation process with the initiator INA over parameters of the interaction session, including location(s), protocols, rules and methods (5160). If they do not agree on the negotiation parameters, they continue to interact until they do agree on these issues. The INAs agree on the rules of negotiations, the number of negotiation sessions and so on, based on the constraints (5170) and the initiator INA proceeds to the negotiation sessions with the other INAs based on these pre-negotiation protocols, rules and methods (5180).

In reference to FIG. 52, NA logistics are described. After initiating the session (5210), agents are generated and identified by codes (5215). The initial agent interaction protocols are generated (5220) in order for the agents to establish a common communication methodology. Such communication processes involves translation (5225) and synchronization (5230). Failure to synchronize communication leads to a termination at 5245. Once fully synchronized, INAs may construct unique negotiation strategies using AI (5240) utilizing analytical agents (5235). At this point, agents signal the intention (5250) to negotiate with other agents. After signaling to other agents, INAs send out communication streams (5255) to their home base, thereby constantly revealing to the home base their locations, status and plans. At this point, the initiator INA enters into a pre-negotiation session with the selected INAs (5260) and launches micro-agents to negotiate with INAs at different locations (5265). The INAs then enter into the negotiation process (5270) and either cease negotiation (5275) or come to an agreement (5280). If they cease negotiation, the NA settings are saved for later (5285) and the session closed. On the other hand, if there is agreement, the MRA functions are activated consistent with the agreement reached (5290).

FIGS. 53A and 53B illustrate the negotiation process in a distributed system with mobility between INAs. The present example focuses on a one-to-one negotiation between an initiator INA and INA 2. After an initiator INA initiates a negotiation session with INA 2 (5310), the INAs identify possible locations (5315) and specify agreed locations (5320) at which to negotiate. In the illustrated example, the initiator INA moves to INA 2's location (5323) with program code. INA 2 identifies incoming initiator-INA entry after activation and security protocol approval (5326) at INA 2's location.

The agents engage in (5330) and complete (5333) negotiation tasks, after which the initiator INA notifies its home MRA of its remote location activities by sending a message (5336). After reviewing more tasks at the remote INA 2 location (5340), the initiator INA either terminates (or returns home) (5343) or assesses additional tasks using internal database and analysis (5347), assessment (5350) and identification (5353) of the next location for task execution and moves to another location (5356).

After moving its program code (5360), the initiator INA identifies a need for AI computation (5363), requests AI computation resources at a specified location (5367), identifies available AI computation resources (5370) and messages a request for AI computation resources to be sent to a specific location (5373). The initiator INA receives (5377) and tests the AI computation resources at a specific negotiation site (5380). The negotiations are completed at the remote location (5385) and the initiator INA returns home (5390).

As shown in this figure, though a one-to-one interactive negotiation is shown between an initiator INA and another INA, an initiator INA (or its micro-agents) may negotiate simultaneously with at least two INAs at two or more INA locations in another embodiment.

FIG. 54 shows a simultaneous multi-lateral negotiation process with multiple variables. At each phase in the process, denoted on the left column, INA 1 is in the position of negotiating with six INAs, listed here as 2 through 7. In the first phase, after negotiation with INA 2 in the first session, INA 1 negotiates with INA 3 in the second session. In the third session, INA 1 negotiates simultaneously with INA 2 and INA 3 on the second phase of negotiation with each. In session four, however, INA 1 begins to negotiate with INA 4, while it continues to negotiate with INA 2 in a third phase. Similarly, in the fifth session, INA 1 continues to negotiate with INA 4 in a second phase, while it begins to negotiate with INA 5 in a first phase. The sixth session continues this approach of continuing with INA 5 in a second phase while it initiates a negotiation with INA 6, and so on in session seven.

FIG. 55 shows multivariate negotiation factors in which, in the first phase, MRA 1 negotiates over specific variables with MRA 2, rejecting successive possible variables until finally agreeing on, and thus selecting, "Z". In the second phase, MRA 2 negotiates over specific variables with MRA 3 in a similar way, also resulting in the agreement over, and selection of, "Z". This process of negotiating over a number of factors shows the key element of "convergence" to negotiation. By repeating this process a number of times, many INAs may agree with each other about numerous factors in a complex dynamic system.

FIG. 56 shows the tournament style winner determination process in a competitive INA framework. Several INAs (2 through 5) enter into a negotiation with an initiator INA (5650) in phase one. The initiator INA agrees to narrow down the field to INA 2 (5660) and INA 4 (5670) in phase two. Between these finalists, the initiator INA then selects the winner, INA 4 (5690) in the third phase.

The argumentation process is shown in FIG. 57. During consecutive temporal phases of a negotiation process between MRA A and MRA B, several key factors are isolated and accepted by each MRA. First, negotiation variables are accepted by MRA B. Second, MRA A prunes out variables that it will not compromise on. Next, MRA B prunes out non-negotiable variables. Finally both MRAs determine the key variables that the will compromise on.

Negotiation is a process that fits into the overall game theoretic model that organizes competitive agents across limited goods. In this sense, negotiation involves agent strategies that anticipate opposing agent strategies. FIG. 58 shows the anticipation of opposing INA strategies. After INA1 presents an argument to INA2 (5810), INA 2 evaluates the argument (5830) using multi-variate analysis and regression analysis (5820). INA2 anticipates INA1's strategy by examining the trajectory of arguments (5840), which it performs by identifying cues to anticipate behavior in its environment (5850). INA 2 then presents a counter-argument to INA 1 (5860). INA 1 anticipates INA 2's strategy by anticipating its possible argument scenarios (5870) and the INAs eventually reach an agreement (5880).

FIGS. 59 through 67 describe group problem solving.

In FIG. 59, problems are identified by MRAs and the collective agrees to narrow the focus of the problem. Any MRA in the group can identify a problem (5910), in sequence, such as "How to carry out a mission with other MRAs?" (5920), "How to combine with other MRAs for a common mission?" (5930), "How to target an object with a group of MRAs?" (5940) or other mission or goal based problems (5950). The group of MRAs prioritize problems by assigning values to each problem and ordering them by rank in real time (5960) so that potential solutions can be made in the ranking order (5970).

Solution options between MRAs are described in FIG. 60. A shared four-dimensional grid is created by MRAs in order to represent the framework of a potential field (6010). Simulation scenarios from the MRA group are tested in order to detect the best fitting solution for a specific option (6040) after analyses are performed on specific solution options by MRAs (6030). A competition is then established between various potential solutions for the best solution available (6050) and weights are attached to each solution option (6060) which allows the simulation scenario solution options to be ranked (6070).

FIG. 61 describes the solution option selection method developed and applied by MRAs. An MRA develops a benchmark of methods in order to select a simulation scenario (6110) and then applies an experimentation process to test possible solutions (6120). The shortest path option is selected as a default without environmental interaction (6125). But the MRAs interact with the environment (6160), a process that is informed by actual environmental change (6150). The MRAs receive the results of the environmental interaction (6170) and evaluate the results (6180). Each MRA has a distinct vantage and thus applies a unique analysis (6190). The MRAs prioritize the results by weighting them for probability of success and by ranking them in the order of highest probability (6130). The methods of solution selection are refined (6135) and a feedback loop is structured to apply continued experimentation, when combined with continued environmental interaction, in order to continue to refine the methods of solution selection. A winner is selected from the possible solution options (6140) and the optimal solution is selected for a possible scenario (6145).

There are times when an optimal solution to a problem is not possible. In these instances, the best we can hope to achieve is the best available solution in a specific circumstance. FIG. 62 describes this process of selecting the best available, not the optimum, solution, to a problem, while waiting for the most recent relevant information. The MRAs work together to establish a list of solution options (6210), which are filtered according to constraints (6220) by time, optimization, combinatorial optimization, accuracy, quality of information and by pruning out what is not probable (6230). The MRAs then apply solution option methods (6240) which are refined by interaction with the environment (6250). The MRAs either (1) undergo a convergence of agreement (6250), in which case they select a specific simulation scenario solution option (6275) and carry out a mission (6285), (2) partially agree with an overlap of interests within constraints (6260) and (3) temporarily agree (within constraints) (6265), in which cases they select merely the best available simulation scenario solution option (6280) and carry out a mission within these constraints (6290). On the other hand, the MRAs, may not agree at all (6270), in which event they must return back to the earlier phases of the process of filtering the solution options (at 6220). FIG. 63 shows an illustration of MRA group agreement.

In FIG. 63, part (A), three MRAs present arguments that are represented as small circles within the larger circles. The gray area that shows the overlap of the three MRAs signifies the common interest between the three. In the second diagram at (B), the best available optimum scenario is shown in the gray area with time constraints. The configuration of this optimum window of opportunity, because it is time constrained, changes with the changing circumstances of the environment.

Clearly, the time aspect of the decision process is important because perfect information is rarely available and because agents in a multi-robotic system that interact in uncertain and dynamic environments benefit from waiting for the latest available information before deciding to act. FIG. 64 shows the temporal aspect of the decision process, with the left column representing the temporal component, the second column representing the physical state of the multi-robotic system and the right column representing the analytical state of the multi-agent system. In the first line, past physical experiences influence past data flows, while past data flows affect future scenarios. Future scenarios affect present analysis and decision-making, which influence the selection of a preferred scenario of action. This section of the preferred scenario influences the present course of action. In this way, the analytical and physical states of the system have causal connections over time. These interconnections reveal the integration between the MAS and MRS.

The group problem solving process requires specific analytical methods, including multivariate analysis, regression analysis, trend analysis and pattern analysis, in order to select a successful candidate. FIGS. 65, 66 and 67 describe these analytical tools.

In FIG. 65, multivariate analysis is applied to problem solving. A problem is forwarded to an MVA filter (6510), which strips the variables from the problem and analyzes each variable in isolation (6520). The MVA filtering process forwards the variable analysis procedure to multiple MRAs (6530) using parallel processing, where each MRA analyzes variables and compares this analysis with other MRA analyses (6540). The MRAs rank the multiple variables and share with the results between the MRAs (6550). The variables are evaluated in each solution option (6560) and the best available solution is selected from solution options (6570).

In FIG. 66, regression analysis is applied to the problem solving of conflicting MRAs for a winner determination. The MRAs analyze a problem with a regression analysis filter (6610), sort through various variables (6620) and share the data between them (6630). Again, the MRAs divide the analysis between them in order to benefit from the advantages of parallel computation. The MRAs weight the variables by establishing priorities and comparing each variable with program parameters (6645). The MRAs evaluate the importance of the variables by comparing them with data sets in the distributed database (6650) and then rank the priorities of variables (6660) and apply the ranking of the problem variables to solution options (6670). MRAs select the best solution option by applying the program parameters (6680).

In FIG. 67, pattern analysis and trend analysis are applied to problem solving of conflicting MRAs for winner determination. Depending on which type of analysis is required, a problem is formulated (6710) and either pattern analysis (6720 and 6730)) or trend analysis (6725 and 6735) is applied. The pattern analysis approach analyses regularities in spatial coordinates using statistical methods (6740), while trend analysis analyses regularities in temporal coordinates using statistical methods (6745). In either case, each analysis is evaluated (6750), the results ranked (6760) and the analyses are applied to MRA decision logic (6770). The MRA group then makes a decision based on these analyses and formulates a plan (6780) that the group is able to activate (6790).

Much of the substance of the problem solving, and negotiation, processes underlying inter-MRA conflict involves simulations. Because MRAs are mechanical entities that assume physical shape and mobility in space and time, it is possible to model them by using simulations. The MRS may use a number of types of simulations, including cellular automata simulations, particle simulations and game theoretic simulations. All three main types of simulation add valuable qualities to the representation of complex activities in a mobile distributed multi-robotic system, including structuring the dynamics of aggregation processes. FIGS. 68 through 73 describe the cellular automata simulation of MRA group activities.

Cellular automata (CA) is a system of cells which are represented digitally as a binary unit or vacuum. As objects move through a grid, they fill up the space in the cell. If an object does not occupy a cell, it is empty. In this straightforward way, CA can simulate groups of objects in space and time. CA's may include two dimensional, three-dimensional or four-dimensional (i.e., including the time dimension) structures. Once including the time dimension, it is possible to model CA simulations. CA simulations are well suited to represent mobile distributed multi-robotic systems because the MRAs are seen as merely objects that move in space and time across a map in a nonoverlapping environment. Though the simulations may be complex, for instance, in modeling dynamic coalitions in adaptive sequences as they interact with a fast changing environment, their representation is critical in order to provide a mechanism for the self-organization of the MRS processes.

FIG. 68 shows the modeling of MRS activity with simulations in a situation assessment. As the illustration shows, a cubic space is occupied by mobile agents, represented here as A, B and C. In the case of this situation assessment, the map describes the change in spatial position of the agents from A1 to A2 to A3 (6840), from B1 to B2 to B3 (6850) and from C1 to C2 to C3 (6860).

FIG. 69 describes synchronizing simulations within an MRA cluster. An MRA sensor detects other MRA locations (6910) and converts the analogue sensor data to a digital form (6920). The MRA data about other MRA positions is analyzed in real time to show phase state changes (6930) and a simulation is constructed to represent data about MRA position changes (6940). Each MRA continuously tracks all MRAs in the system in real time (6950) by using this approach and each MRA constructs a simulation to represent MRAs in the system (6960).

FIG. 70 describes a CA scenario option simulation. Two scenario options are presented for A and B. For scenario option A, MRA 1 (7010) and MRA 2 (7020) move across four phases to objects X and Y. For scenario option B, MRA 1 (7030) and MRA 2 (7040) move across the four phases towards objects X and Y but in a different path.

FIG. 71 describes a reversible, or deterministic, CA in which a simulation is constructed by projecting backwards from a goal. Though the scenario option representations look very similar to FIG. 70, the phasal process that is used is exactly opposite the causal approach. Rather, in this simulation model, the MRAs begin with the goal and project backwards. By using this reversible approach, the CA simulation is presented with a more goal-oriented solution.

FIG. 72 shows how adaptive geometric set theory is applied to an MRS. The three CA models of A (7210), B (7220) and C (7230) show three different sequences from one to three reflecting different positions. In the converged model (7240), a combination of the three models is reached which synthesizes the three by compromising the outcomes of B and C. Geometric set theory is useful to represent the overlap of aggregated sets.

FIG. 73 shows the selection of an optimal simulation as a (temporary) convergence of simulation scenarios. MRA 1 is represented by actual positions at 1', 1", 1'" and 1"" (7320) while a possible scenario is represented by 1R", 1R'" and 1R'" (7310). Similarly, for MRA 2 (7330) and the possible simulation scenario (7340). Finally, the outcome for these sequences is a convergence of MRA 1 at 7325 and of MRA 2 at 7335.

FIGS. 74 through 78 describe the aggregation process in a multi robotic system. FIGS. 75 through 84 describe the dynamic coalition (or reaggregation) process in a MRA and FIGS. 85 through 88 show autonomous MRS self-organizing processes.

FIG. 74 describes the aggregation initiation process in which sets of MRAs form from a larger collective. The MRAs develop and present simulations (7410), test the simulations (7415), prune out the least useful simulations (7420), and compare the best simulations with the environment (7425) and with (updated) program parameters (7430). The best simulations (within constraints) are selected (7435) and converged (7450) in order to create overlap. From the converged simulations, a map is created (7455) and individual MRA locations are identified relative to their positions on the map (7460). The MRAs then move their physical locations in an efficient way according to the geometric location of the converged simulation map (7465).

The initiation of homogenous MRA group formation is described in FIG. 75. In the first (top) section, an object X (7510) is confronted with seven similar MRAs (7520). After undergoing an aggregation initiation phase, the MRAs (7540) are shown in the second section as changing their position with regard to object X (7530) by moving towards the object.

In FIG. 76, the initiating process is shown involving common heterogeneous MRAs. In the first phase, an MRA with type "S" (7610) initiates a group of specialized MRAs (7620). In the second phase, the "S" MRAs (7630) concentrate in order to perform a specific task, while the other types of MRAs (7640) retain their positions. In this case, a particular type of specialized MRA is "picked out" in order to perform a specific function as a specialized unit.

In FIG. 77, a complementary heterogeneous MRS group formation initiation is described. In the first phase, the MRA with type "S" (7710) initiates a group of specialized MRAs in a similar was as with common heterogeneous MRAs. However, rather than attracting the same "S" type, it requests the "Y" and "T" types (7730) from the second column which leaves the other MRAs in their stable positions (7740). In this way, complementary specialists may work together as a team to perform complex functions in tandem.

The first phase of a demand-initiated environmental adaptation is described in FIG. 78. From the combination of static environmental data maps (7830) and actual environmental changes (7820), dynamic environment data maps (7825) are created. These maps inform past and present simulations (7850), which are analyzed (7840). The analysis is itself informed by learning methods (7810). Given the simulations and their analysis, negotiations occur between the MRAs (7855), which reach a decision, within limits (7865). This decision is also informed by limited (converged) scenario simulations (7870). Once a decision is made by MRAs, the selection is made about the specific form of aggregation to use (7875) and the actual special positions of the MRAs are changed in accordance with this new decision (7880).

In FIGS. 79 to 84, dynamic coalitions, or re-aggregation processes, are discussed. In FIG. 79, the continuous MRA group composition reconfiguration process is described. In the first phase, a group is concentrated (7910) that includes MRAs 1, 2, 3 and 4. In the second phase, a new grouping is organized (7930) that includes MRAs 3, 4, 5 and 6. Finally, in the final phase, yet another grouping is organized to include MRAs 4, 5, 6, 7 and 8. The movement through the system from the left part of the group to the right part of the group illustrates the changing interaction response to the environment that requires the grouping to adapt to different sub-sets of the larger collective.

In FIG. 80, the continuous reconfiguration of sub-networks is described. In this figure, the right column shows an object that the MRA group(s) on the left move towards. The first phase of the process is identified in the right column. In the first part of the process, at 8005, the first sub-set of the collective moves towards the object. In a second phase, the MRAs reconstitute the configuration of the MRA grouping (8010) and move toward the object. In a later phase, in the middle map, a larger initial grouping, including six MRAs (8015) move toward the object, while a second grouping (8020) moves to the object later. This second group includes the overlapping two members of both groups. However, in the third part of the process, the demand for MRAs changes again from the second part of the process. In this case, five MRAs move toward the object, while a grouping including six MRAs (including the last three of the first phase) move towards the object. This figures illustrates the dynamic motion aspect of the aggregation process as coalitions are dynamically created and reconfigured.

FIG. 81 illustrates dynamic group behavior adaptation to environmental interaction. In the first phase, the first MRA grouping (8120) moves towards a group of objects (8130). In this first phase, one object is knocked out, represented by an X, but two MRAs are also removed. In the second phase, the reconstituted group of MRAs (8150), which includes the combination of 8120 and 8110, move towards two more objects in the group of objects (8160) and three MRAs are removed from action, as represented by an X's. In the third phase, the newly reconstituted MRA group (8170) that includes a combination of 8150 and 8140, move towards the three remaining objects (8180).

The parallel dynamic traveling salesman problem is described with cooperating autonomous agents in FIG. 82. After they receive a sensor data stream (8210), a group of MRAs collect environmental data by sharing sensor data (8240) and use the initial prioritization of environmental data consistent with program parameters (8250). As the environmental data changes (8270), an interaction between MRAs and the environment occurs (8820) which informs the MRA sensor data stream (8210). The environmental data changes (8270) also reprioritize the order of priorities with the latest information of a changing environment (8280); this reprioritization of the order of priorities are largely based on the MRAs' prioritization of a physical sequence (8260) based on a reprioritization of MRA program parameters (8230). Once the reprioritization of priorities with the latest information (to accommodate a changing environment) occurs, the MRAs perform a physical sequence of actions in the order of priority (8290). This process involves a dynamic connection between the analytical functions of the MAS and the physical processes of sensor data gathering from multiple changing MRA positions that yields variable data inputs from a changing environment. Because the MRS is distributed, the use of parallel processing allows increasingly efficient processing of computation resources. FIG. 64 also illustrates a data flow process that accommodates both physical state and analytical state dynamics across time.

FIG. 83 shows altruistic MRAs sacrificing themselves in order to acquire sensor information to increase the chances of overall mission success. The MRAs shown with an X, move toward the object (8320) and are knocked out. However, the information that is obtained in this gambit mission is then sent back to the collective so that they are better able to defeat the object.

The general dynamic coalition process is described in FIG. 84. After mission goals and parameters are established (8455), sensor data and various sources examine the terrain (8460). The simultaneous parallel computation by numerous agents is performed by sharing data and by dividing computation resources (8465). The sensor data is then evaluated by various MRAs (8470). Groups of MRAs begin to emerge by agreeing to aggregate (8475). Decisions are made to form smaller groups in order to meet evolving mission parameters and priorities. Specified MRAs update the navigation plans and activate the mission (8485). As the mission evolves, groups of MRAs are added or removed as needed, for instance if the opposition is particularly hostile (8490).

FIG. 85 describes the group coordination and obstacle avoidance process that is involved in autonomous MRS self-organizing processes. Obstacles X, Y and Z (8510) move towards MRAs A, B and C (8550) from their initial positions. As the objects get closer, at 8520, the MRAs detect the objects as obstacles, at 8540, and begin to avoid them by moving out of the trajectory of the moving objects (8530).

In FIG. 86, specific MRAs A (8610), B (8630) and C (8650) move towards specific objects X (862), Y (8640) and Z (8660), with A attacking Z, B attacking X and C attacking Y. This specialization of a self-organizing process is further developed in FIG. 87 as a specialized group of MRAs work together as a team. MRAs A (8710), B (8720), C (8780) and D (8790) move into positions 8730, 8740, 8760 and 8770, respectively, in a phase in the process towards assembling together at 8750. In this position, the specialized MRAs work together sharing specific functions for greater usefulness on a mission. In FIG. 88, multi-functional MRAs are described in a self-organizing process. Whereas in FIG. 87, the MRAs are specialized, in FIG. 88, the MRAs have multiple functions that may switch in specific changing circumstances. As the figure shows, MRA A in position A1 (8810) and MRA B in position B1 (8850) move towards object X (8830). As they move towards the object, the MRAs detect the need to change from one specialized function to another. At positions A2 (8820) and B2 (8840), the MRAs change their functional mode to a different specialty in order to be more effective in their mission against the object.

FIGS. 89 through 99 describe specific applications of the present system. There are three main categories of application, including (1) remote sensing (described in FIGS. 89 to 92), (2) hazard management (described in FIGS. 93 to 95) and (3) building processes (described in FIGS. 96 to 99). Remote sensing activities that use an MRS include surveillance, reconnaissance, remote exploration, sentry activities and cinematography. Hazard management activities include toxic site clean-up, oil spill and fire fighting activities. Building processes include manufacturing production and assembly, road building and surgical activities.

In FIG. 89, surveillance and reconnaissance is described using multiple micro objects for sensing and tracking of a mobile object. As two MRAs, X (8910) and Y (8960) move in parallel tracks to positions X2 (8920) and Y2 (8970), respectively, they track object A (8940). As the object moves to position A2 (8950) and then to position A3 (8955), MRA X moves to position X3 (8930) and then to position X4 (8935), while MRA Y moves to position Y3 (8980) and then to position Y4 (8990) by using sensors and by tracking the object closely.

In FIG. 90, a remote exploration process is described in which the initial tracking of multiple objects is performed by multiple micro-MRAs. In this example, MRA1 (9010) moves towards object R1 to position X'. However, the object itself moves, from position R' to position R" and is followed by the MRA, which moves to position X". This process is repeated with MRA 2 (9020) tracking object R2 (9060) and with MRA 3 (9030) tracking object R3 (9070).

FIG. 91 describes sentry activity within limited perimeters defending multiple objects with a multiple number of MRAs. In this illustration, the MRAs are spaced evenly apart in order to occupy a constrained field around the perimeters of a field.

The current system is also applicable to cinematography, wherein one mobile object (or cluster of mobile objects) are sensed and tracked with MRAs. This process is described in FIG. 92. MRA 1 (9210) and MRA 2 (9270) track object X (9240) as it moves to positions 9250 and 9260. MRA 1 tracks the object along a path to position 9220 and 9230, while MRA 2 tracks the object along a path to position 9280 and 9290. This process may be variable so that as the object stops to pause, the MRAs stop as well. In this case, the MRAs have automated digital photographic capabilities with on-board auto-focus zoom lenses and data storage. The MRAs can be used to track multiple objects as well. One MRA may track the object(s) in a close in view while the other MRA(s) may track the object(s) from a distance in order to obtain a different view of the same scene.

FIG. 93 describes a toxic site cleanup. In this case, a static cleanup occurs within land perimeters by multiple MRAs. In the first phase, A-type MRAs (9310) are used to confine a limited amount of toxic contamination (9320) in a specific physical space. The MRAs move by using a side-to-side sweeping approach. In the second phase, the spill (9340) has been reduced and the MRS calls in the B-type MRAs (9330) in order to continue to eliminate the contamination by using a similar sweeping technique. Finally, as the toxic spill (9620) is controlled in a finite space, the MRS calls in the C-type MRAs (9350) to complete the mop up operation.

In a similar way as cleaning up toxic spills on land, FIG. 94 describes a dynamic clean up of an oil spill within limited hydro perimeters by multiple MRAs. In the first phase, the oil spill (9420) is surrounded by MRAs (9410), which operate to limit the damage and remove the oil. In the second phase, the oil spill is rendered smaller (9440) and MRAs (9430) continue to operate to remove the oil by operating in specific "cells" that act to sweep up the spill. This process continues in the final phase in which the oil spill (9470) is confined and the final drops of oil are mopped up by the MRAs (9460).

FIG. 95 describes the automated fire fighting process in which dynamic interaction occurs with a complex environment by multiple MRAs. In the first phase of the process, MRAs (9510) are dropped to the fire (9520) on one façade only (because the fire is initially inaccessible on the other side). As the MRAs (9530) are able to surround the fire (9540), in the second phase, they seek to put it out by using several methods, including removing brush that is flammable, by pouring fire retardant in a line around the fire and by directly pouring water on the fire. The MRAs may be air launched or ground launched and retrieved. In the final phase, the fire is reduced (9560) and the MRAs (9550) complete the task of extinguishing the fire.

FIG. 96 describes the manufacturing production process in which an object is created by using multiple MRAs. MRAs A (9610), B (9640), C (9650) and D (9630) work together to create the object (9620). One way to do this is for each MRA to attach parts of the object together from different spatial positions.

FIG. 97 shows the assembly of an object by using MRAs to combine the parts. At an assembly facility (9710), MRA A at position A1 (9720) and MRA B at position B1 (9730) act to assemble objects. Rather than having a movable assembly line, in this case, the MRAs themselves move. MRA A moves to position A2 (9740) and MRA B moves to position B2 (9750) in order to complete the assembly task. This process of organization of assembly tasks provides the opportunity for specialized functional MRAs to work together as a team in order to assemble objects by combining parts more quickly.

Roads can be built by using multiple MRAs as illustrated in FIG. 98. MRA A (9810) and MRA B (9820) proceed to create a road by laying down asphalt along adjacent tracks.

FIG. 99 describes micro surgery using MRAs for trauma intervention and stabilization. In this case, MRA A and MRA B guide themselves to the patient. Initially, the MRAs ascertain, by using sensors, the symptoms of trauma in order to identify problems. The MRAs then move to various positions on the patient in order to solve the problems. In the case of a wound, the MRA will seek to stop the bleeding by cauterizing the wound with a laser or by applying pressure. In the case of heart stoppage, the MRA will administer an electric shock. By stabilizing a patient, the chances of recovery are dramatically higher.

It is understood that the examples and embodiments described herein are for illustrative purposes only and that various modifications or changes in light thereof will be suggested to persons skilled in the art and are to be included within the spirit and purview of this application and scope of the appended claims. All publications, patents, and patent applications cited herein are hereby incorporated by reference for all purposes in their entirety.

What is claimed is:

1. A system for managing a robotic network, comprising:
a plurality of mobile robots, each robot including program code configured to communicate and exchange information with other robots, and a set of sensors, wherein all robots are configured to track each other;
wherein when robots are removed from or added to the network, the remaining network adjusts;
wherein the robot network includes a plurality of sensor sources;
wherein the robot network is linked together to connect all robots to at least one other robot;
wherein the robots communicate with other robots within the network to share sensor data; and
wherein the robots in the robot network transmit to and receives sensor data from other robots in the network.

2. A system of claim 1:
wherein the robot network consists of autonomous mobile robots.

3. A system of claim 1:
wherein the robot system is programmed to update the status of the sensor data to the robots.

4. A system of claim 1:
wherein the two or more robots in the robot network obtain and process sensor data from all the sensors in the sensor network in real time.

5. A system for managing a robotic network comprising:
a plurality of robots;
a plurality of intelligent mobile software agents (TMSAs), the IMSAs comprising software means for allowing robots to communicate, interact and collaborate with other robots;
wherein the plurality of robots are initially configured into a specific spatial configuration;
wherein new sensor data on environmental change is used to organize the robot network into a specific spatial configurations;
wherein new sensor data on environmental change is organized by IMSAs;
wherein the IMSAs programming is used to determine the priority of robot functions;
wherein the software code is transferred to robots;
wherein the robots are operable to receive software code from IMSAs;
wherein the specific spatial configuration of each subgroup of robots is determined based on information from one or more inputs from the environment; and
wherein the network of robots continually adjusts its spatial configuration.

6. A system of claim 5:
wherein the specific spatial configuration of each set of robots is changed in response to the information from one or more inputs from the environment.

7. A system of claim 5:
wherein the IMSAs use hybrid genetic algorithms to co-evolve with the robot environment.

8. A system for managing a mobile robotic system (MRS) comprising:
a collection of mobile robotic agents (MRAs);
intelligent mobile software agents (IMSAs) configured to allow MRAs to communicate, interact and collaborate with other MRAs:
wherein the IMSAs use simulations to model the positions of the MRAs;
wherein the simulations are organized to track the locations of MRAs from position to position over time;
wherein the simulations are transmitted to and received by the MRAs; and
wherein the simulations are used by the MRAs to configure the MRS.

9. A system of claim 8:
wherein the simulations are processed in real-time.

10. A system of claim 8:
wherein the simulations are organized to track the locations of MRAs from position to position over time.

11. A system of claim 8:
wherein the plurality of configurations of MRAs change;
wherein the MRAs change their spatial positions based on the decisions from the changing simulations;
wherein the simulations are based on data from the changing environmental interactions; and
wherein the MRAs adapt their behaviors based on the simulation inputs as the data change.

* * * * *